United States Patent
Paul et al.

(10) Patent No.: US 11,073,374 B2
(45) Date of Patent: Jul. 27, 2021

(54) DEVICES AND METHODS FOR MEASURING USING AUGMENTED REALITY

(71) Applicant: Apple Inc., Cupertino, CA (US)

(72) Inventors: Grant R. Paul, San Francisco, CA (US); Stephen O. Lemay, San Francisco, CA (US); Giancarlo Yerkes, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/145,025

(22) Filed: Sep. 27, 2018

(65) Prior Publication Data
US 2019/0339839 A1 Nov. 7, 2019

Related U.S. Application Data

(60) Provisional application No. 62/679,952, filed on Jun. 3, 2018, provisional application No. 62/668,249, filed on May 7, 2018.

(51) Int. Cl.
*G01B 11/02* (2006.01)
*G06F 3/0484* (2013.01)
(Continued)

(52) U.S. Cl.
CPC ............ *G01B 11/026* (2013.01); *G06F 3/016* (2013.01); *G06F 3/0488* (2013.01);
(Continued)

(58) Field of Classification Search
CPC ............ G06F 3/04815; G06F 3/04845; G06F 3/04883; G06F 3/016; G06F 3/04842;
(Continued)

(56) References Cited

U.S. PATENT DOCUMENTS 8,244,462 B1 * 8/2012 Zhu ......................... G01C 5/00
701/408
9,152,209 B2 * 10/2015 Jeong .................... G06F 1/3228
(Continued)

FOREIGN PATENT DOCUMENTS

| CN | 102607423 A | 7/2012 |
| CN | 106251185 A | 12/2016 |

(Continued)

OTHER PUBLICATIONS

Aakash G Technical, "App Review #1 / Measure—Tango AR / How to Use", https://www.youtube.com/watch?v=fj2iiOg36KE, May 13, 2017, 2 pages.
(Continued)

*Primary Examiner* — Thu V Huynh
(74) *Attorney, Agent, or Firm* — Morgan, Lewis & Bockius LLP

(57) ABSTRACT

An electronic device displays a representation of a physical space, receives a first set of inputs, and adds a first virtual annotation to the representation of the physical space, the first virtual annotation being linked to a portion of the representation of the physical space. The electronic device then receives a second set of inputs. If the second set of inputs corresponds to a request to create a virtual annotation within a threshold distance from the first virtual annotation, the electronic device creates a second virtual annotation in the representation of the physical space while maintaining the first virtual annotation. If the second set of inputs corresponds to a request to create a virtual annotation outside of the threshold distance from the first virtual annotation, the electronic device creates a second virtual annotation in the representation of the physical space and removes the first virtual annotation.

30 Claims, 138 Drawing Sheets

(51) Int. Cl.
*H04N 5/232* (2006.01)
*G06T 11/60* (2006.01)
*G06F 3/0481* (2013.01)
*G06F 3/0488* (2013.01)
*G06K 9/00* (2006.01)
*G06F 3/01* (2006.01)
*G06T 7/60* (2017.01)
*H04M 1/72403* (2021.01)

(52) U.S. Cl.
CPC ...... *G06F 3/04815* (2013.01); *G06F 3/04842* (2013.01); *G06F 3/04845* (2013.01); *G06F 3/04847* (2013.01); *G06F 3/04883* (2013.01); *G06K 9/00651* (2013.01); *G06T 7/60* (2013.01); *G06T 11/60* (2013.01); *H04M 1/72403* (2021.01); *H04N 5/232933* (2018.08); *H04N 5/232939* (2018.08); *G06T 2200/24* (2013.01)

(58) Field of Classification Search
CPC ..... G06F 3/04847; G06F 3/0488; G06T 7/60; G06T 11/60; H04N 5/232939; H04N 5/232933; G01B 11/026; G01B 11/02; G01B 11/028; G01B 11/03; G01B 11/04; G01B 11/0683; G01B 11/08; G06K 9/00651
See application file for complete search history.

(56) References Cited

U.S. PATENT DOCUMENTS

| | | |
|---|---|---|
| 9,495,794 B2 | 11/2016 | Masumoto |
| 9,846,027 B2 * | 12/2017 | Kimura ................. G01B 11/02 |
| 10,049,504 B2 | 8/2018 | Chen et al. |
| 10,074,179 B2 | 9/2018 | Arita et al. |
| 10,268,266 B2 | 4/2019 | Mathey-Owens et al. |
| 10,296,869 B2 | 5/2019 | Hulth |
| 10,347,033 B2 | 7/2019 | Masumoto |
| 10,606,075 B2 | 3/2020 | Choi et al. |
| 10,606,609 B2 | 3/2020 | Energin et al. |
| 10,762,716 B1 | 9/2020 | Paul et al. |
| 2008/0222233 A1 | 9/2008 | Shi et al. |
| 2009/0002719 A1* | 1/2009 | Chang ................ G01B 11/0608 356/610 |
| 2011/0022942 A1* | 1/2011 | Flemings ............ H04L 67/2804 715/230 |
| 2011/0249117 A1* | 10/2011 | Yoshihama .......... H04N 13/239 348/135 |
| 2011/0252405 A1* | 10/2011 | Meirman ............ G06F 11/3692 717/125 |
| 2011/0279381 A1 | 11/2011 | Tong et al. |
| 2013/0332892 A1 | 12/2013 | Matsuki |
| 2014/0098191 A1 | 4/2014 | Rime et al. |
| 2015/0062123 A1 | 3/2015 | Yuen |
| 2015/0067588 A1* | 3/2015 | Shim .................... G06F 3/0482 715/790 |
| 2015/0187119 A1* | 7/2015 | Masumoto ............. G06T 11/00 345/424 |
| 2015/0227645 A1 | 8/2015 | Childs et al. |
| 2016/0040981 A1* | 2/2016 | Kang .................. G01B 11/022 455/414.1 |
| 2016/0049011 A1 | 2/2016 | Kasahara et al. |
| 2016/0086322 A1* | 3/2016 | Arita .................... G01B 11/02 382/154 |
| 2016/0147408 A1* | 5/2016 | Bevis .................. G02B 27/017 715/850 |
| 2016/0170624 A1 | 6/2016 | Zambetti et al. |
| 2016/0329006 A1 | 11/2016 | Weber et al. |
| 2016/0363990 A1* | 12/2016 | Key ...................... G01G 19/52 |
| 2017/0061696 A1 | 3/2017 | Li et al. |
| 2017/0083272 A1* | 3/2017 | Sun ...................... G06F 3/1423 |
| 2017/0115488 A1 | 4/2017 | Ambrus et al. |
| 2017/0212585 A1* | 7/2017 | Kim ...................... G06F 3/013 |
| 2017/0230641 A1 | 8/2017 | Scavezz et al. |
| 2017/0277670 A1 | 9/2017 | Smith et al. |
| 2017/0289221 A1 | 10/2017 | Khalid et al. |
| 2017/0358142 A1 | 12/2017 | Lee et al. |
| 2018/0004283 A1* | 1/2018 | Mathey-Owens ...... G06F 3/017 |
| 2018/0088794 A1 | 3/2018 | Graham et al. |
| 2018/0114372 A1 | 4/2018 | Nagy et al. |
| 2018/0203561 A1* | 7/2018 | Chang .................. G06F 3/0416 |
| 2018/0203581 A1* | 7/2018 | Takeda ................. G06F 3/0488 |
| 2018/0300952 A1 | 10/2018 | Evans et al. |
| 2018/0336737 A1 | 11/2018 | Varady et al. |
| 2019/0033058 A1* | 1/2019 | Tsurumi ................ G01B 11/02 |
| 2019/0172261 A1 | 6/2019 | Alt et al. |
| 2019/0180506 A1 | 6/2019 | Gebbie et al. |
| 2019/0311512 A1 | 10/2019 | VanBlon et al. |
| 2019/0339058 A1 | 11/2019 | Dryer et al. |
| 2019/0340799 A1 | 11/2019 | Dryer et al. |
| 2019/0355121 A1 | 11/2019 | Nelson et al. |
| 2019/0369404 A1 | 12/2019 | Joshi et al. |
| 2020/0143593 A1 | 5/2020 | Rudman et al. |
| 2020/0232783 A1 | 7/2020 | Dryer et al. |

FOREIGN PATENT DOCUMENTS

| | | |
|---|---|---|
| EP | 3017591 A1 | 5/2016 |
| KR | 20160141688 A | 12/2016 |
| WO | WO 2014/197631 A1 | 12/2014 |
| WO | WO 2019/032736 A1 | 2/2019 |

OTHER PUBLICATIONS

Apple, "MeasureKit—AR ruler app for iOS 11", https://measurekit.com, Sep. 15, 2017, 10 pages.
Berthiaume, "Augmented Reality Scanning Enables Retail Innovation (Video)", https://www.scandit.com/gb/augmented-reality-scanning-enables-retail-innovation-video, Oct. 3, 2017, 5 pages.
Bhalwankar, "Triple Tap to Zoom Feature in Android Phones", https://www.youtube.com/watch?v=KlnbLhA2jg8, Jan. 25, 2014, 2 pages.
Burns, "Google Measure it Demo with Tango", https://www.youtube.com/watch?v=b74VtGGJPBg, May 20, 2016, 2 pages.
LaanLabs, "AirMeasure—AR Tape & Ruler", https://itunes.apple.com/us/app/airmeasure-ar-tape-ruler/id1251282152, Jun. 4, 2018, 3 pages.
Laanlabs, "AirMeasure—The Augmented Reality Toolkit", https://www.youtube.com/watch?v=9ycpvj6hbdE, Sep. 12, 2017, 2 pages.
Lenovo, Lenovo Tech World 2016—Keynote Livestream from San Francisco, https://www.youtube.com/watch?v=MBgQLraVGJQ, Jun. 9, 2016, 2 pages.
Lynch, "How to Zoom in On iPhone: The Quick Tutorial!", https://www.payetteforward.com/how-to-zoom-in-on-iphone-quck-tutorial, Feb. 26, 2018, 4 pages.
Mapletree Apps, "Apple ARKit iPhone Demo—Measure 3D Pro—Ruler on iOS (1)", https://www.youtube.com/watch?v=fzn3RsveJss, Oct. 1, 2017, 2 pages.
Mapletree Apps, "Apple ARKit iPhone Demo—Measure 3D Pro—Ruler on iOS (2)", https://www.youtube.com/watch?v=fzn3RsveJss, Oct. 1, 2017, 2 pages.
Mapletree Apps, "Measure 3D Tutorial series #1—How to Measure a Room", https://www.youtube.com/watch?v=HGV18HXXZqw, Apr. 19, 2018, 2 pages.
Mapletree Apps, Measure 3D Tutorial series #4—How to Measure Length in Horizonal and Vertical Planes, https://www.youtube.com/watch?V-2PjcbrgS50Q, Apr. 19, 2018, 2 pages.
Mapletree Appls, "Measure 3D Tutorial #5—How to Measure Rectangle Shapes", https://www.youtube.com/watch?v=8Gg0SMwkvQU, Apr. 19, 2018, 2 pages.
Miller, "Apple Shares Detailed Human Interface Guidelines for Developers Building ARKit Apps", https://9to5mac.com/2017/08/29/arkit-human-interface-guidelines/, Aug. 29, 2017, 5 pages.
Nuernberger et al., "SnapToReality: Aligning Augmented Reality to the Real World", http://eyalofek.org/Papers/CHI2016_Snap2Reality.pdf., May 7-12, 2016, 12 pages.

(56) References Cited

OTHER PUBLICATIONS

Occipital HQ, "TapMeasure Spatial Utility to Capture and Measure Your Space", https://www.youtube.com/watch?v=Hy1Ex2MAXM, Sep. 19, 2017, 2 pages.
SmartPicture, "PLNAR—Your AR Measurement Tool", https://www.youtube.com/watch?v=H_cqZqKLjws, Sep. 28, 2017, 2 pages.
SmarPicture Tech, "Mobile App Design for Bay Area—Rely on the Reinvently Agency", https://appadvice.com/app/plnar/1282049921, Sep. 21, 2018, 5 pages.
Office Action, dated Aug. 31, 2018, received in Danish Patent Application No. 201870350, 11 pages.
Office Action, dated Aug. 31, 2018, received in Danish Patent Application No. 201870351, 11 pages.
Office Action, dated Sep. 28, 2018, received in Danish Patent Application No. 201870352, which corresponds with U.S. Appl. No. 16/145,015, 7 pages.
Certificate of Examination, dated Jul. 19, 2019, received in Danish Patent Application No. 2019100486, which corresponds with U.S. Appl. No. 16/138,779, 5 pages.
Office Action, dated Jul. 17, 2019, received in European Patent Application No. 19159743.4, which corresponds with U.S. Appl. No. 16/145,025, 8 pages.
Invitation to Pay Additional Fees, dated Jul. 15, 2019, received in International Patent Application No. PCT/US2019/029904, which corresponds with U.S. Appl. No. 16/145,015, 29 pages.
European Search Report, dated Jul. 4, 2019, received in European Patent Application No. 19158743.4, which corresponds with U.S. Appl. No. 16/145,025, 4 pages.
Office Action, dated Feb. 21, 2019, received in U.S. Appl. No. 16/145,015, 34 pages.
Office Action, dated Jan. 31, 2019, received in Danish Patent Application No. 201870352, which corresponds with U.S. Appl. No. 16/145,025, 4 pages.
Notice of Allowance, dated Jun. 5, 2019, received in U.S. Appl. No. 16/145,015, 12 pages.
Office Action, dated May 28, 2019, received in Danish Patent Application No. 201870350, which corresponds with U.S. Appl. No. 16/145,015, 6 pages.
Innovation Patent, dated May 22, 2019, received in Danish Patent Application No. 201870351, which corresponds with U.S. Appl. No. 16/138,779, 5 pages.
Lenovo, "Lenovo_PHAB2_Pro_User_Guide V1.0", https://pcsupport.lenovo.com/do/en/products/tablets/phab-series/phab2-pro-documentation/doc_userguide, Aug. 29, 2017, 10 pages.
Office Action, dated Feb. 21, 2020, received in Danish Patent Application No. 201870350, which corresponds with U.S. Appl. No. 16/145,015, 8 pages.
Notice of Allowance, dated Nov. 22, 2019, received in U.S. Appl. No. 16/138,779, 17 pages.
Office Action, dated Feb. 13, 2020, received in Danish Patent Application No. 201870351, which corresponds with U.S. Appl. No. 16/138,779, 10 pages.
Office Action, dated Sep. 16, 2019, received in Danish Patent Application No. 201870352, which corresponds with U.S. Appl. No. 16/145,025, 3 pages.
International Search Report and Written Opinion, dated Sep. 9, 2019, received in International Patent Application No. PCT/US2019/029904, which corresponds with U.S. Appl. No. 16/145,015, 31 pages.
Office Action, dated Aug. 3, 2020, received in Chinese Patent Application No. 201910261469.3, which corresponds with U.S. Appl. No. 16/138,779, 5 pages.
Office Action, dated Aug. 27, 2020, received in Danish Patent Application No. 201870352, which corresponds with U.S. Appl. No. 16/145,025, 2 pages.
Office Action, dated Oct. 5, 2020, received in European Patent Application No. 19159743.4, which corresponds with U.S. Appl. No. 16/145,025, 6 pages.
Office Action, dated Jan. 8, 2021, received in U.S. Appl. No. 17/018,958, 27 pages.
Office Action, dated Feb. 21, 2021, received in U.S. Appl. No. 16/841,550, 8 pages.
Office Action, dated Jan. 22, 2021, received in U.S. Appl. No. 17/018,980, 17 pages.
Office Action, dated Jan. 7, 2021, received in U.S. Appl. No. 17/018,994, 7 pages.
Notice of Allowance, dated Feb. 23, 2021, received in U.S. Appl. No. 17/018,994, 8 pages.
YouTube, A1 Corner & Edge Detection (beta), https://www.youtube.com/watch?v=YSNklighUtxA, Nov. 21, 2020, 2 pages.
YouTube, AR Measure—Automatic Measure in Augmented Reality, https://www.youtube.com/watch?v=70CQfH76vg4, Mar. 16, 2019, 2 pages.
YouTube, Huawei P30 Pro AR Measure / Measure length, depth, area and volume, https;//www.outube.com/watch?v=0QX5QaK7YY, 2 pages.
Office Action, dated Jan. 20, 2021, received in Chinese Patent Application No. 201910261469.3, which corresponds with U.S. Appl. No. 16/138,779, 11 pages.
Office Action, dated Dec. 18, 2020, received in Danish Patent Application No. 202070602, which corresponds with U.S. Appl. No. 17/018,958, 10 pages.
Office Action, dated Dec. 18, 2020, received in Danish Patent Application No. 202070603, which corresponds with U.S. Appl. No. 17/018,980, 9 pages.
Office Action, dated Jan. 12, 2021, received in Danish Patent Application No. 2020-70604, which corresponds with U.S. Appl. No. 17/018,994, 8 pages.
Intention to Grant, dated Mar. 10, 2021, received in Danish Patent Application No. 201870352, which corresponds with U.S. Appl. No. 16/145,025, 2 pages.

\* cited by examiner

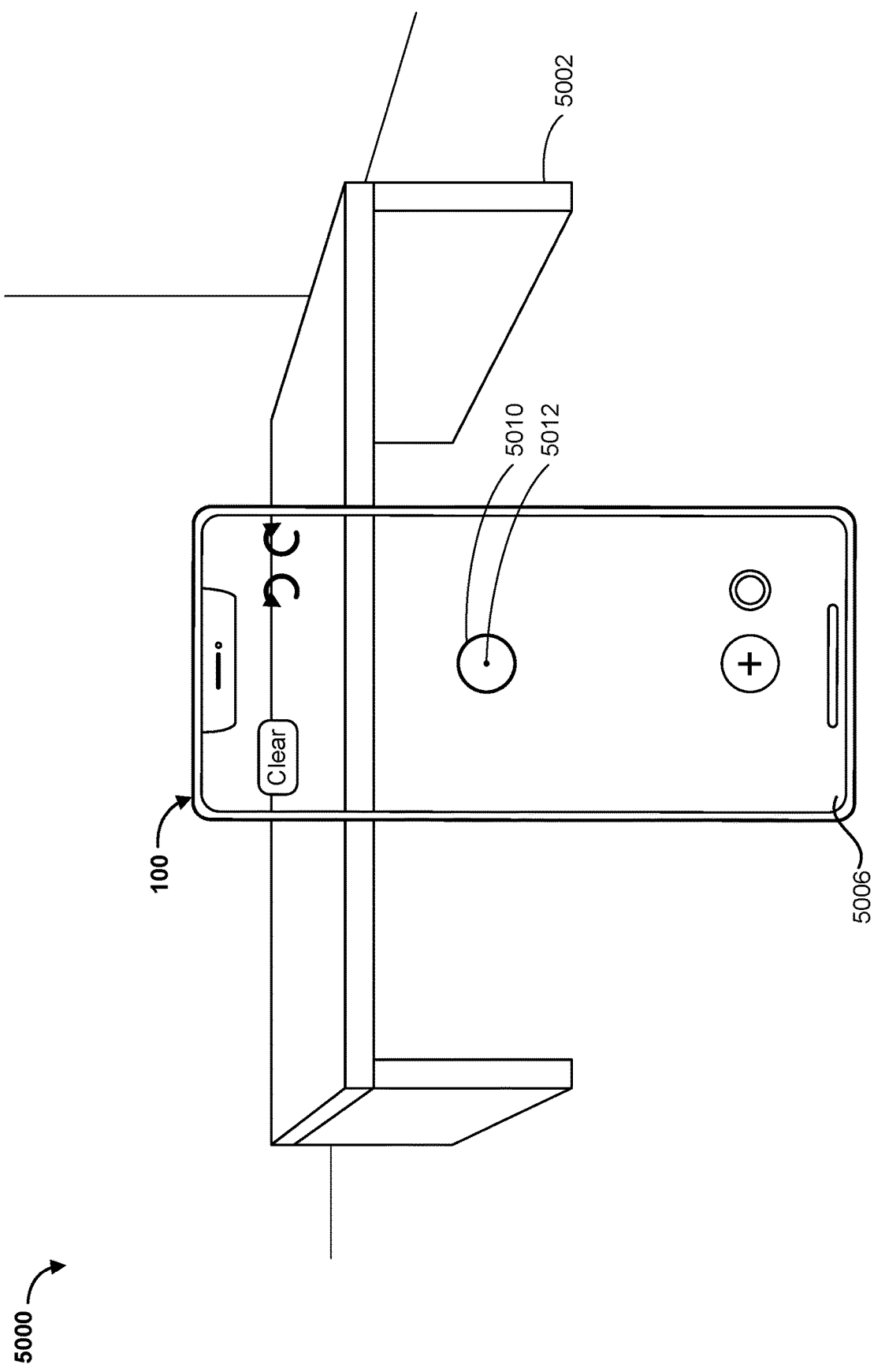

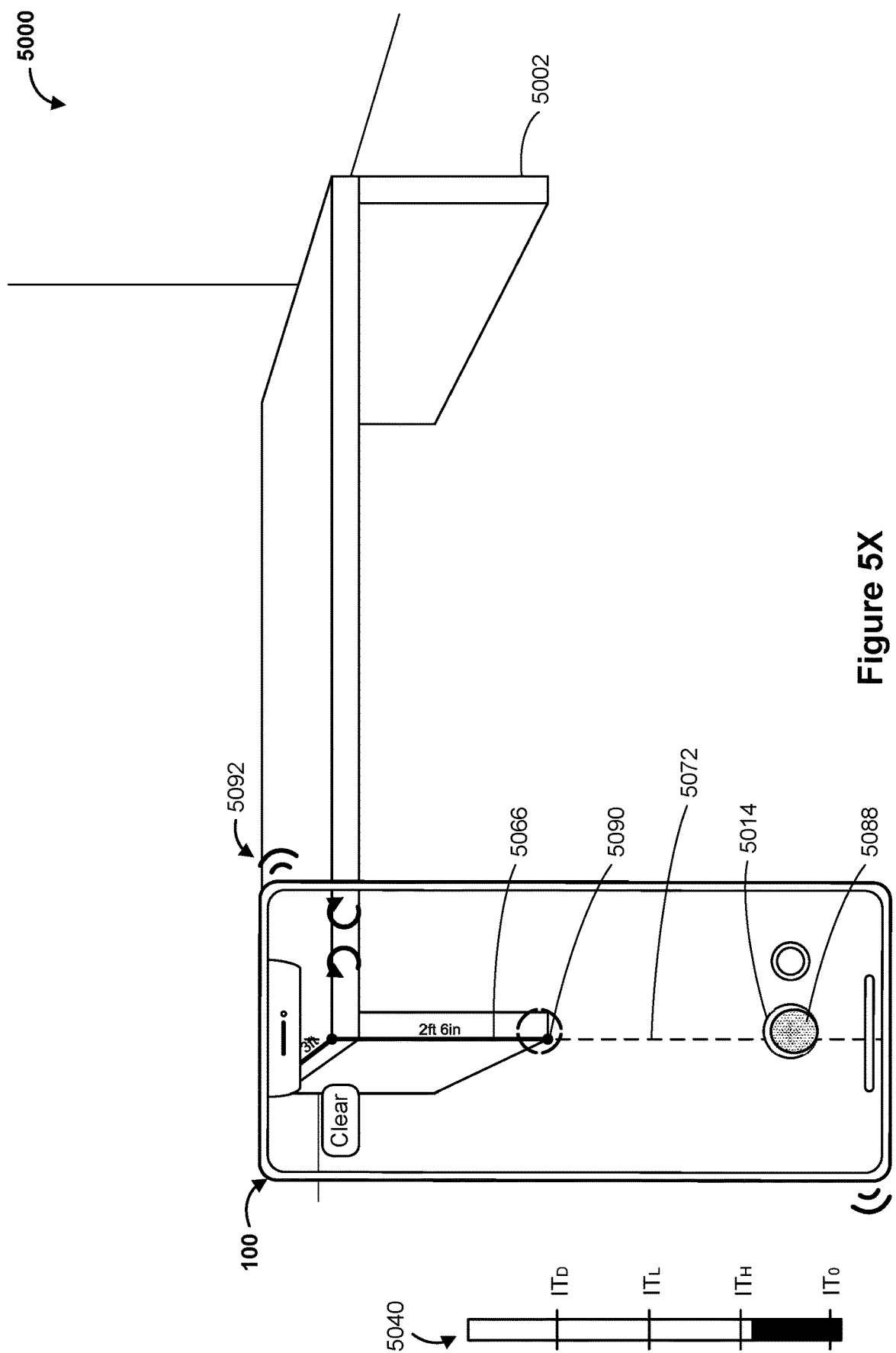

618 The one or more cameras are located on the electronic device adjacent to a portion of the touch-sensitive display that is near a side of the device on which the one or more cameras are positioned;
   the user interface includes:
      a first affordance that is displayed in a portion of the touch-sensitive display and which, when activated, adds a measurement point to the displayed representation of the field of view, and
      one or more second affordances displayed in accordance with a first orientation of the electronic device;
   detect movement of the electronic device to a second orientation; and
   in response to detecting the movement of the electronic device to the second orientation:
      update display of the one or more second affordances in accordance with the second orientation of the electronic device; and
      continue to display the first affordance in the portion of the touch-sensitive display 620 The user interface of the application includes one or more affordances that correspond to operations of the application, including a capture affordance;
   detect a third touch input on the capture affordance; and
   in accordance with a determination that the third touch input meets first media capture criteria, initiate capture of media of a first type that includes a sequence of images of the field of view of at least one of the one or more camera

622 In accordance with a determination that the third touch input meets second media capture criteria, initiate capture of media of a second type that includes a single image of the field of view of at least one of the one or more cameras 624 Prior to displaying the user interface of the application:
      display a control panel user interface that includes a plurality of controls, wherein a first control in the plurality of controls corresponds to the application; and
      detect a touch input activating the first control; and,
   in response to detecting the touch input activating the first control, display the user interface of the application

Figure 6B

626 The user interface is a first user interface of a plurality of user interfaces in the application;
  the first user interface corresponds to a measurement mode of the application; and
  a second user interface of the plurality of user interfaces corresponds to a levelling mode of the application 628 Determine a distance between the electronic device and the first location in the three-dimensional space that corresponds to the measurement point;
  in accordance with a determination that the determined distance is less than a first threshold distance, a magnification factor between the first magnification and the second magnification is a first magnification factor;
  in accordance with a determination that the determined distance is greater than a second threshold distance, the magnification factor is a second magnification factor; and
  in accordance with a determination that the determined distance is between the first threshold distance and the second threshold distance, the magnification factor is a respective magnification factor, between the first magnification factor and the second magnification factor, that depends on the determined distance 630 While displaying the enlarged display of at least the portion of the representation of the field of view, detect a fourth touch input that includes detecting a contact at the current location of the measurement point and detecting movement of the contact across the touch-sensitive display; and,
  in response to detecting the movement of the contact across the touch-sensitive display:
    move the measurement point across the representation of the field of view in accordance with the movement of the contact in the fourth touch input 632 The first touch input is detected on an affordance which, when activated, adds a measurement point to the displayed representation of the field of view;
  the affordance is displayed in the user interface at a predefined location; and
  a location in the representation of the field of view where the measurement point is initially added, in response to activation of the affordance, is distinct from the predefined location of the affordance

Figure 6C

726 In accordance with a determination that the first criteria are not met while the measurement-point-creation indicator is displayed over the second location in the representation of the field of view that corresponds to the second location in the three-dimensional space:
  forgo adding and displaying the second measurement point in the representation of the field of view that corresponds to the second location in the three-dimensional space; and
  forgo displaying the first measurement segment connecting the first measurement point and the second measurement point 728 After adding the second measurement point, update the representation of the field of view as the electronic device is moved again; and
  after the electronic device is moved again, while the measurement-point-creation indicator is displayed over a third location in the representation of the field of view that corresponds to the third location in the three-dimensional space:
    in accordance with a determination that the first criteria are met while the measurement-point-creation indicator is displayed over the third location in the representation of the field of view that corresponds to the third location in the three-dimensional space:
      add and display a third measurement point in the representation of the field of view that corresponds to the third location in the three-dimensional space;
      in accordance with a determination that second criteria are met, wherein the second criteria include a requirement that the contact is maintained between the first criteria being met for adding the second measurement point and the first criteria being met for adding the third measurement point, display a second measurement segment connecting the second measurement point and the third measurement point; and
      in accordance with a determination that the second criteria are not met, forgo displaying the second measurement segment connecting the second measurement point and the third measurement point 730 In accordance with a determination that the intensity of the contact meets the respective intensity threshold, generate a tactile output 732 The respective intensity threshold is a second intensity threshold that is above a first intensity threshold;
  in accordance with a determination that the intensity of the contact ceases to meet the second intensity threshold, and that the intensity of the contact meets the first intensity threshold, generate a tactile output

Figure 7C

734 The adding and the displaying of the first measurement point is performed when the intensity of the contact meets the respective intensity threshold, while the measurement-point-creation indicator is displayed over the first location in the representation of the field of view that corresponds to the first location in the three-dimensional space; and
    the adding and the displaying of the second measurement point is performed when the intensity of the contact meets the respective intensity threshold after the electronic device is moved, while the measurement-point-creation indicator is displayed over the second location in the representation of the field of view that corresponds to the second location in the three-dimensional space 736 The respective intensity threshold is a second intensity threshold that is above a first intensity threshold;
    the first criteria include a requirement that the intensity of the contact falls below the respective intensity threshold, after meeting the respective intensity threshold, in order for the first criteria to be met;
    the adding and the displaying of the first measurement point is performed when the intensity of the contact falls below the respective intensity threshold, while the measurement-point-creation indicator is displayed over the first location in the representation of the field of view that corresponds to the first location in the three-dimensional space; and
    the adding and the displaying of the second measurement point is performed when, after the electronic device is moved and while the measurement-point-creation indicator is displayed over the second location in the representation of the field of view that corresponds to the second location in the three-dimensional space, the intensity of the contact falls below the respective intensity threshold 738 While displaying the representation of the field of view of the one or more cameras:
    determine an anchor point in the representation of the field of view of the one or more cameras that corresponds to a respective location in the three-dimensional space; and,
    as the one or more cameras move, while the measurement-point-creation indicator is over the anchor point, change a visual appearance of the measurement-point-creation indicator to indicate that a respective measurement point will be added at the anchor point if the contact meets the first criteria

Figure 7D

740 The user interface includes an affordance, which, when activated, adds a measurement point in the representation of the field of view at a location in the representation of the field of view over which the measurement-point-creation indicator is displayed;
  detect a touch input activating the affordance; and
  in response to detecting the touch input activating the affordance, add and display a measurement point in the representation of the field of view at the location in the representation of the field of view over which the measurement-point-creation indicator is displayed

Figure 7E

824 As at least one of the one or more cameras moves, while the measurement-point-creation indicator is over the anchor point:
    in conjunction with changing the visual appearance of the measurement-point-creation indicator, generate a tactile output;
    adding a measurement point at the anchor point, if a touch input meets first criteria, will not form a region enclosed by a plurality of displayed measurement segments in the representation of the field of view of the one or more cameras 826 Detect movement of the measurement-point-creation indicator away from the anchor point; and
    in response to detect the movement of the measurement-point-creation indicator away from the anchor point, generate a tactile output 828 In response to detecting the first touch input that meets the first criteria:
    add the first measurement point without adding a measurement segment connected to the first measurement point; and
    generate a first tactile output;
    detect movement of the measurement-point-creation indicator to a second location in the representation of the field of view that corresponds to a second location in the three-dimensional space;
    while the measurement-point-creation indicator is over the second location in the representation of the field of view, detect a second touch input on the touch-sensitive display that meets the first criteria; and
    in response to detecting the second touch input that meets the first criteria:
        add a second measurement point at the second location in the representation of the field of view;
        add a measurement segment between the first measurement point and the second measurement point; and
        generate a second tactile output that is different from the first tactile output 830 As at least one of the one or more cameras moves:
    display the measurement-point-creation indicator while the representation of the field of view includes a region corresponding to an identified physical feature in the three-dimensional space in the field of view of at least one of the one or more cameras; and
    cease to display the measurement-point-creation indicator while the representation of the field of view does not include a region corresponding to an identified physical feature in the three-dimensional space

Figure 8C

912 While concurrently displaying, over the representation of the field of view, the representation of the measurement and the label that describes the measurement:
    while the electronic device is the first distance from the physical object, display one or more first scale markers along the representation of the measurement at a first scale;
    detect movement of the electronic device that moves the electronic device to a second distance from the physical object; and
    while the electronic device is the second distance from the physical object, display one or more second scale markers along at least a portion of the representation of the measurement at a second scale that is distinct from the first scale 914 Detect a second set of one or more user inputs that add, over the representation of the field of view, a representation of a second measurement that corresponds to a respective physical object in the three-dimensional space;
    concurrently display, over the representation of the field of view, the representation of the second measurement and a second label that describes the second measurement, wherein:
        in accordance with a determination that a second distance between the electronic device and the respective physical object is less than the first threshold distance, the second label is displayed at the first threshold size;
        in accordance with a determination that the second distance between the electronic device and the respective physical object is greater than the second threshold distance, the second label is displayed at the second threshold size; and
        in accordance with a determination that the second distance between the electronic device and the respective physical object is between the first threshold distance and the second threshold distance, the second label is displayed at a size, between the first threshold size and the second threshold size, that depends on the second distance between the electronic device and the respective physical object 916 The first distance between the electronic device and the physical object to which the first measurement corresponds is different from the second distance between the electronic device and the respective physical object to which the second measurement corresponds;
    the first label is displayed at a first size;
    the second label is displayed at a second size; and
    the first size is different from the second size

Figure 9B

1016 The one or more user inputs add, over the representation of the field of view, a representation of a second measurement that corresponds to the physical object, wherein:

the representation of the second measurement includes the second endpoint that corresponds to the second location on the physical object;

the representation of the second measurement includes a third endpoint that corresponds to a third location on the physical object; and the representation of the second measurement includes a second line segment connecting the second endpoint and the third endpoint; and the first area in the representation of the field of view of the one or more cameras is determined based on the first measurement and the second measurement

---

1018 The field of view of at least one of the one or more cameras includes a first portion of the physical rectangular area, and the first area corresponds to the first portion of the physical rectangular area;

detect movement of the electronic device that moves the field of view of at least one of the one or more cameras;

in response to detecting the movement of the electronic device that moves the field of view, update the representation of the field of view over time to display one or more indications of one or more additional areas that correspond to one or more additional portions of the physical rectangular area; and in accordance with a determination that an aggregate area, including the first area and the one or more additional areas displayed over time, corresponds to the entire physical rectangular area, display, over the representation of the field of view, a label that describes a measurement that corresponds to the physical rectangular area

---

1020 After displaying, over the representation of the field of view, the label that describes the measurement that corresponds to the physical rectangular area in accordance with the determination that the aggregate area corresponds to the entire physical rectangular area, detect further movement of the electronic device that moves the field of view of at least one of the one or more cameras such that the representation of the field of view includes the first area corresponding to the first portion of the physical rectangular area; and in accordance with the determination that the aggregate area corresponds to the entire physical rectangular area, display, over the first area corresponding to the first portion of the physical rectangular area, the label that describes the measurement that corresponds to the physical rectangular area

Figure 10B

1112 Initiating the process for sharing the information about the measurement includes displaying a second user interface that includes one or more activatable user interface elements, wherein a respective activatable user interface element in the one or more activatable user interface elements corresponds to a respective destination for the information about the measurement;
   detect a second touch input on the touch-sensitive display on a respective activatable user interface element in the second user interface; and
   in response to detecting the second touch input, transmit the information about the measurement to the respective destination corresponding to the respective activatable user interface element 1114 In response to detecting the first touch input on the touch-sensitive display on the representation of the measurement, display the information about the measurement 1116 The displaying of the information about the measurement is performed in accordance with a determination that the first touch input meets first criteria, wherein the first criteria include a requirement that an intensity of a contact in the first touch input meet a respective intensity threshold in order for the first criteria to be met 1118 Determine a classification of the physical object;
   the information about the measurement includes a label indicating the classification of the physical object 1120 The representation of the measurement was added to the user interface of the application based at least in part on movement of the electronic device in a first direction during the measurement;
   determine a classification of a relationship between the measurement and the physical object based at least in part on the movement of the electronic device in the first direction during the measurement;
   the information about the measurement includes a label indicating the classification of the relationship between the measurement and the physical object

Figure 11B

1216 The field of view includes a plurality of elements, and the plurality of elements includes one or more elements that extend in directions other than the first direction;
    while detecting the movement of the electronic device that moves the field of view in the first direction, forgo displaying guides that extend in directions other than the first direction 1218 Prior to detecting the movement of the electronic device that moves the field of view in the first direction:
    detect a first touch input on the touch-sensitive display;
    in response to detecting the first touch input, add and display a first measurement point at a first location in the representation of the field of view that corresponds to a first location in the three-dimensional space;
    displaying the first guide is further based on a determination that the one or more first elements correspond to the first location in the three-dimensional space; and
    the first guide includes the first location in the representation of the field of view 1220 The first measurement point at the first location in the representation of the field of view is a most-recently-added measurement point in the representation of the field of view 1222 After detecting the movement of the electronic device that moves the field of view in the first direction, detect movement of the electronic device that moves the field of view in a second direction;
    in response to detecting the movement of the electronic device that moves the field of view in the second direction, cease to display the first guide that extends in the first direction; and
    while detecting the movement of the electronic device that moves the field of view in the second direction:
        update the representation of the field of view in accordance with the movement of the electronic device;
        identify one or more second elements in the representation of the field of view that extend along the second direction; and
        based at least in part on the determination of the one or more second elements, display, in the representation of the field of view, a second guide that extends in the second direction and that corresponds to one of the one or more identified second elements

Figure 12B

1224 At least one of the one or more first identified elements to which the first guide corresponds is an element identified as an edge of a physical object in the three-dimensional space 1226 At least one of the one or more first identified elements to which the first guide corresponds is an element identified as a plane in the three-dimensional space 1228 The user interface includes a measurement-point-creation indicator that is displayed over the representation of the field of view;
    display a respective measurement point at a respective location in the representation of the field of view that corresponds to a respective location in the three-dimensional space;
    detect movement of the electronic device that moves the measurement-point-creation indicator over the respective measurement point in the representation of the field of view;
    in response to detecting the movement of the electronic device, while the measurement-point-creation indicator is displayed over the respective measurement point, display a plurality of guides, wherein a first guide of the plurality of guides is perpendicular to a second guide of the plurality of guides, and wherein the plurality of guides intersect at the respective measurement point 1230 The user interface includes a measurement-point-creation indicator that is displayed over a second location in the representation of the field of view;
    while displaying the first guide that extends in the first direction:
        detect a second touch input on the touch-sensitive display;
        in response to detecting the second touch input:
            in accordance with a determination that a distance between the second location and the first guide is within a threshold distance, add and display a second measurement point at the location on the first guide that is the distance from the second location; and
            in accordance with a determination that a distance between the second location and the first guide is not within the threshold distance, add and display the second measurement point at the second location

Figure 12C

1318 Creating the second virtual annotation in the representation of the physical space while maintaining the first virtual annotation in the representation of the physical space includes starting to create the second virtual annotation at a location that corresponds to at least a portion of the first virtual annotation 1320 Creating the second virtual annotation in the representation of the physical space while maintaining the first virtual annotation in the representation of the physical space includes completing creation of the second virtual annotation at a location that corresponds to at least a portion of the first virtual annotation 1322 In response to receiving the second set of one or more inputs associated with the representation of the physical space, in accordance with a determination that the second set of one or more inputs correspond to a request to shift a field of view of at least one of the one or more cameras by more than a threshold amount, remove the first virtual annotation from the representation of the physical space 1324 In response to receiving the second set of one or more inputs associated with the representation of the physical space, in accordance with a determination that the second set of one or more inputs correspond to a request to shift a field of view of at least one of the one or more cameras so that the first virtual annotation is no longer visible for more than a threshold amount of time, remove the first virtual annotation from the representation of the physical space

Figure 13B

1326 While receiving the second set of one or more inputs and while the first virtual annotation is in the representation of the physical space, output an indication that further input will cause the first virtual annotation to be removed from the representation of the physical space 1328 The indication is a visual indication that is displayed in a predetermined portion of the user interface that is used for displaying alerts 1330 The indication is a change in appearance of the first virtual annotation in the representation of the physical space 1332 The first virtual annotation is a representation of a measurement that includes a description of the measurement, and the change in appearance of the first virtual annotation includes removing the description from the representation of the measurement while maintaining at least a portion of the representation of the measurement 1334 After displaying the change in appearance of the first virtual annotation in the representation of the physical space:
 detect an input at a location within a threshold distance from the first virtual annotation; and,
 in response to detecting the input at the location within the threshold distance form the first virtual annotation, reverse the change in appearance of the first virtual indication

Figure 13C

1416 In response to detecting the movement of at least one of the one or more cameras relative to the physical space:
  in accordance with a determination that the placement user interface element is at a location in the representation of the physical space that corresponds to a first object in the physical space that is a first distance away from one of the one or more cameras, display the placement user interface element at a first size; and
  in accordance with a determination that the placement user interface element is at a location in the representation of the physical space that corresponds to a second object in the physical world that is a second distance away from one of the one or more cameras, display the placement user interface element at a second size, where the first distance is greater than the second distance and the first size is less than the second size > 1418 The first size of the placement user interface element in the representation of the physical space is larger relative to the first object in the physical space than the second size of the placement user interface element in the representation of the physical space relative to the second object in the physical space 1420 The placement user interface element includes a first portion and a second portion;
  in response to detecting the movement of at least one of the one or more cameras relative to the physical space:
    in accordance with a determination that the placement user interface element is at a location in the representation of the physical space that corresponds to a predefined type of feature in the physical space, update the appearance of the placement user interface element so that the second portion of the placement user interface element is enlarged relative to the first portion of the placement user interface element; and
    in accordance with a determination that the placement user interface element is at a location in the representation of the physical space that does not correspond to a predefined type of feature in the physical space, maintain display of the placement user interface element without enlarging the second portion of the placement user interface element relative to the first portion of the placement user interface element

Figure 14B

1422 The placement user interface element includes a first portion and a second portion;

in response to detecting the movement of at least one of the one or more cameras relative to the physical space:

in accordance with a determination that the placement user interface element is at a location in the representation of the physical space that corresponds to a predefined type of feature in the physical space, update the appearance of the placement user interface element so that the second portion of the placement user interface element is shifted relative to the first portion of the placement user interface element; and in accordance with a determination that the placement user interface element is at a location in the representation of the physical space that does not correspond to a predefined type of feature in the physical space, maintain display of the placement user interface element without shifting the second portion of the placement user interface element relative to the first portion of the placement user interface element 1424 In response to detecting the movement of at least one of the one or more cameras relative to the physical space, in accordance with a determination that the device is unable to identify an object in the second portion of the physical space whose corresponding object in the representation of the physical space can be linked to a virtual annotation, display an alert with information indicating that the electronic device is unable to identify an object in the second portion of the physical space whose corresponding object in the representation of the physical space can be linked to a virtual annotation

Figure 14C

1426 In response to detecting the movement of at least one of the one or more cameras relative to the physical space, in accordance with a determination that the device is unable to identify an object in the second portion of the physical space whose corresponding object in the representation of the physical space can be linked to a virtual annotation, display an alert with information indicating a reason that the electronic device is unable to identify an object in the second portion of the physical space whose corresponding object in the representation of the physical space can be linked to a virtual annotation 1428 The information indicating the reason that the device is unable to identify an object in the second portion of the physical space whose corresponding object in the representation of the physical space can be linked to a virtual annotation includes one or more of: an indication that more light is required, an indication that at least one of the one or more cameras is moving too fast, an indication that at least one of the one or more cameras needs to be moved to locate a surface in the physical space, an indication that at least one of the one or more cameras needs to be moved further away from objects in the physical space, and an indication that at least one of the one or more cameras needs to be moved closer to objects in the physical space 1430 While displaying the placement user interface element at a location over the representation of the physical space that corresponds to the second portion of the physical space:
    detecting a placement input; and,
    in response to detecting the placement input, place at least a portion of a virtual annotation in the representation of the physical space at a location that corresponds to the placement user interface element 1432 While displaying the placement user interface element at a location over the representation of the physical space that corresponds to the second portion of the physical space:
    detect an input at a location that corresponds to the placement user interface element; and
    in response to detecting the input at the location that corresponds to the placement user interface element, display a graphical indication adjacent to a different user interface element in the annotation placement user interface that indicates that activation of the different user interface element will cause placement of at least a portion of a virtual annotation in the representation of the physical space at a location that corresponds to the placement user interface element

Figure 14D

DEVICES AND METHODS FOR MEASURING USING AUGMENTED REALITY

RELATED APPLICATIONS

This application claims priority to U.S. Provisional Application Ser. No. 62/679,952, filed Jun. 3, 2018, and U.S. Provisional Application Ser. No. 62/668,249, filed May 7, 2018, which are incorporated by reference herein in their entireties.

TECHNICAL FIELD

This relates generally to electronic devices for virtual/augmented reality, including but not limited to electronic devices for measuring physical spaces and/or objects using virtual/augmented reality environments.

BACKGROUND

Augmented reality environments are useful for making measurements of physical spaces and objects therein, by providing a view of the physical space and enabling a user to superimpose measurements on the physical space and objects therein. But conventional methods of measuring using augmented reality are cumbersome, inefficient, and limited. In some cases, conventional methods of measuring using augmented reality are limited in functionality. In some cases, conventional methods of measuring using augmented reality require multiple separate inputs (e.g., a sequence of gestures and button presses, etc.) to achieve an intended outcome (e.g., through activation of numerous displayed user interface elements to access different measurement functions). In addition, conventional methods take longer than necessary, thereby wasting energy. This latter consideration is particularly important in battery-operated devices.

SUMMARY

Accordingly, there is a need for computer systems with improved methods and interfaces for measuring using virtual/augmented reality environments. Such methods and interfaces optionally complement or replace conventional methods for measuring using virtual/augmented reality environments. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for measuring using virtual/augmented reality are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, in addition to an augmented reality-based measurement function, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a touch-sensitive display and one or more cameras. The method includes displaying, on the touch-sensitive display, a user interface of an application. The user interface includes a representation of a field of view of at least one of the one or more cameras. The representation of the field of view is displayed at a first magnification, and the representation of the field of view is updated over time based on changes to current visual data detected by at least one of the one or more cameras. The field of view includes at least a portion of a three-dimensional space. The method includes, while displaying the representation of the field of view, detecting a first touch input on the touch-sensitive display, and, in response to detecting the first touch input, adding and displaying a measurement point at a first location in the representation of the field of view that corresponds to a first location in the three-dimensional space. The method also includes, after adding the measurement point and while continuing to display the representation of the field of view: as at least one of the one or more cameras moves, displaying the measurement point at a location in the representation of the field of view that corresponds to the first location in the three-dimensional space; detecting a second touch input at a location on the touch-sensitive display that corresponds to a current location of the measurement point in the representation of the field of view; and, in response to detecting the second touch input, enlarging display of at least a portion of the representation of the field of view from the first magnification to a second magnification, greater than the first magnification, wherein the enlarged display of the portion of the representation of the field of view includes the measurement point.

In accordance with some embodiments, a method is performed at an electronic device with a touch-sensitive display, one or more sensors to detect intensities of contacts with the touch-sensitive display, and one or more cameras. The method includes displaying, on the touch-sensitive display, a user interface of an application. The user interface includes a representation of a field of view of at least one of the one or more cameras. The representation of the field of view is updated over time based on changes to current visual data detected by at least one of the one or more cameras. The user interface also includes a measurement-point-creation indicator that is displayed over the representation of the field of view. The field of view includes at least a portion of a three-dimensional space. The method includes detecting a contact on the touch-sensitive display, and, while continuously detecting the contact on the touch-sensitive display, while the measurement-point-creation indicator is displayed over a first location in the representation of the field of view that corresponds to a first location in the three-dimensional space, and in accordance with a determination that first criteria are met, where the first criteria include a requirement that an intensity of the contact meet a respective intensity threshold in order for the first criteria to be met, adding and displaying a first measurement point in the representation of the field of view that corresponds to the first location in the three-dimensional space. The method also includes, after adding the first measurement point, updating the representation of the field of view as the electronic device is moved. The method further includes, after the electronic device is moved, while the measurement-point-creation indicator is displayed over a second location in the representation of the field of view that corresponds to a second location in the three-dimensional space, in accordance with a determination that the first criteria are met while the measurement-point-creation indicator is displayed over the second location in the representation of the field of view that corresponds to the second location in the three-dimensional space: adding and displaying a second measurement point in the representation of the field of view that corresponds to the second location in the three-dimensional space; and displaying a first measurement segment connecting the first measurement point and the second measurement point.

In accordance with some embodiments, a method is performed at an electronic device with a touch-sensitive display and one or more cameras. The method includes displaying, on the touch-sensitive display, a user interface of an application. The user interface includes a representation of a field of view of at least one of the one or more cameras. The representation of the field of view is updated over time based on changes to current visual data detected by at least one of the one or more cameras. The user interface includes a measurement-point-creation indicator that is displayed over the representation of the field of view. The field of view includes at least a portion of a three-dimensional space. The method includes, while displaying the representation of the field of view, determining an anchor point at a location in the representation of the field of view that corresponds to a first location in the three-dimensional space. The method also includes, as at least one of the one or more cameras move, while the measurement-point-creation indicator is over the anchor point, changing a visual appearance of the measurement-point-creation indicator to indicate that a measurement point will be added at the anchor point if a touch input meets first criteria. The method further includes, detecting a first touch input on the touch-sensitive display that meets the first criteria, and, in response to detecting the first touch input that meets the first criteria: in accordance with a determination that the measurement-point-creation indicator is over the anchor point when the first criteria are met, adding and displaying a first measurement point at the anchor point in the representation of the field of view that corresponds to the first location in the three-dimensional space; and in accordance with a determination that the measurement-point-creation indicator is not over the anchor point when the first criteria are met, adding and displaying a first measurement point at a first location in the representation of the field of view that is away from the anchor point.

In accordance with some embodiments, a method is performed at an electronic device with a display, an input device, and one or more cameras. The method includes displaying, on the display, a user interface of an application. The user interface includes a representation of a field of view of at least one of the one or more cameras. The representation of the field of view is updated over time based on changes to current visual data detected by at least one of the one or more cameras. The field of view includes a physical object in a three-dimensional space. The method includes, while displaying the representation of the field of view, detecting one or more user inputs, via the input device, that add, over the representation of the field of view, a representation of a first measurement that corresponds to the physical object. The method also includes concurrently displaying, over the representation of the field of view, the representation of the first measurement and a first label that describes the first measurement, where: in accordance with a determination that a first distance between the electronic device and the physical object is less than a first threshold distance, the first label is displayed at a first threshold size; in accordance with a determination that the first distance between the electronic device and the physical object is greater than a second threshold distance that is greater than the first threshold distance, the first label is displayed at a second threshold size that is smaller than the first threshold size; and in accordance with a determination that the first distance between the electronic device and the physical object is between the first threshold distance and the second threshold distance, the first label is displayed at a size, between the first threshold size and the second threshold size, that depends on the first distance between the electronic device and the physical object.

In accordance with some embodiments, a method is performed at an electronic device with a display, an input device, and one or more cameras. The method includes displaying, on the display, a user interface of an application. The user interface includes a representation of a field of view of at least one of the one or more cameras. The representation of the field of view is updated over time based on changes to current visual data detected by at least one of the one or more cameras. The field of view includes a physical object in a three-dimensional space. The method includes, while displaying the representation of the field of view, detecting one or more user inputs, via the input device, that add, over the representation of the field of view, a representation of a first measurement that corresponds to the physical object, where the representation of the first measurement includes a first endpoint that corresponds to a first location on the physical object, the representation of the first measurement includes a second endpoint that corresponds to a second location on the physical object; and the representation of the first measurement includes a first line segment connecting the first endpoint and the second endpoint. The method also includes determining, based in part on the first measurement, a first area in the representation of the field of view that adjoins the first line segment of the first measurement, where the first area corresponds to a physical rectangular area in the three-dimensional space. The method further includes displaying an indication of the first area in the user interface, where the indication is overlaid on the first area in the representation of the field of view.

In accordance with some embodiments, a method is performed at an electronic device with a touch-sensitive display and one or more cameras. The method includes displaying, on the touch-sensitive display, a first user interface of an application. The first user interface includes a representation of a field of view of at least one of the one or more cameras. The representation of the field of view is updated over time based on changes to current visual data detected by at least one of the one or more cameras. The field of view includes a physical object in a three-dimensional space. A representation of a measurement of the physical object is superimposed on an image of the physical object in the representation of the field of view. The method includes, while displaying the first user interface, detecting a first touch input on the touch-sensitive display on the representation of the measurement. The method further includes, in response to detecting the first touch input on the touch-sensitive display on the representation of the measurement, initiating a process for sharing information about the measurement.

In accordance with some embodiments, a method is performed at an electronic device with a display, an input device, and one or more cameras. The method includes displaying, on the display, a user interface of an application. The user interface includes a representation of a field of view of at least one of the one or more cameras. The representation of the field of view is updated over time based on changes to current visual data detected by at least one of the one or more cameras. The field of view includes at least a portion of a three-dimensional space. The method includes detecting movement of the electronic device that moves the field of view of at least one of the one or more cameras in a first direction. The method also includes, while detecting the movement of the electronic device that moves the field of view in the first direction: updating the representation of the field of view in accordance with the movement of the electronic device; identifying one or more first elements in the representation of the field of view that extend along the first direction; and, based at least in part on the determination of the one or more first elements, displaying, in the representation of the field of view, a first guide that extends in the first direction and that corresponds to one of the one or more first identified elements.

In accordance with some embodiments, a method is performed at an electronic device with one or more input devices, one or more display devices, and one or more cameras: The method includes displaying, via the one or more display devices, a user interface that includes a representation of a physical space. The method includes, while displaying the representation of the physical space, receiving a first set of one or more inputs to create a virtual annotation in the representation of the physical space. The method also includes, in response to receiving the first set of one or more inputs, adding a first virtual annotation to the representation of the physical space. The first virtual annotation is linked to a portion of the representation of the physical space. The method also includes, after adding the first virtual annotation to the representation of the physical space, receiving a second set of one or more inputs associated with the representation of the physical space. The method further includes, in response to receiving the second set of one or more inputs associated with the representation of the physical space: in accordance with a determination that the second set of one or more inputs corresponds to a request to create a virtual annotation in the representation of the physical space that is within a threshold distance from the first virtual annotation, creating a second virtual annotation in the representation of the physical space while maintaining the first virtual annotation in the representation of the physical space; and, in accordance with a determination that the second set of one or more inputs corresponds to a request to create a virtual annotation in the representation of the physical space that is outside of the threshold distance from the first virtual annotation, creating a second virtual annotation in the representation of the physical space and removing the first virtual annotation from the representation of the physical space.

In accordance with some embodiments, a method is performed at an electronic device with one or more input devices, one or more display devices, and one or more cameras. The method includes displaying, via the one or more display devices, an annotation placement user interface. The annotation placement user interface includes: a representation of a physical space; and a placement user interface element that indicates a location at which a virtual annotation will be placed in the representation of the physical space in response to detecting an annotation placement input. The method includes, while displaying the annotation placement user interface, detecting movement of at least one of the one or more cameras relative to the physical space. The movement of at least one of the one or more cameras starts while the placement user interface element is displayed at a location in the representation of the physical space that corresponds to a first portion of the physical space. The method includes, in response to detecting the movement of at least one of the one or more cameras relative to the physical space, moving the placement user interface element to a location in the representation of the physical space that corresponds to a second portion of the physical space that is different from the first portion of the physical space, and updating an appearance of the annotation placement user interface in accordance with the movement of at least one of the one or more cameras relative to the physical space, including: in accordance with a determination that the electronic device is unable to identify an object in the second portion of the physical space whose corresponding object in the representation of the physical space can be linked to a virtual annotation, ceasing to display at least a portion of the placement user interface element; and in accordance with a determination that the device has identified an object in the second portion of the physical space whose corresponding object in the representation of the physical space can be linked to a virtual annotation, maintaining display of the placement user interface element.

In accordance with some embodiments, a computer system (e.g., an electronic device) includes (and/or is in communication with) a display generation component (e.g., a display, a projector, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more attitude sensors, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by a computer system that includes (and/or is in communication with) a display generation component, one or more cameras, one or more input devices, optionally one or more attitude sensors, optionally one or more sensors to detect intensities of contacts with the touch-sensitive surface, and optionally one or more tactile output generators, cause the computer system to perform or cause performance of the operations of any of the methods described herein. In accordance with some embodiments, a graphical user interface on a computer system that includes (and/or is in communication with) a display generation component, one or more cameras, one or more input devices, optionally one or more attitude sensors, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes (and/or is in communication with) a display generation component, one or more cameras, one or more input devices, optionally one or more attitude sensors, optionally one or more sensors to detect intensities of contacts with the touch-sensitive surface, optionally one or more tactile output generators, and means for performing or causing performance of the operations of any of the methods described herein. In accordance with some embodiments, an information processing apparatus, for use in a computer system that includes (and/or is in communication with) a display generation component, one or more cameras, one or more input devices, optionally one or more attitude sensors, optionally one or more sensors to detect intensities of contacts with the touch-sensitive surface, and optionally one or more tactile output generators, includes means for performing or causing performance of the operations of any of the methods described herein.

Thus, computer systems that have (and/or are in communication with) a display generation component, one or more cameras, one or more input devices, optionally one or more attitude sensors, optionally one or more sensors to detect intensities of contacts with the touch-sensitive surface, and optionally one or more tactile output generators, are provided with improved methods and interfaces for measuring physical objects using virtual/augmented reality environments, thereby increasing the effectiveness, efficiency, and user satisfaction with such computer systems. Such methods and interfaces may complement or replace conventional methods for measuring physical objects using virtual/augmented reality environments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6C are flow diagrams of a process for interacting with an application for making measurements of a physical space using an augmented reality environment in accordance with some embodiments.

FIGS. 7A-7E are flow diagrams of a process for adding measurements to a displayed representation of a physical space in an augmented reality environment in accordance with some embodiments.

FIGS. 8A-8C are flow diagrams of a process for adding virtual measurement points at automatically determined anchor points in an augmented reality environment in accordance with some embodiments.

FIGS. 9A-9B are flow diagrams of a process for displaying labels for measurements of a physical space in an augmented reality environment in accordance with some embodiments.

FIGS. 10A-10B are flow diagrams of a process for measuring and interacting with rectangular areas in a physical space in an augmented reality environment in accordance with some embodiments.

FIGS. 11A-11B are flow diagrams of a process for interacting with and managing measurement information in an augmented reality environment in accordance with some embodiments.

FIGS. 12A-12C are flow diagrams of a process for providing automatically determined alignment guides in an augmented reality environment in accordance with some embodiments.

FIGS. 13A-13C are flow diagrams of a process for automatically removing previously-added virtual annotations in an augmented reality environment in accordance with some embodiments.

FIGS. 14A-14D are flow diagrams of a process for indicating whether objects in a physical space have been identified as objects whose corresponding representations in an augmented reality environment can be tracked in accordance with some embodiments.

DESCRIPTION OF EMBODIMENTS

As noted above, augmented reality environments are useful for making measurements of physical spaces and objects therein, by providing a view of the physical space and enabling a user to superimpose measurements on the physical space and physical objects therein. Conventional methods of measuring with augmented reality environments are often limited in functionality. In some cases, conventional methods require multiple separate inputs (e.g., a sequence of gestures and button presses, etc.) to achieve an intended outcome (e.g., through activation of numerous displayed user interface elements to access different measurement functions). The embodiments disclosed herein provide an intuitive way for a user to make measurements with an augmented reality environment (e.g., by enabling the user to perform different operations in the augmented reality environment with fewer inputs, and/or by simplifying the user interface). Additionally, the embodiments herein provide improved visual and tactile feedback that provide additional information to the user about the physical objects being measured and about the operations being performed in the augmented reality environment.

The systems, methods, and GUIs described herein improve user interface interactions with virtual/augmented reality environments in multiple ways. For example, they make it easier to measure features in a physical space using an augmented reality environment, by providing automatic detection of features in the physical space, improved labeling, and alignment guides (e.g., for improved measurement point placement and area recognition), and by enabling the user to interact with and manage measurement information.

Figure 8A:
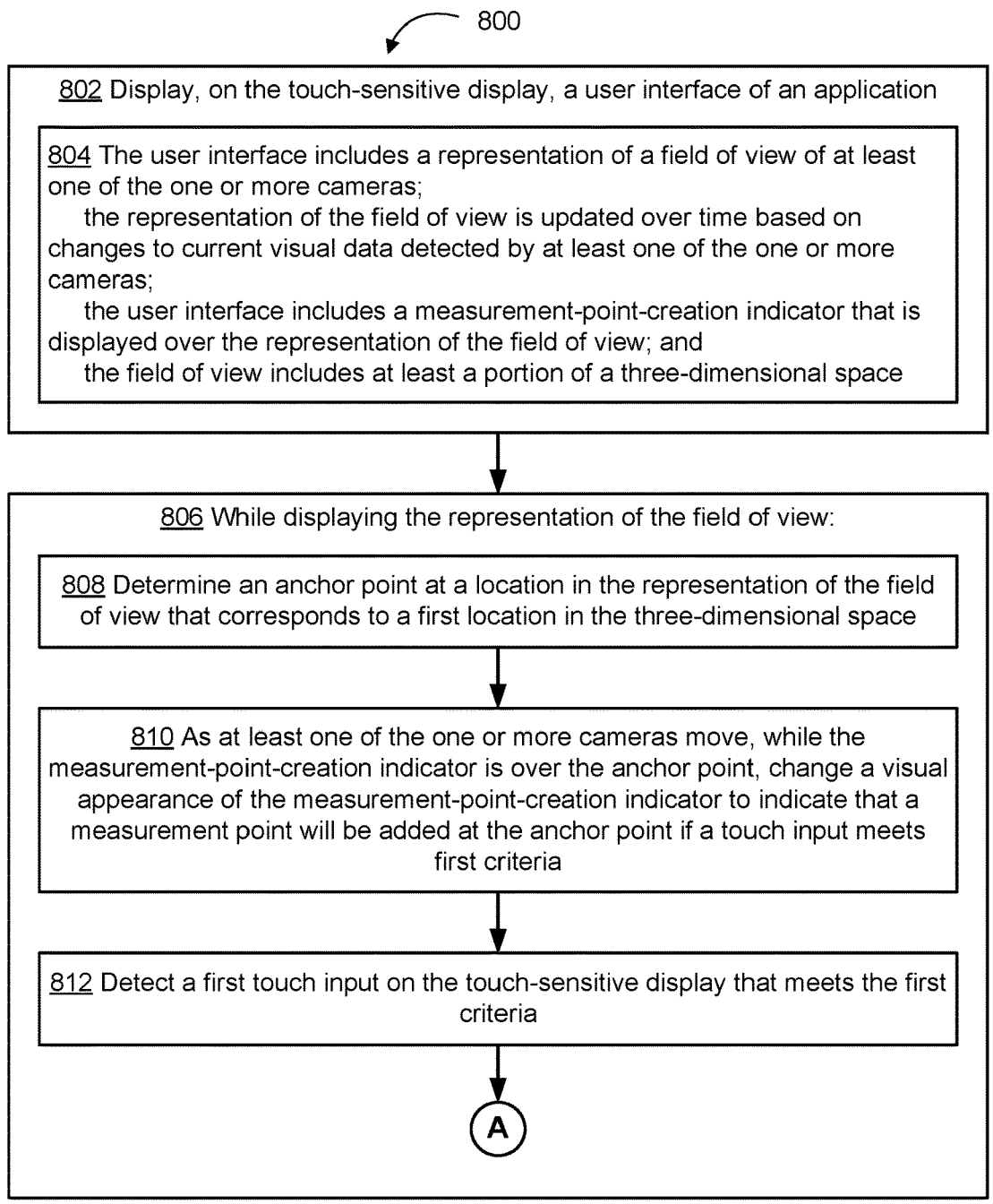
Figure 8B:
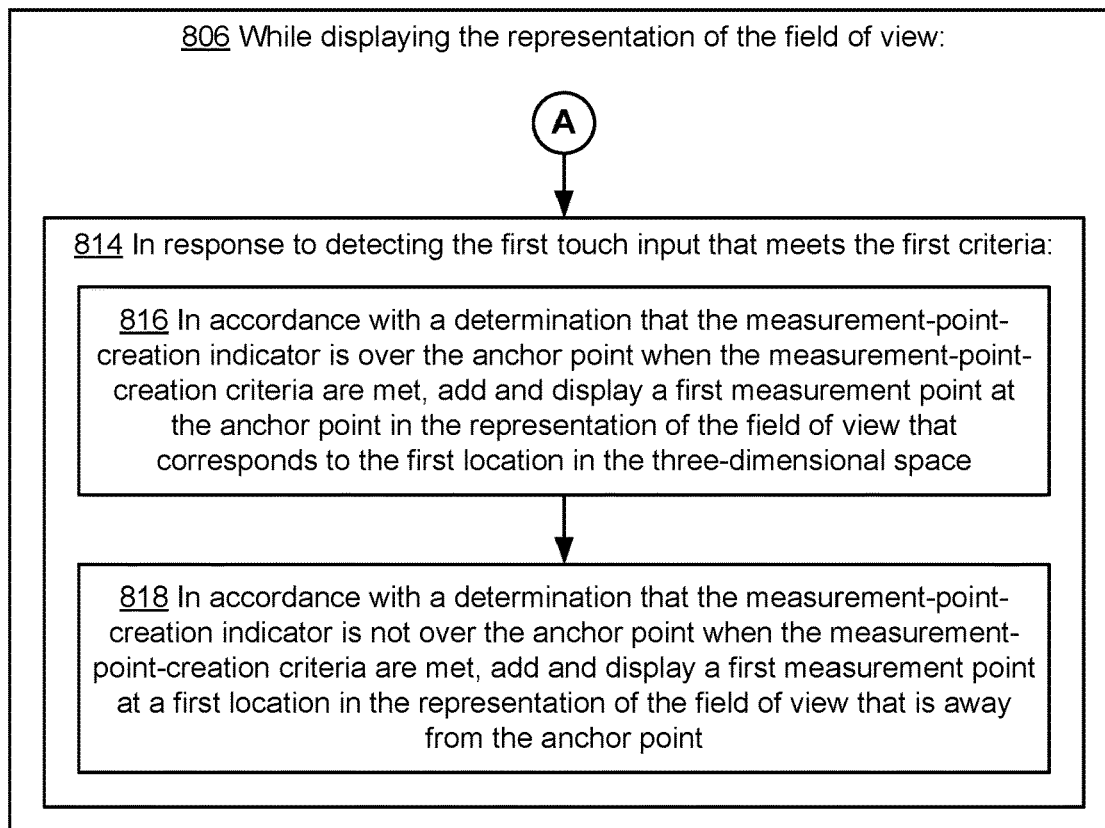
Figure 9A:
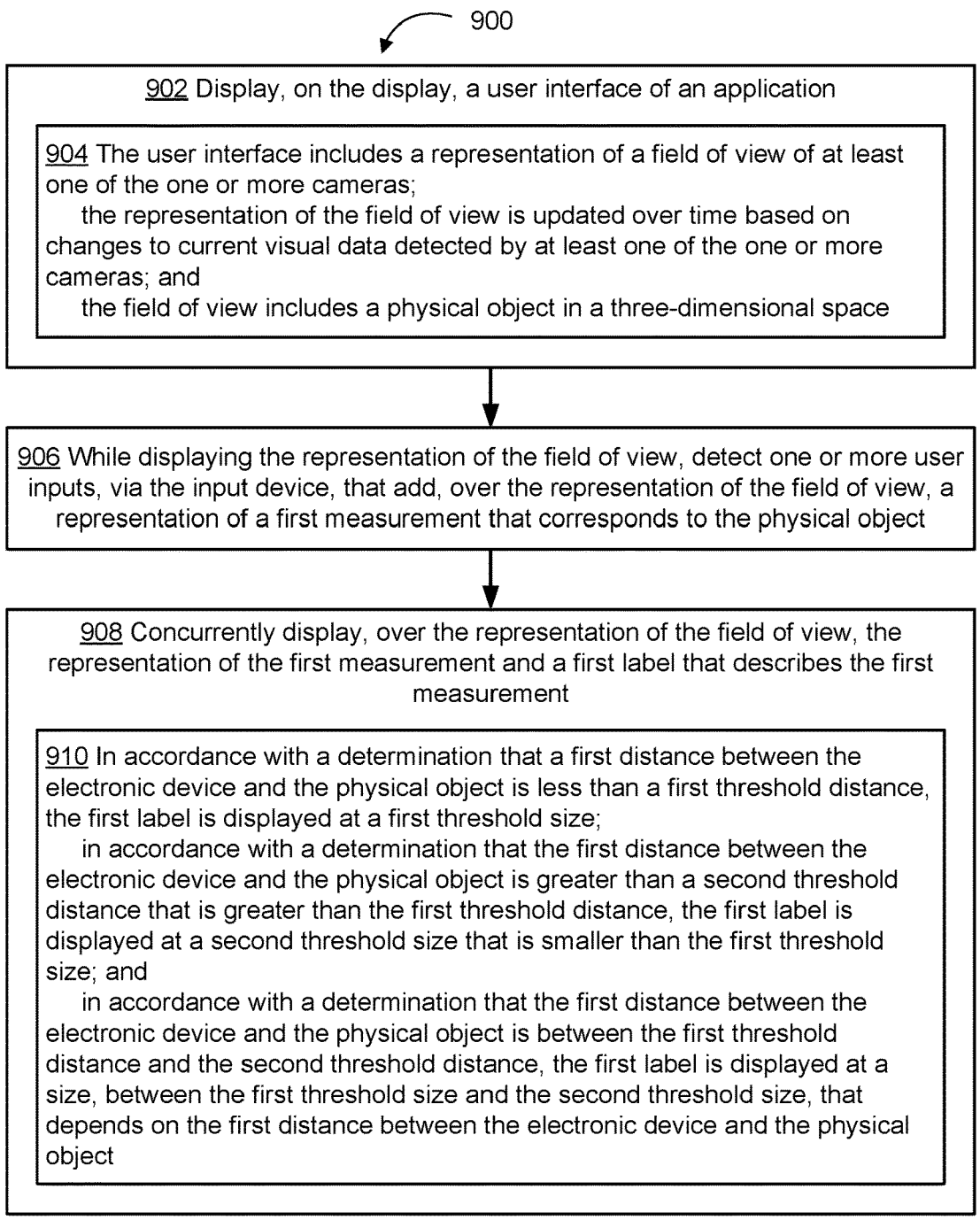
Figure 10A:
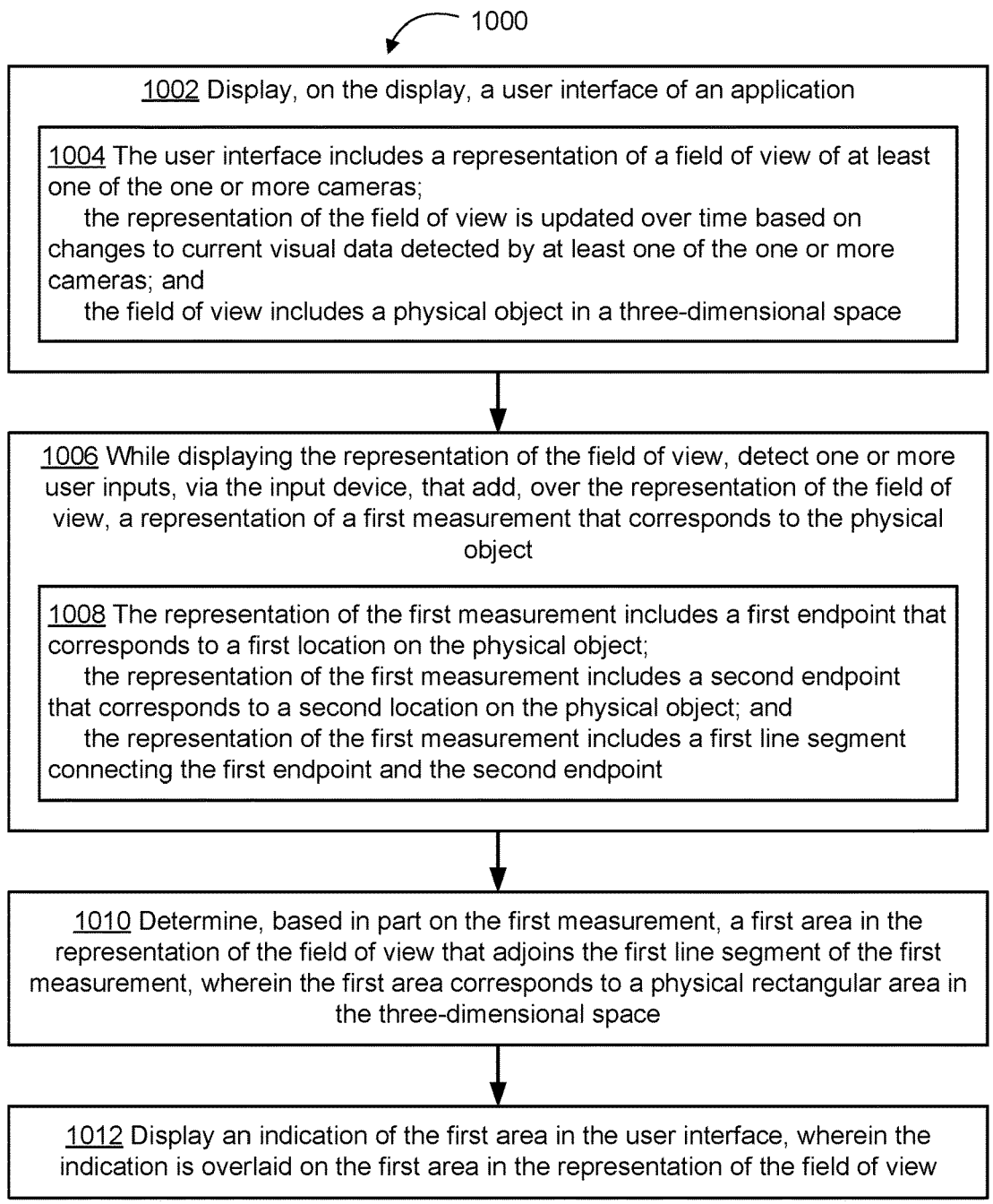
Figure 11A:
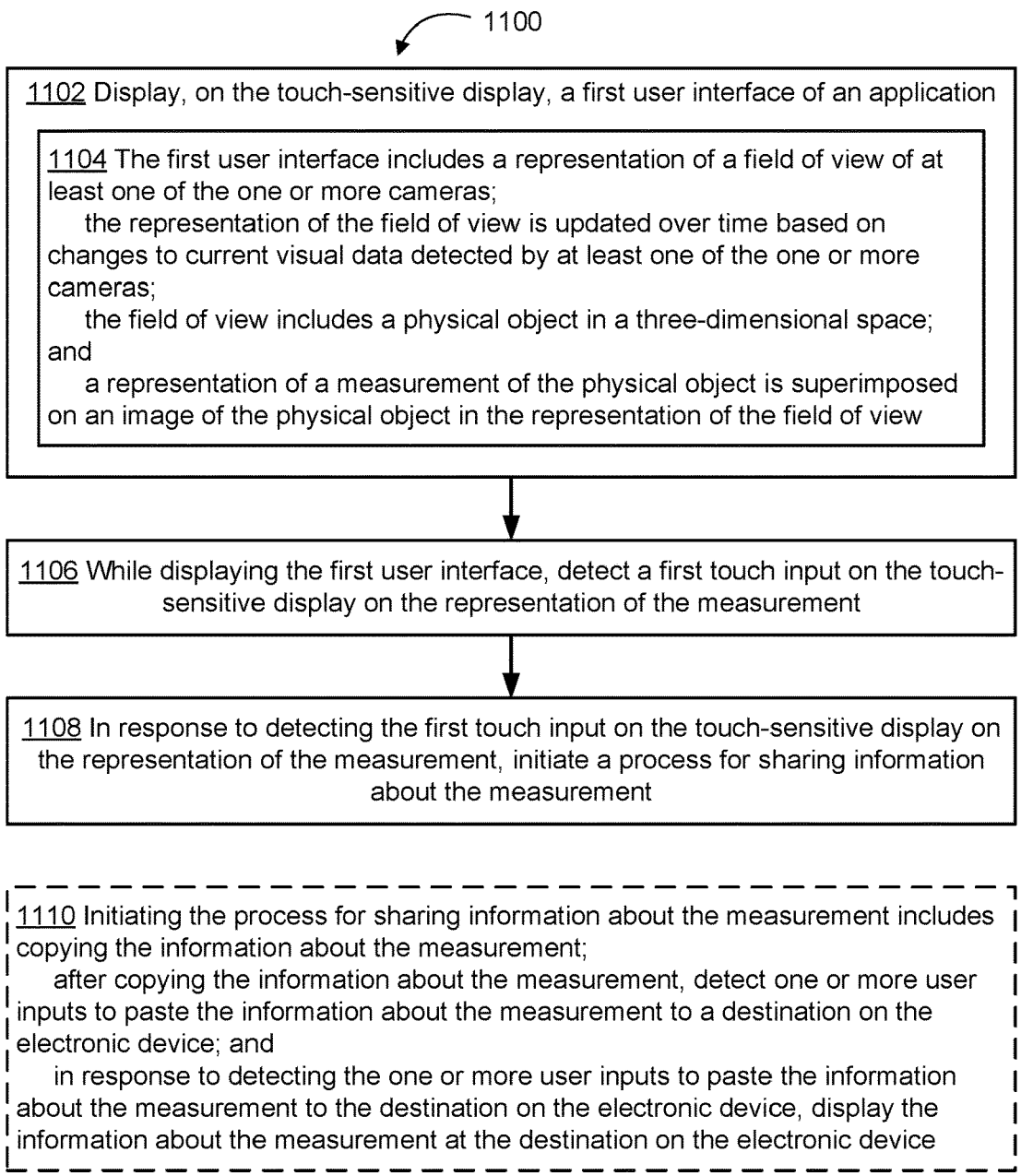
Figure 12A:
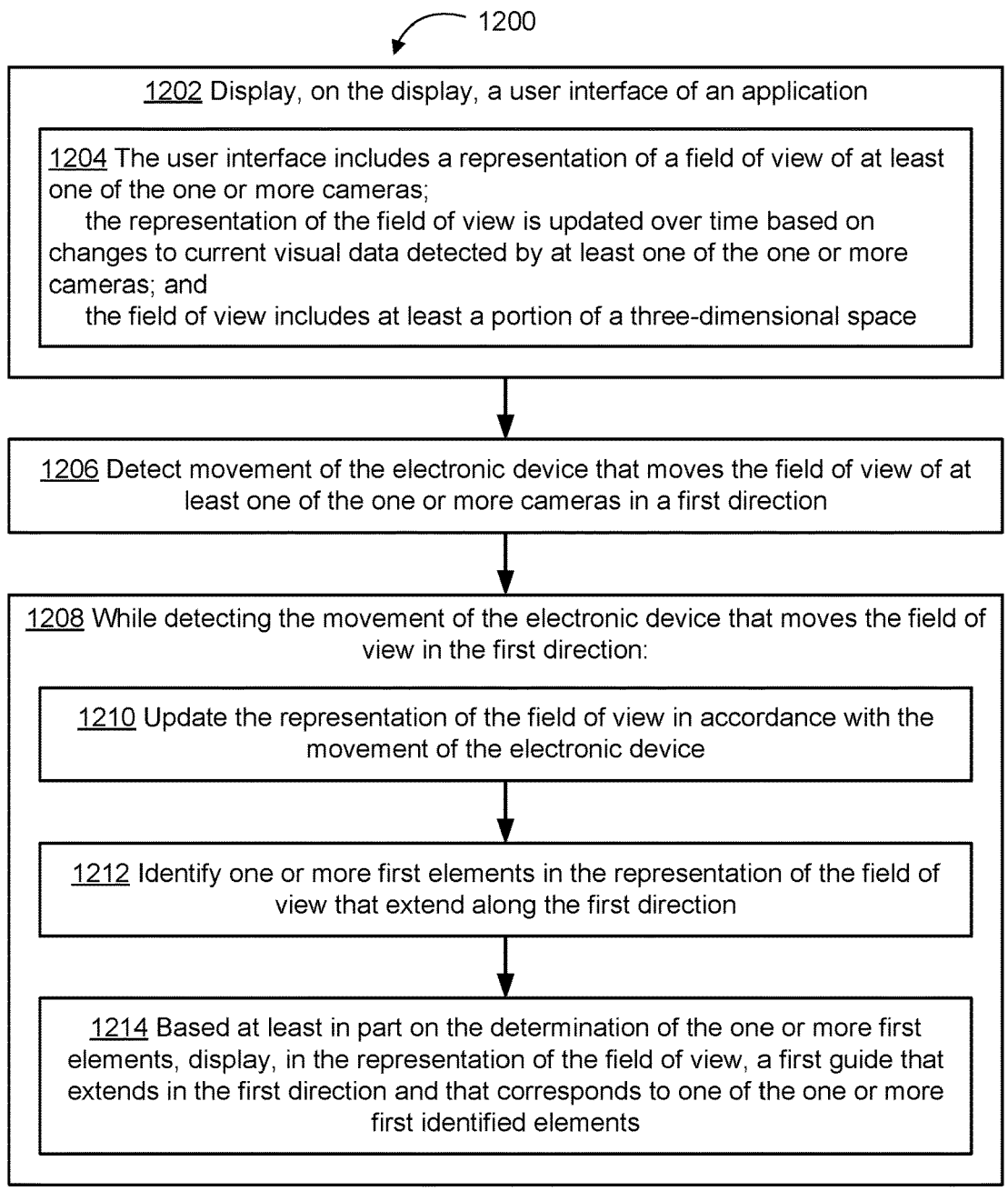
Figure 13A:
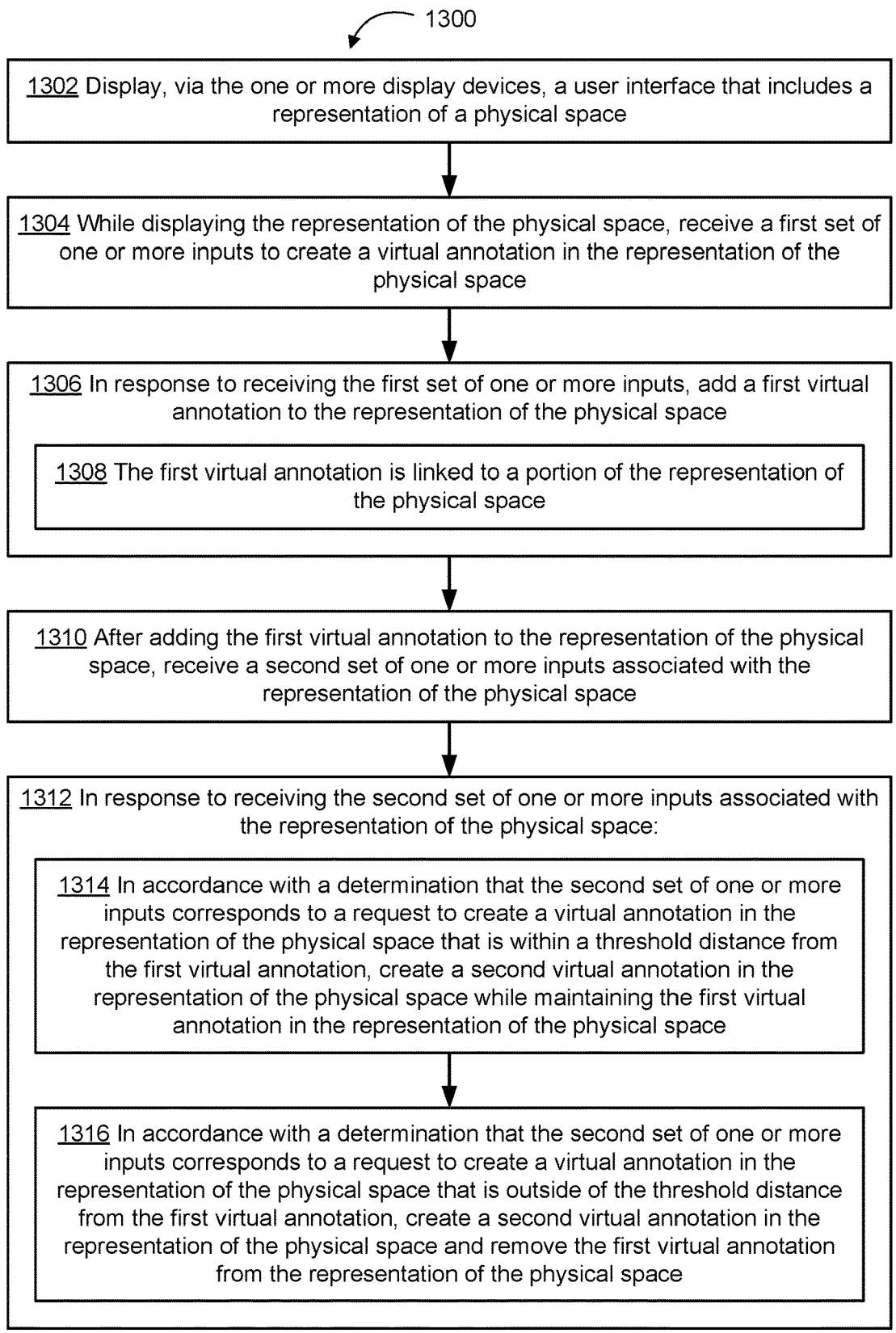
Figure 14A:
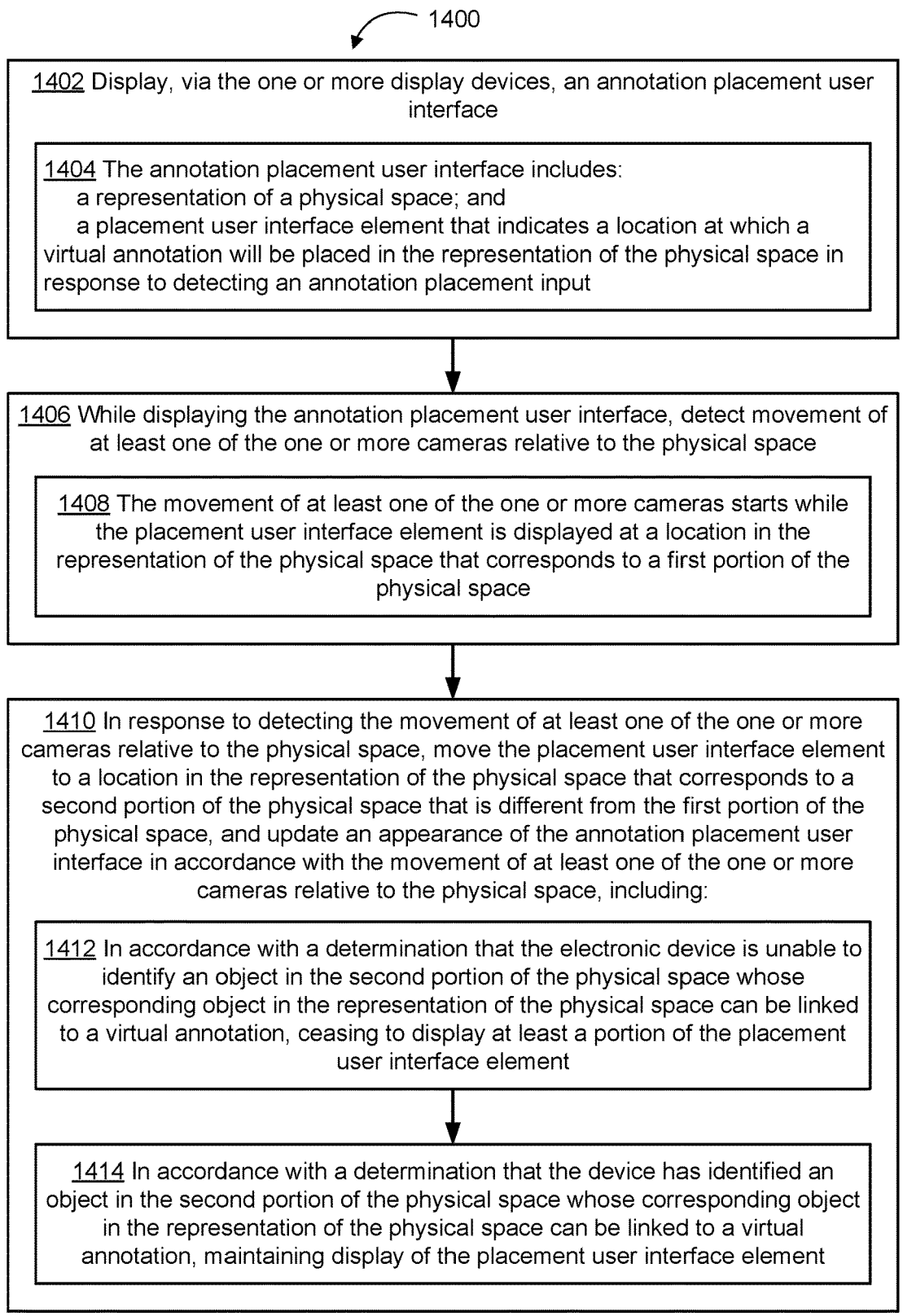

Below, FIGS. 1A-1B, 2, and 3A-3C provide a description of example devices. FIGS. 4A-4B and 5A-5CO illustrate example contexts and example user interfaces for making measurements of a physical space using an augmented reality environment. FIGS. 6A-6C illustrate a flow diagram of a method of interacting with an application for making measurements of a physical space using an augmented reality environment. FIGS. 7A-7E illustrate a flow diagram of a method of adding measurements to a displayed representation of a physical space in an augmented reality environment. FIGS. 8A-8C illustrate a flow diagram of a method of adding virtual measurement points at automatically determined anchor points in an augmented reality environment. FIGS. 9A-9B illustrate a flow diagram of a method of displaying labels for measurements of a physical space in an augmented reality environment. FIGS. 10A-10B illustrate a flow diagram of a method of measuring and interacting with rectangular areas in a physical space in an augmented reality environment. FIGS. 11A-11B illustrate a flow diagram of a method of interacting with and managing measurement information in an augmented reality environment. FIGS. 12A-12C illustrate a flow diagram of a method of providing automatically determined alignment guides in an augmented reality environment. FIGS. 13A-13C are flow diagrams of a process for automatically removing previously-added virtual annotations in an augmented reality environment. FIGS. 14A-14D are flow diagrams of a process for indicating whether objects in a physical space have been identified as objects whose corresponding representations in an augmented reality environment can be tracked. The user interfaces in FIGS. 5A-5CO are used to illustrate the processes in FIGS. 6A-6C, 7A-7E, 8A-8C, 9A-9B, 10A-10B, 11A-11B, 12A-12C, 13A-13C, and 14A-14D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Computer systems for virtual/augmented reality include electronic devices that produce virtual/augmented reality environments. Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad) that also includes, or is in communication with, one or more cameras.

In the discussion that follows, a computer system that includes an electronic device that has (and/or is in communication with) a display and a touch-sensitive surface is described. It should be understood, however, that the computer system optionally includes one or more other physical user-interface devices, such as a physical keyboard, a mouse, a joystick, a wand controller, and/or cameras tracking the position of one or more features of the user such as the user's hands.

The device typically supports a variety of applications, such as one or more of the following: a gaming application, a note taking application, a drawing application, a presentation application, a word processing application, a spreadsheet application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed by the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
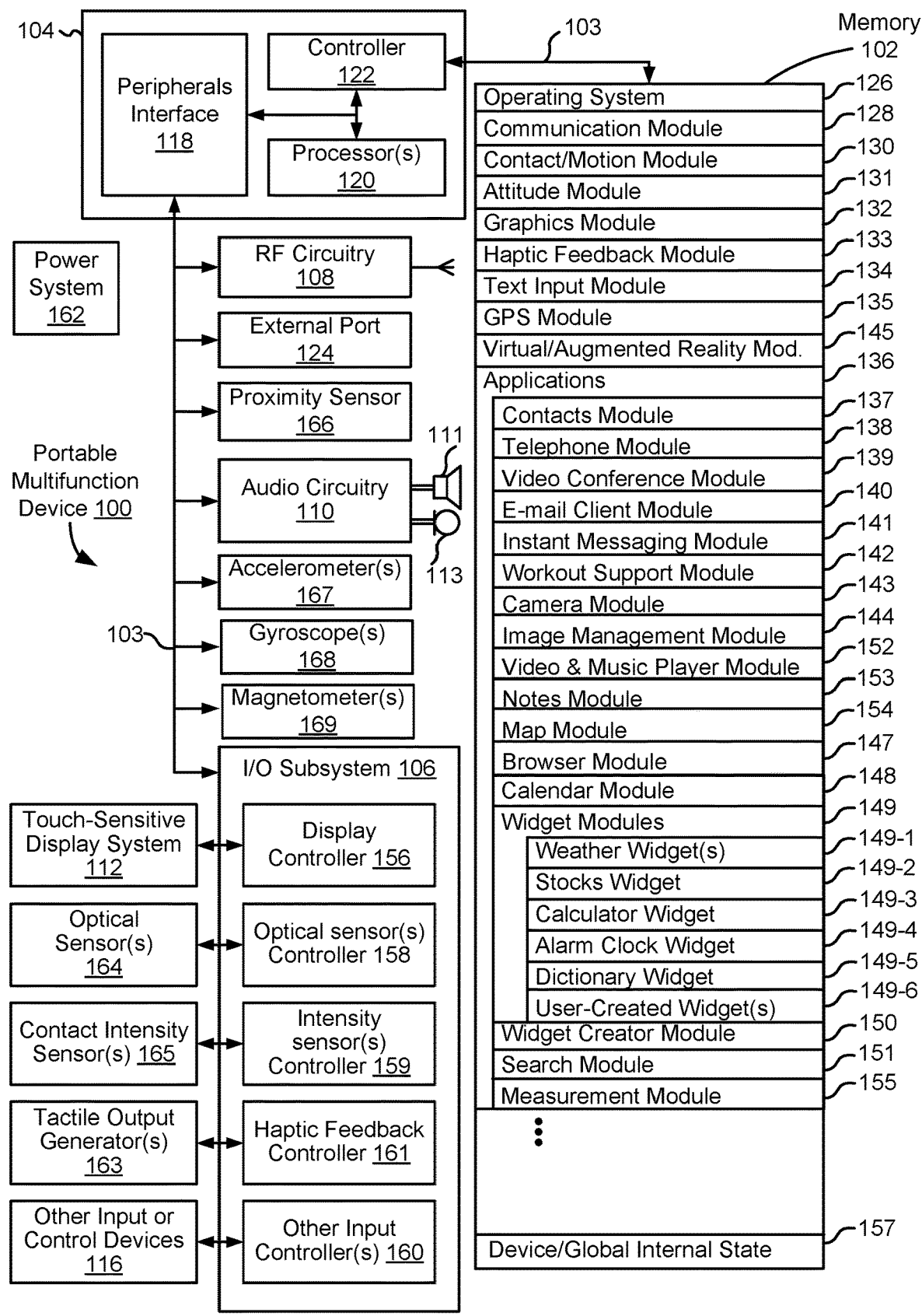
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164 (e.g., as part of one or more cameras). Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4A:
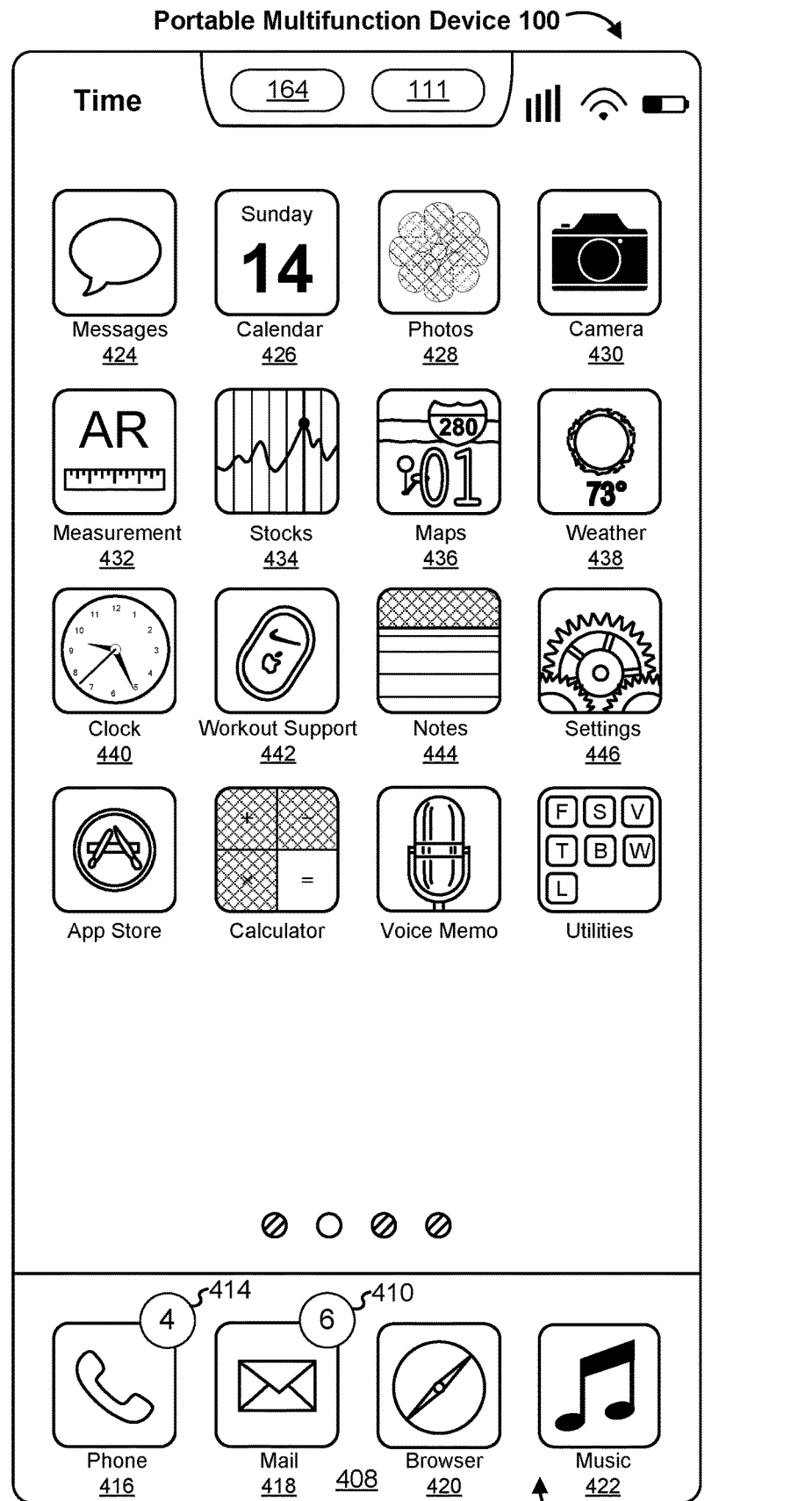
FIG. 4A illustrates an example user interface for a menu of applications on a portable multifunction device in accordance with some embodiments.
Figure 4B:
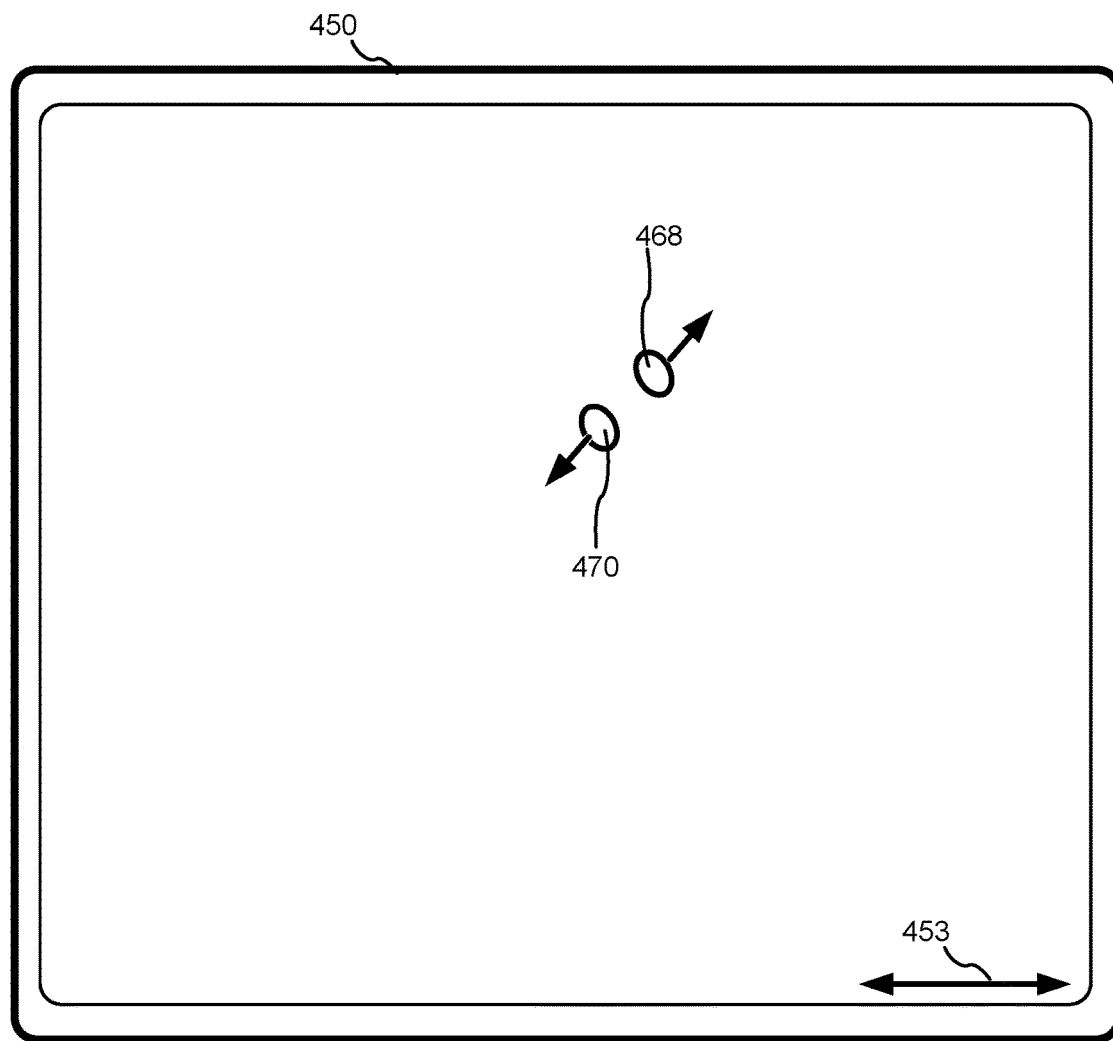
FIG. 4B illustrates an example user interface for a multifunction device with a touch-sensitive surface that is separate from the display in accordance with some embodiments.
Figure 4B:
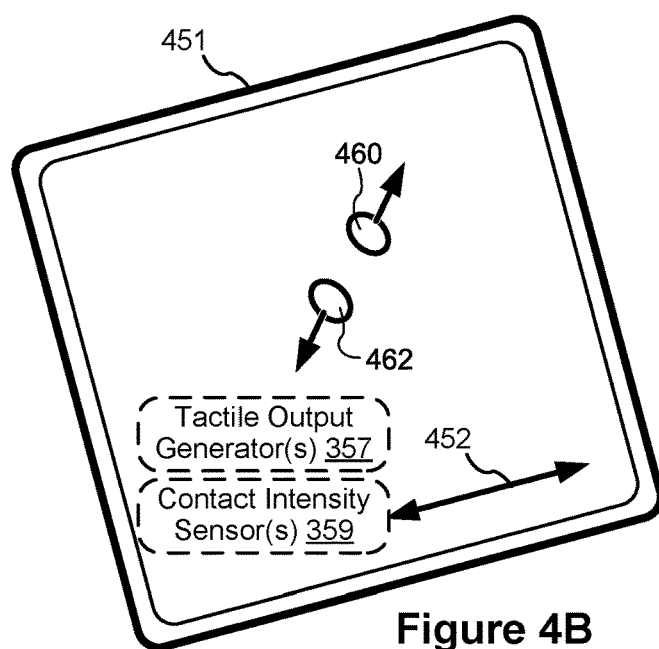
Figure 4C:
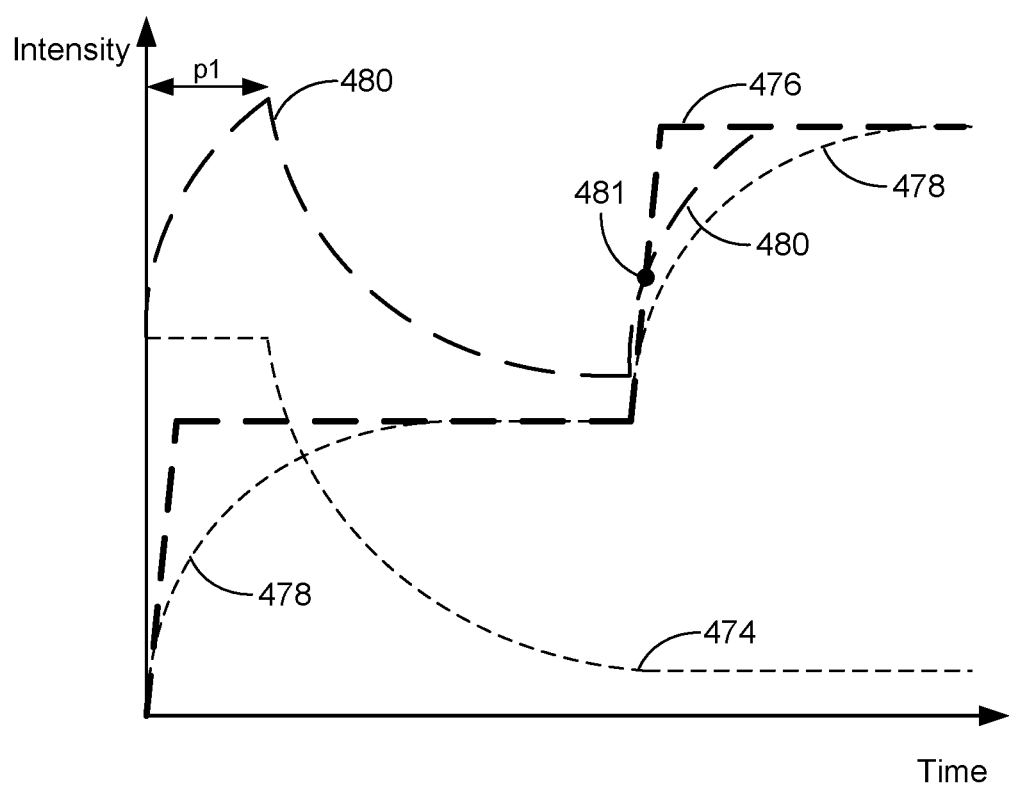
FIGS. 4C-4E illustrate examples of dynamic intensity thresholds in accordance with some embodiments.
Figure 4D:
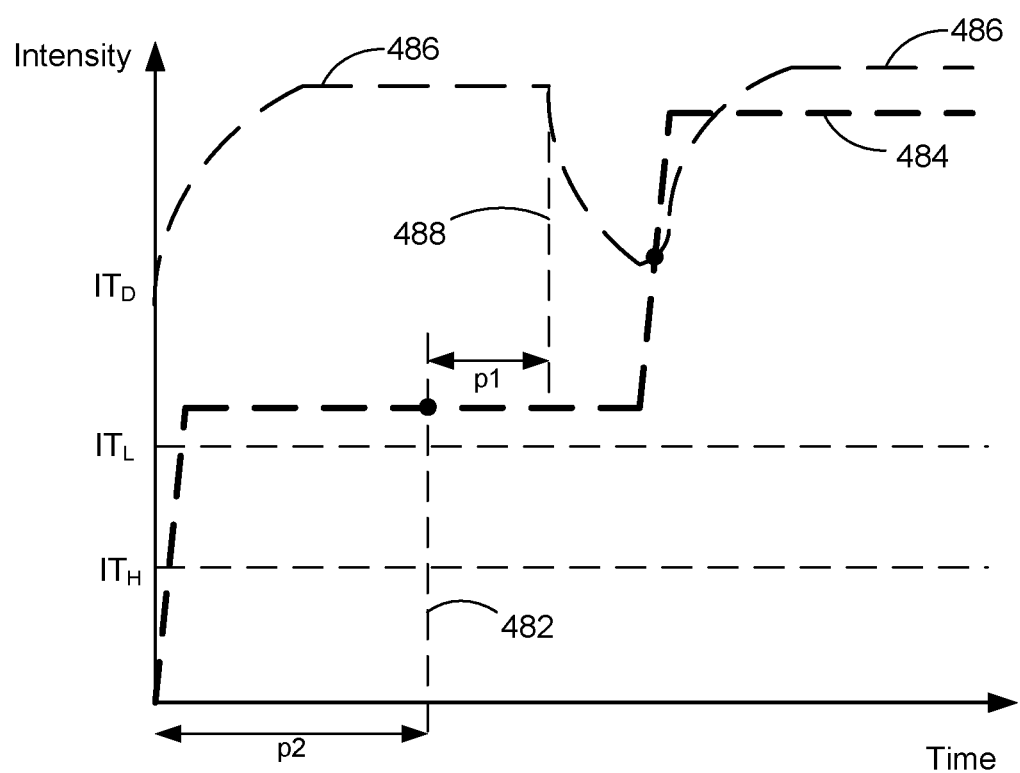
Figure 4E:
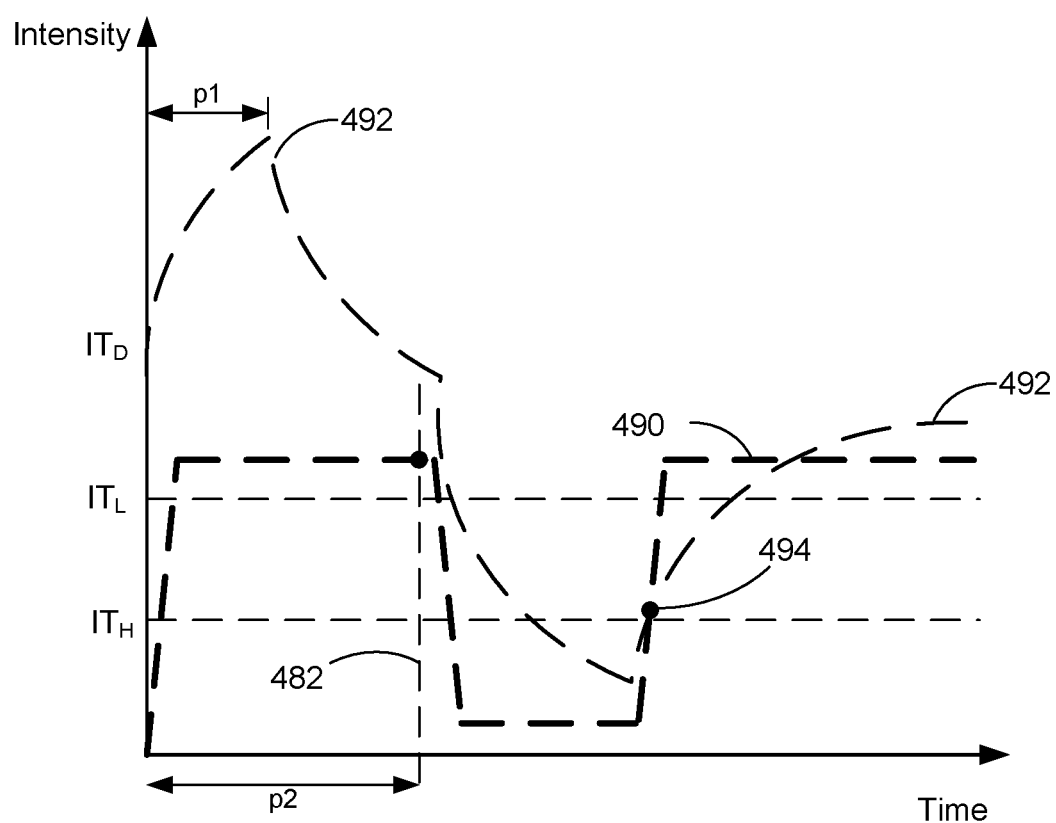
Figure 4F:
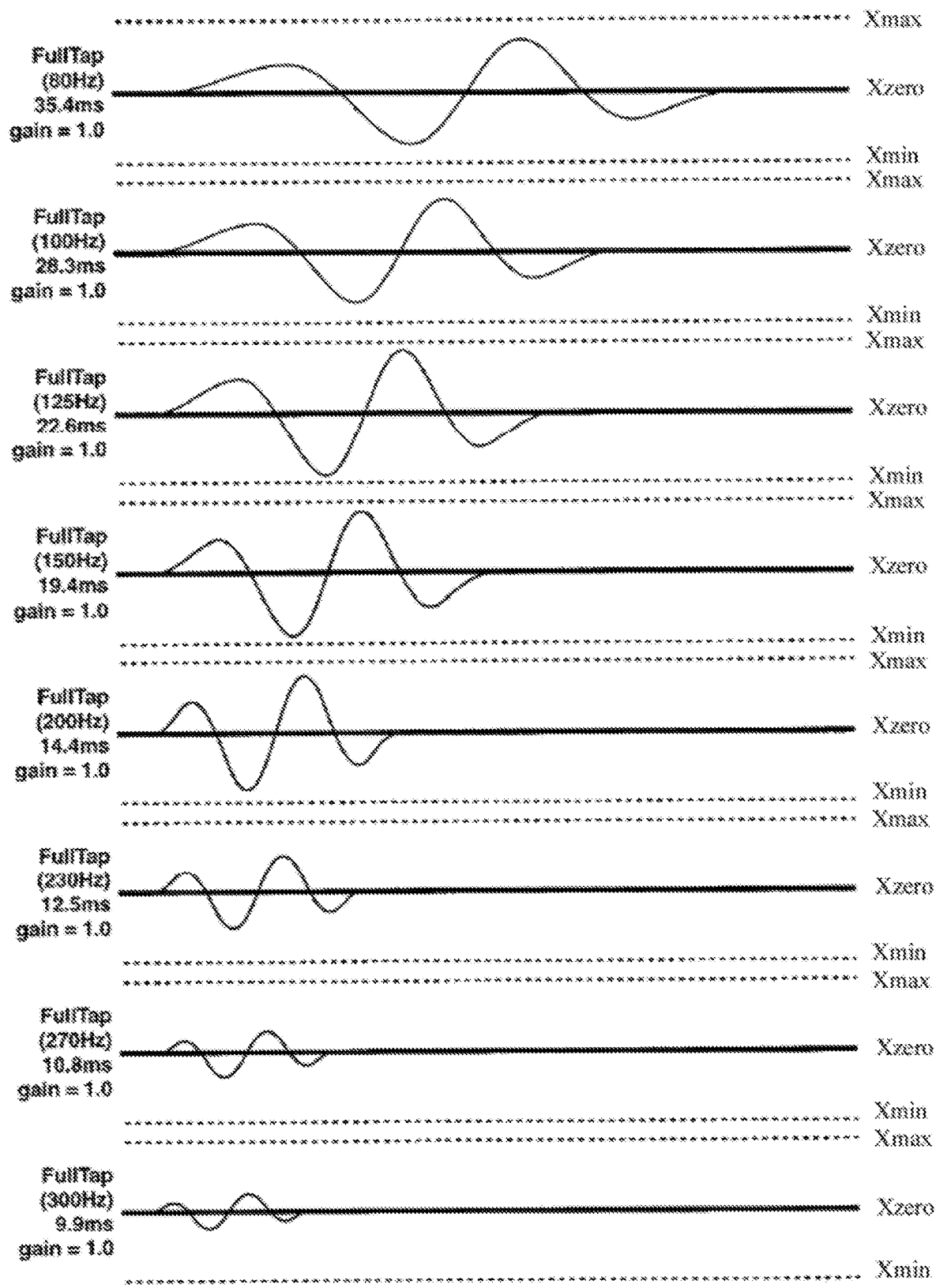
FIGS. 4F-4K illustrate a set of sample tactile output patterns in accordance with some embodiments.
Figure 4G:
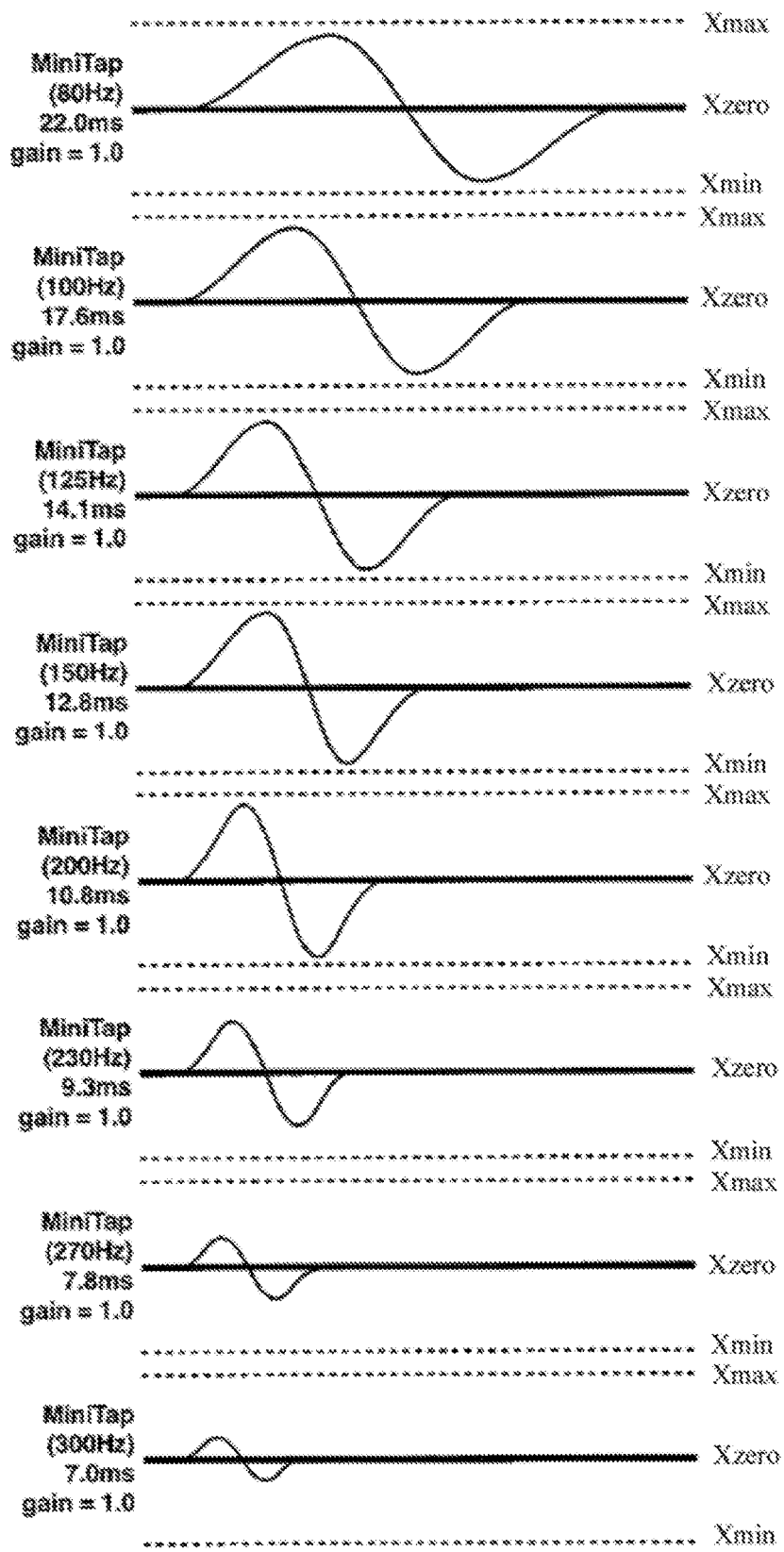
Figure 4H:
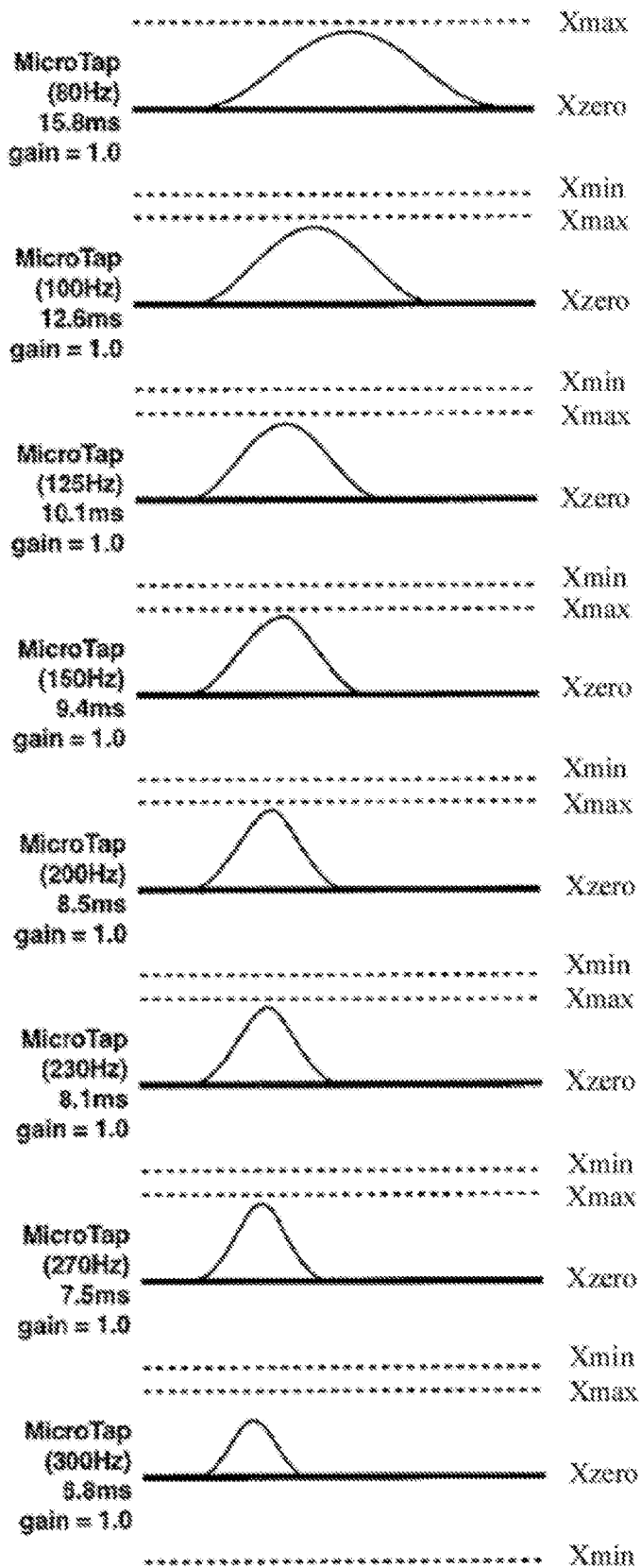
Figure 4I:
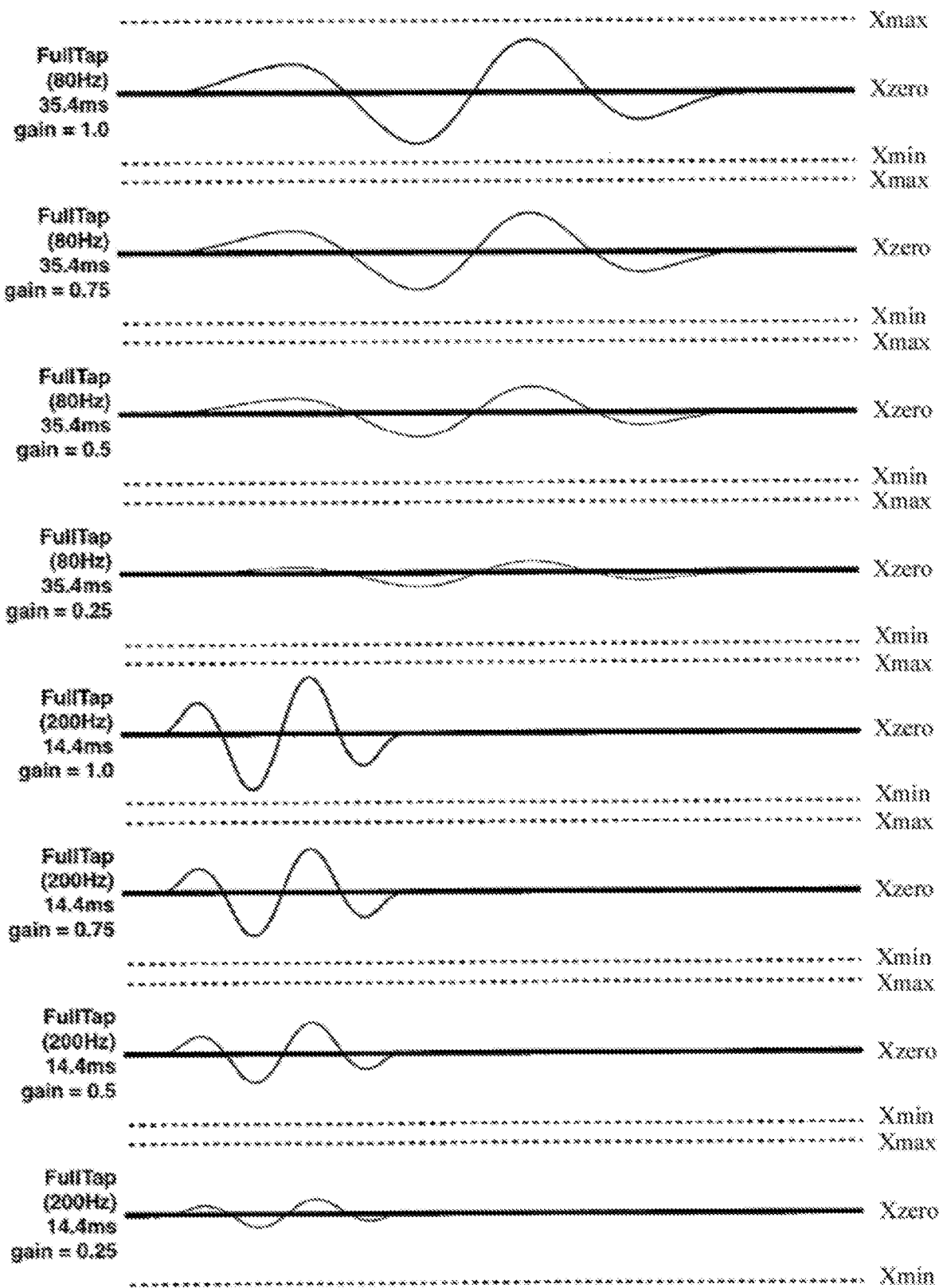
Figure 4J:
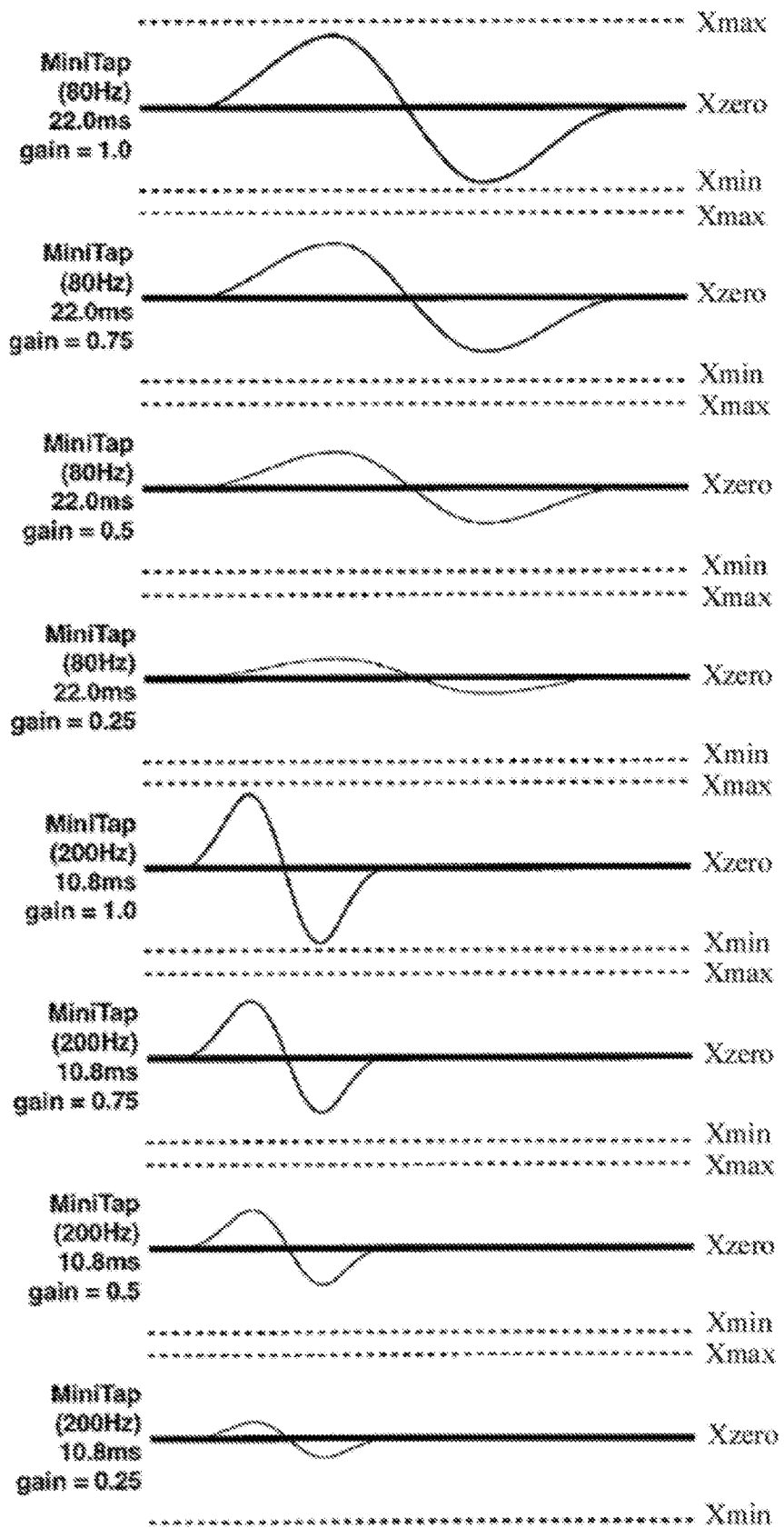
Figure 4K:
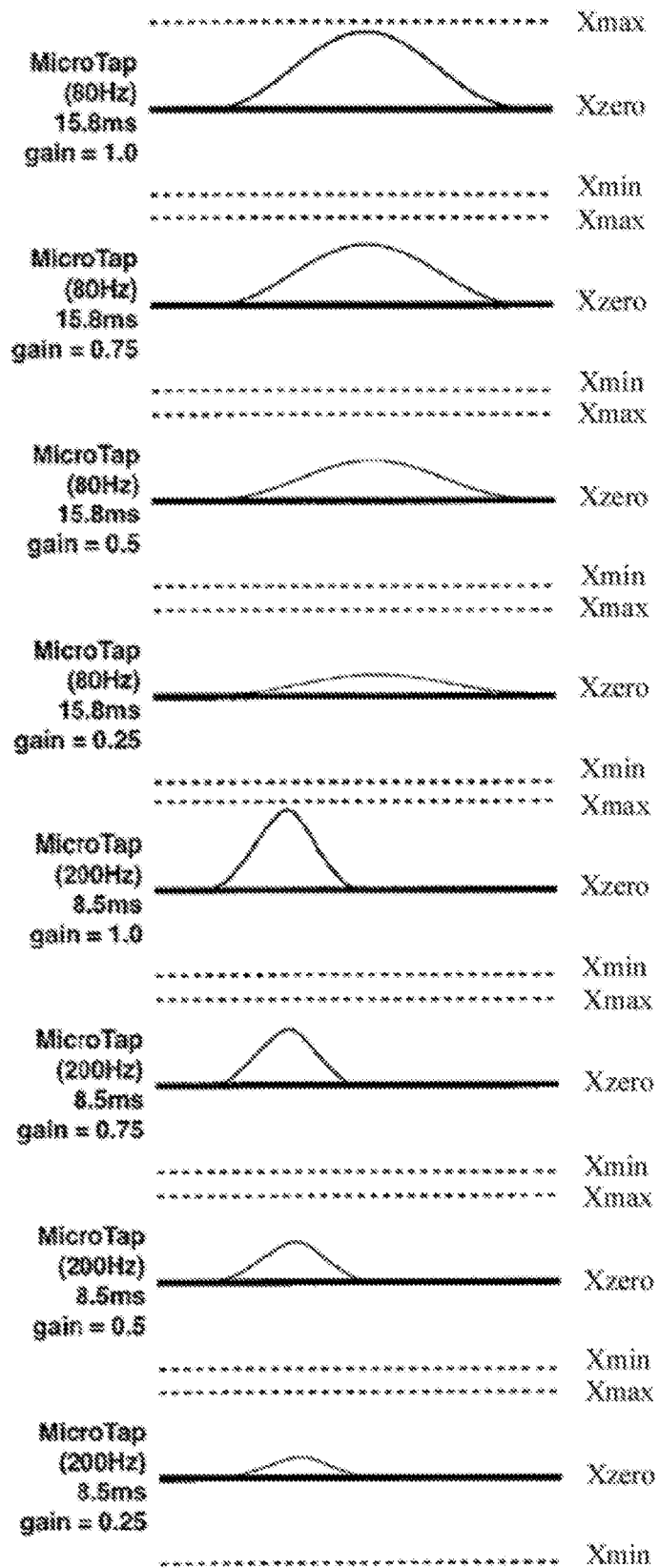

FIGS. 4F-4H provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 4I-4K, which are each shown with variants having a gain of 1.0, 0.75, 0.5, and 0.25. As shown in FIGS. 4I-4K, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 4F-4K show tactile output patterns that have a particular waveform. The waveform of a tactile output pattern represents the pattern of physical displacements relative to a neutral position (e.g., $x_{zero}$) versus time that a moveable mass goes through to generate a tactile output with that tactile output pattern. For example, a first set of tactile output patterns shown in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 4G (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 4H (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 4F-4K include $x_{min}$ and $x_{max}$ values which represent the maximum and minimum extent of movement of the moveable mass. For larger electronic devices with larger moveable masses, there may be larger or smaller minimum and maximum extents of movement of the mass. The examples shown in FIGS. 4F-4K describe movement of a mass in 1 dimension, however similar principles would also apply to movement of a moveable mass in two or three dimensions.

As shown in FIGS. 4F-4H, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 4F-4H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 4F-4H, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 4F-4H for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. In some embodiments, tactile output generator(s) 163 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Android, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif. In some embodiments, the external port is a USB Type-C connector that is the same as, or similar to and/or compatible with the USB Type-C connector used in some electronic devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Attitude module 131, in conjunction with accelerometers 167, gyroscopes 168, and/or magnetometers 169, optionally detects attitude information concerning the device, such as the device's attitude (e.g., roll, pitch, and/or yaw) in a particular frame of reference. Attitude module 131 includes software components for performing various operations related to detecting the position of the device and detecting changes to the attitude of the device.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Virtual/augmented reality module 145 provides virtual and/or augmented reality logic to applications 136 that implement augmented reality, and in some embodiments virtual reality, features. Virtual/augmented reality module 145 facilitates superposition of virtual content, such as a virtual user interface object (e.g., a virtual measuring tape for making augmented reality-based measurements), on a representation of at least a portion of a field of view of the one or more cameras. For example, with assistance from the virtual/augmented reality module 145, the representation of at least a portion of a field of view of the one or more cameras may include a respective physical object and the virtual user interface object may be displayed at a location, in a displayed augmented reality environment, that is determined based on the respective physical object in the field of view of the one or more cameras or a virtual reality environment that is determined based on the attitude of at least a portion of a computer system (e.g., an attitude of a display device that is used to display the user interface to a user of the computer system).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- measurement module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, and virtual/augmented reality module 145, measurement module 155 includes executable instructions that allow the user to measure physical spaces and/or objects therein in an augmented reality environment, as described in more detail herein.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touch-sensitive surface. In some other embodiments, the menu button is a physical push button or other physical input control device instead of a touch-sensitive surface.

Figure 1B:
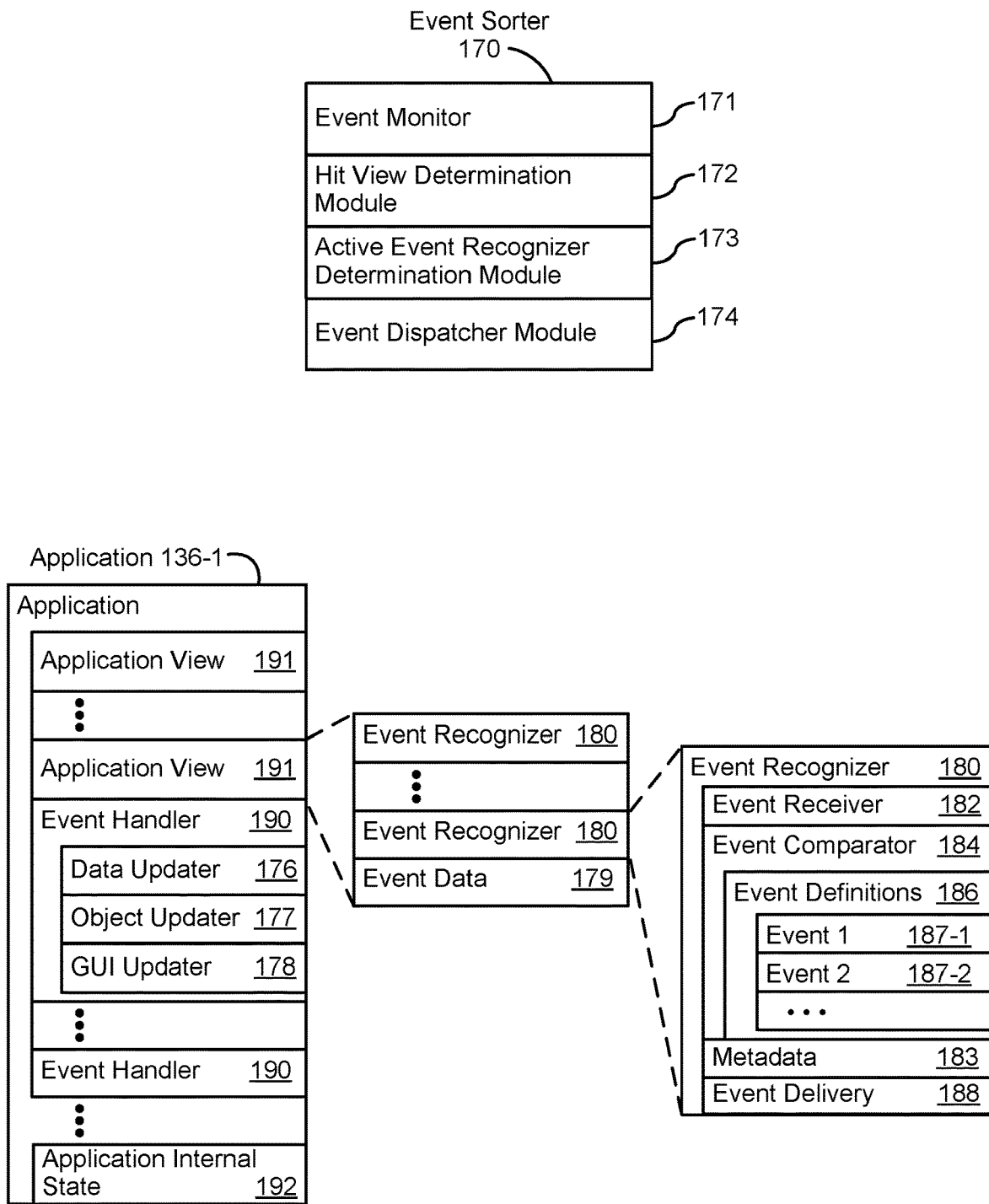
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; inputs based on real-time analysis of video images obtained by one or more cameras; movement of the device; oral instructions; detected eye movements; biometric inputs; and/or any combination thereof are optionally utilized as inputs corresponding to sub-events which define an event to be recognized.

Figure 1C:
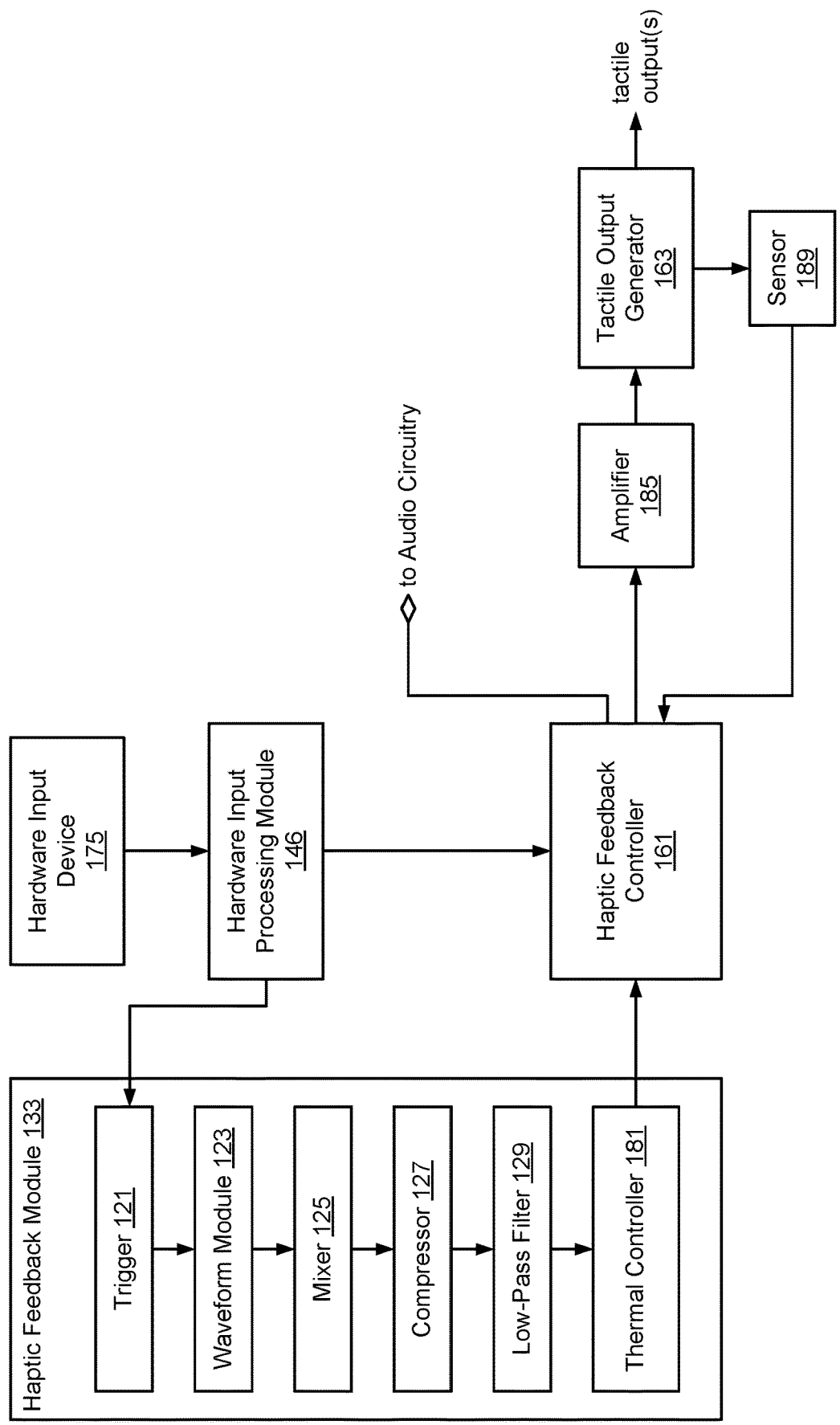
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 181 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 163).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 163 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 163 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 163 when the tactile outputs are generated in accordance with the compressed waveforms. Low-pass filter 129 reduces or removes such extraneous signals in the waveforms.

Thermal controller 181 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 175 (e.g., other input or control devices 116 in FIG. 1A, such as a home button or an intensity-sensitive input surface, such as an intensity-sensitive touch screen). In some embodiments, hardware input device 175 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 175 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 175 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 175 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 175 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 185 and/or tactile output generator 163.

In some embodiments, the tactile output module includes amplifier 185. In some embodiments, amplifier 185 receives waveforms (e.g., from haptic feedback controller 161) and amplifies the waveforms prior to sending the amplified waveforms to tactile output generator 163 (e.g., any of tactile output generators 163 (FIG. 1A) or 357 (FIG. 3)). For example, amplifier 185 amplifies the received waveforms to signal levels that are in accordance with physical specifications of tactile output generator 163 (e.g., to a voltage and/or a current required by tactile output generator 163 for generating tactile outputs so that the signals sent to tactile output generator 163 produce tactile outputs that correspond to the waveforms received from haptic feedback controller 161) and sends the amplified waveforms to tactile output generator 163. In response, tactile output generator 163 generates tactile outputs (e.g., by shifting a moveable mass back and forth in one or more dimensions relative to a neutral position of the moveable mass).

In some embodiments, the tactile output module includes sensor 189, which is coupled to tactile output generator 163. Sensor 189 detects states or state changes (e.g., mechanical position, physical displacement, and/or movement) of tactile output generator 163 or one or more components of tactile output generator 163 (e.g., one or more moving parts, such as a membrane, used to generate tactile outputs). In some embodiments, sensor 189 is a magnetic field sensor (e.g., a Hall effect sensor) or other displacement and/or movement sensor. In some embodiments, sensor 189 provides information (e.g., a position, a displacement, and/or a movement of one or more parts in tactile output generator 163) to haptic feedback controller 161 and, in accordance with the information provided by sensor 189 about the state of tactile output generator 163, haptic feedback controller 161 adjusts the waveforms output from haptic feedback controller 161 (e.g., waveforms sent to tactile output generator 163, optionally via amplifier 185).

Figure 2:
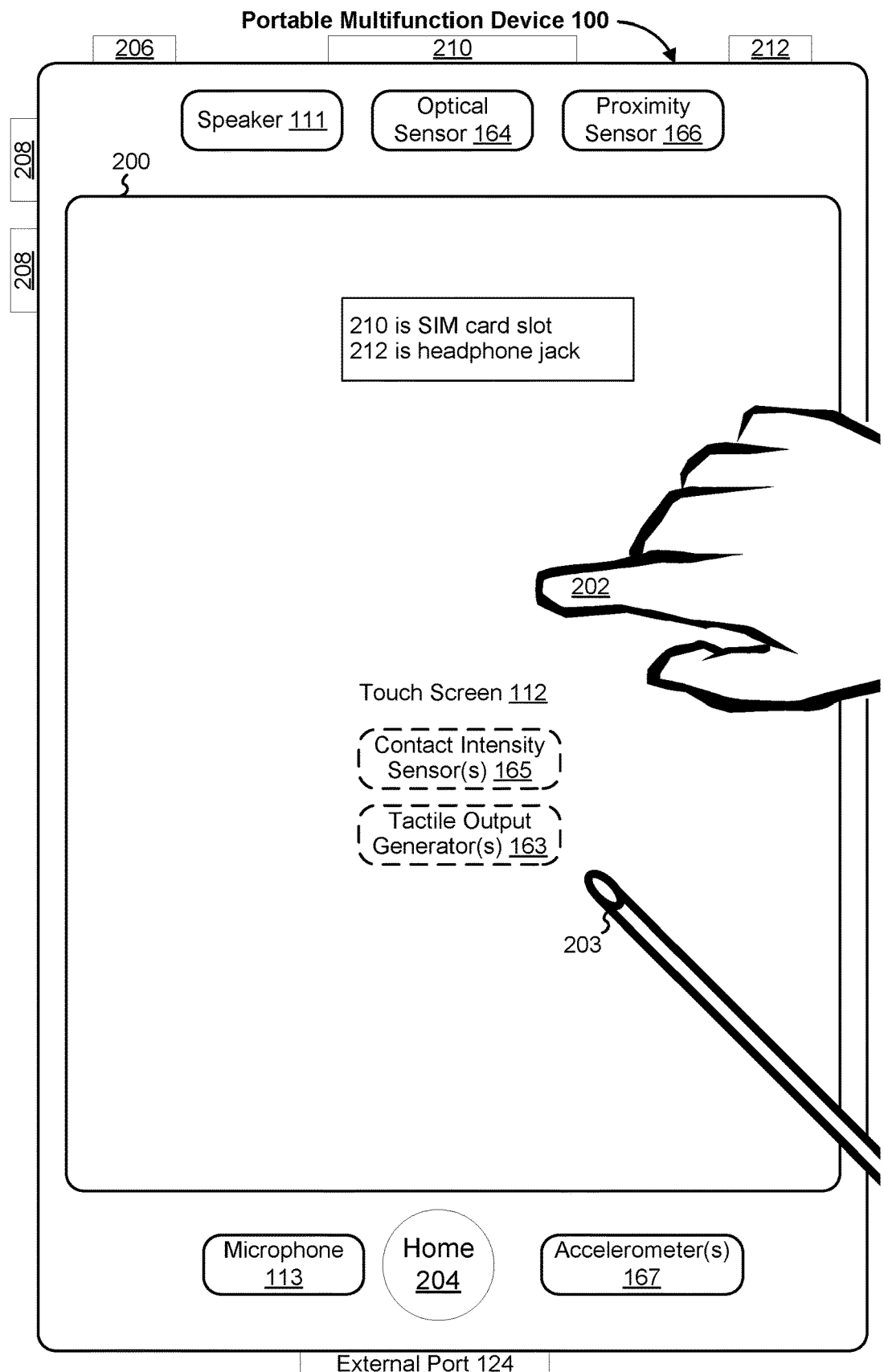
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

Figure 3A:
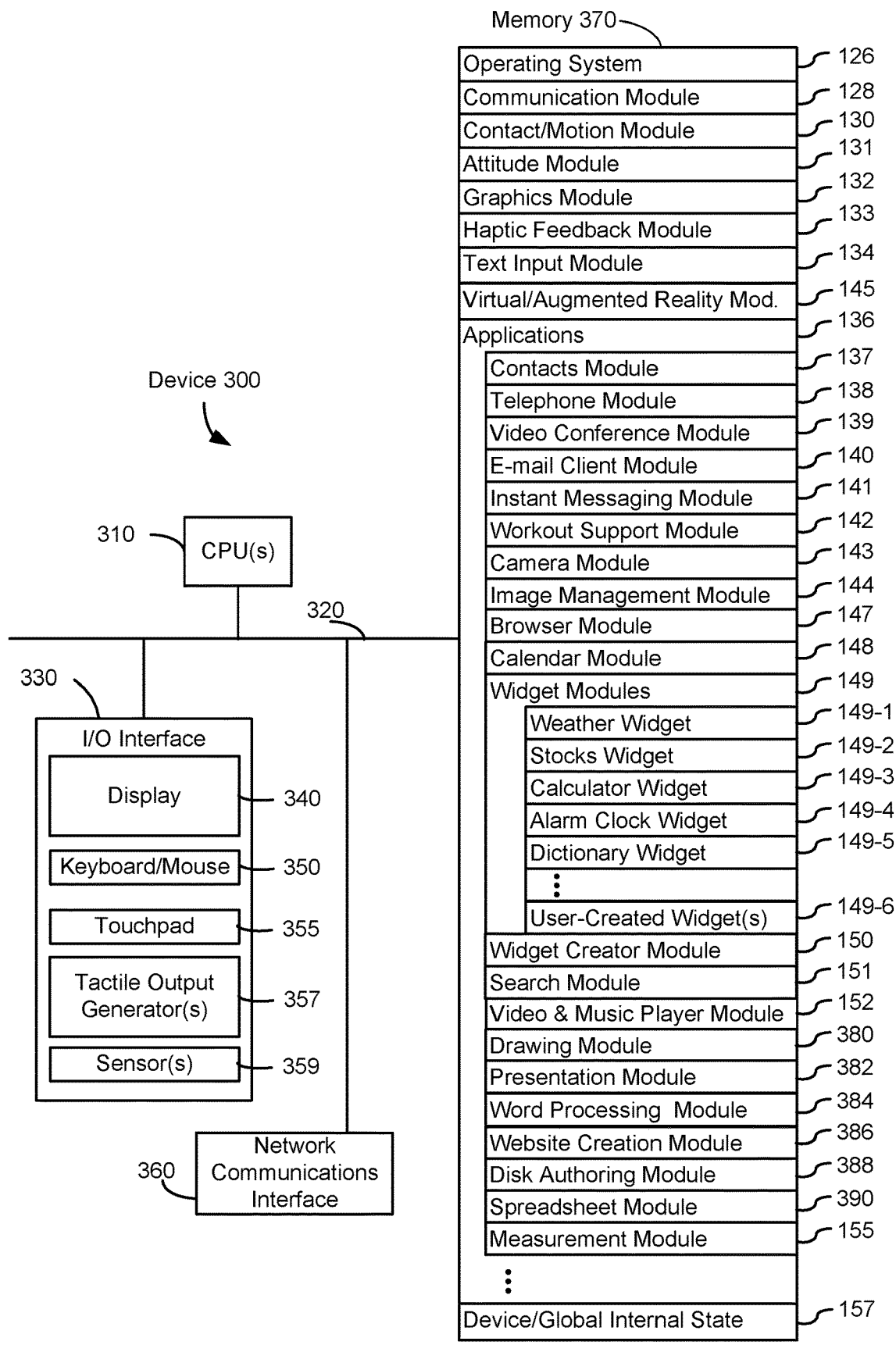
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
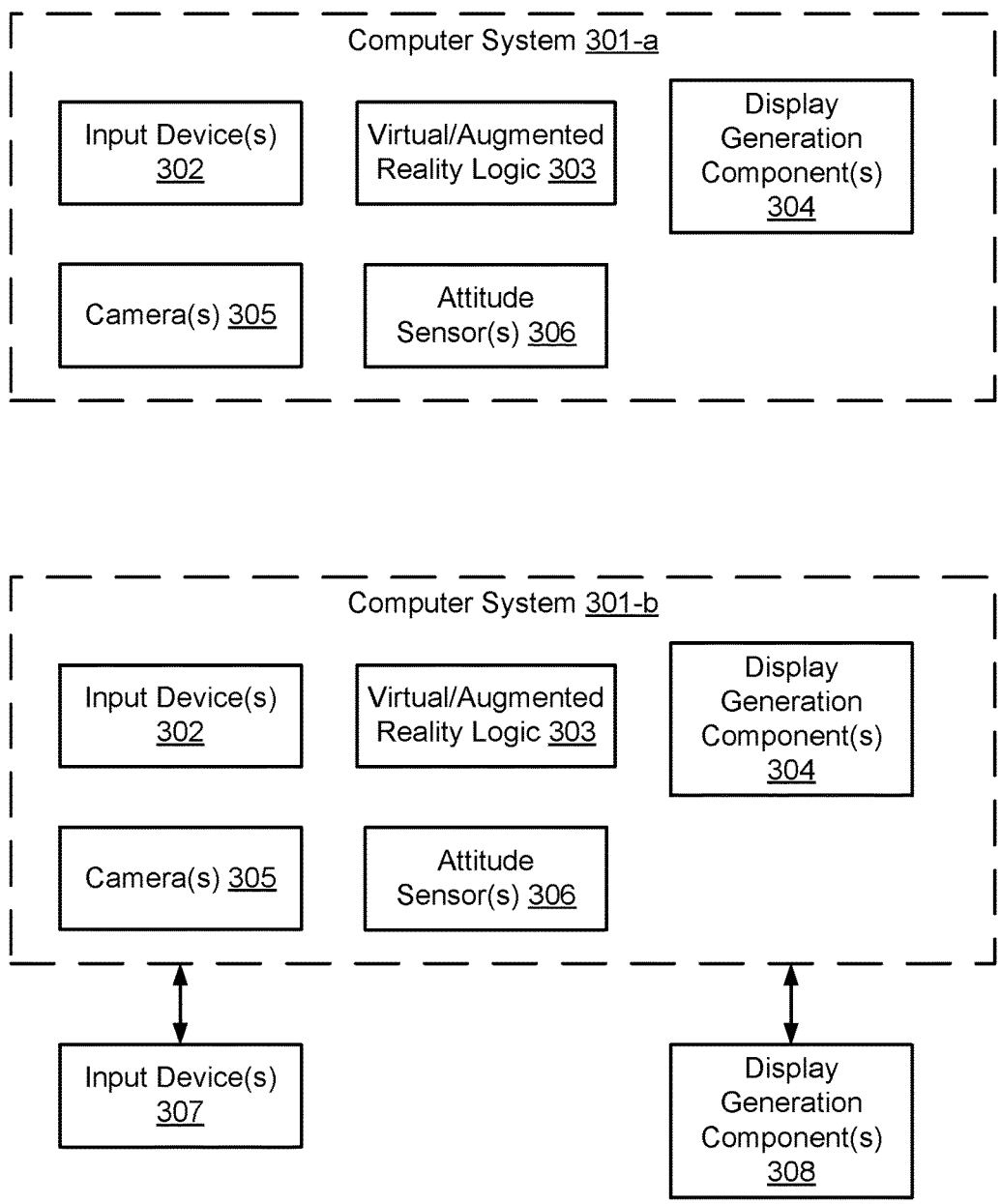
FIGS. 3B-3C are block diagrams of example computer systems in accordance with some embodiments.
Figure 3C:
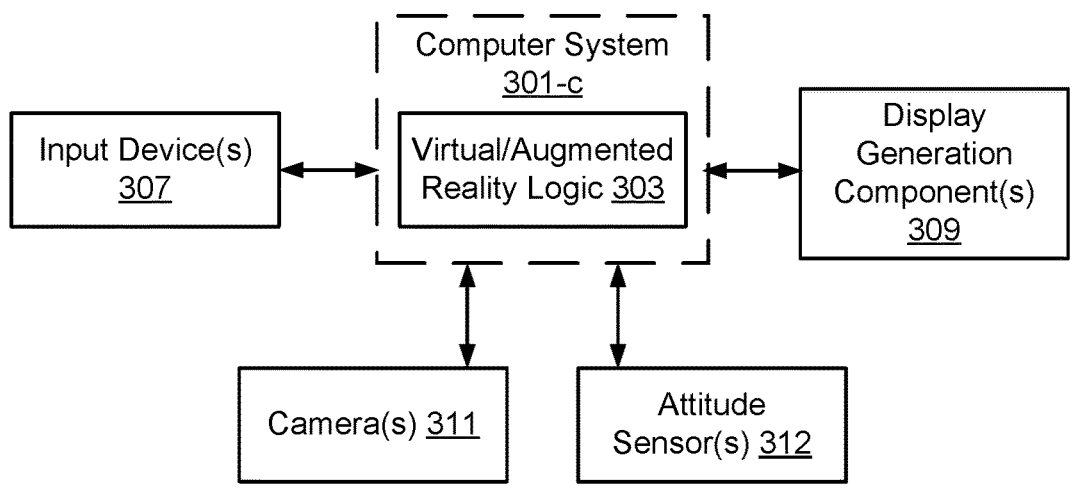

FIGS. 3B-3C are block diagrams of example computer systems 301 in accordance with some embodiments.

In some embodiments, computer system 301 includes and/or is in communication with:
  input device(s) (302 and/or 307, e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands);
  virtual/augmented reality logic 303 (e.g., virtual/augmented reality module 145);
  display generation component(s) (304 and/or 308, e.g., a display, a projector, a heads-up display, or the like) for displaying virtual user interface elements to the user;
  camera(s) (e.g., 305 and/or 311) for capturing images of a field of view of the device, e.g., images that are used to determine placement of virtual user interface elements, determine an attitude of the device, and/or display a portion of the physical environment in which the camera(s) are located; and
  attitude sensor(s) (e.g., 306 and/or 311) for determining an attitude of the device relative to the physical environment and/or changes in attitude of the device.

In some computer systems (e.g., 301-a in FIG. 3B), input device(s) 302, virtual/augmented reality logic 303, display generation component(s) 304, camera(s) 305; and attitude sensor(s) 306 are all integrated into the computer system (e.g., portable multifunction device 100 in FIGS. 1A-1B or device 300 in FIG. 3 such as a smartphone or tablet).

In some computer systems (e.g., 301-b), in addition to integrated input device(s) 302, virtual/augmented reality logic 303, display generation component(s) 304, camera(s) 305; and attitude sensor(s) 306, the computer system is also in communication with additional devices that are separate from the computer system, such as separate input device(s) 307 such as a touch-sensitive surface, a wand, a remote control, or the like and/or separate display generation component(s) 308 such as virtual reality headset or augmented reality glasses that overlay virtual objects on a physical environment.

In some computer systems (e.g., 301-c in FIG. 3C), the input device(s) 307, display generation component(s) 309, camera(s) 311; and/or attitude sensor(s) 312 are separate from the computer system and are in communication with the computer system. In some embodiments, other combinations of components in computer system 301 and in communication with the computer system are used. For example, in some embodiments, display generation component(s) 309, camera(s) 311, and attitude sensor(s) 312 are incorporated in a headset that is either integrated with or in communication with the computer system.

In some embodiments, all of the operations described below with reference to FIGS. 5A-5CO are performed on a single computing device with virtual/augmented reality logic 303 (e.g., computer system 301-*a* described below with reference to FIG. 3B). However, it should be understood that frequently multiple different computing devices are linked together to perform the operations described below with reference to FIGS. 5A-5CO (e.g., a computing device with virtual/augmented reality logic 303 communicates with a separate computing device with a display 450 and/or a separate computing device with a touch-sensitive surface 451). In any of these embodiments, the computing device that is described below with reference to FIGS. 5A-5CO is the computing device (or devices) that contain(s) the virtual/augmented reality logic 303. Additionally, it should be understood that the virtual/augmented reality logic 303 could be divided between a plurality of distinct modules or computing devices in various embodiments; however, for the purposes of the description herein, the virtual/augmented reality logic 303 will be primarily referred to as residing in a single computing device so as not to unnecessarily obscure other aspects of the embodiments.

In some embodiments, the virtual/augmented reality logic 303 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on a display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the virtual/augmented reality logic 303).

In some embodiments, both a display and a touch-sensitive surface are integrated with the computer system (e.g., 301-*a* in FIG. 3B) that contains the virtual/augmented reality logic 303. For example, the computer system may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2).

In some embodiments, a touch-sensitive surface is integrated with the computer system while a display is not integrated with the computer system that contains the virtual/augmented reality logic 303. For example, the computer system may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computer system may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, a display is integrated with the computer system while a touch-sensitive surface is not integrated with the computer system that contains the virtual/augmented reality logic 303. For example, the computer system may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computer system may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither a display nor a touch-sensitive surface is integrated with the computer system (e.g., 301-*c* in FIG. 3C) that contains the virtual/augmented reality logic 303. For example, the computer system may be a stand-alone computing device 300 (e.g., a set-top box, gaming console, etc.) connected (via wired or wireless connection) to a separate touch-sensitive surface (e.g., a remote touchpad, a portable multifunction device, etc.) and a separate display (e.g., a computer monitor, television, etc.).

In some embodiments, the computer system has an integrated audio system (e.g., audio circuitry 110 and speaker 111 in portable multifunction device 100). In some embodiments, the computing device is in communication with an audio system that is separate from the computing device. In some embodiments, the audio system (e.g., an audio system integrated in a television unit) is integrated with a separate display. In some embodiments, the audio system (e.g., a stereo system) is a stand-alone system that is separate from the computer system and the display.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, labeled "Music"; and
Icons for other applications, such as:
  Icon 424 for IM module 141, labeled "Messages";
  Icon 426 for calendar module 148, labeled "Calendar";

Icon 428 for image management module 144, labeled "Photos";

Icon 430 for camera module 143, labeled "Camera";

Icon 432 for measurement module 155, labeled "Measurement";

Icon 434 for stocks widget 149-2, labeled "Stocks";

Icon 436 for map module 154, labeled "Maps";

Icon 438 for weather widget 149-1, labeled "Weather";

Icon 440 for alarm clock widget 149-4, labeled "Clock";

Icon 442 for workout support module 142, labeled "Workout Support";

Icon 444 for notes module 153, labeled "Notes"; and

Icon 446 for a settings application or module, labeled "Settings," which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device). In some embodiments, a focus indicator (e.g., a cursor or selection indicator) is displayed via the display device to indicate a current portion of the user interface that will be affected by inputs received from the one or more input devices.

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold ITS). FIG. 4D also illustrates two other intensity thresholds: a first intensity threshold $IT_H$ and a second intensity threshold $IT_L$. In FIG. 4D, although touch input 484 satisfies the first intensity threshold $IT_H$ and the second intensity threshold $IT_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $IT_L$ was triggered). This type of dynamic intensity threshold reduces accidental triggering of a response associated with the dynamic intensity threshold $IT_D$ immediately after, or concurrently with, triggering a response associated with a lower intensity threshold, such as the first intensity threshold $IT_H$ or the second intensity threshold $IT_L$.

FIG. 4E illustrate yet another dynamic intensity threshold 492 (e.g., intensity threshold $IT_D$). In FIG. 4E, a response associated with the intensity threshold $IT_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $IT_L$, followed by an increase in the intensity of touch input 490, without releasing touch input 490, can trigger a response associated with the intensity threshold $IT_D$ (e.g., at time 494) even when the intensity of touch input 490 is below another intensity threshold, for example, the intensity threshold $IT_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

Although only specific frequencies, amplitudes, and waveforms are represented in the sample tactile output patterns in FIGS. 4F-4K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

User Interfaces and Associated Processes

Attention is now directed towards embodiments of user interfaces ("UI") and associated processes that may be implemented on a computer system (e.g., an electronic device such as portable multifunction device 100 (FIG. 1A), device 300 (FIG. 3A), or computer system 301 (FIG. 3B)) that includes (and/or is in communication with) a display generation component (e.g., a display, a projector, a heads-up display, or the like), one or more cameras (e.g., video cameras that continuously provide a live preview of at least a portion of the contents that are within the field of view of at least one of the cameras and optionally generate video outputs including one or more streams of image frames capturing the contents within the field of view of at least one of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more attitude sensors, optionally one or more sensors to detect intensities of contacts with the touch-sensitive surface, and optionally one or more tactile output generators.

Figure 5A:
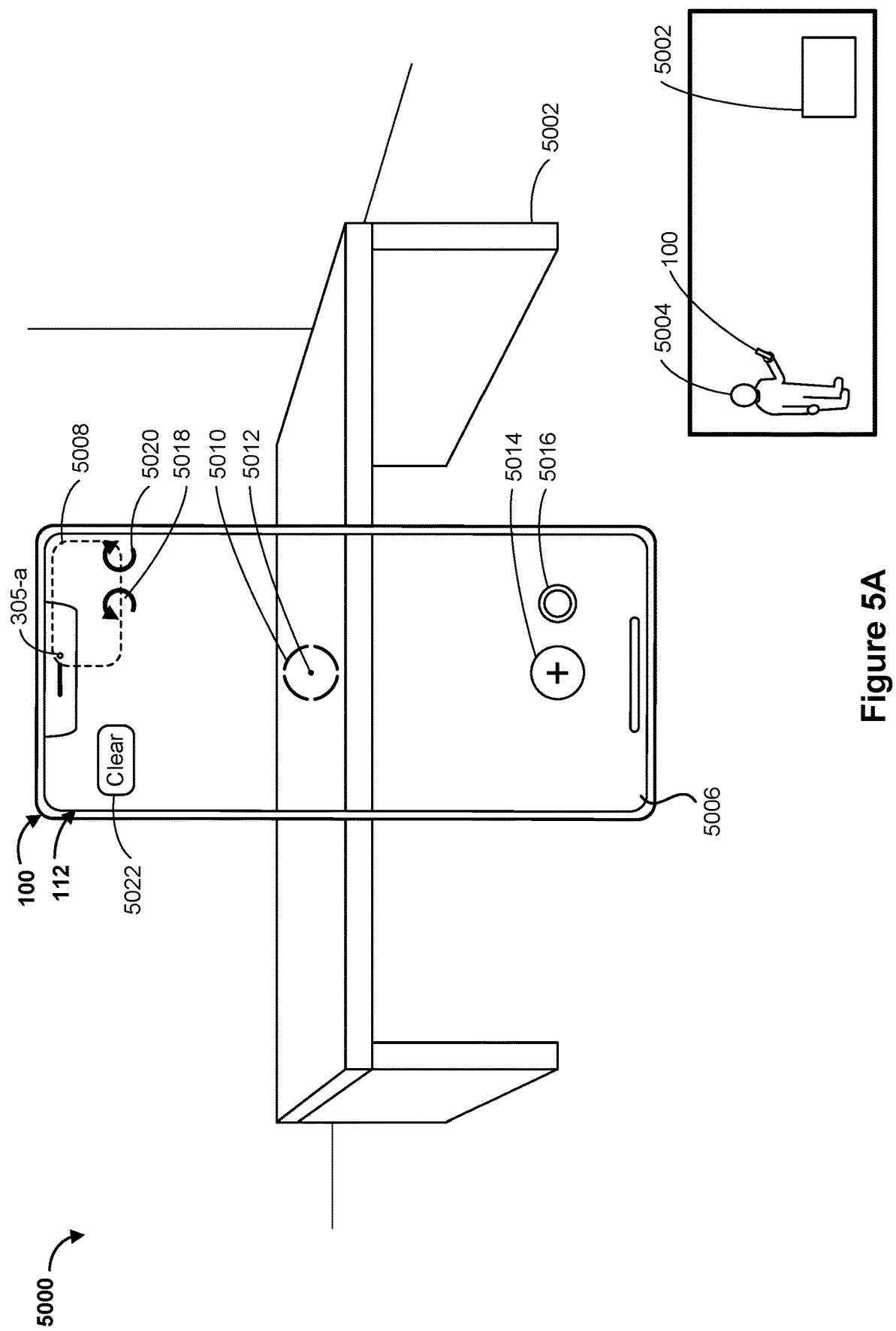
FIGS. 5A-5CO illustrate example user interfaces for making measurements of a physical space using an augmented reality environment in accordance with some embodiments.
Figure 5B:
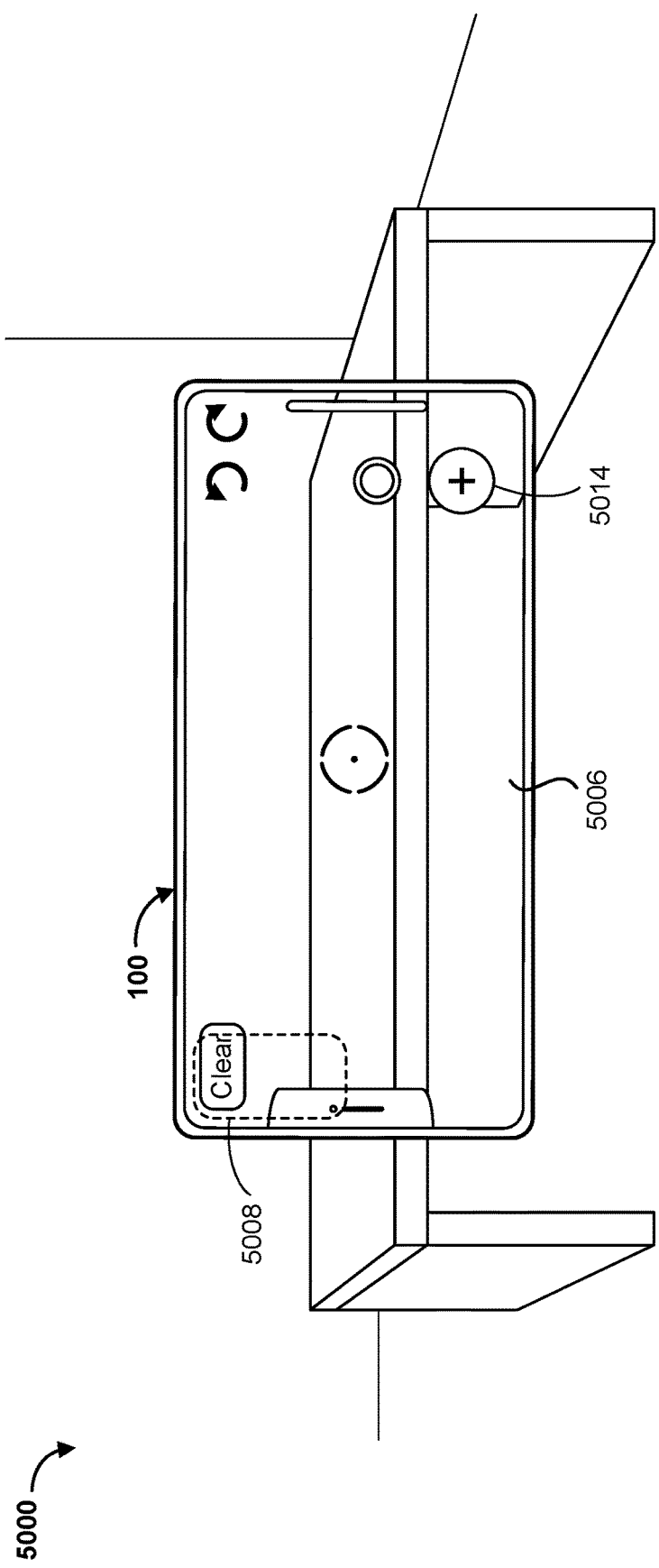
Figure 5C:
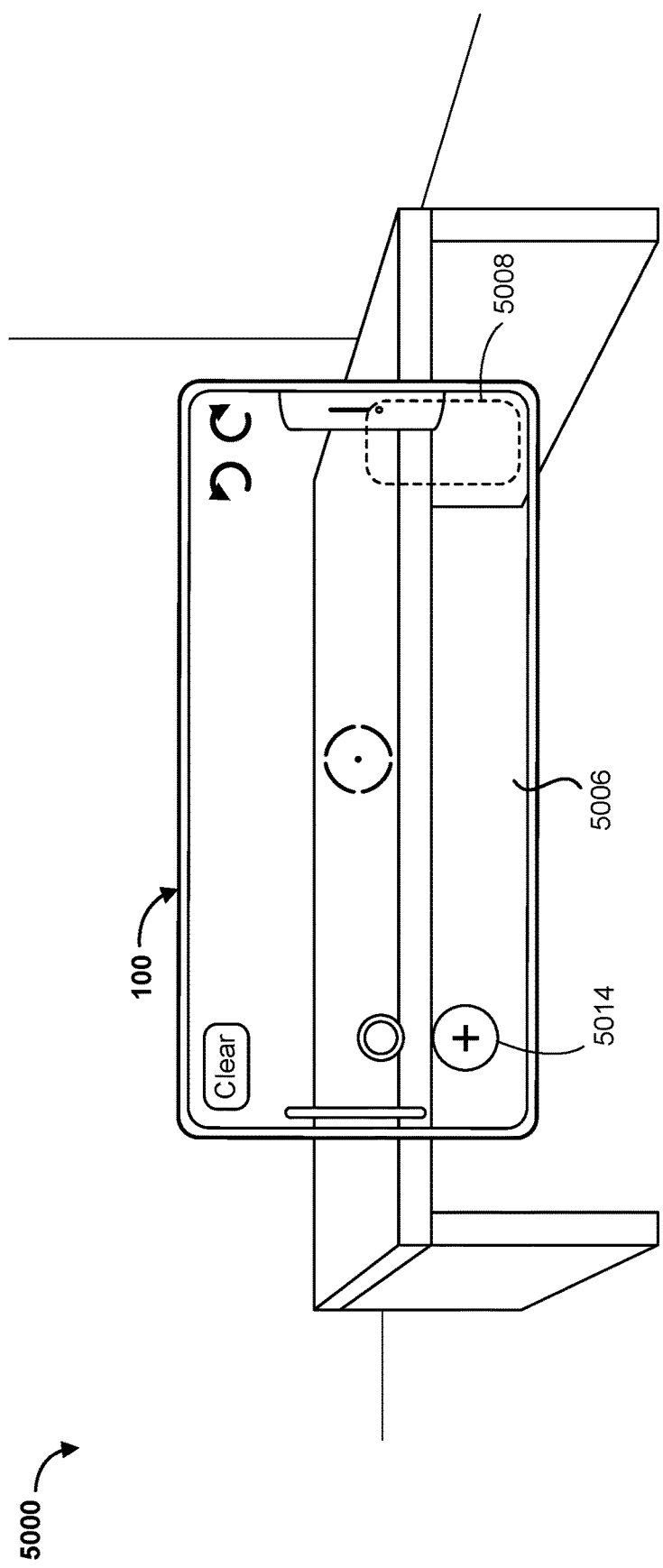
Figure 6A:
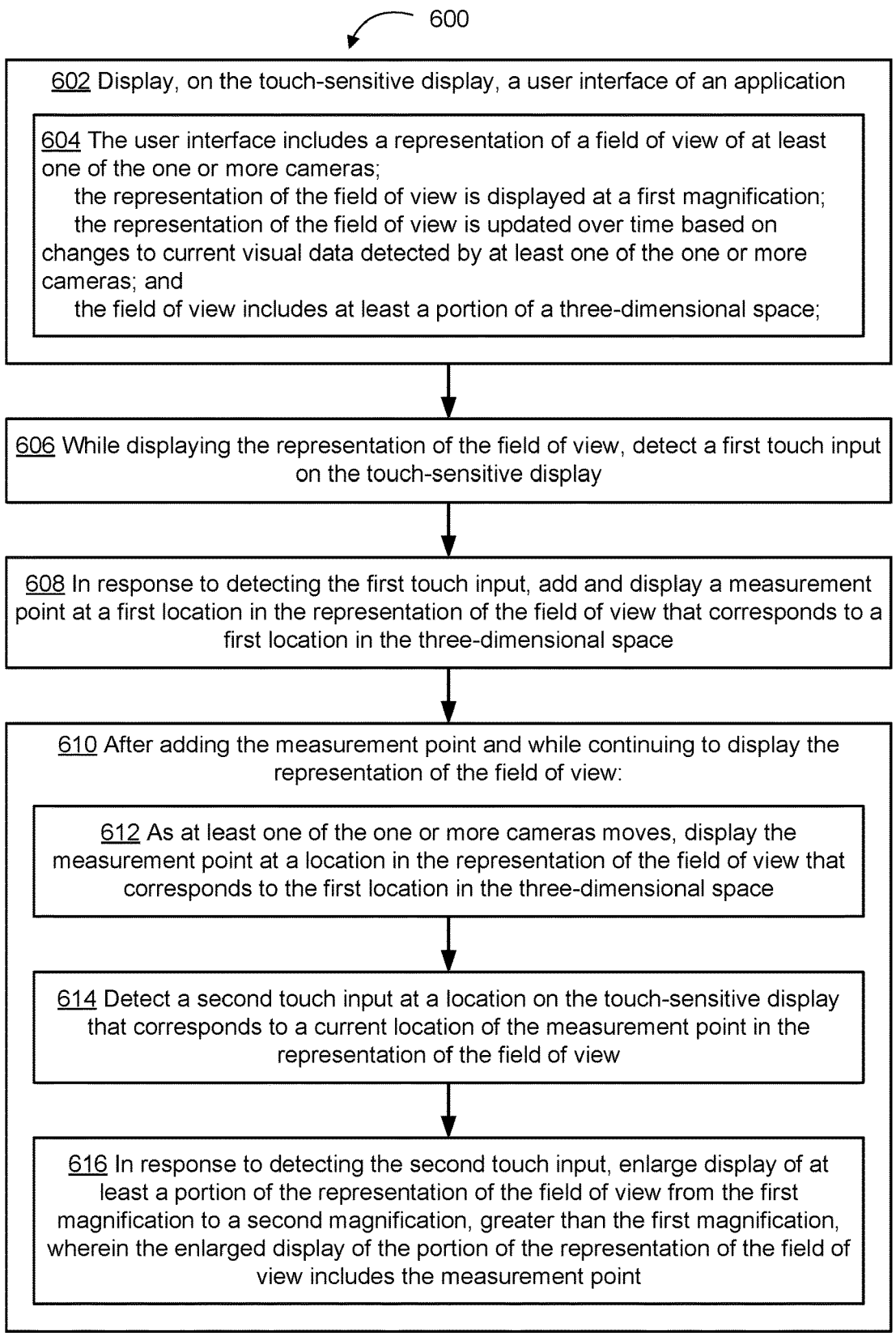
Figure 7A:
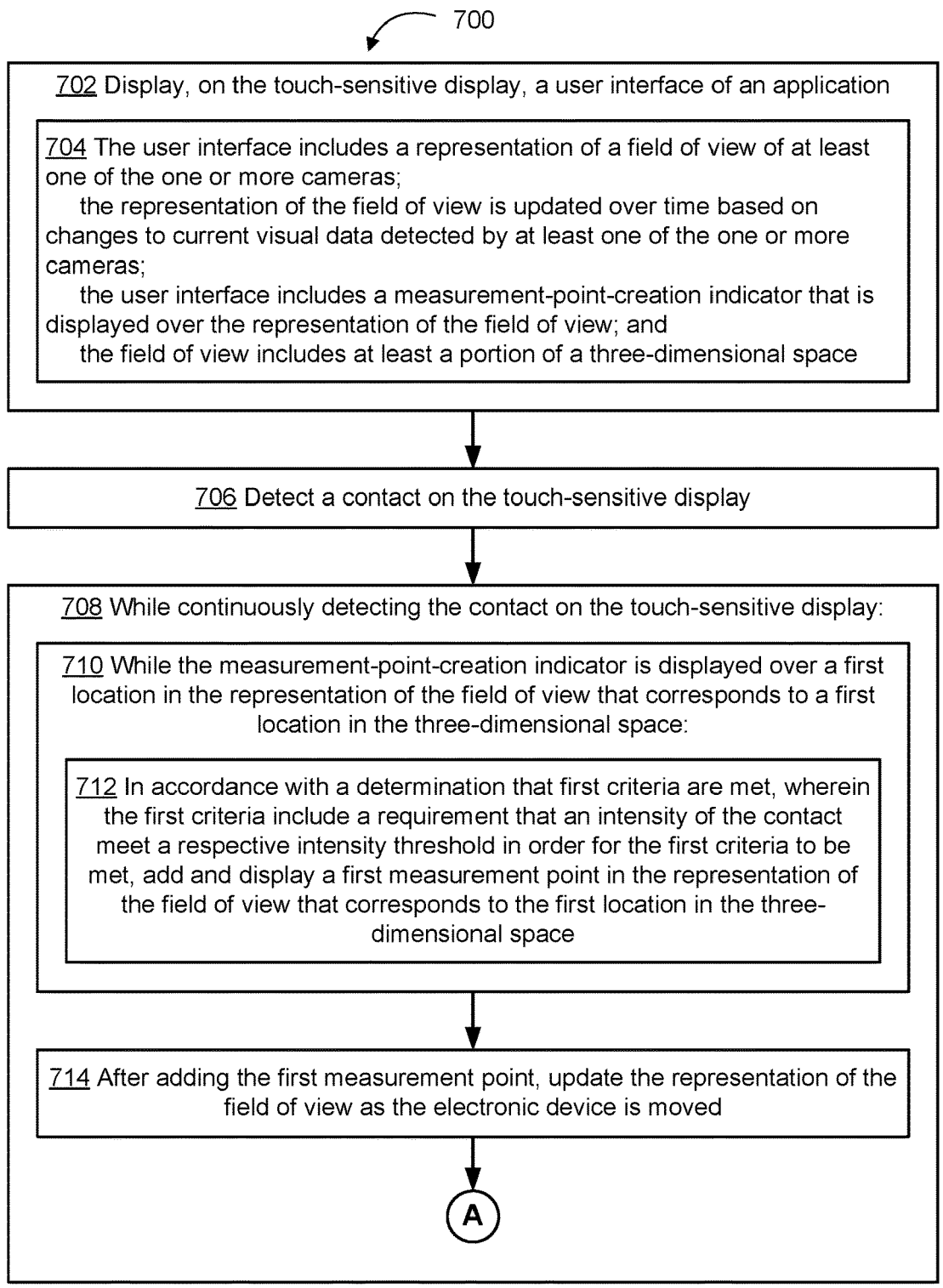
Figure 7B:
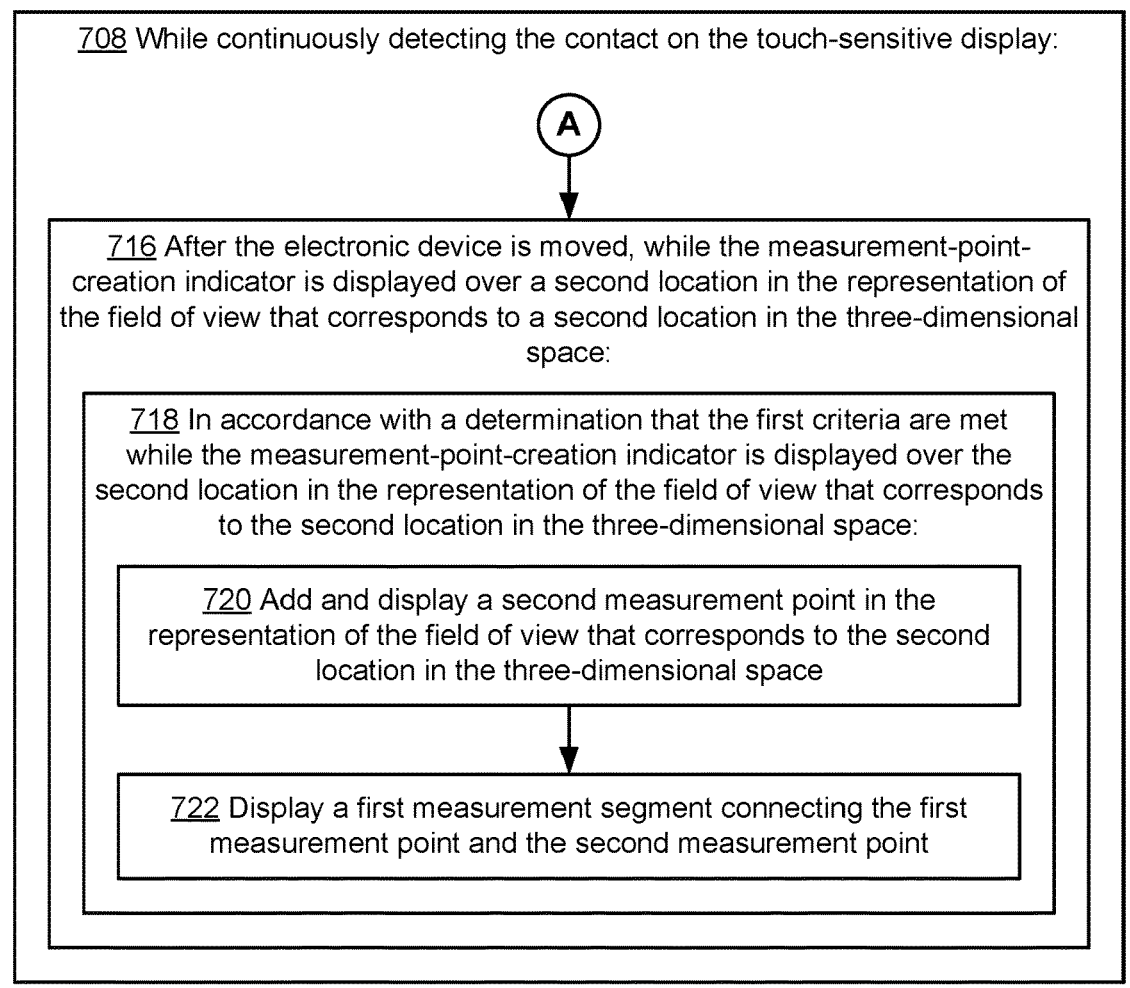

FIGS. 5A-5CO illustrate example user interfaces for making measurements of a physical space using an augmented reality environment in accordance with some embodiments. The user interfaces in these figures are used to illustrate the processes described below, including the processes in FIGS. 6A-6C, 7A-7E, 8A-8C, 9A-9B, 10A-10B, 11A-11B, 12A-12C, 13A-13C, and 14A-14D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5A illustrates a context in which user interfaces described with respect to FIGS. 5A-5CO are used. In particular, FIG. 5A illustrates a view of physical space 5000 in which table 5002 and device 100 are located. Device 100 is held by user 5004 to view physical space 5000, including a portion of table 5002, through touch screen 112 of device 100. In particular, touch screen 112 displays a view of an augmented reality environment corresponding to physical space 5000. User 5004 uses touch screen 112 of device 100 to interact with the augmented reality environment via displayed user interface 5006 (e.g., a user interface of an augmented reality measurement application). User interface 5006 includes a live preview of the field of view of at least one of one or more cameras of device 100 (sometimes referred to as "the camera" of device 100, such as camera(s) 305, FIGS. 3A-3B or camera(s) 311, FIG. 3C, optionally including optical sensors 164, FIG. 1A as part of the one or more cameras). In some embodiments, the camera(s) are located on device 100 in region 5008. In some embodiments, device 100 includes front-facing camera 305-$a$ that is located in region 5008 next to and on the same side of device 100 as touch screen 112 (e.g., the side facing user 5004 in FIG. 5A). In some embodiments, device 100 includes one or more cameras that are located in region 5008 behind touch screen 112 or on the opposite side of device 100 from touch screen 112 (e.g., the side facing away from user 5004 in FIG. 5A). At least one camera continuously provides a live preview of contents that are within the field of view the camera, which may include one or more physical objects in physical space 5000 (e.g., table 5002).

In some embodiments, user interface 5006 includes one or more user interface elements for user interaction with the augmented reality environment. For example, in FIG. 5A, user interface 5006 includes reticle 5010 that indicates an area for user interaction with the augmented reality environment. In some embodiments, reticle 5010 includes focus point 5012 that indicates a particular point for user interaction. In some embodiments, user interface 5006 includes measurement addition button 5014 that is used for adding new measurements (e.g., new measurement points, new measurement segments, and/or new measurement regions) to user interface 5006 (e.g., as described in more detail herein). In some embodiments, reticle 5010 and focus point 5012 together form a measurement-point-creation indicator that indicates a location at which a new measurement will be added in response to activation of measurement addition button 5014.

In some embodiments, user interface 5006 includes media capture button 5016 that is used for capturing media, such as a still image, or a video (that optionally includes corresponding audio), of the field of view, and any virtual measurements corresponding to physical objects in the field of view. In some embodiments, user interface 5006 includes undo button 5018 that is used for undoing (e.g., reversing the performance of) a most-recently-performed operation in user interface 5006. In some embodiments, user interface 5006 includes redo button 5020 that is used for redoing a most-recently-undone operation (e.g., reversing the reversal of the most-recently-performed operation by activation of undo button 5018) in user interface 5006. User interface 5006 may also include one or more virtual measurements that correspond to one or more physical objects in physical space 5000, and that are displayed at least partially in response to user inputs on the user interface elements of user interface 5006. In some embodiments, user interface 5006 includes clear button 5022 for removing virtual measurements displayed in user interface 5006 (and, optionally, also removing virtual measurements that are not displayed in user interface 5006 when clear button 5022 is activated, such as virtual measurements corresponding to physical object(s) that are outside of the field of view of the camera when clear button 5022 is activated).

FIG. 5B illustrates device 100 in a first landscape orientation, in contrast to its portrait orientation in FIG. 5A. While device 100 is in the first landscape orientation, as shown in FIG. 5B, the one or more cameras of device 100 are located in region 5008 on the left side of device 100, and measurement addition button 5014 is displayed in user interface 5006 on the right side of device 100, away from region 5008, to reduce the chance that user 5004 will hold device 100 on the left side and obscure the field of view of the camera providing the live preview in user interface 5006, and also to facilitate interaction with the augmented reality environment during single-handed operation by user 5004 while holding device 100 by its right side (e.g., while user 5004 holds device 100 with his/her right hand).

FIG. 5C illustrates device 100 in a second landscape orientation, different from the landscape orientation in FIG. 5B (e.g., 180 degrees rotated from the landscape orientation in FIG. 5B). While device 100 is in the second landscape orientation, as shown in FIG. 5C, the one or more cameras of device 100 are located in region 5008 on the right side of device 100, and measurement addition button 5014 is displayed in user interface 100 on the left side of device 100, away from region 5008, to reduce the chance that user 5004 will hold device 100 on the right side and obscure the field of view of the camera providing the live preview in user interface 5006, and also to facilitate interaction with the augmented reality environment during single-handed operation by user 5004 while holding device 100 by its left side (e.g., while user 5004 holds device 100 with his/her left hand).

Figure 5D:
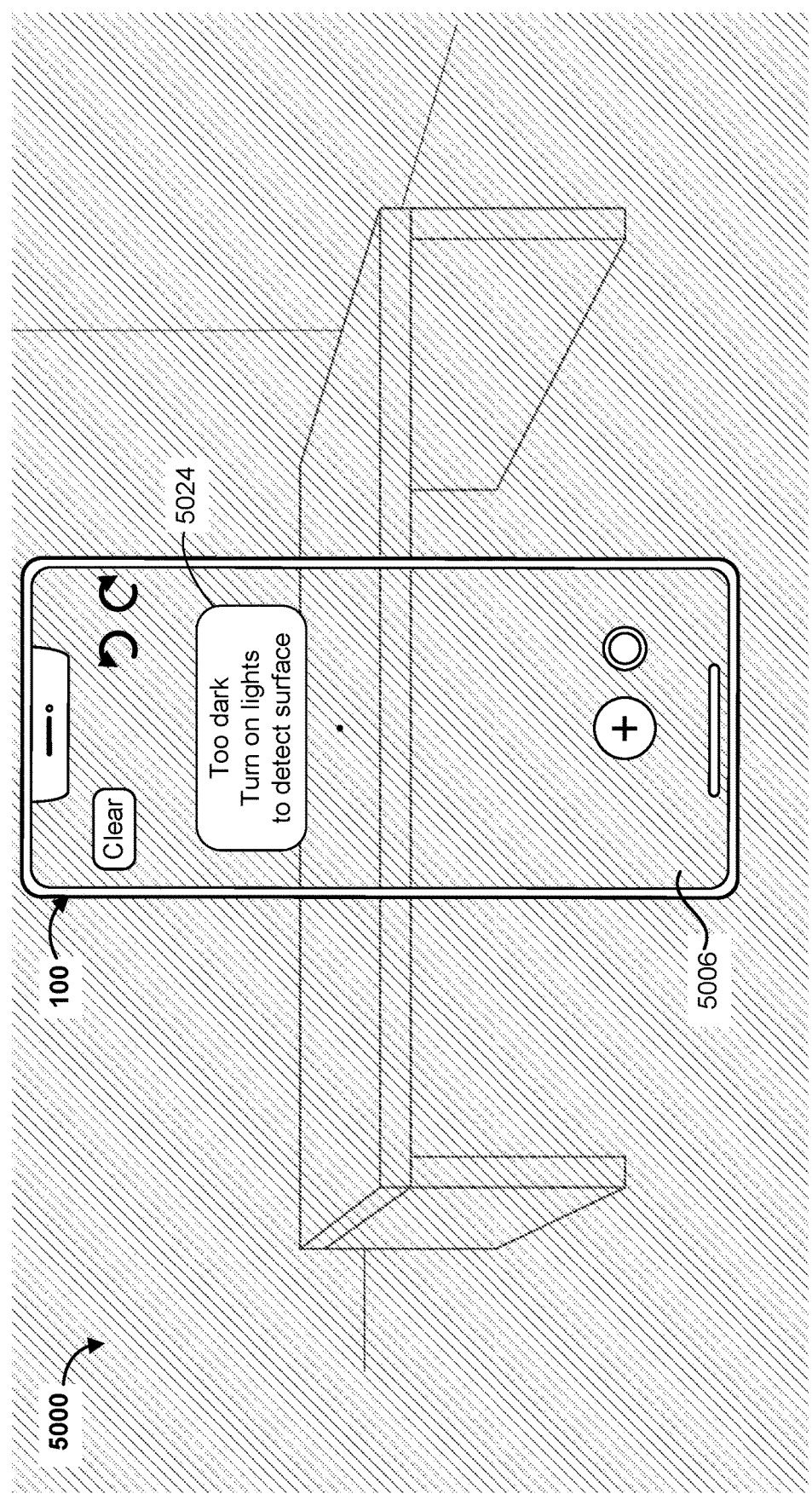

FIG. 5D illustrates an example of an error condition of the augmented reality environment. In particular, FIG. 5D shows a view of physical space 5000 when there is insufficient light available for device 100 to recognize distinct physical objects and physical features in the field of view of the camera. Device 100 displays error message 5024 (e.g., with the text "Too dark" and "Turn on lights to detect surface") in user interface 5006 to indicate the error condition and to prompt user 5004 to increase the amount of light in physical space 5000. In some embodiments, while an error condition exists such that device 100 is unable to identify a physical object or feature in the field of view of the camera, device 100 ceases to display reticle 5010 and/or focus point 5012 to indicate the error condition.

Figure 5E:
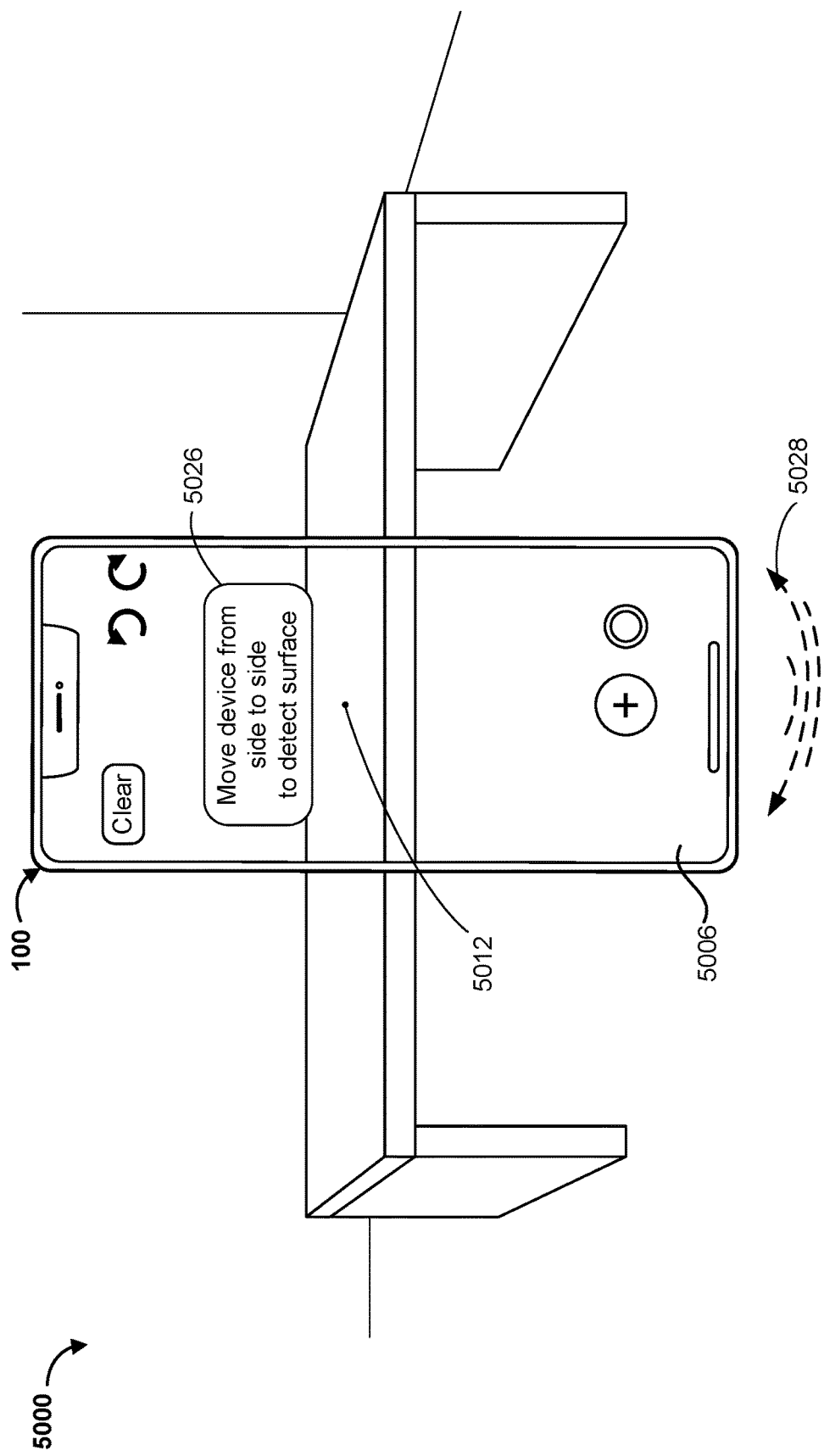

FIG. 5E illustrates another example of an error condition of the augmented reality environment. In particular, FIG. 5E shows a view of physical space 5000 when there is sufficient light available (e.g., user 5004 has turned on the lights in response to error message 5024), but device 100 does not detect a surface of a physical object in physical space 5000 that is in the field of view of the camera. Device 100 displays error message 5026 (e.g., with the text "Move device from side to side to detect surface") in user interface 5006 to indicate the error condition and to prompt user 5004 to move device 100 from side to side (e.g., to facilitate image processing by device 100 to detect a physical surface that is in the field of view of the camera). Movement arrows 5028 indicate side-to-side movement of device 100 by user 5004 in response to error message 5026. In some embodiments, error message 5026 is displayed when device 100 does not detect a surface of a physical object at the location over which focus point 5012 is displayed in the live preview. In some embodiments, a different error message is displayed if user 5004 moves device 100 too quickly for a surface of a physical object to be detected, to indicate the error condition and to prompt user 5004 to move device 100 more slowly.

Figure 5F:
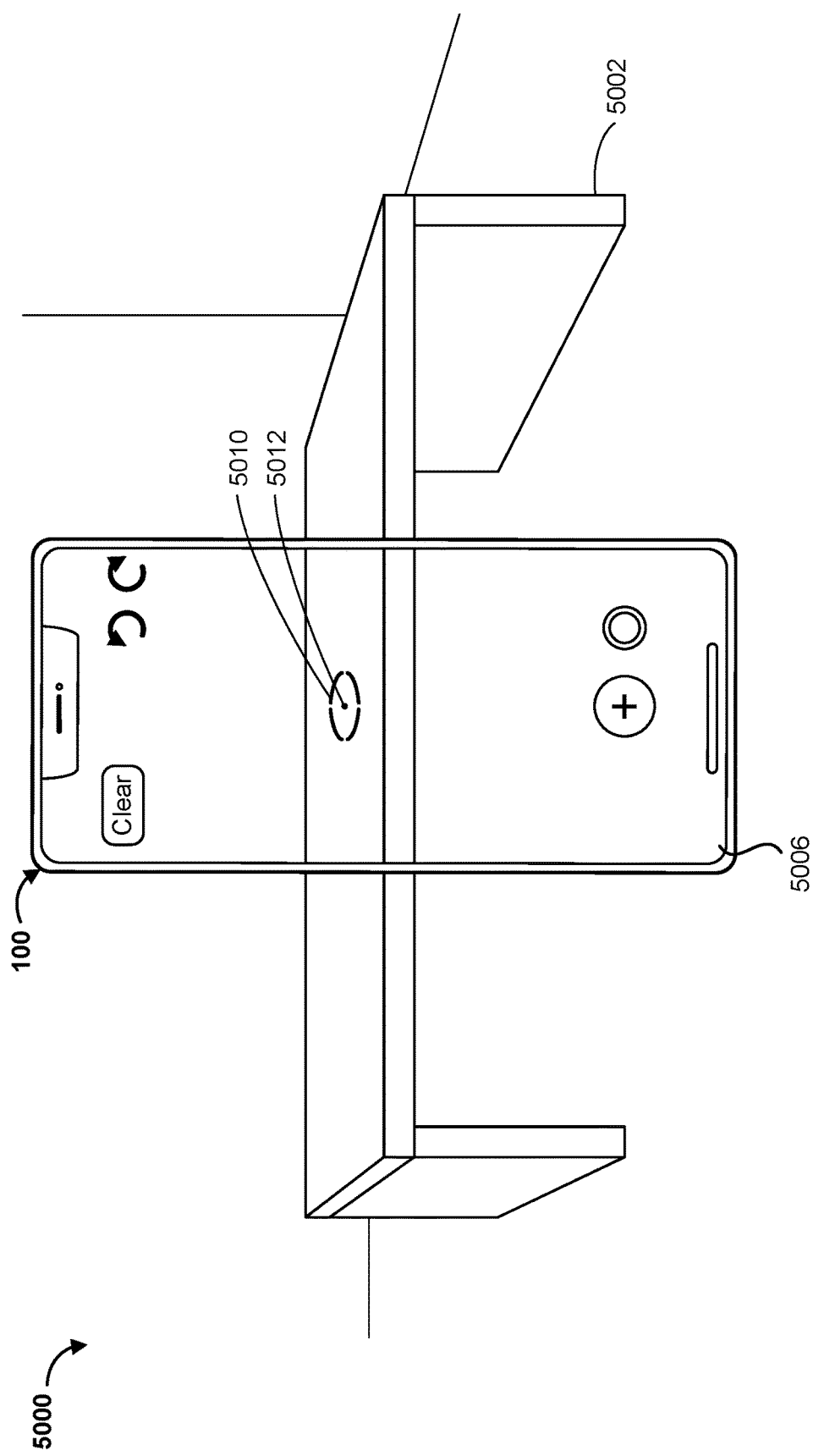

FIG. 5F illustrates a view of physical space 5000 when device 100 has detected a surface of physical object in physical space 5000. In particular, in FIG. 5F, device 100 has detected the top surface of table 5002 (e.g., based on the side-to-side movement of device 100, as described above with respect to FIG. 5E, while focus point 5012 is positioned over the top surface of table 5002 in the live preview). In accordance with detecting a surface, device 100 displays reticle 5010 in user interface 5006, in addition to focus point 5012. In some embodiments, reticle 5010 is displayed whenever focus point 5012 is positioned over a region in the live preview that corresponds to a detected surface of a physical object in physical space 5000 (e.g., to indicate that the region in the live preview over which focus point 5012 is positioned corresponds to a detected surface). In some embodiments, reticle 5010 is tilted to appear to be co-planar with the detected surface, as illustrated in FIG. 5F, to indicate the surface that has been detected by the device.

FIG. 5G illustrates a transition from FIG. 5F. In FIG. 5G, user 5004 has moved device 100 such that focus point 5012 is positioned over a point in the live preview that does not correspond to a detected surface (e.g., focus point 5012 is no longer positioned over the detected top surface of table 5002 in the live preview). Accordingly, device 100 changes the appearance of reticle 5010 (e.g., by no longer tilting the reticle 5010, by changing the reticle to a solid circle, and/or by ceasing to display the reticle), while continuing to display focus point 5012.

Figure 5H:
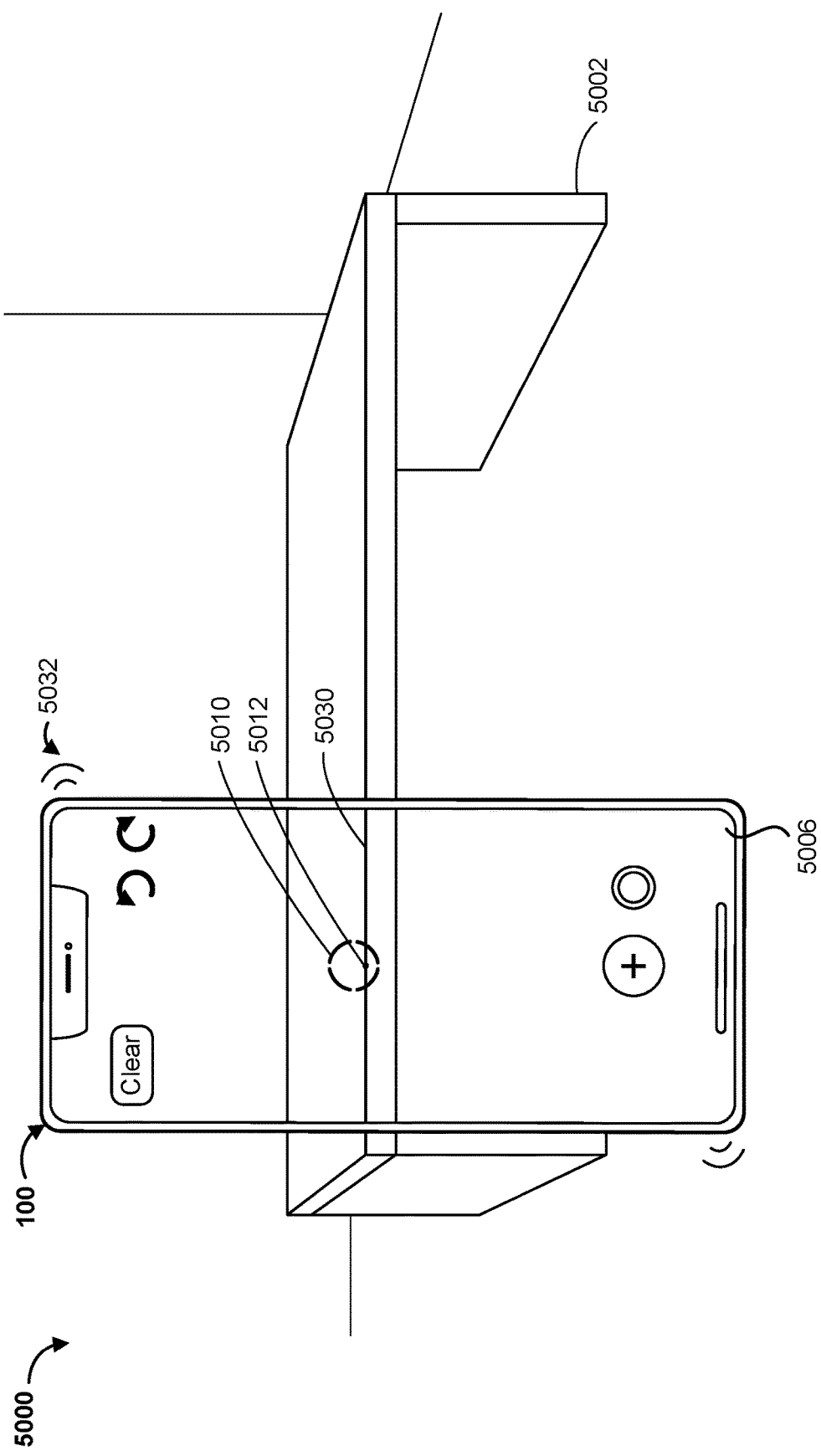

FIG. 5H illustrates a transition from FIG. 5G. In FIG. 5H, user 5004 has moved device 100 such that focus point 5012 and at least part of reticle 5010 are repositioned over the detected top surface of table 5002 in the live preview. Device 100 has detected edge 5030 of table 5002 in the live preview (e.g., an edge of the detected top surface). Edge 5030 is at least partially within reticle 5010 (e.g., focus point 5012 is within a predefined threshold distance of edge 5030, where the predefined threshold distance is at most the radius of reticle 5010). Accordingly, the visual appearances of reticle 5010 and focus point 5012 are changed. In particular, focus point 5012 has been moved (e.g., vertically downward) to, or "snapped" to, a point along edge 5030. In addition, a size of reticle 5010 is reduced to indicate that focus point 5012 has snapped to a detected feature in the live preview. In some embodiments, reticle 5010 is displayed at the size shown in FIG. 5H whenever focus point 5012 is snapped to a detected feature in the live preview. In some embodiments, the visual appearances of reticle 5010 and focus point 5012 are changed when focus point 5012 snaps to a detected feature in the live preview that corresponds to an edge or a corner of a physical object in the field of view of the camera. In some embodiments, the visual appearances of reticle 5010 and focus point 5012 are not changed when reticle 5010 and focus point 5012 are positioned over a detected feature in the live preview that corresponds to a surface of a physical object in the field of view of the camera (but not an edge or a corner). In some embodiments, in conjunction with moving focus point 5012 to edge 5030, device 100 optionally generates tactile output 5032 (e.g., using tactile output generators 163, FIG. 1A) to indicate that point 5012 has been "snapped" to a detected feature in the live preview of the camera.

Figure 5I:
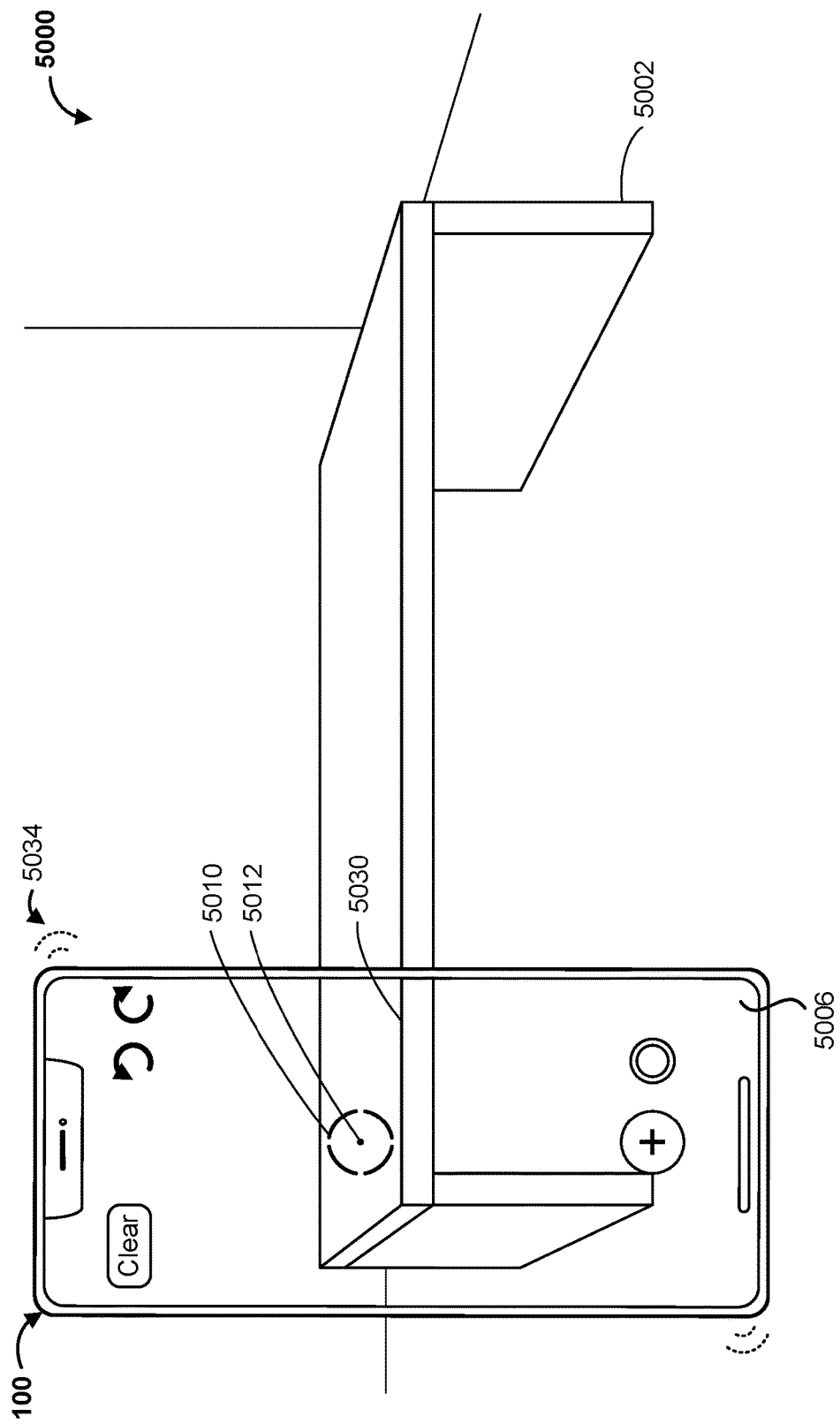

FIG. 5I illustrates a transition from FIG. 5H. In FIG. 5I, user 5004 has moved device 100 such that no portion of edge 5030 is within reticle 5010. Accordingly, focus point 5012 is snapped away from edge 5030 and is redisplayed at the center of reticle 5010 (e.g., because there is no longer any feature within reticle 5010 to which focus point 5012 should snap). In addition, the size of reticle 5010 is increased back to its size as shown in FIG. 5F, prior to focus point 5012 snapping to edge 5030. In some embodiments, reticle 5010 is displayed at the size shown in FIGS. 5F and 5I by default, whenever focus point 5012 is not snapped to any detected feature in the live preview. In some embodiments, focus point 5012 is displayed at the center of reticle 5010 by default, whenever focus point 5012 is not snapped to any detected feature in the live preview. In some embodiments, as shown in FIG. 5I, device 100 optionally generates tactile output 5034 in conjunction with moving focus point 5012 away from edge 5030, to indicate focus point 5012 is no longer snapped to a detected feature in the live preview of the camera. In some embodiments, tactile output 5034 differs from tactile output 5032 (FIG. 5H) in at least one tactile output property (e.g., frequency, amplitude, and/or pattern), such that tactile output 5032 (FIG. 5H), which indicates snapping to a detected feature, provides a different tactile feedback to user 5004 than tactile output 5034, which indicates snapping away from a detected feature.

Figure 5J:
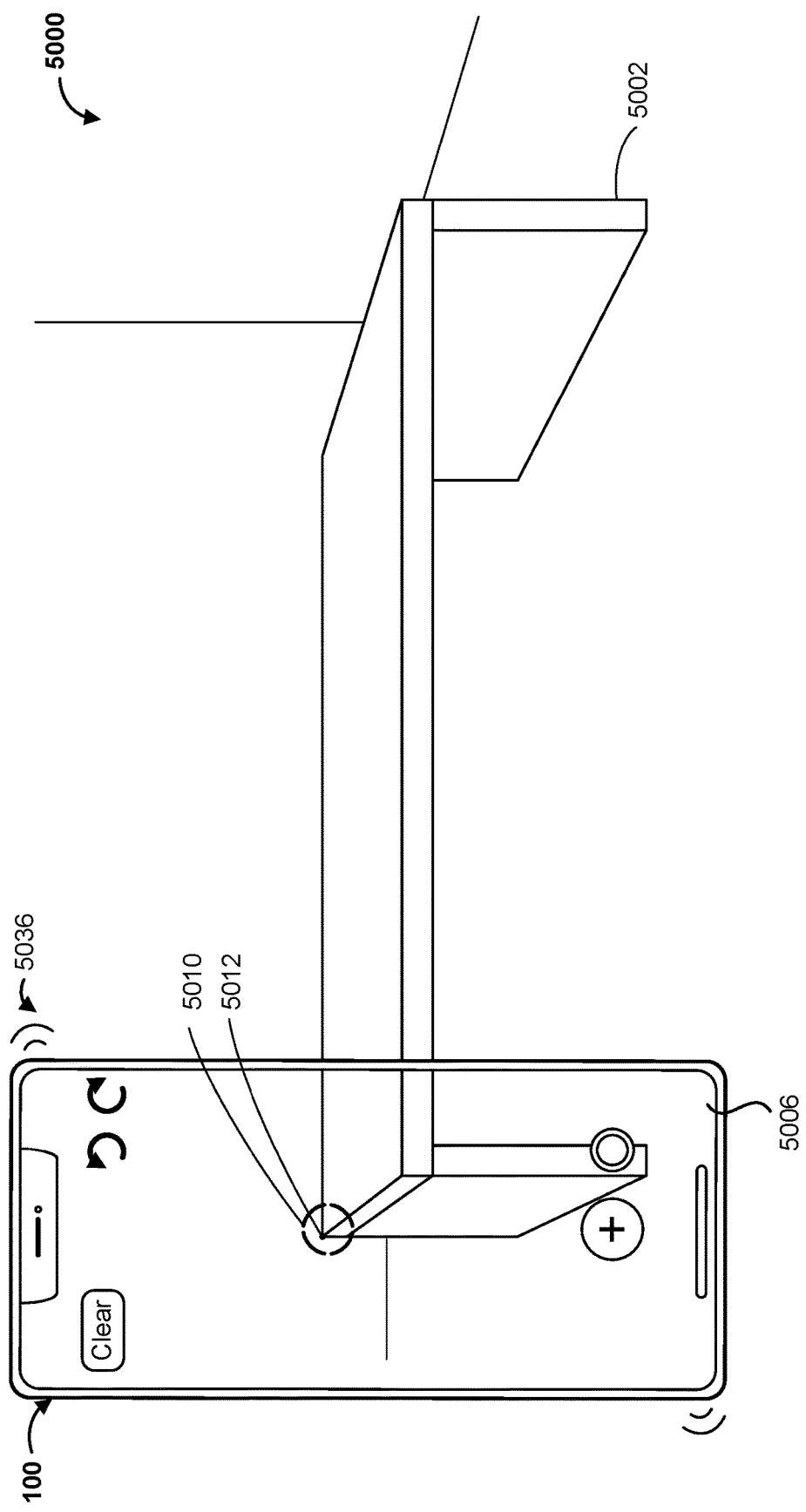

FIGS. 5J-5O illustrate creation of a measurement of the horizontal upper-left edge of table 5002. FIG. 5J illustrates a transition from FIG. 5I. In FIG. 5J, user 5004 has moved device 100 such that the upper-back-left corner of table 5002, as displayed in the live preview, is within reticle 5010. Accordingly, focus point 5012 is snapped to the anchor point corresponding to the upper-back-left corner of table 5002 in the live preview. In some embodiments, focus point 5012 is maintained on the anchor point in the live preview as long as the upper-back-left corner of table 5002 in the live preview is within reticle 5010 (e.g., although device 100 may move slightly due to unintentional movements of user 5004, such as unsteadiness of user 5004's hands). The size of reticle 5010 is decreased to indicate the snapping behavior (e.g., to the same size shown in and described above with reference to FIG. 5H). In addition, tactile output 5036 is generated to indicate the snapping behavior.

Figure 5K:
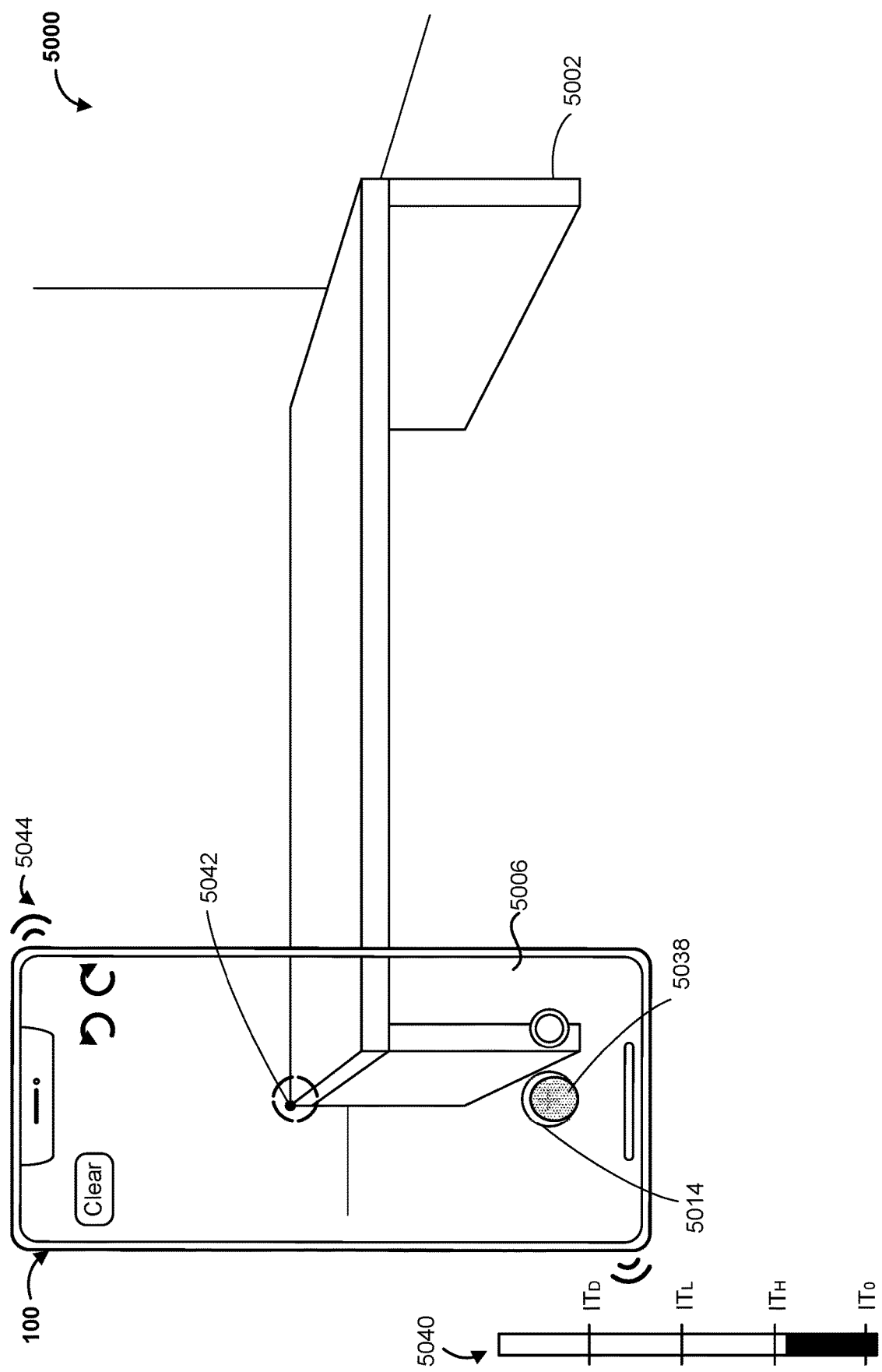
Figure 5L:
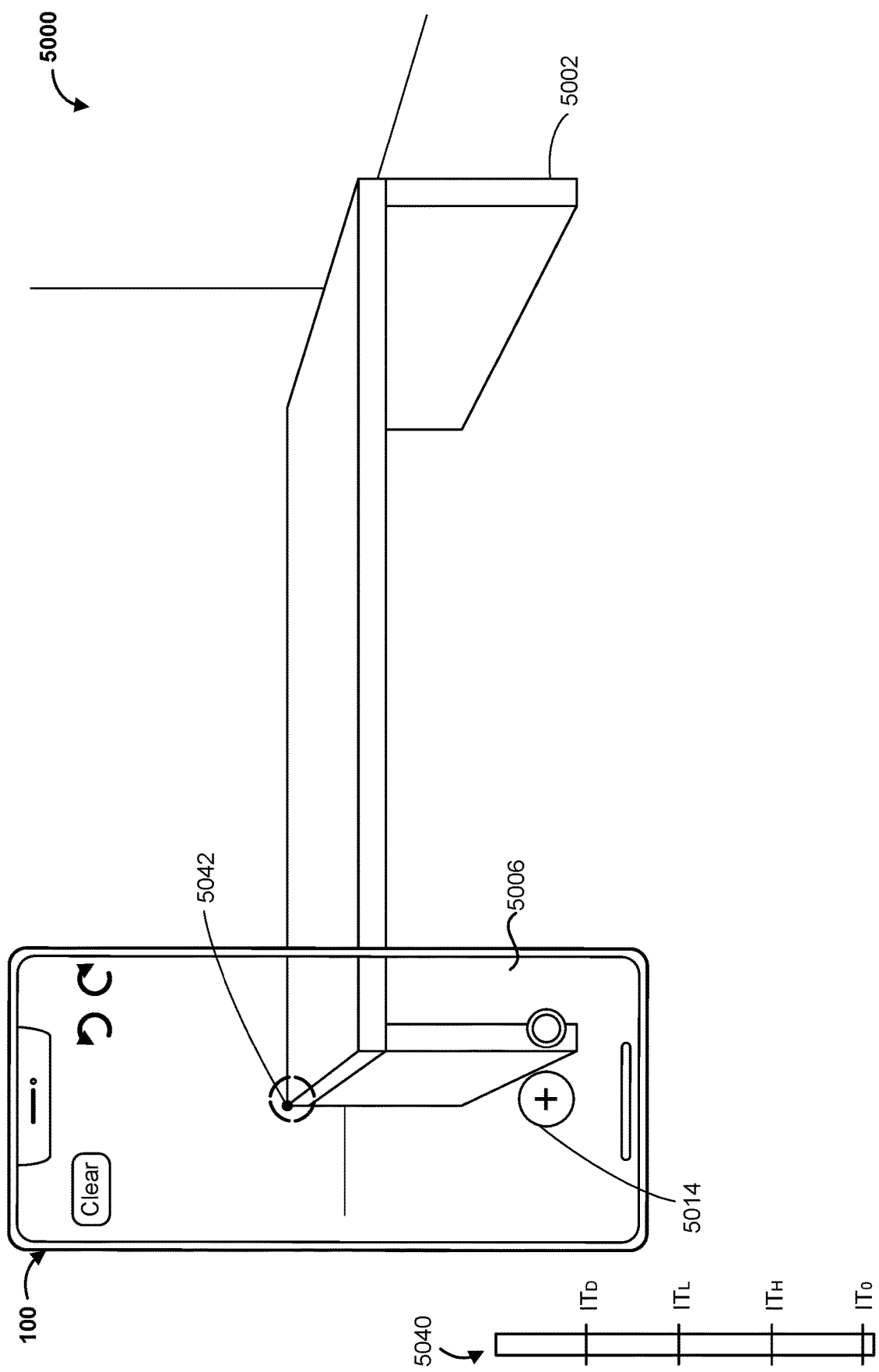

FIGS. 5K-5L illustrate a transition from FIG. 5J showing the addition of a measurement point to user interface 5006. In particular, FIG. 5K illustrates activation of measurement addition button 5014 by touch input 5038 (e.g., a tap gesture) with a contact intensity that is above a minimum contact detection threshold $IT_0$, as indicated by intensity meter 5040. In response to the activation of measurement addition button 5014, device 100 adds and displays (virtual) measurement point 5042 to user interface 5006 at a current location of focus point 5012. In conjunction with adding measurement point 5042 to user interface 5006, device 100 optionally generates tactile output 5044 to indicate the addition of a measurement point. In some embodiments, tactile output 5044 differs from tactile output 5032 (FIG. 5H) and tactile output 5034 (FIG. 5I) in at least one tactile output property (e.g., frequency, amplitude, and/or pattern), such that tactile output 5032 (FIG. 5H) and tactile output 5034 (FIG. 5I), which indicate snapping behavior, provide different tactile feedback to user 5004 than tactile output 5044, which indicates the addition of a measurement point. FIG. 5L illustrates liftoff of touch input 5038 from measurement addition button 5014.

Figure 5M:
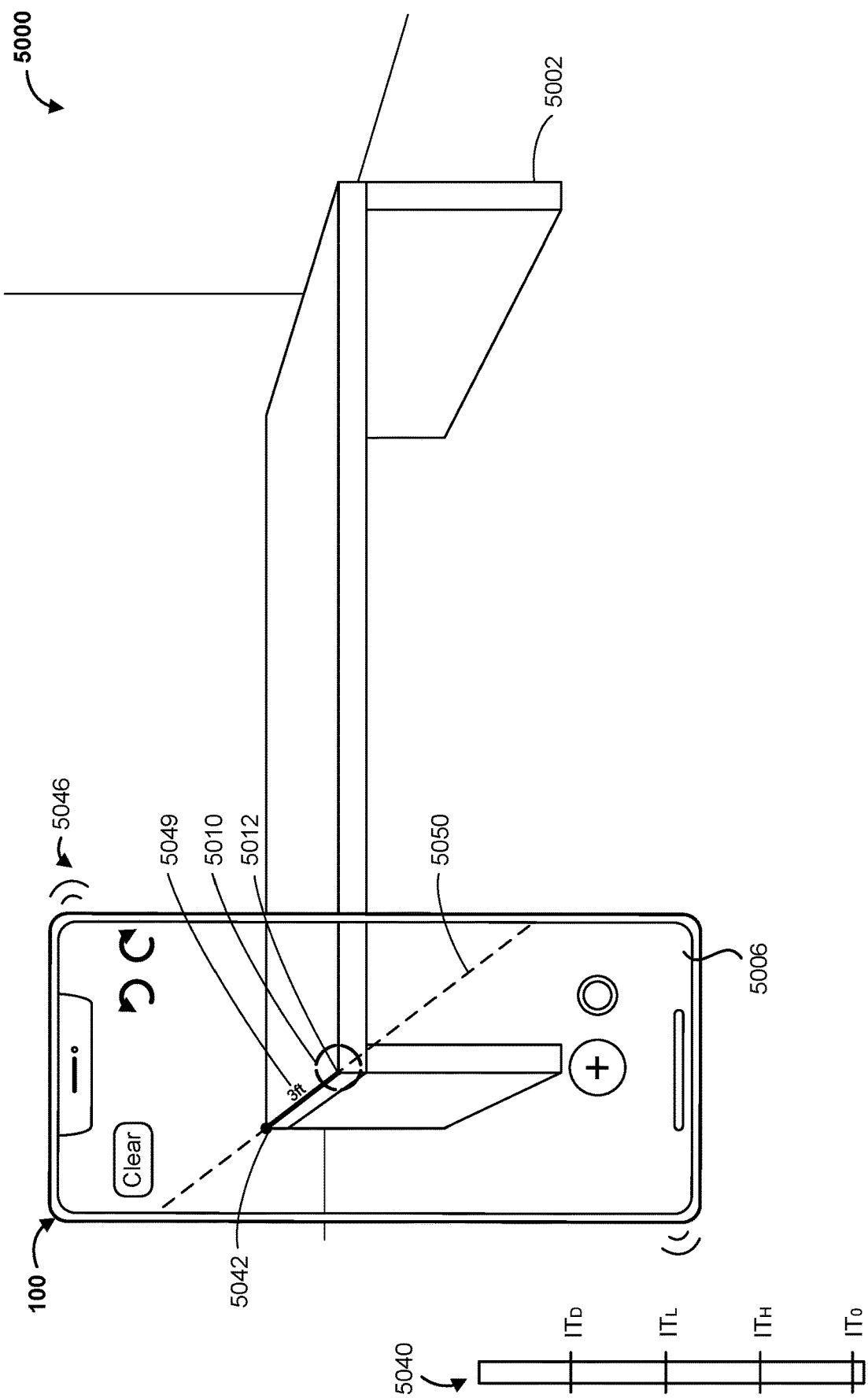

FIG. 5M illustrates a transition from FIG. 5L. In FIG. 5M, user 5004 has moved device 100 diagonally downward and toward the right such that reticle 5010 is positioned over a different location in physical space 5000 as displayed in the live preview. In particular, in FIG. 5M, reticle 5010 is positioned over the upper-front-left corner of table 5002 as displayed in the live preview. Accordingly, focus point 5012 is snapped to the anchor point corresponding to the upper-front-left corner of table 5002 in the live preview. The size of reticle 5010 is decreased to indicate the snapping behavior (e.g., to the same size shown in and described above with reference to FIG. 5J). Tactile output 5046 is generated to indicate the snapping behavior. In addition, measurement point 5042 continues to be displayed over the upper-back-left corner of table 5002 in the live preview (e.g., measurement point 5042 is associated with the upper-back-left corner of table 5002 and is displayed over that position in the live preview even while the position of the upper-back-left corner of table 5002 in the live preview changes as device 100 moves).

In response to the movement of device 100 such that reticle 5010 and focus point 5012 are positioned over a different location in physical space 5000, measurement segment 5048 is displayed between measurement point 5042 (the most-recently-added measurement point) and focus point 5012. Measurement segment 5048 is displayed with label 5049 that indicates a distance between the point in physical space 5000 corresponding to measurement point 5042 and the point in physical space 5000 corresponding to focus point 5012 (e.g., "3 ft"). Before the second endpoint of measurement segment 5048 is added, measurement segment 5048 is a dynamic measurement segment having a first endpoint that is measurement point 5042 and a second endpoint that is the current position of focus point 5012 (e.g., the length of measurement segment 5048 and the distance indicated by label 5049 corresponding to measurement segment 5048 are both updated in accordance with movement of device 100 that changes the point in physical space 5000 to which the current location of focus point 5012 corresponds). In addition, virtual guide 5050 is displayed along a feature in physical space 5000 that extends in the direction of movement of device 100 from the most-recently-added measurement point, measurement point 5042. Specifically, virtual guide 5050 is displayed along the horizontal upper-left edge of table 5002 that extends diagonally downward and toward the right in the live preview. Note that the upper-left edge of table 5002, and other edges of the top surface of table 5002, are referred to herein as horizontal edges, because they are horizontal in physical space 5000 even though they may appear diagonal in the live preview, from the perspective of device 100.

Figure 5N:
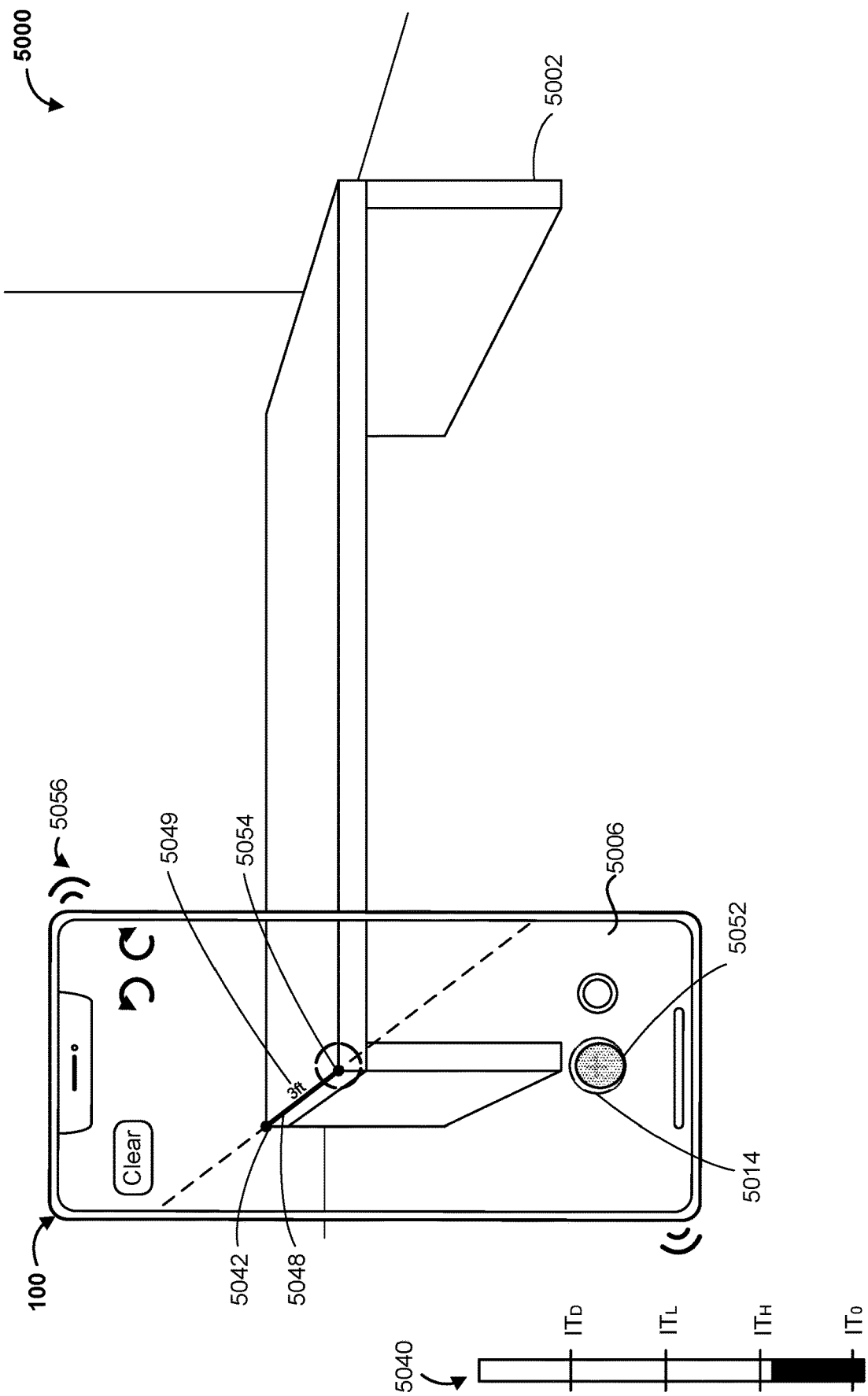
Figure 5O:
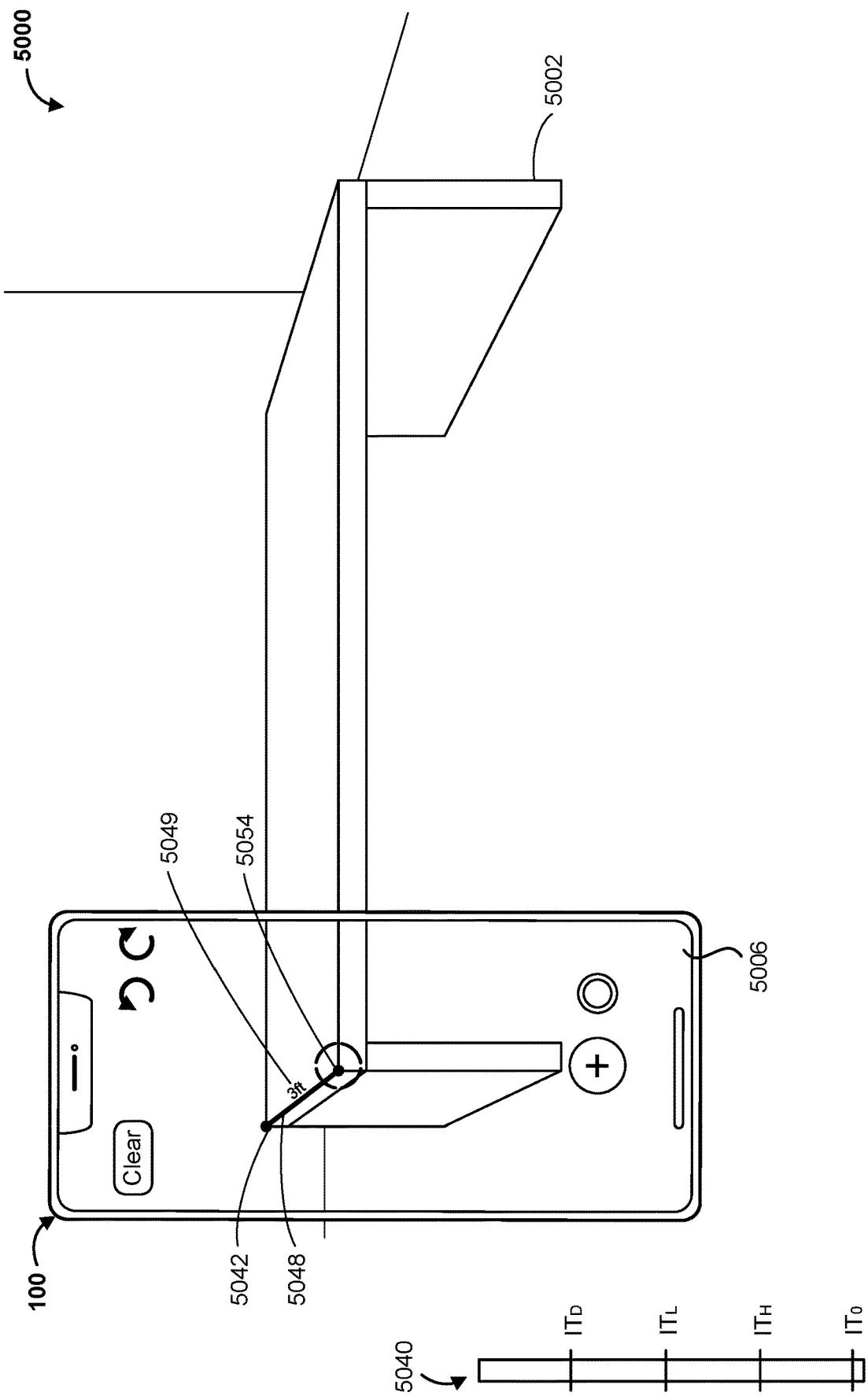

FIGS. 5N-5O illustrate a transition from FIG. 5M showing the addition of a measurement point to user interface 5006. In particular, FIG. 5N illustrates activation of measurement addition button 5014 by touch input 5052 (e.g., a tap gesture) with a contact intensity that is above a minimum contact detection threshold $IT_0$, as indicated by intensity meter 5040. In response to the activation of measurement addition button 5014, device 100 adds and displays (virtual) measurement point 5054 in user interface 5006 at a current location of focus point 5012 and as the second endpoint of measurement segment 5048. In conjunction with adding measurement point 5054 to user interface 5006, device 100 optionally generates tactile output 5056 to indicate the addition of a measurement point. In some embodiments, tactile output 5056 is the same type of tactile output as tactile output 5044 (FIG. 5K), indicating the addition of a measurement point. In some embodiments, tactile output 5056 differs from tactile output 5044 (FIG. 5K) in at least one tactile output property (e.g., frequency, amplitude, and/or pattern), such that tactile output 5056 provides different tactile feedback to user 5004 than tactile output 5044 (FIG. 5K). In some such embodiments, tactile output 5044 (FIG. 5K) indicates the addition of a measurement point that begins a new measurement segment, while tactile output 5056 indicates the addition of a measurement point that completes (e.g., ends) a measurement segment. FIG. 5O illustrates liftoff of touch input 5052 from measurement addition button 5014. After liftoff of touch input 5052, device 100 continues to display measurement point 5042, measurement point 5054, measurement segment 5048 connecting measurement points 5042 and 5054 in user interface 5006, and label 5049 (corresponding to a measurement of the horizontal upper-left edge of table 5002). In some embodiments, as shown in FIG. 5O, upon the completion of a measurement segment, device 100 ceases to display virtual guides such as virtual guide 5050.

Figure 5P:
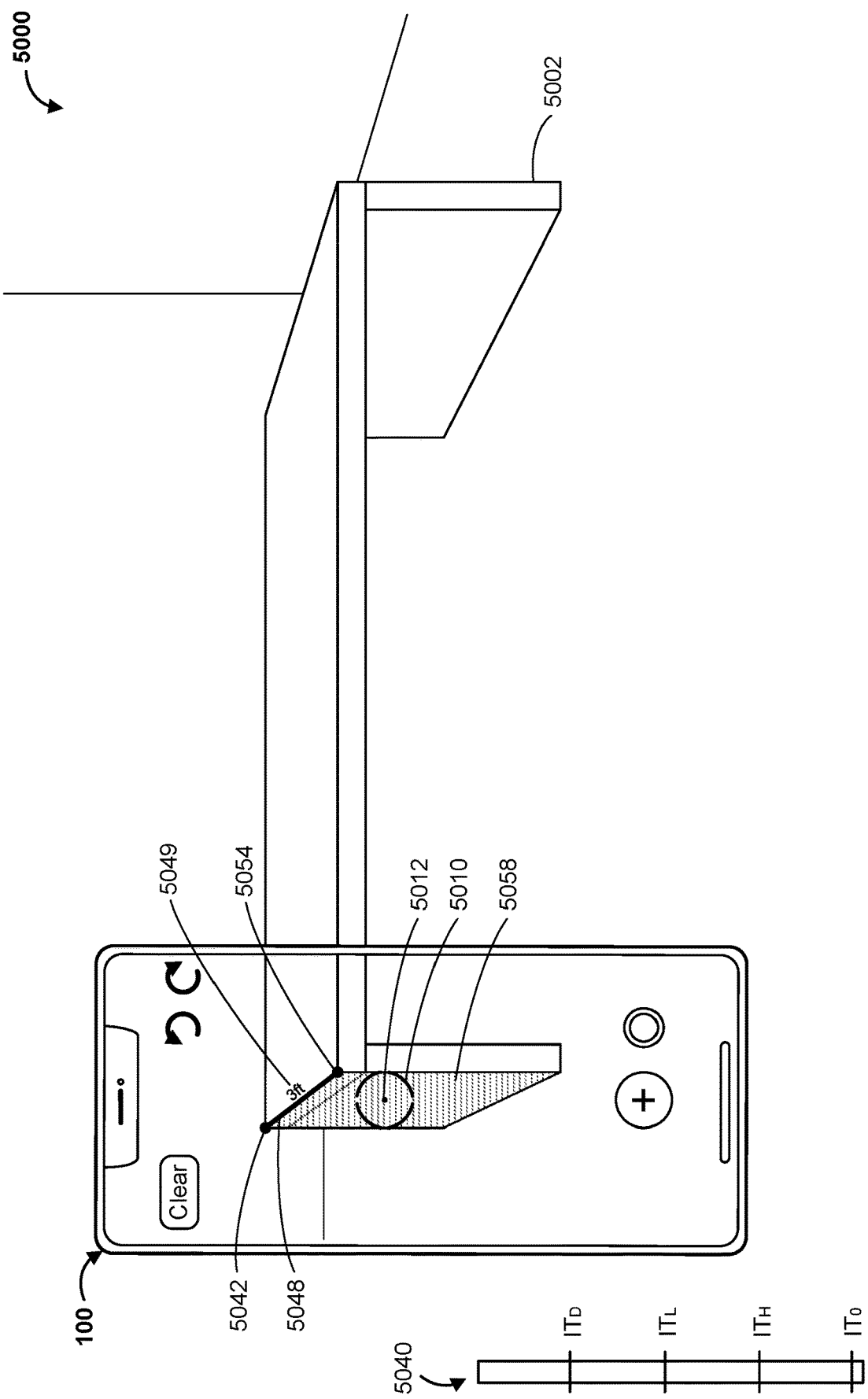

FIG. 5P illustrates a transition from FIG. 5O. In FIG. 5P, user 5004 has moved device 100 such that reticle 5010 is positioned over a side surface of table 5002 in the live preview that is adjacent to measurement segment 5048. Device 100 has determined (e.g., based in part on measurement segment 5048) that the region over which reticle 5010 (or more specifically, focus point 5012) is positioned corresponds to a physical rectangular area in physical space 5000 (e.g., although the detected region appears trapezoidal in the live preview, from the perspective of device 100). Accordingly, device 100 displays indicator 5058 to indicate that the detected region corresponds to a physical rectangular area. In addition, device 100 continues to display measurement point 5042, measurement point 5054, measurement segment 5048, and label 5049 over the horizontal upper-left edge of table 5002. In some embodiments, measurement elements (e.g., measurement point 5042, measurement 5054, measurement segment 5048, and label 5049) that are part of a virtual measurement are displayed in user interface 5006 whenever the physical object corresponding to the virtual measurement (e.g., the horizontal upper-left edge of table 5002) is visible in the live preview, until the corresponding virtual measurement is cleared.

Figure 5Q:
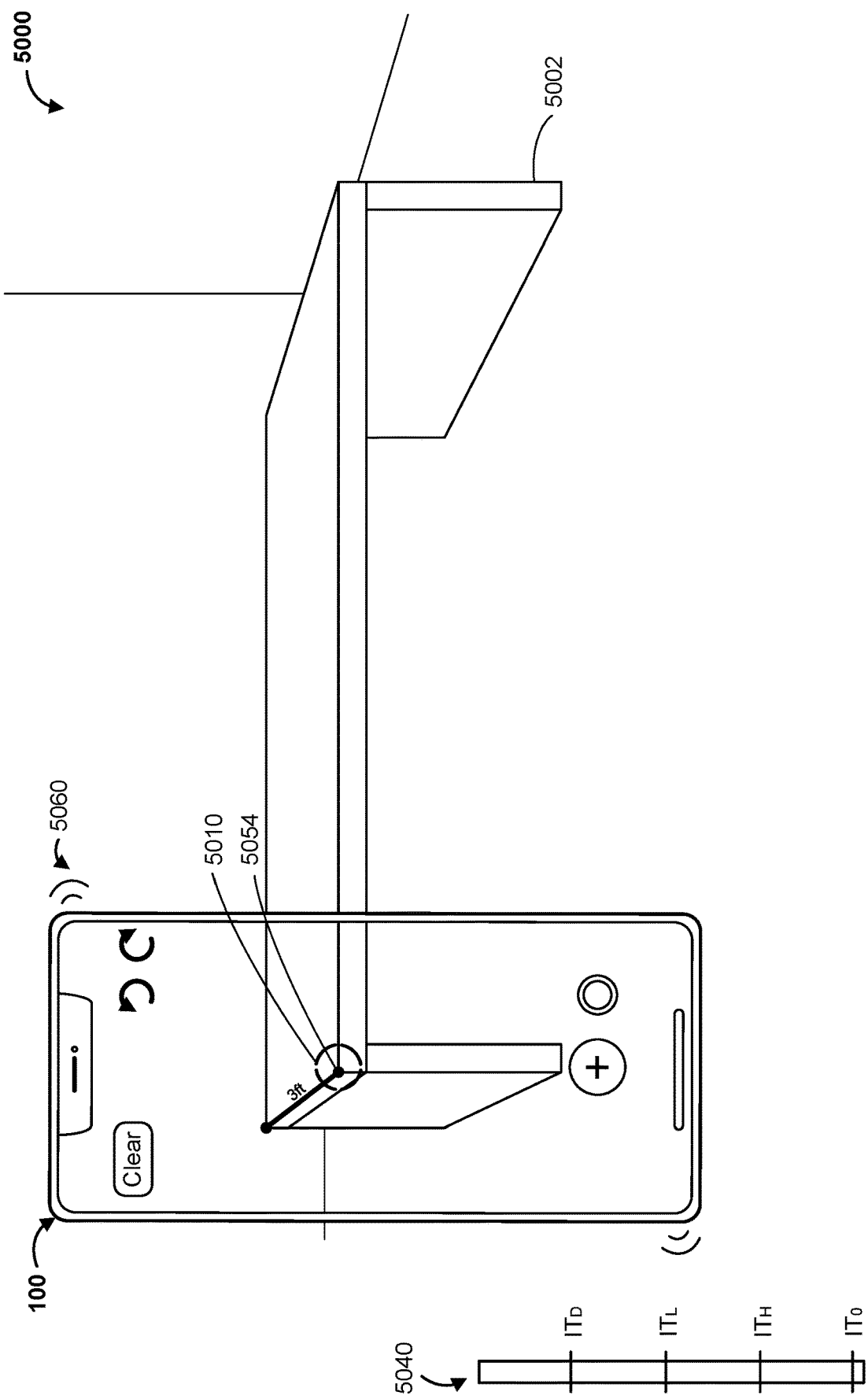

FIG. 5Q-5X illustrate creation of a measurement of the vertical front-left edge of table 5002. FIG. 5Q illustrates a transition from FIG. 5P. In FIG. 5Q, user 5004 has moved device 100 such that reticle 5010 is repositioned over the upper-front-left corner of table 5002 as displayed in the live preview. Accordingly, focus point 5012 is snapped to the anchor point corresponding to the upper-front-left corner of table 5002 in the live preview, and corresponding to measurement point 5054. The size of reticle 5010 is decreased to indicate the snapping behavior (e.g., to the same size shown in and described above with reference to FIG. 5M). Tactile output 5060 is generated to indicate the snapping behavior. Device 100 ceases to display indicator 5058 (e.g., because focus point 5012 has snapped to the anchor point corresponding to the upper-front-left corner of table 5002, and is no longer displayed over the detected region in the live preview that corresponds to the physical rectangular area of the side surface of table 5002).

Figure 5R:
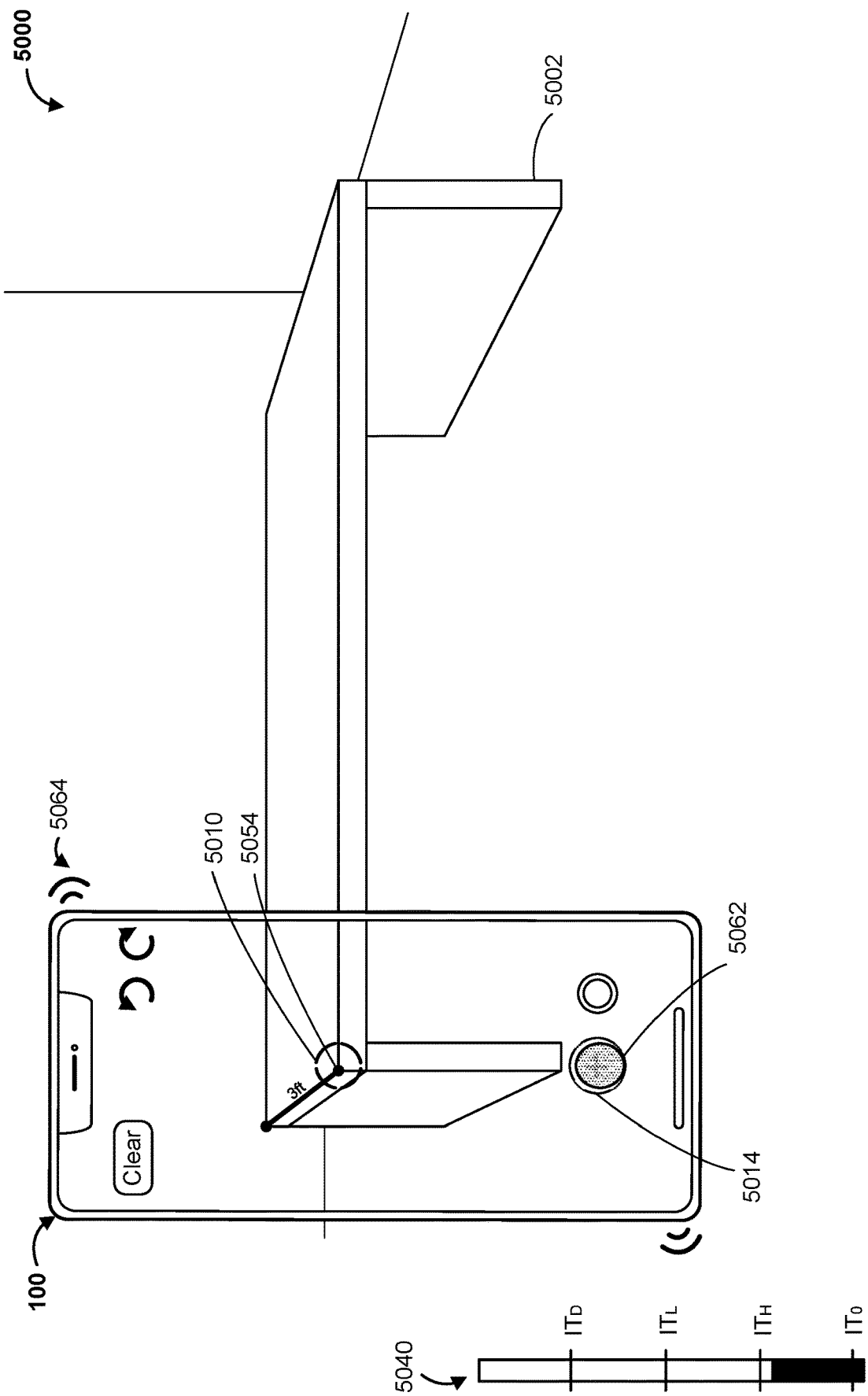

FIG. 5R illustrates a transition from FIG. 5Q showing the addition of a measurement point to user interface 5006. In particular, FIG. 5R illustrates activation of measurement addition button 5014 by touch input 5062 (e.g., a tap gesture) with a contact intensity that is above a minimum contact detection threshold $IT_0$, as indicated by intensity meter 5040. In some embodiments, as shown in FIG. 5R, in response to the activation of measurement addition button 5014, device 100 uses measurement point 5054 as the starting point for a new measurement segment to be added. In some embodiments, in response to the activation of measurement addition button 5014, device 100 adds and displays another (virtual) measurement point, at the same location as measurement point 5054, as the starting point for a new measurement segment. In conjunction with establishing either of the aforementioned starting points for a new measurement segment, device 100 optionally generates tactile output 5064 to indicate the addition of a measurement point (and, in some embodiments, to indicate that the added measurement point begins a new measurement segment).

Figure 5S:
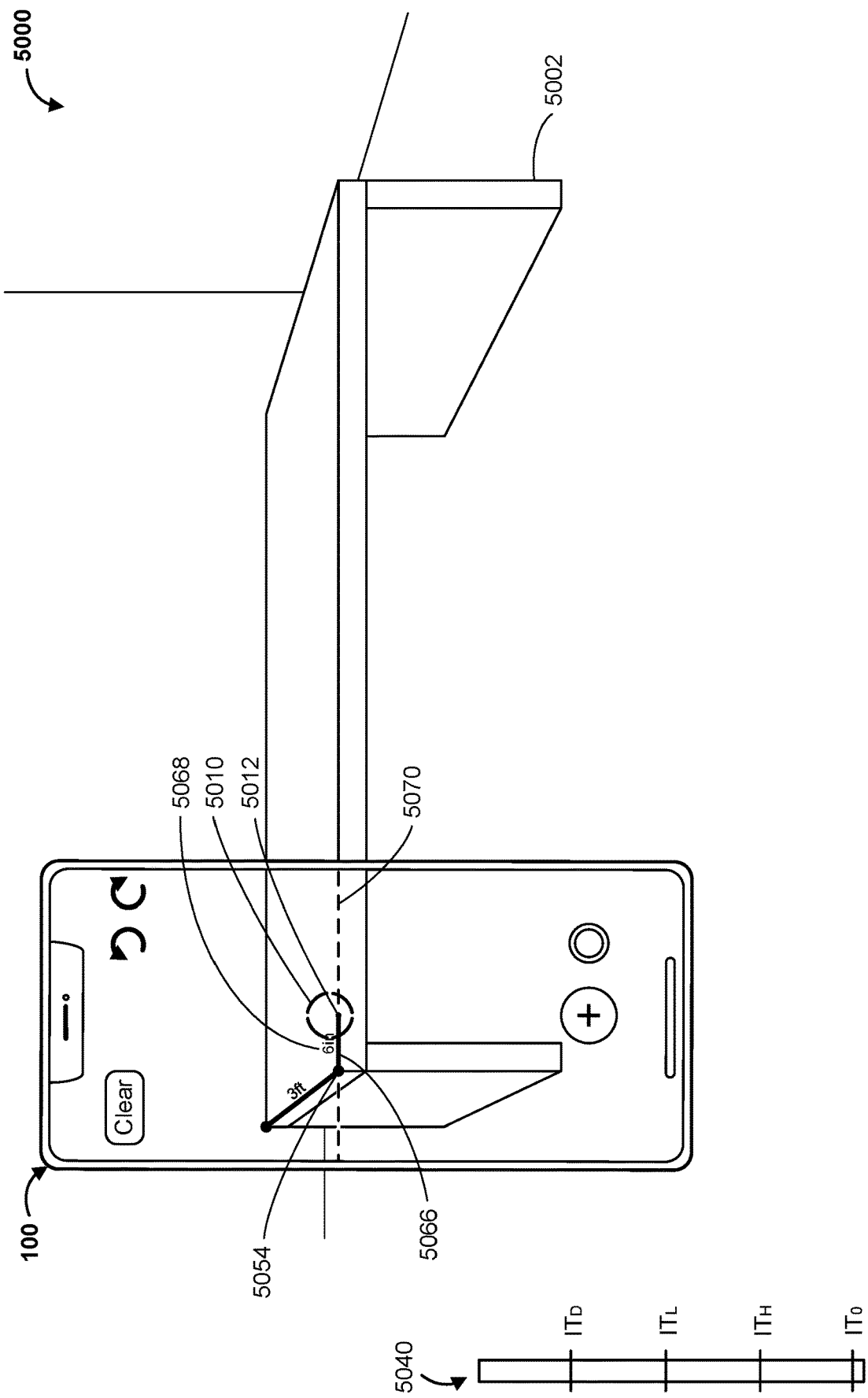

FIG. 5S illustrates a transition from FIG. 5R. In FIG. 5S, user 5004 has moved device 100 horizontally toward the right such that reticle 5010 is positioned over a location along the horizontal front edge of table 5002, and such that the upper-front-left corner of table 5002 in the live preview is no longer within reticle 5010. Accordingly, focus point 5012 is displayed on an anchor point corresponding to the horizontal front edge of table 5002 (e.g., at the midpoint of the portion of the front edge of table 5002 that is within reticle 5010, which is the point along the portion of the front edge of table 5002 within reticle 5010 that is the shortest distance from the center of reticle 5010). Reticle 5010 is displayed at its decreased size (e.g., at the same size as in FIG. 5R) to indicate that focus point 5012 is snapped to a detected feature in the live preview. In addition, measurement point 5054 continues to be displayed over the upper-front-left corner of table 5002 in the live preview, and dynamic measurement segment 5066 is displayed between measurement point 5054 and focus point 5012. Label 5068 indicates a distance between the point in physical space 5000 corresponding to measurement point 5054 and the point in physical space 5000 corresponding to focus point 5012. In addition, in response to the horizontal movement of device 100, device 100 displays virtual guide 5070 extending horizontally from measurement point 5054.

In some embodiments, as shown in FIG. 5S, a tactile output is not generated to indicate the snapping behavior. For example, while at least some portion of the horizontal front edge of table 5002 is been maintained within reticle 5010, such that focus point 5012 has not snapped away from the horizontal front edge of table 5002 at any time during the movement of device 100, although the particular anchor point to which focus point 5012 is snapped changes while device 100 moves, device 100 forgoes generating a tactile output so as to avoid continuous generation of tactile outputs as focus point 5012 moves along the detected edge.

Figure 5T:
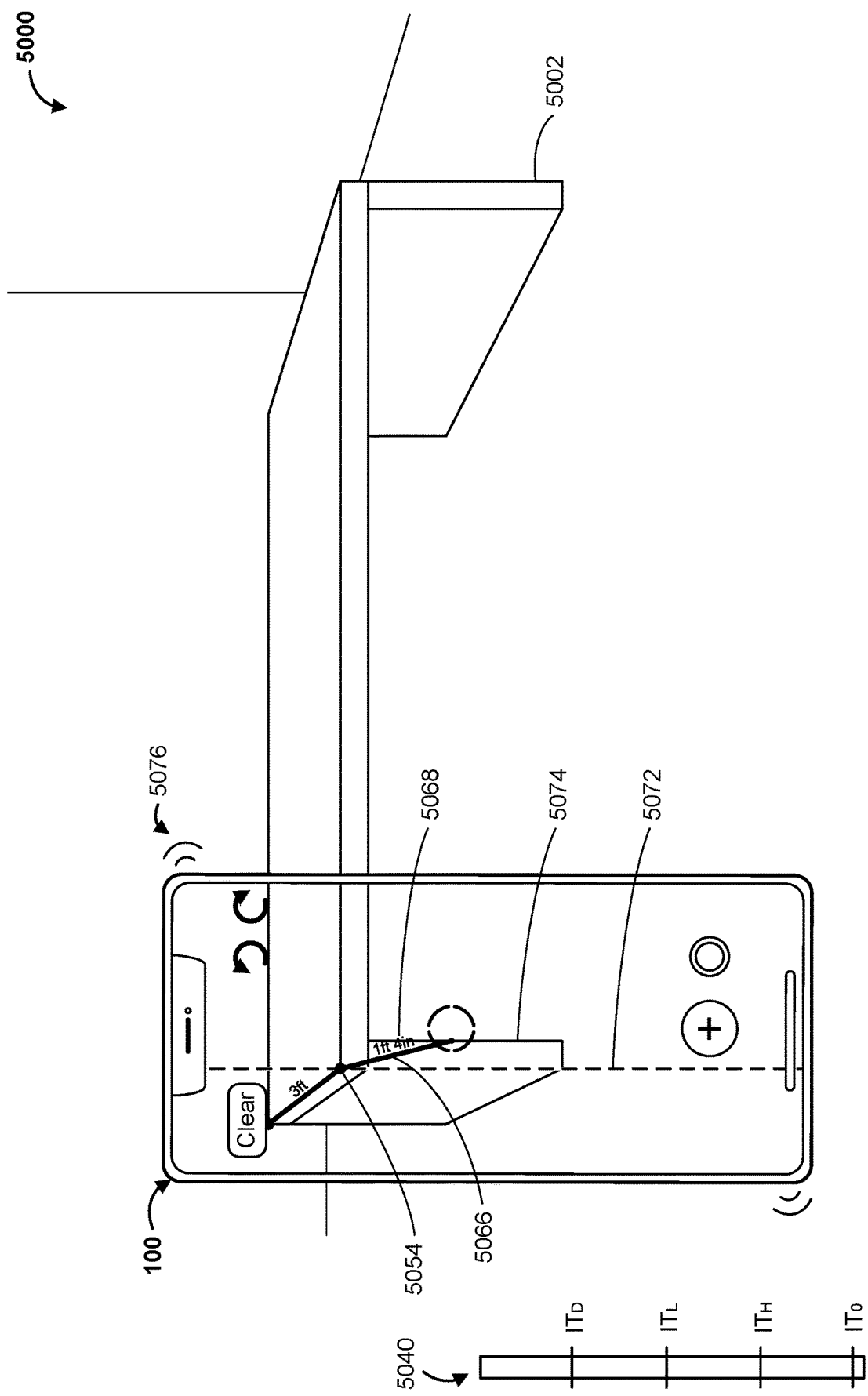

FIG. 5T illustrates a transition from FIG. 5S. In FIG. 5T, the direction of movement of device 100 has changed from horizontally toward the right to vertically downward. In response to the change in direction of movement from horizontal movement to vertical movement, device 100 ceases to display (horizontal) virtual guide 5070 (FIG. 5S) and instead displays (vertical) virtual guide 5072 extending vertically from measurement point 5054 in the direction of movement of device 100. Focus point 5012 is snapped to an anchor point corresponding to vertical inner-left edge 5074 of table 5002, and in some embodiments, as shown in FIG. 5T, device 100 generates tactile output 5076 to indicate the snapping behavior. Dynamic measurement segment 5066 is continually updated in accordance with the movement of device 100 so as to be displayed between measurement point 5054 and a current location of focus point 5012. In addition, label 5068 is continually updated in accordance with the movement of device and the updating of dynamic measurement segment 5066 so that label 5068 is displayed at a midpoint of dynamic measurement segment 5066.

Figure 5U:
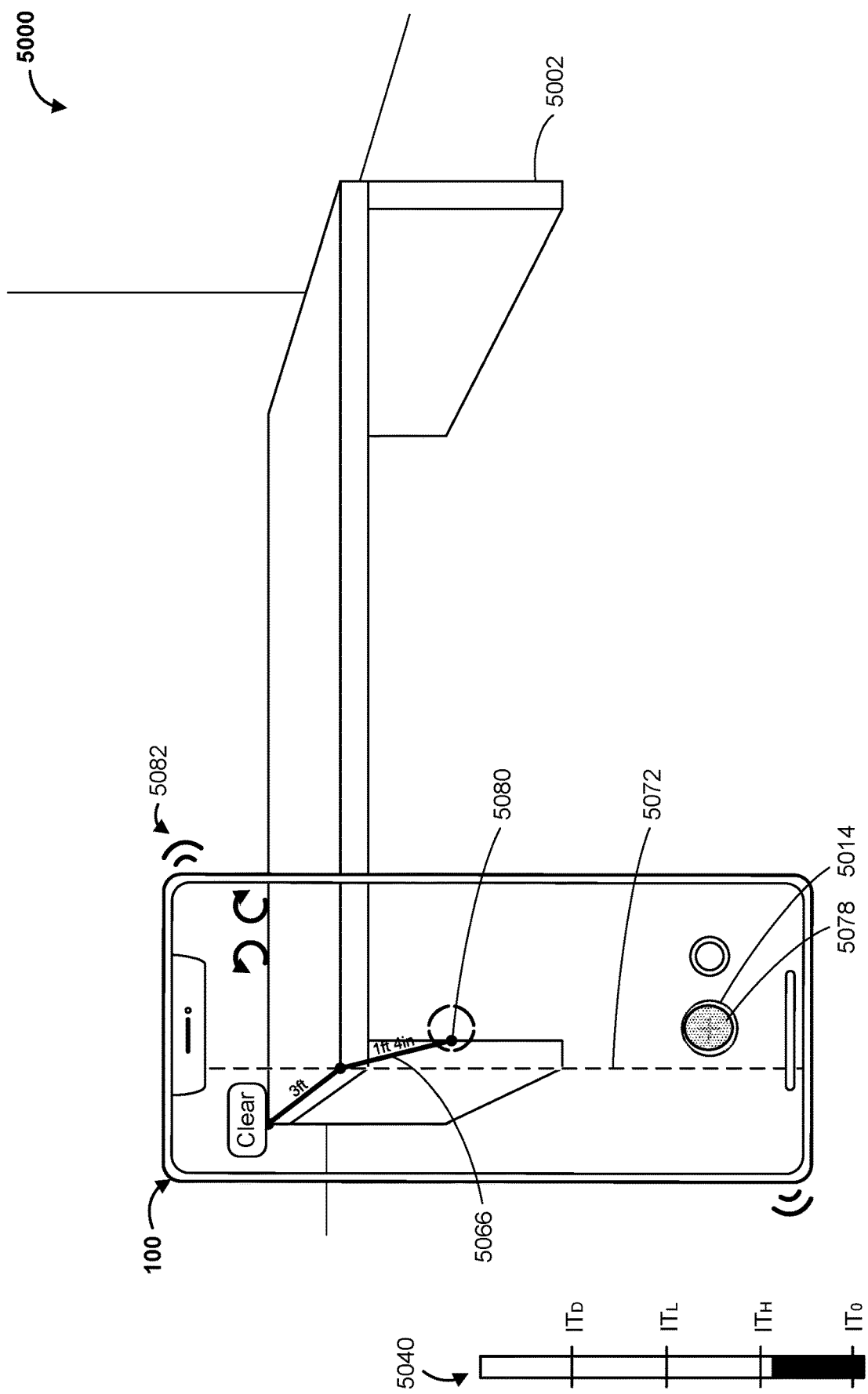

FIG. 5U illustrates a transition from FIG. 5T showing the addition of a measurement point to user interface 5006. In particular, FIG. 5U illustrates activation of measurement addition button 5014 by touch input 5078 (e.g., a tap gesture) with a contact intensity that is above a minimum contact detection threshold $IT_0$, as indicated by intensity meter 5040. In response to the activation of measurement addition button 5014, device 100 adds and displays (virtual) measurement point 5080 to user interface 5006 at a current location of focus point 5012 and as the second endpoint of measurement segment 5066, which becomes a completed measurement segment (e.g., whose second endpoint is now measurement point 5080 and no longer focus point 5012) rather than a dynamic measurement segment. In conjunction with adding measurement point 5080 to user interface 5006, device 100 optionally generates tactile output 5082 indicating the addition of a measurement point (and optionally to indicate in particular the addition of a measurement point that completes a measurement segment, for example using the same type of tactile output as tactile output 5056, FIG. 5N). In some embodiments, as shown in FIG. 5U, device 100 continues to display virtual guides such as virtual guide 5072 even after the completion of a measurement segment (e.g., until the device 100 is moved away from its current position).

Figure 5V:
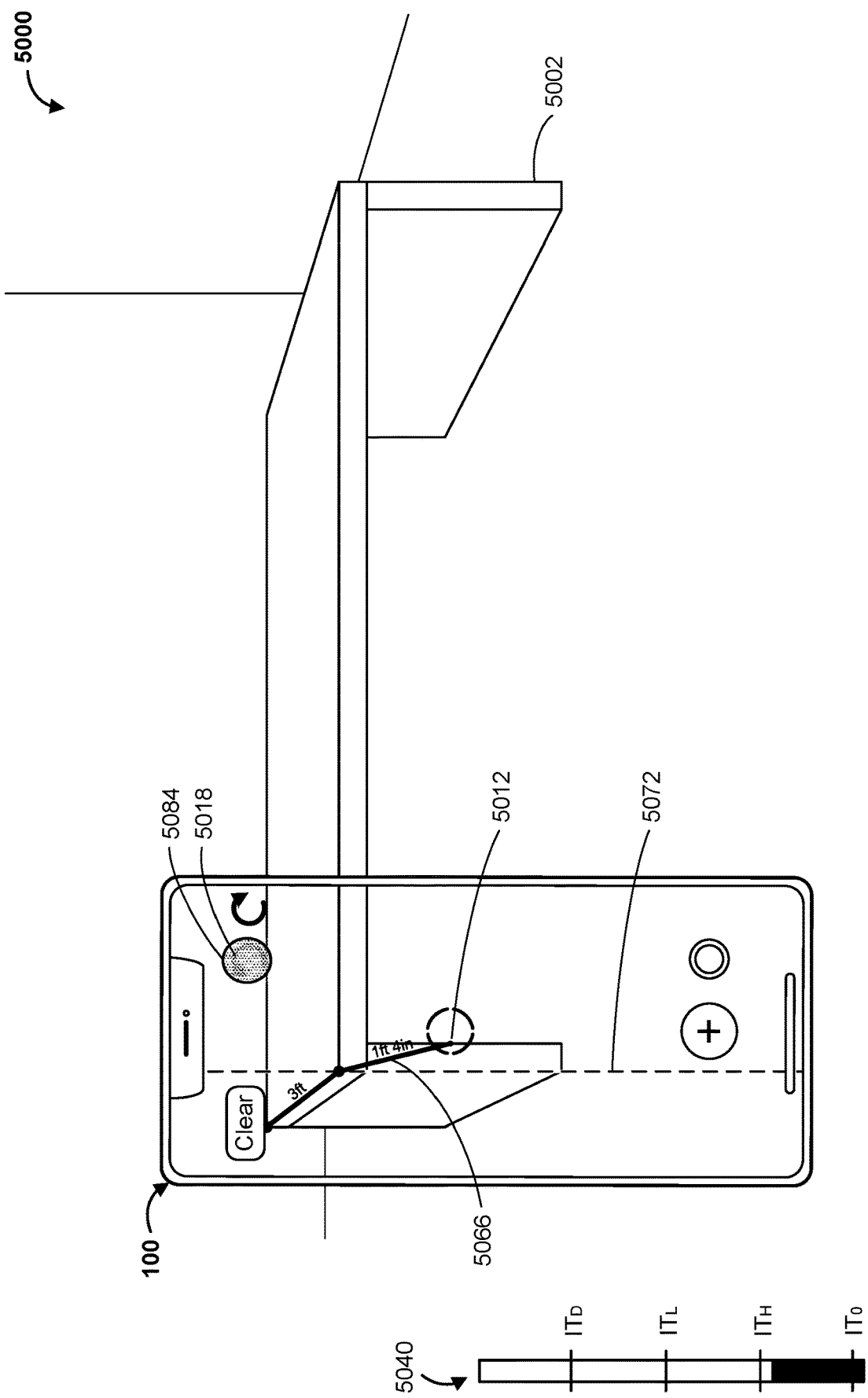

FIG. 5V illustrates a transition from FIG. 5U that includes performing an "undo" operation to reverse the most-recently-performed operation in user interface 5006. In particular, FIG. 5V illustrates activation of undo button 5018 by touch input 5084 to reverse the addition of measurement point 5080 (FIG. 5U). Accordingly, measurement point 5080 is removed from user interface 5006. Measurement segment 5066 is now (again) a dynamic measurement segment whose second endpoint is focus point 5012 and that is updated as focus point 5012 moves.

Figure 5W:
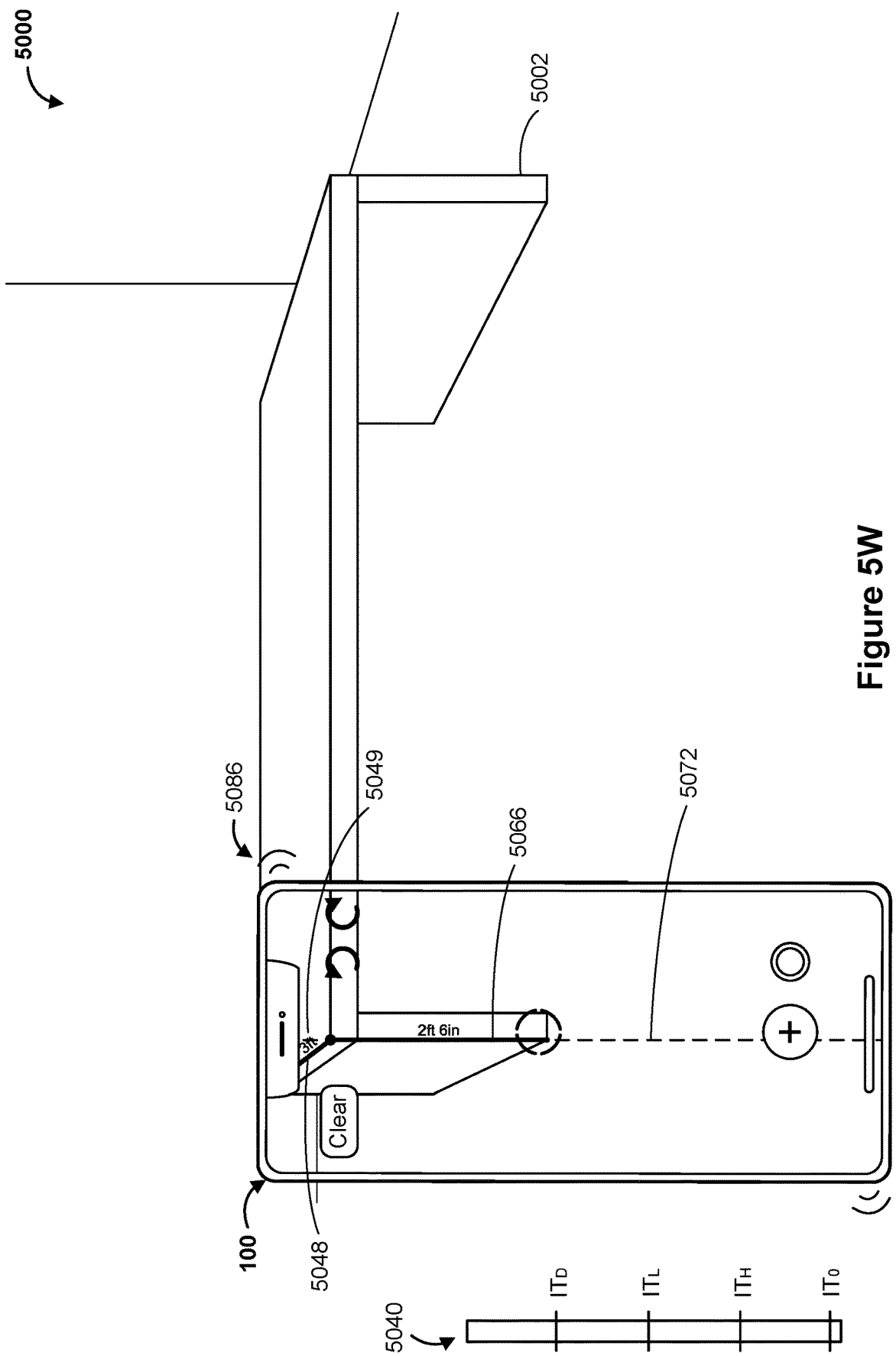

FIG. 5W illustrates a transition from FIG. 5V. In FIG. 5W, user 5004 has moved device 100 downward such that reticle 5010 is positioned over the lower-front-left corner of table 5002 as displayed in the live preview. Accordingly, focus point 5012 is snapped to the anchor point corresponding to the lower-front-left corner of table 5002 (and optionally also to virtual guide 5072). Reticle 5010 is displayed at its decreased size (e.g., at the same size as in FIG. 5U) to indicate that focus point 5012 is snapped to a detected feature in the live preview. Tactile output 5086 is generated to indicate the snapping behavior. In FIG. 5X, device 100 has moved such that only a portion of measurement segment 5048 is displayed in user interface 5006, because the upper-back-left corner of table 5002 is no longer visible in the live preview and thus only a portion of the horizontal upper-left edge of table 5002 is visible in the live preview. Accordingly, label 5049 is displayed at a midpoint of only the displayed portion of measurement segment 5048, rather than at the midpoint of the entire measurement segment 5048 (e.g., as shown in FIG. 5V).

FIG. 5X illustrates a transition from FIG. 5W showing the addition of a measurement point to user interface 5006. In particular, FIG. 5X illustrates activation of measurement addition button 5014 by touch input 5088 (e.g., a tap gesture) with a contact intensity that is above a minimum contact detection threshold $IT_0$, as indicated by intensity meter 5040. In response to the activation of measurement addition button 5014, device 100 adds and displays (virtual) measurement point 5090 to user interface 5006 at a current location of focus point 5012 and as the second endpoint of measurement segment 5066, which becomes a completed measurement segment. In conjunction with adding measurement point 5090 to user interface 5006, device 100 optionally generates tactile output 5092 to indicate the addition of a measurement point (and optionally to indicate the addition of a measurement point that completes a measurement segment, for example using the same type of tactile output as tactile output 5056, FIG. 5N, or tactile output 5082, FIG. 5U).

Figure 5Y:
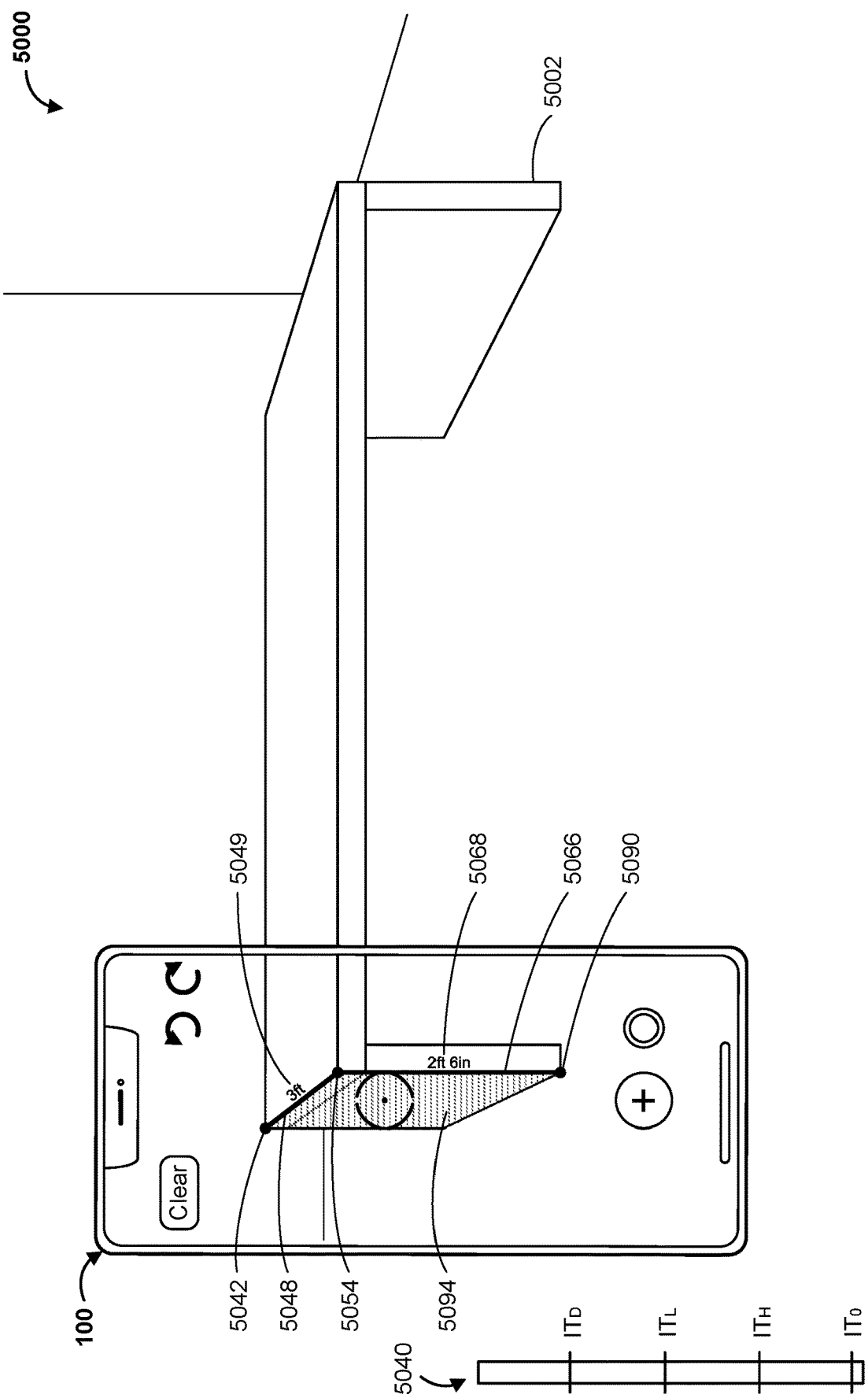
Figure 5Z:
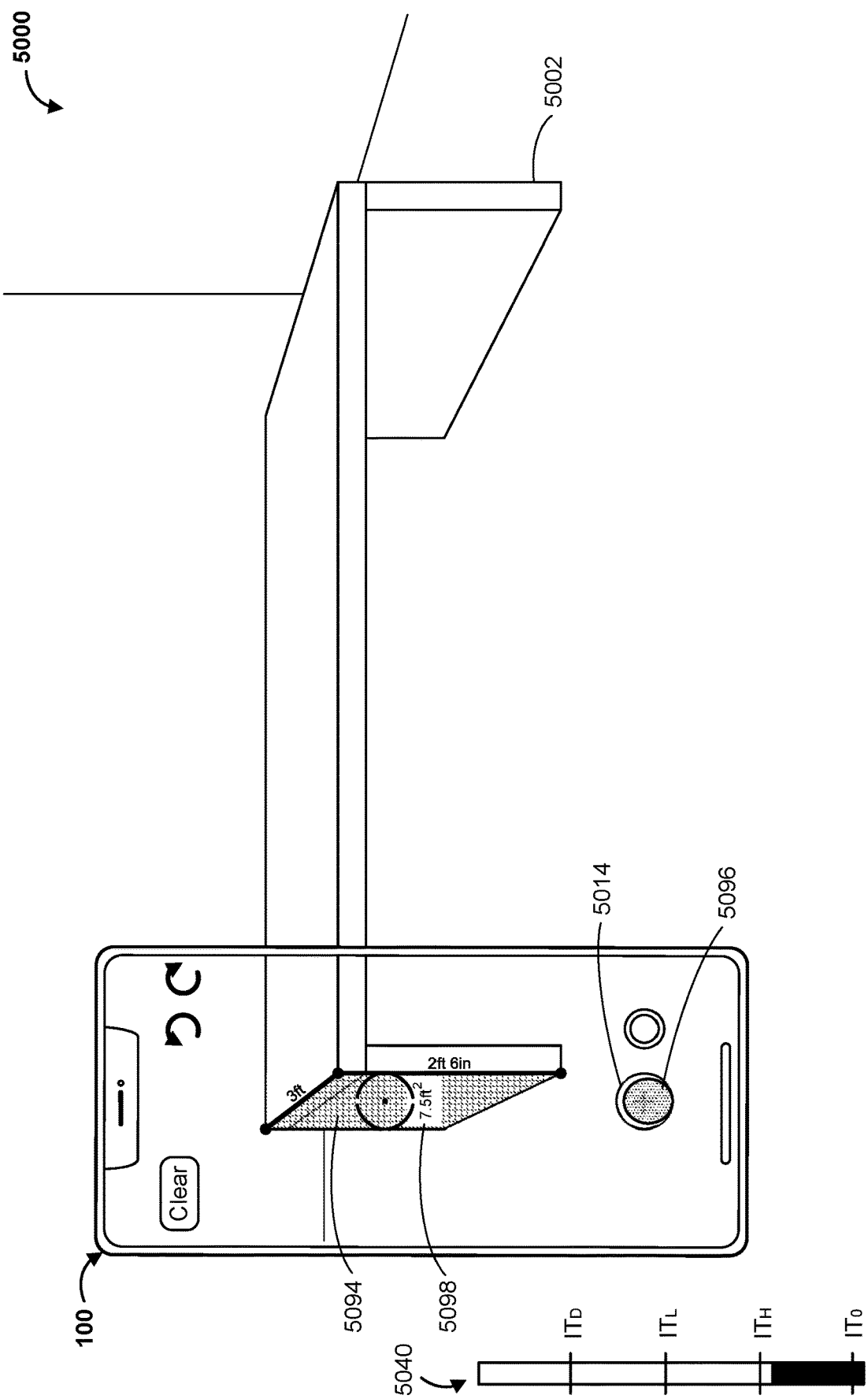
Figure 5A:
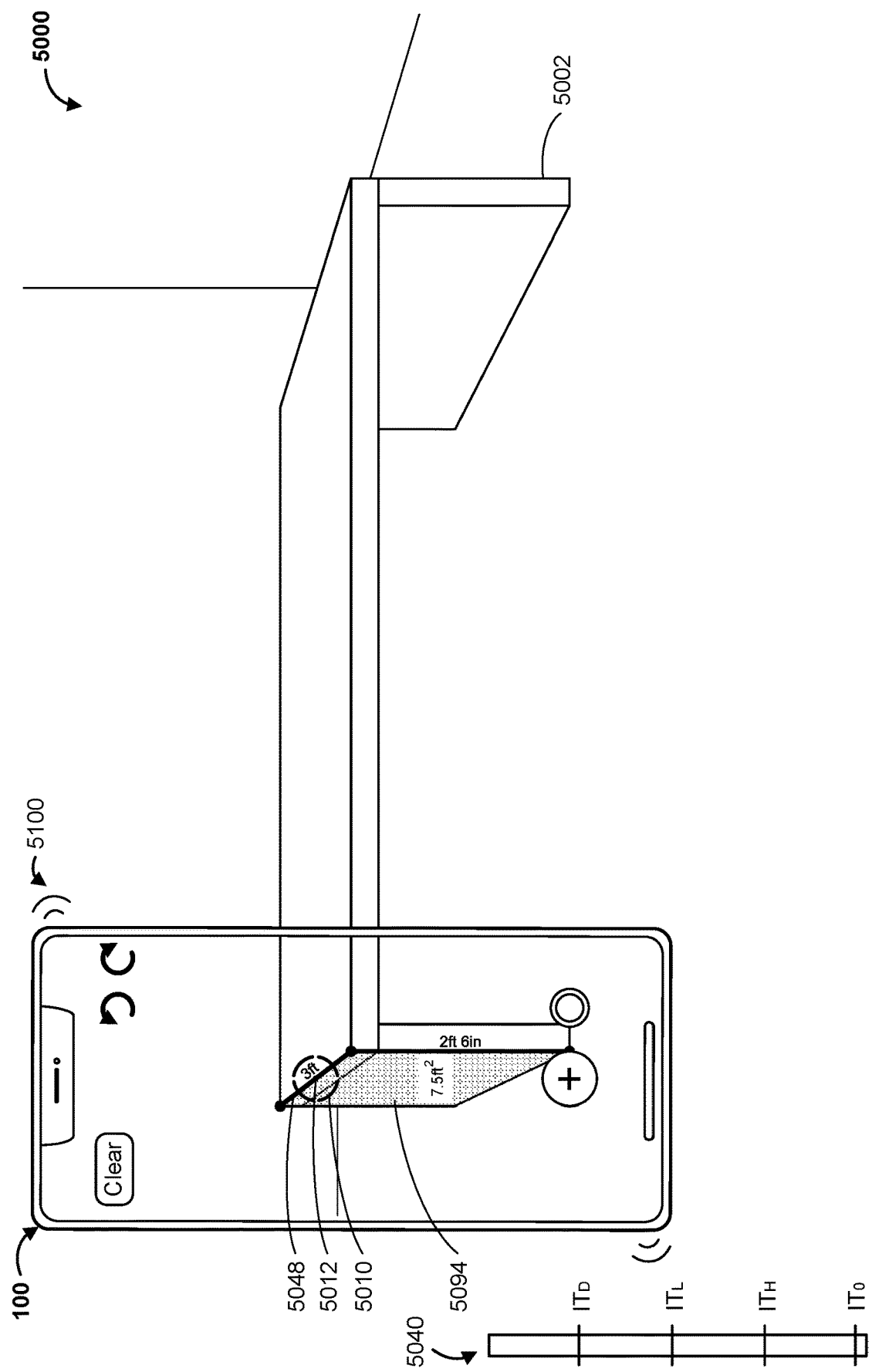
Figure 5A:
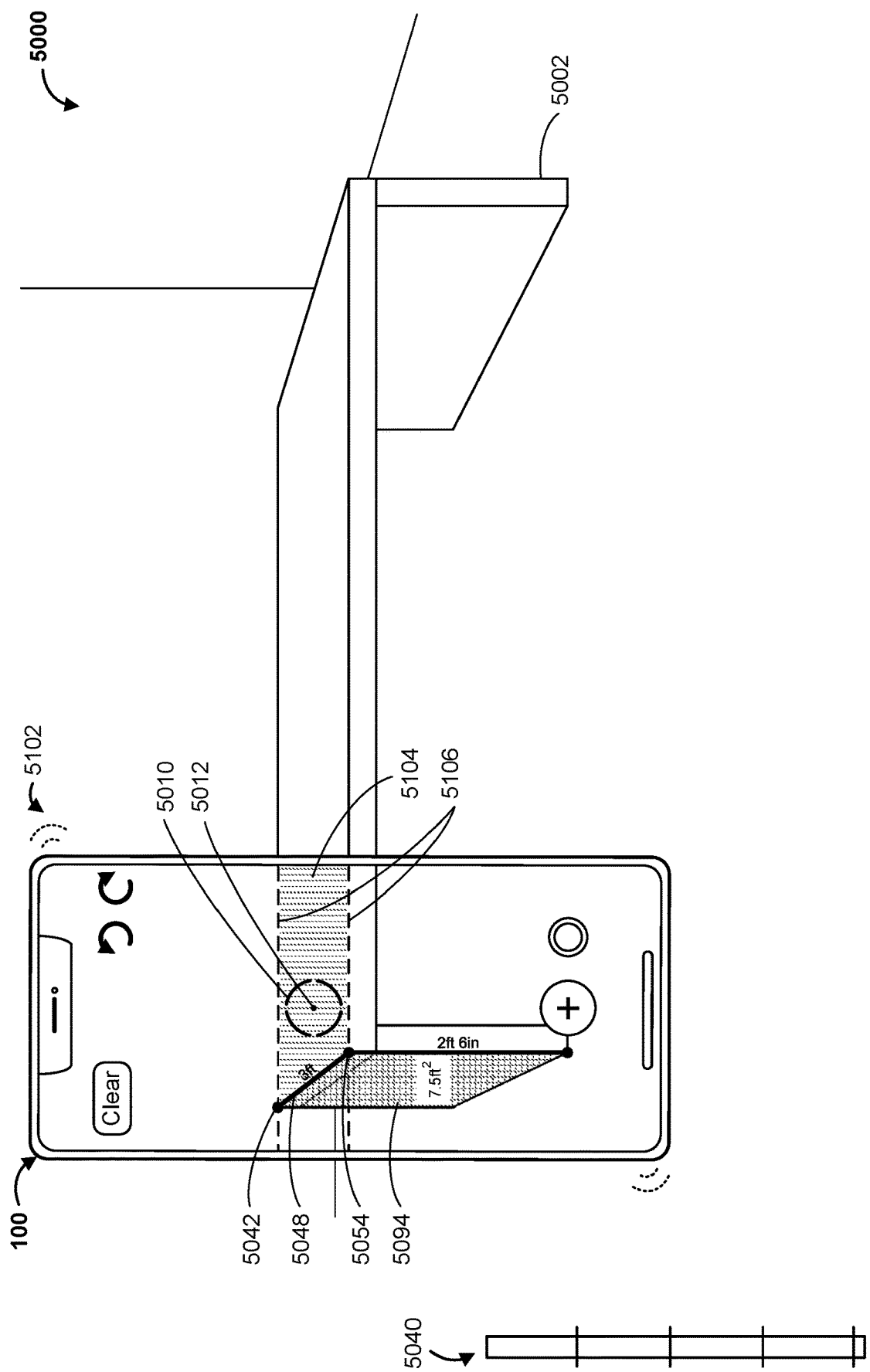
Figure 5A:
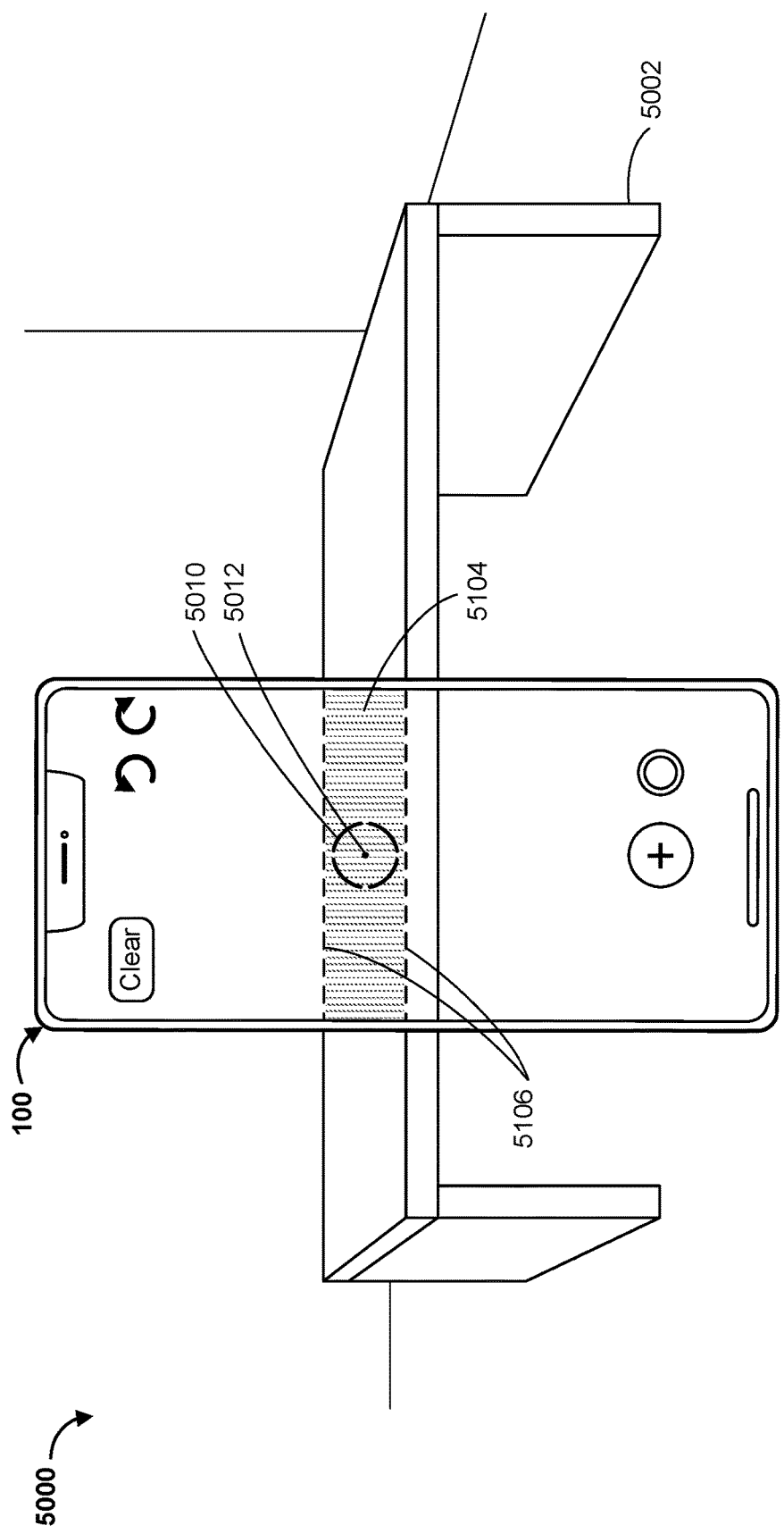
Figure 5A:
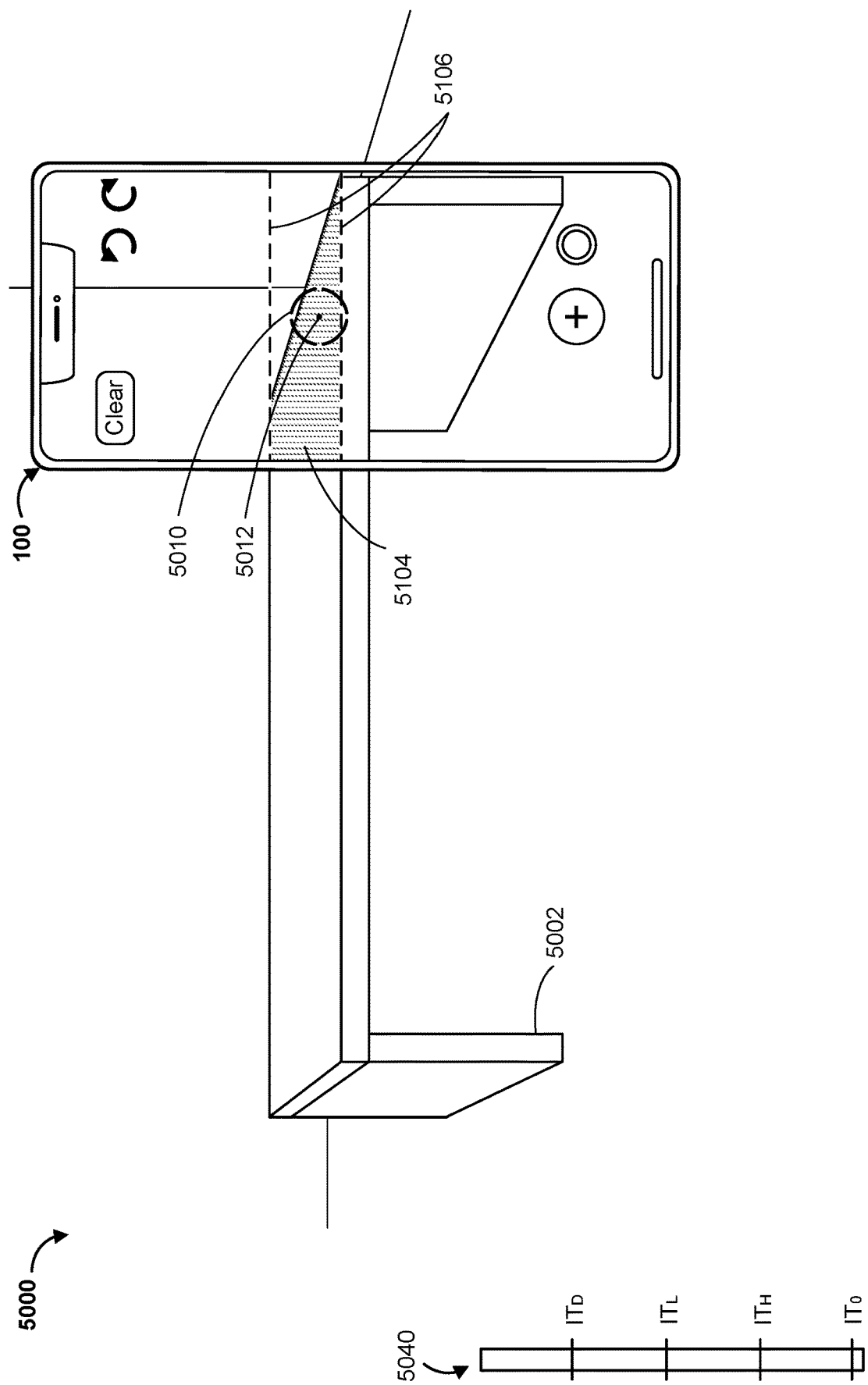
Figure 5A:
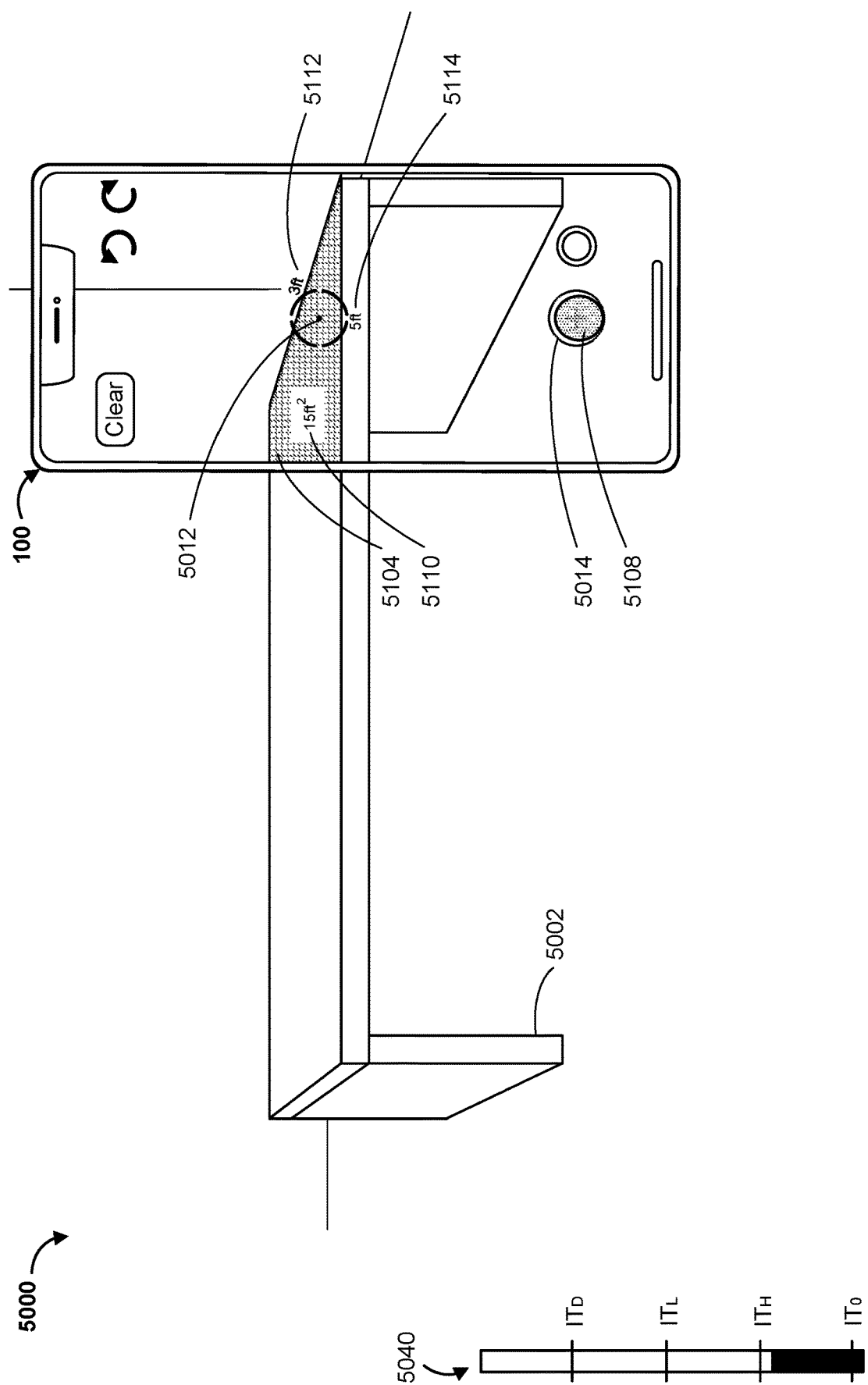
Figure 5A:
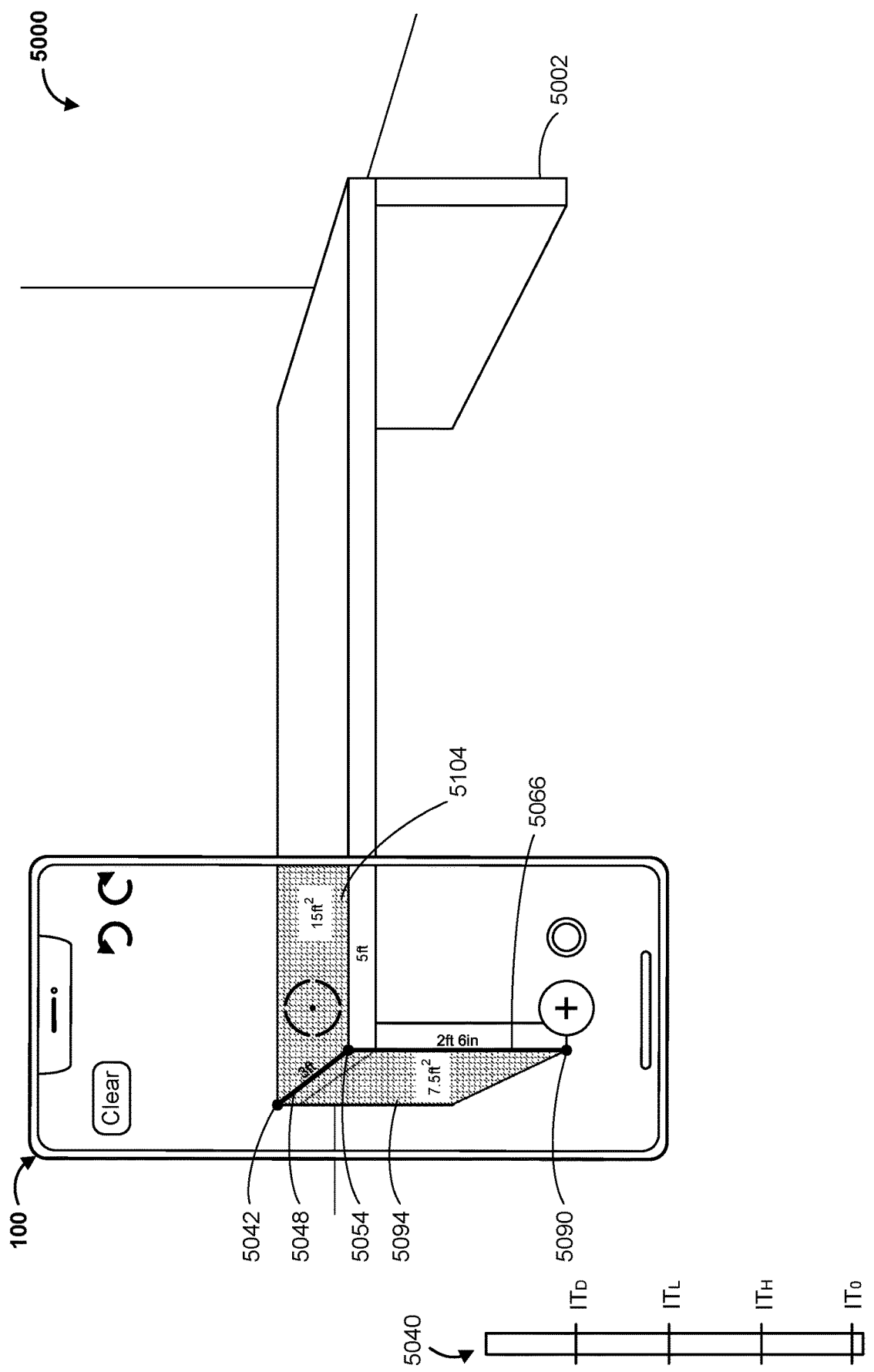
Figure 5A:
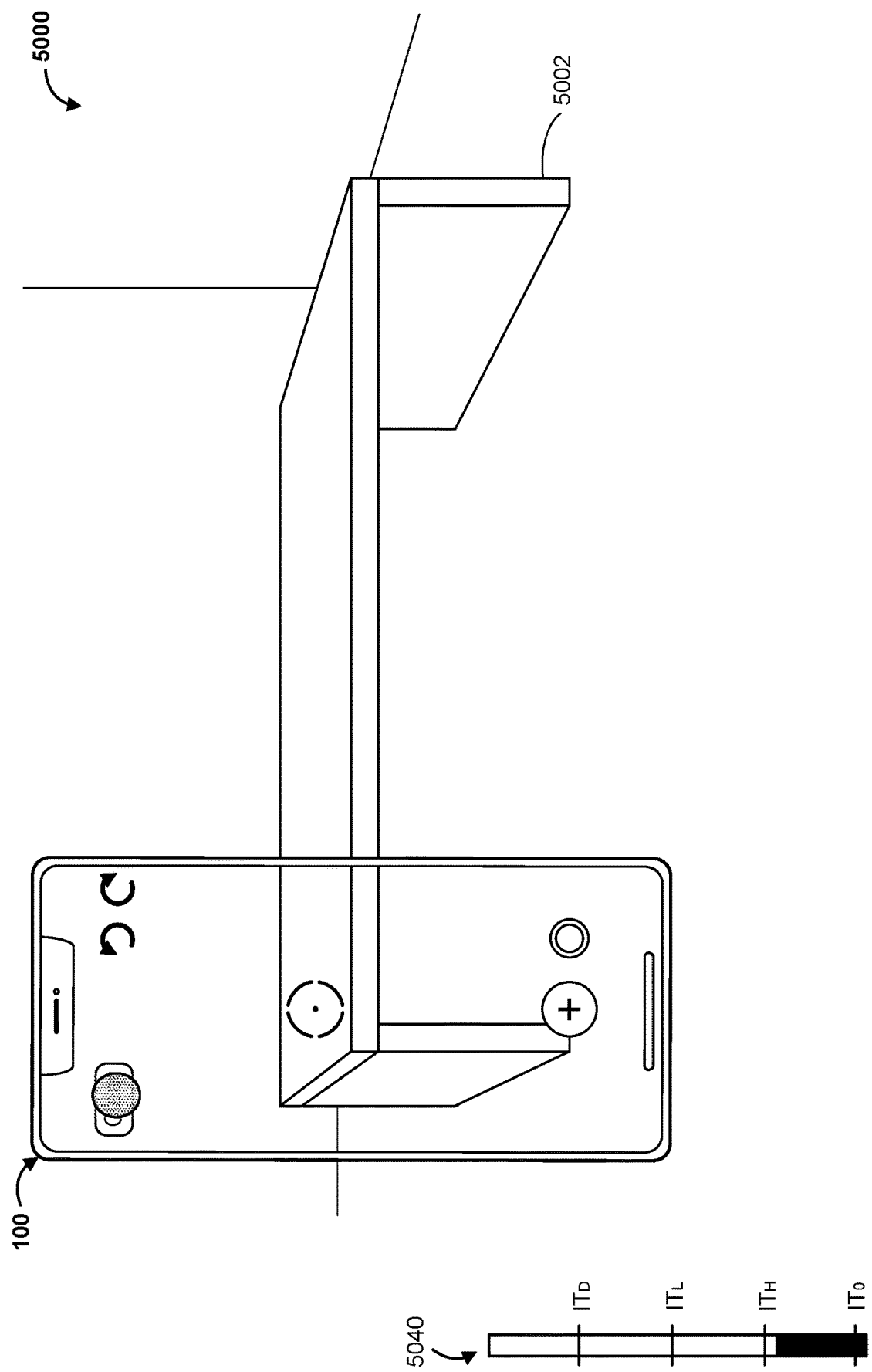
Figure 5A:
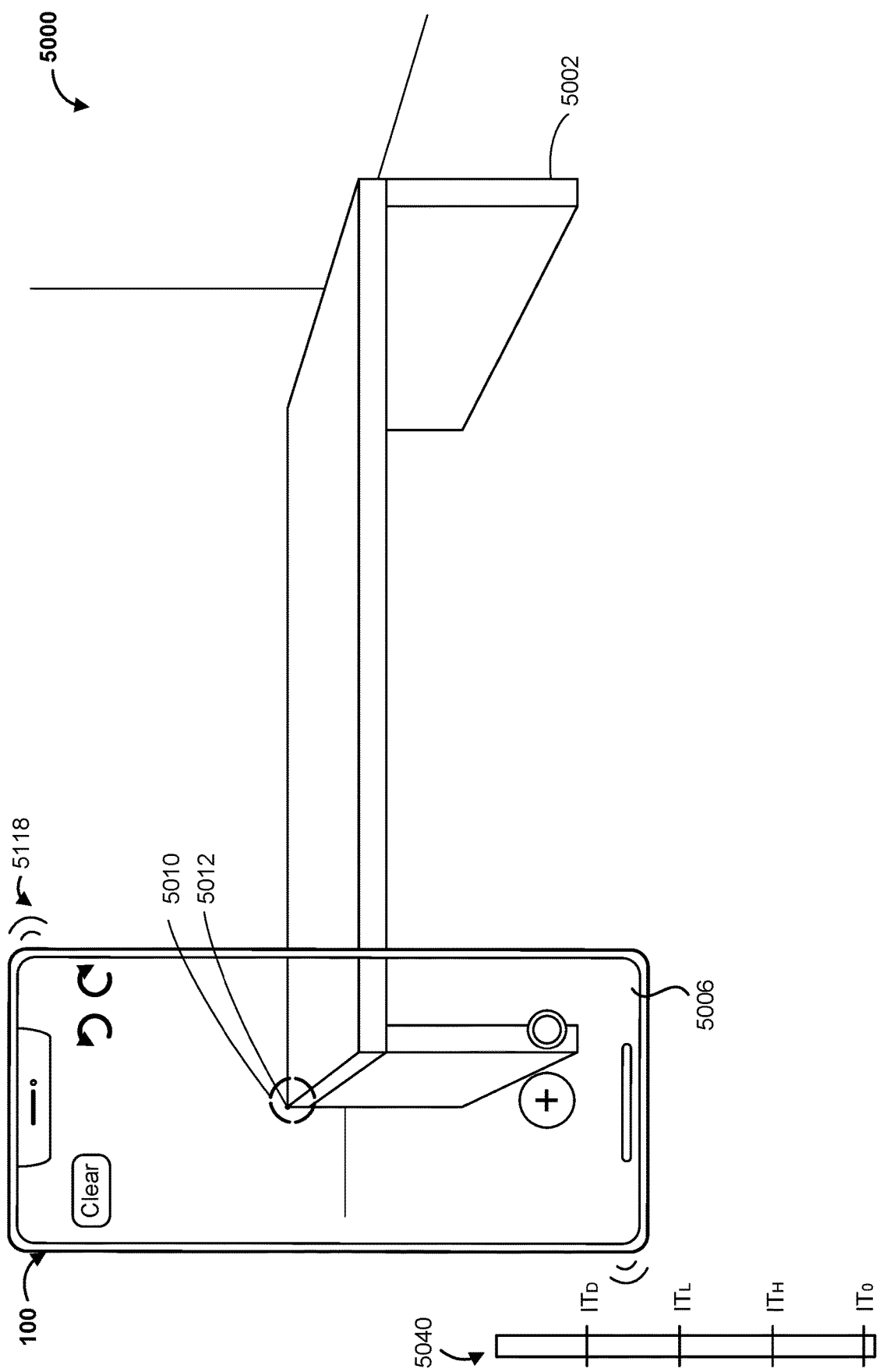
Figure 5A:
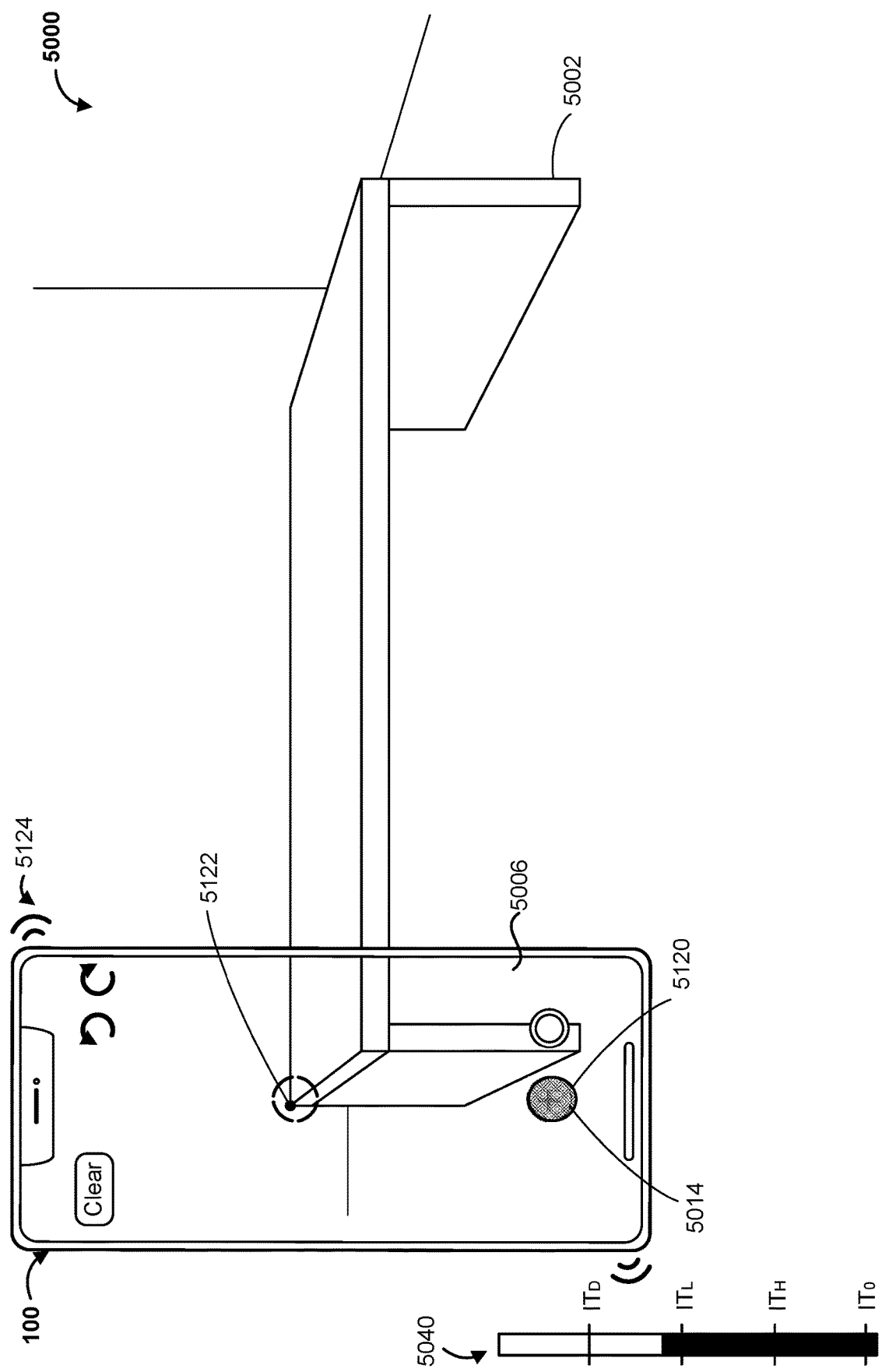
Figure 5A:
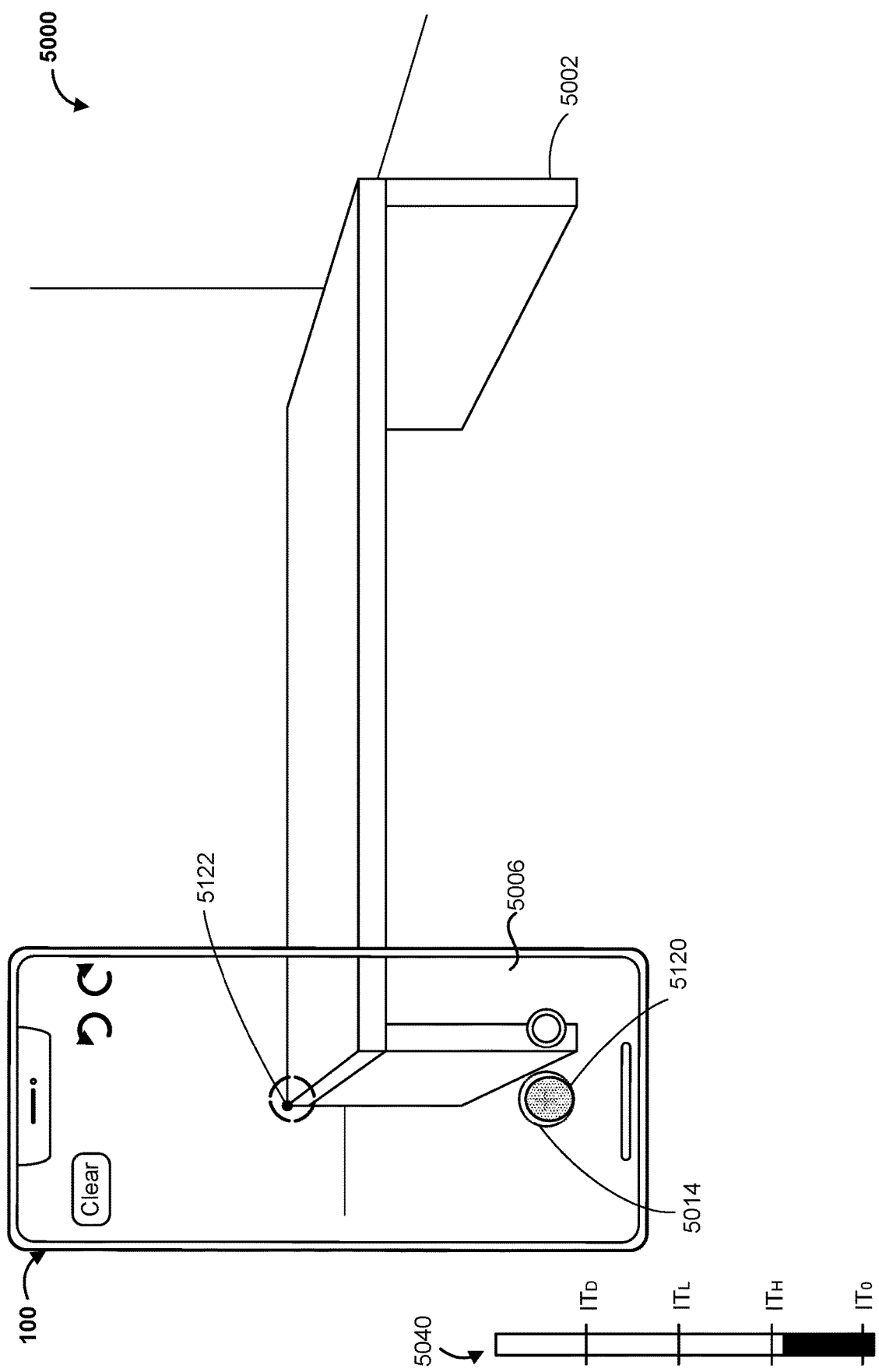
Figure 5A:
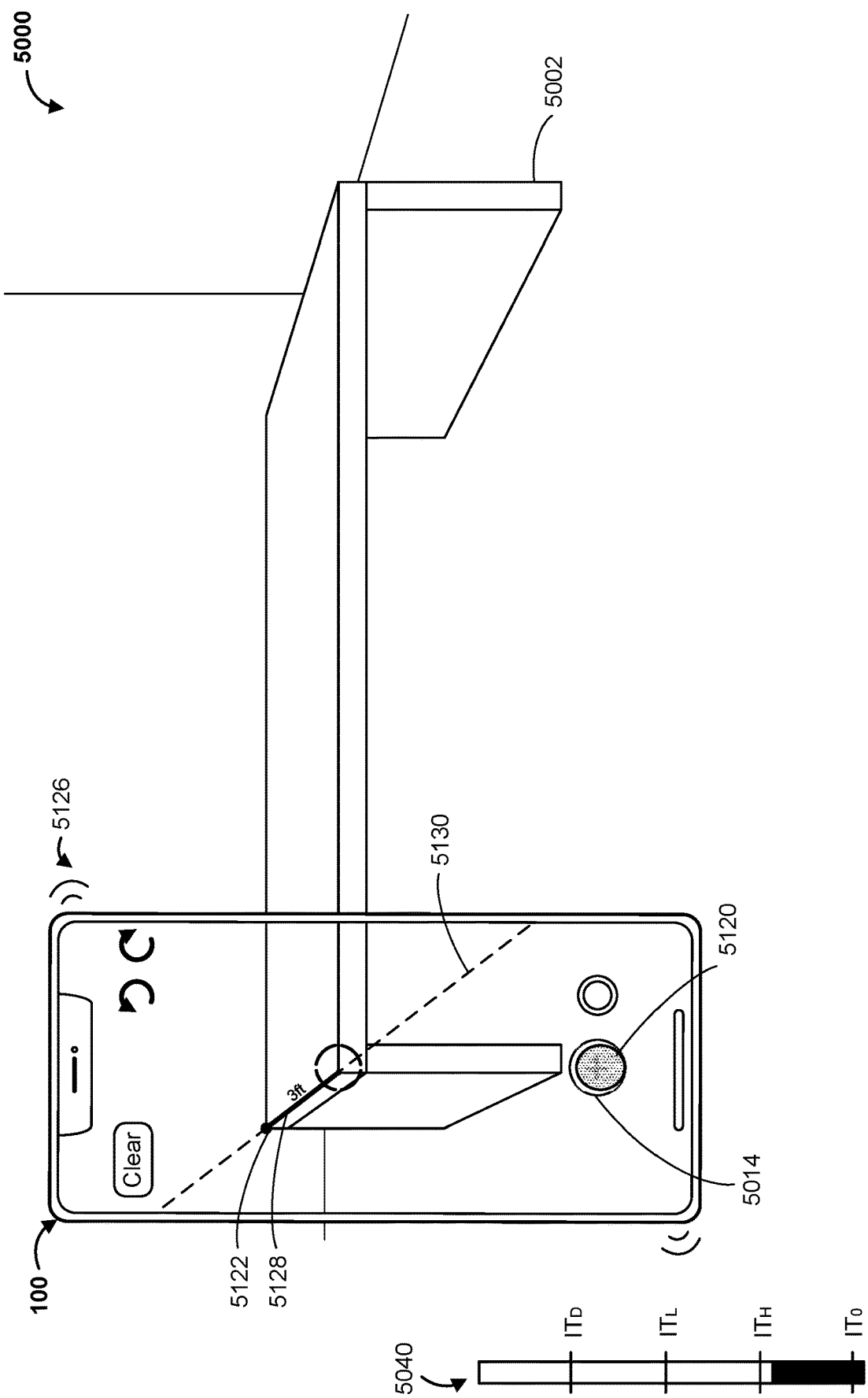
Figure 5A:
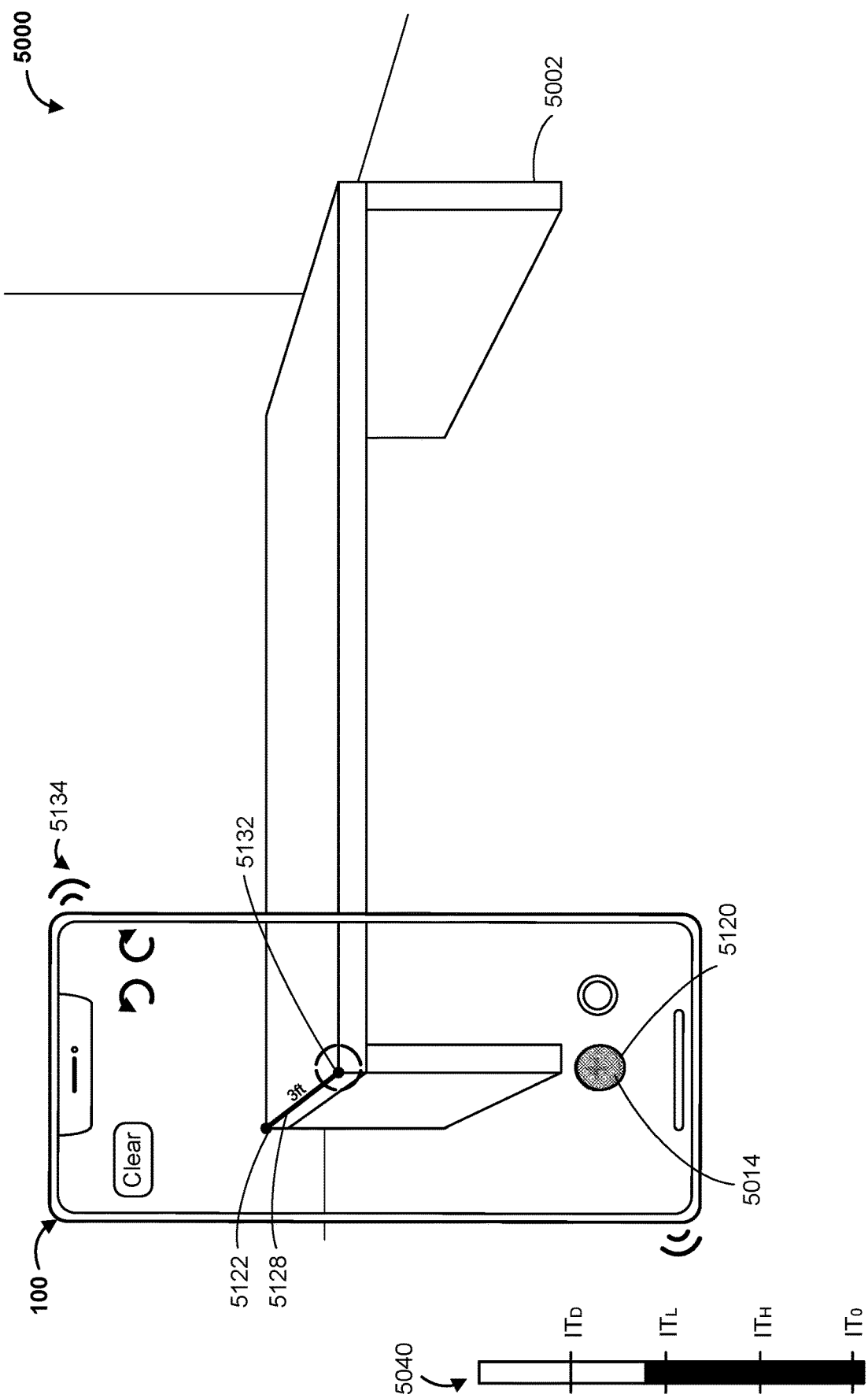
Figure 5A:
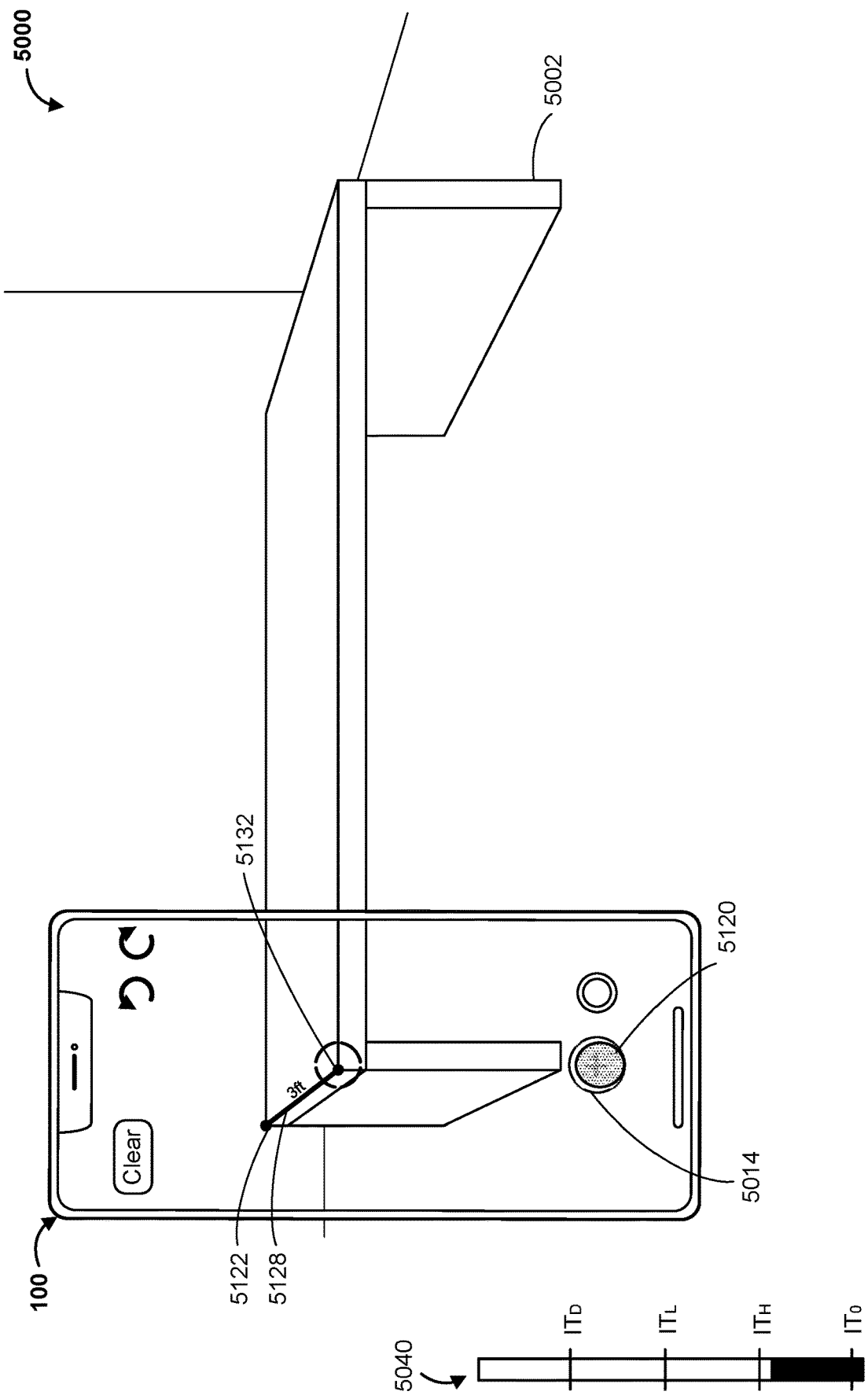
Figure 5A:
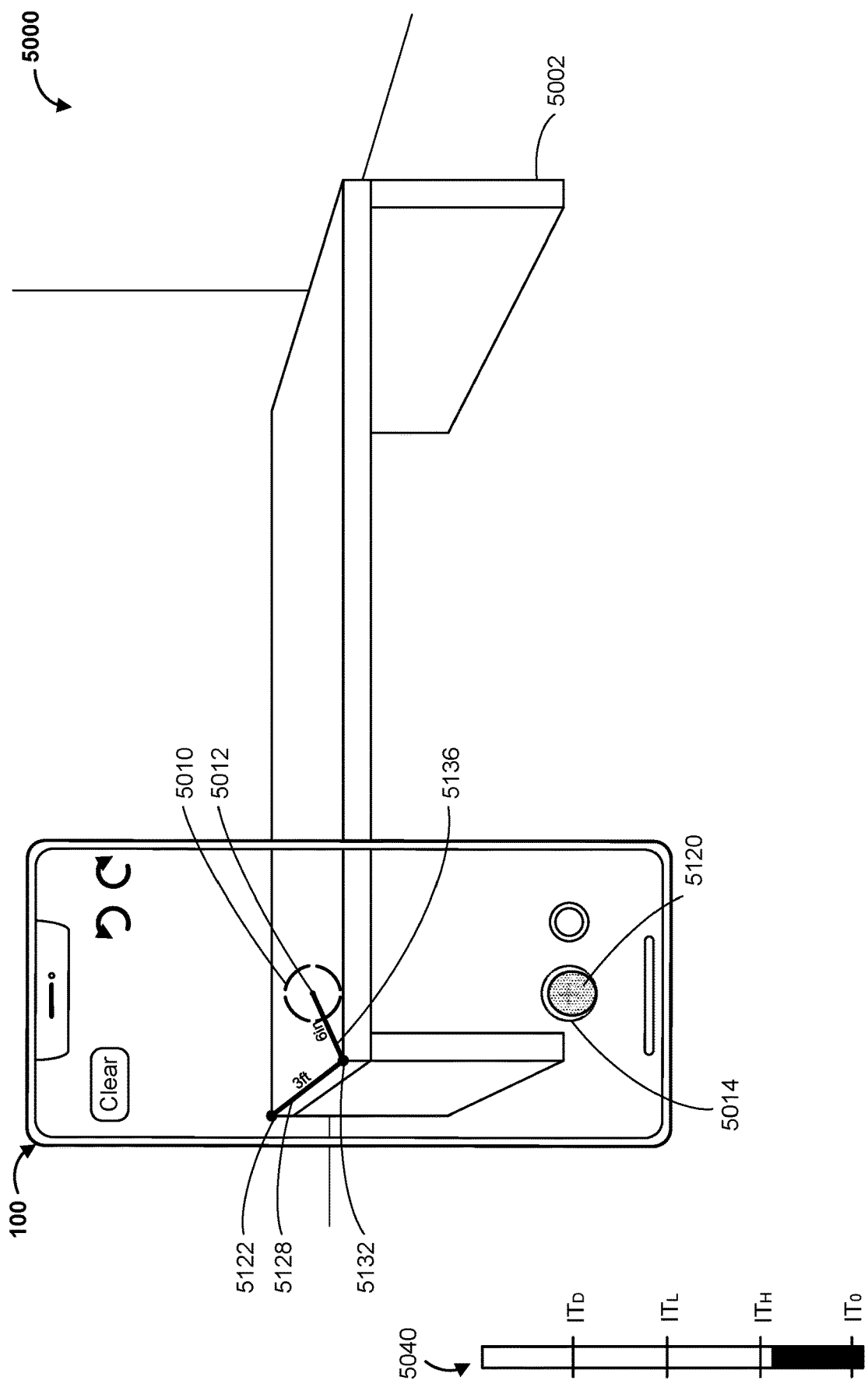
Figure 5A:
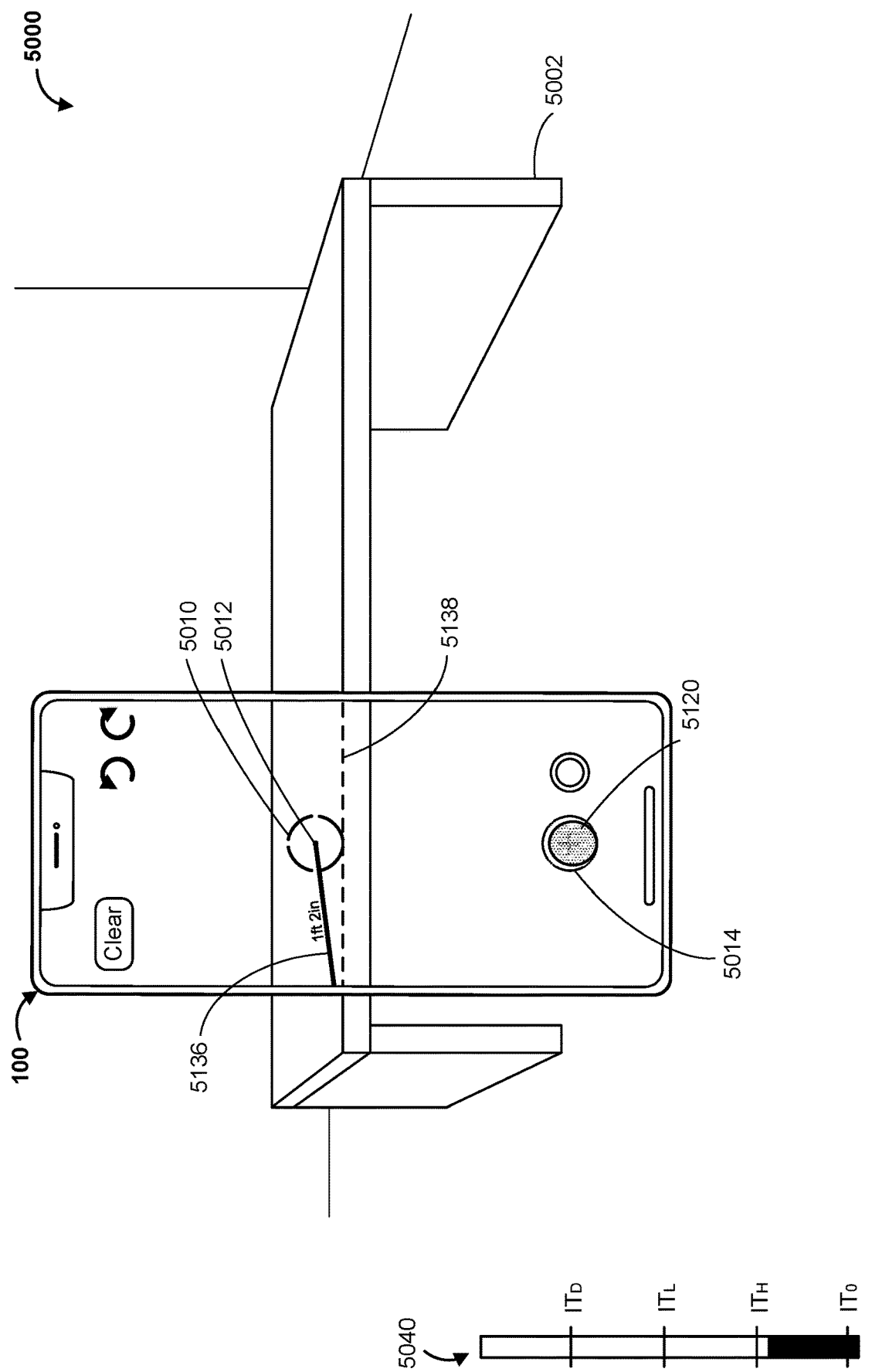
Figure 5A:
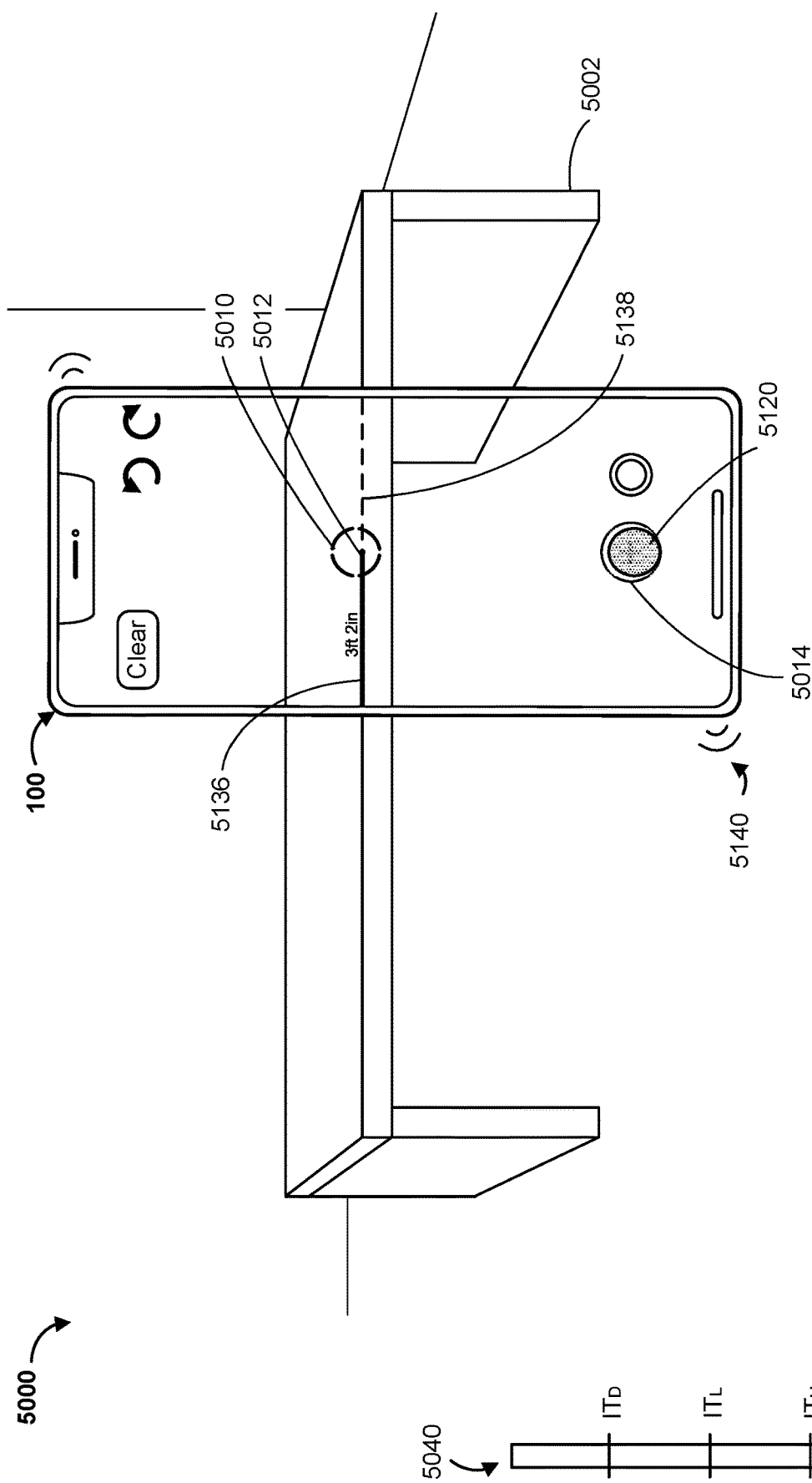
Figure 5A:
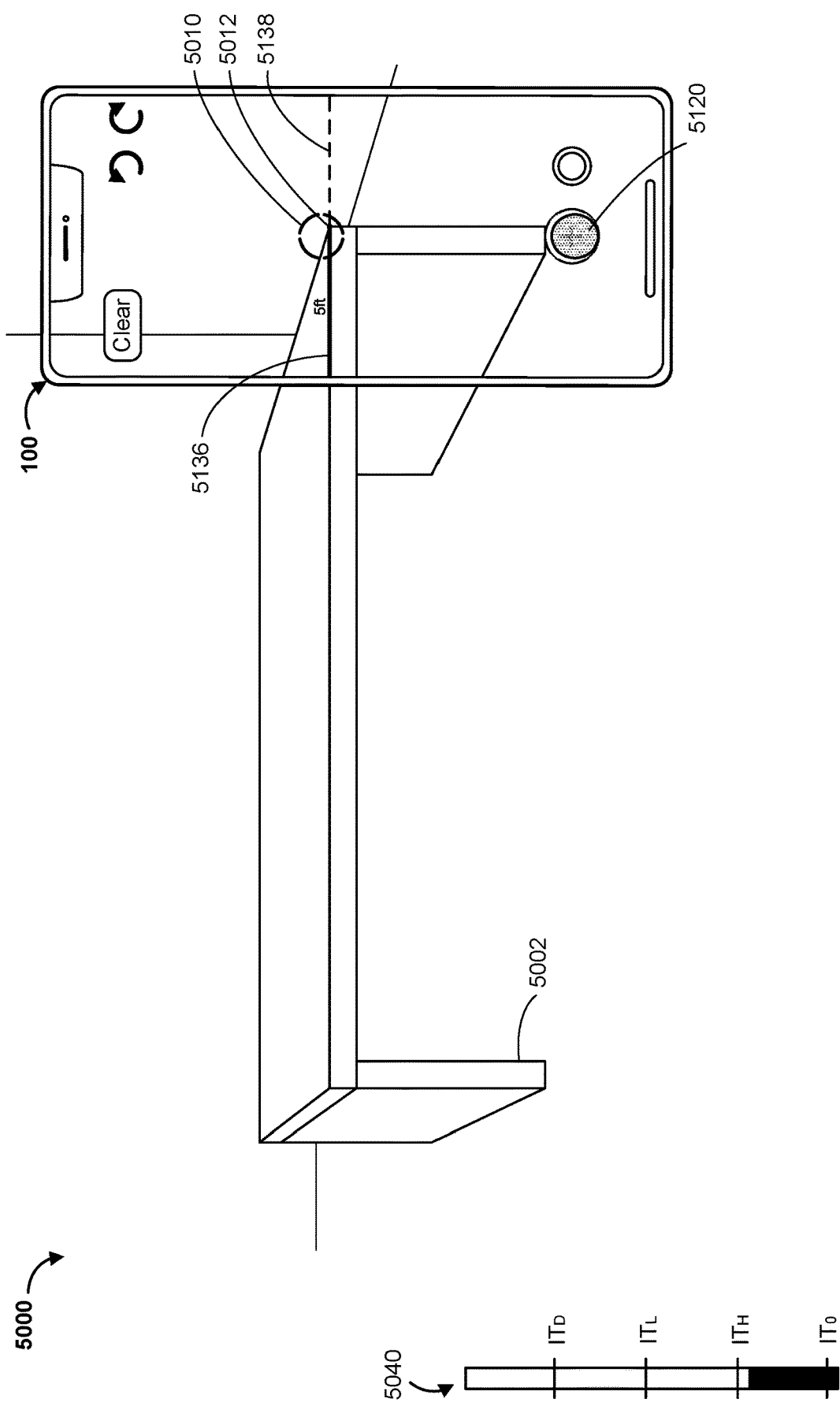
Figure 5A:
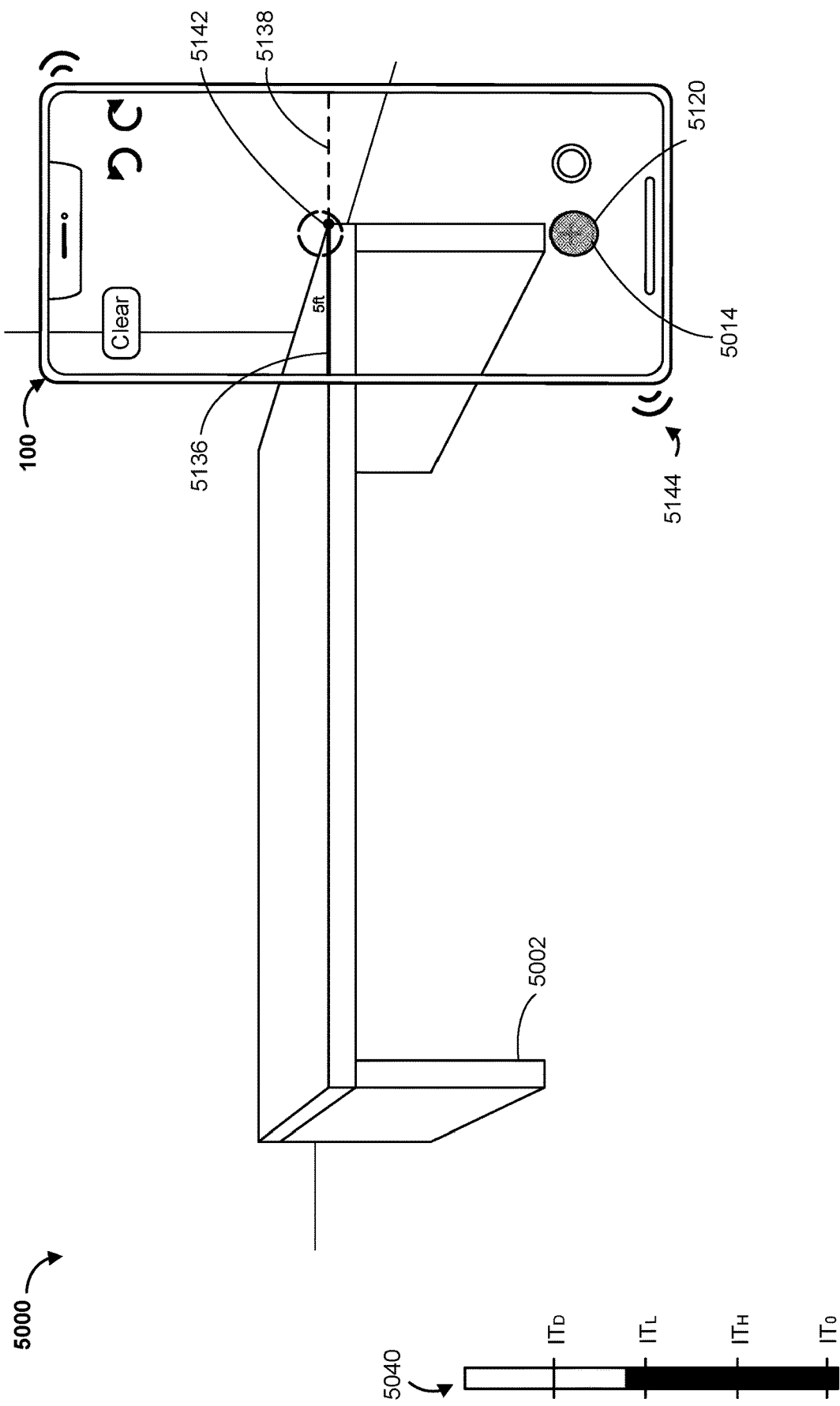
Figure 5A:
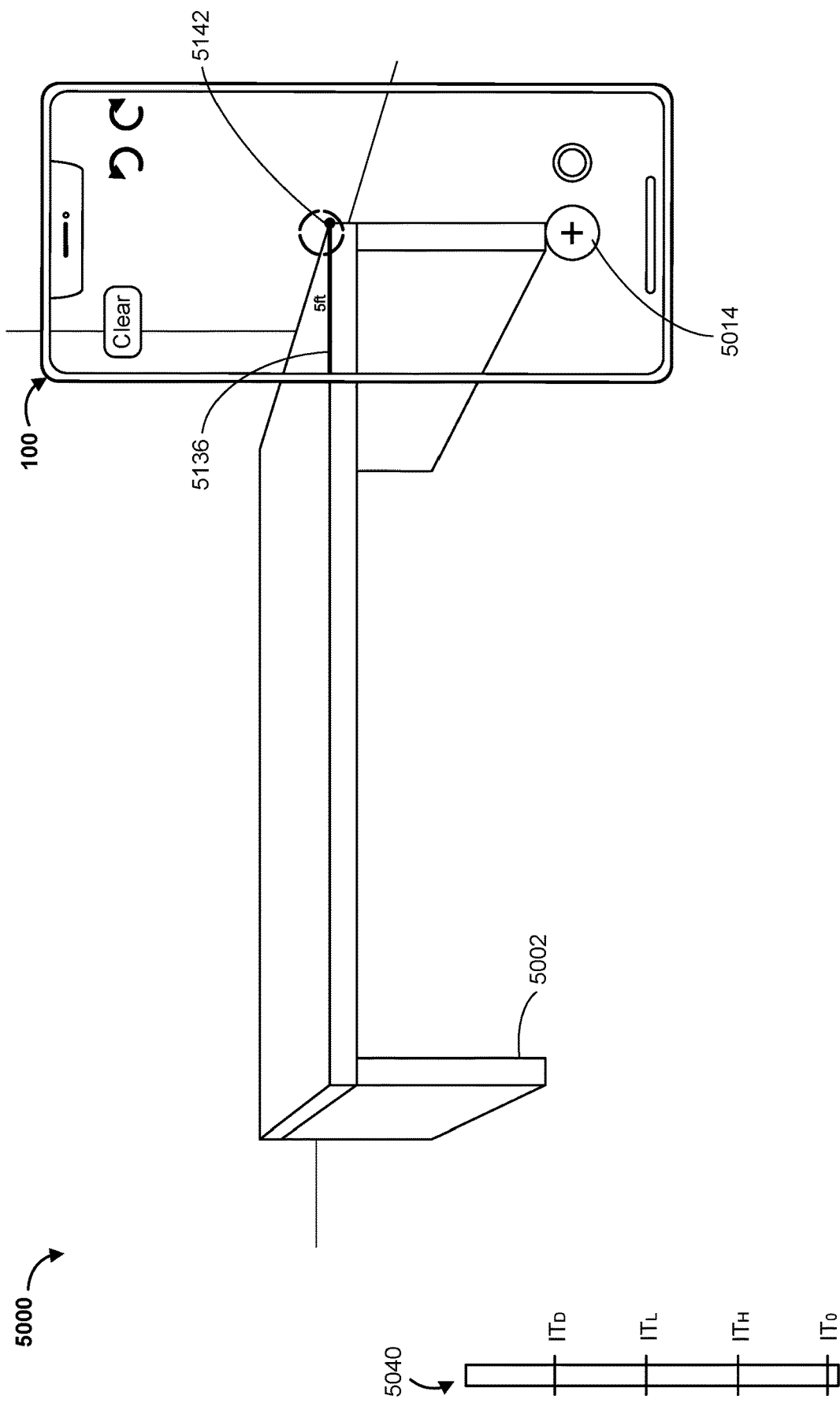
Figure 5A:
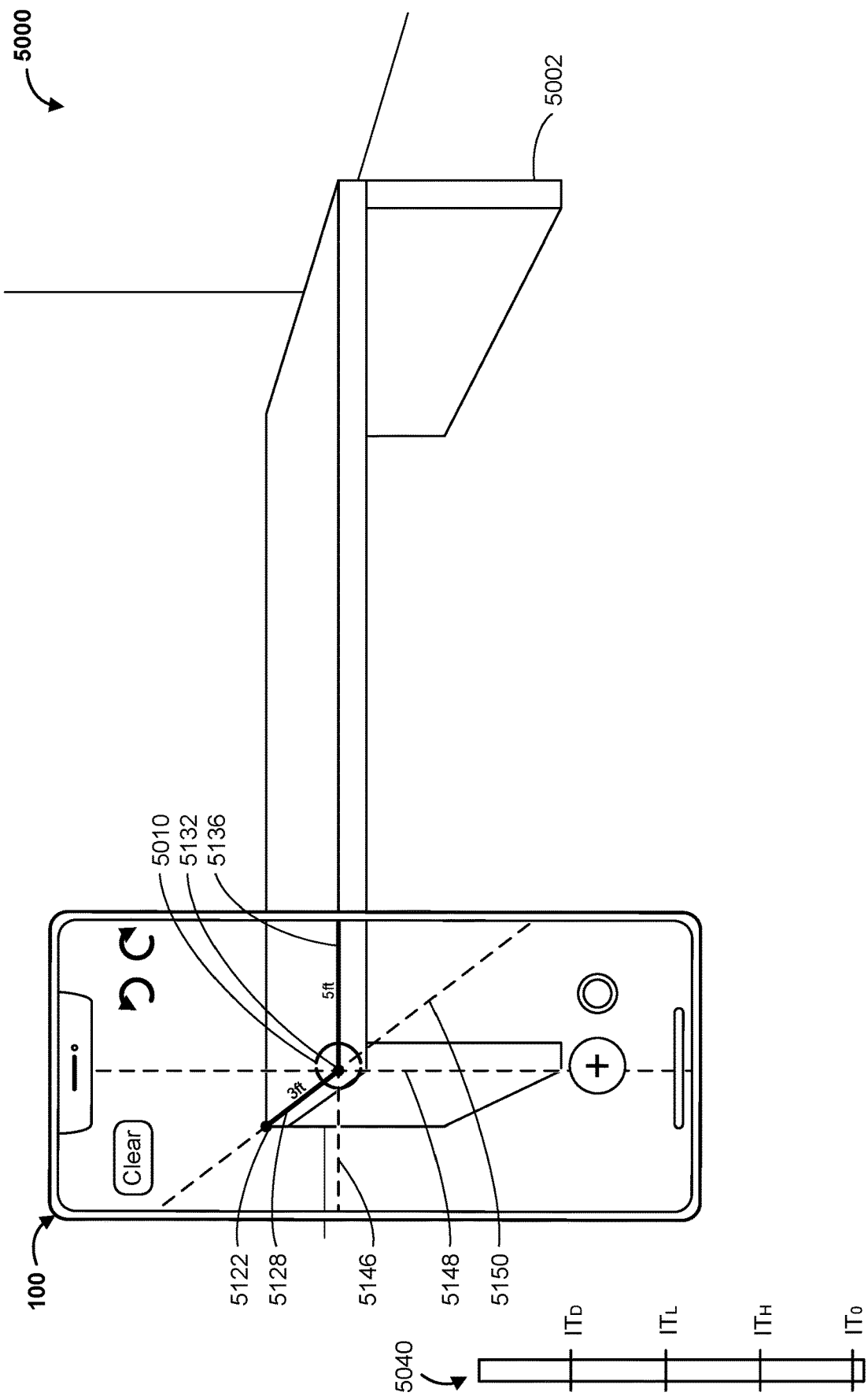
Figure 5A:
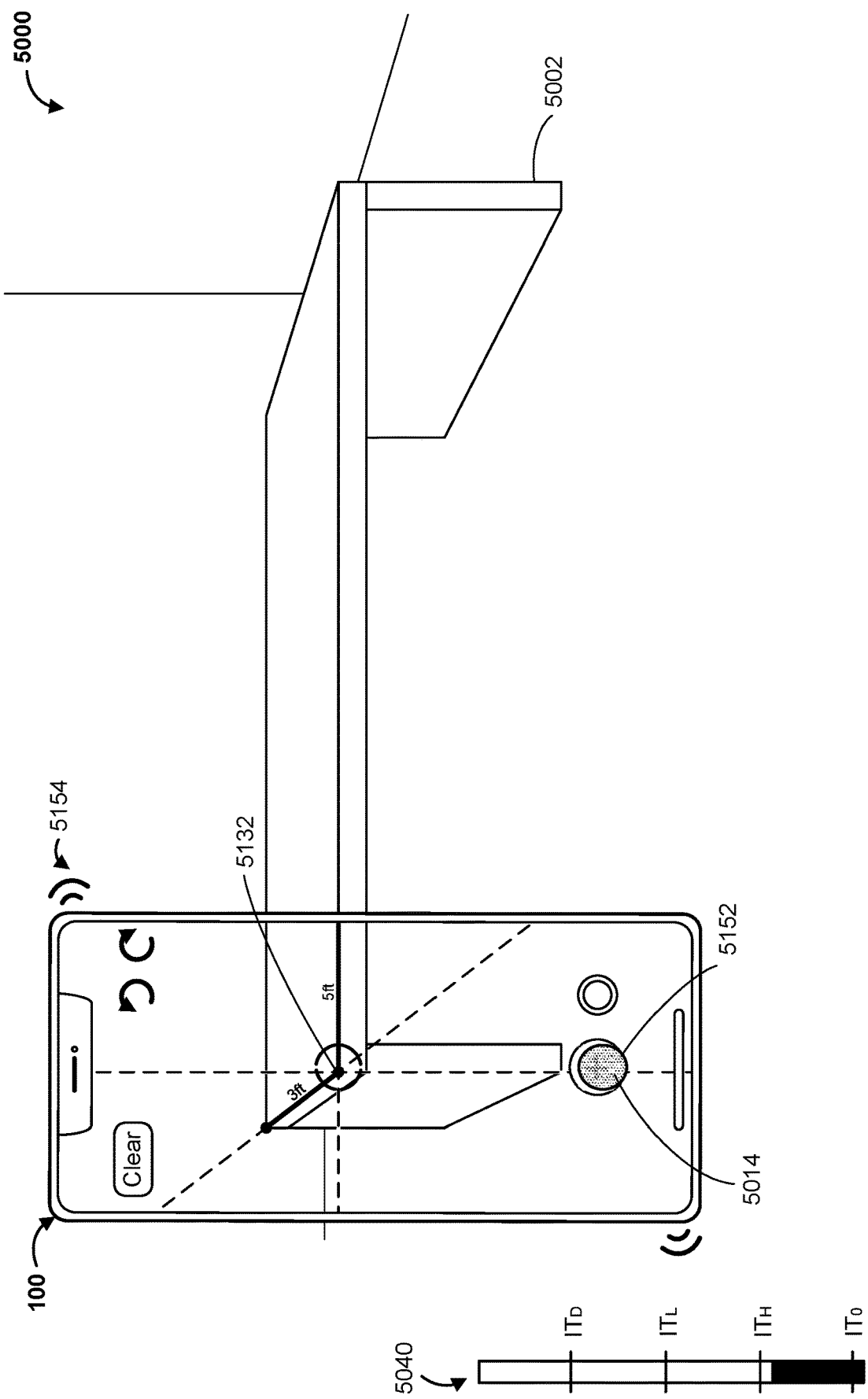
Figure 5A:
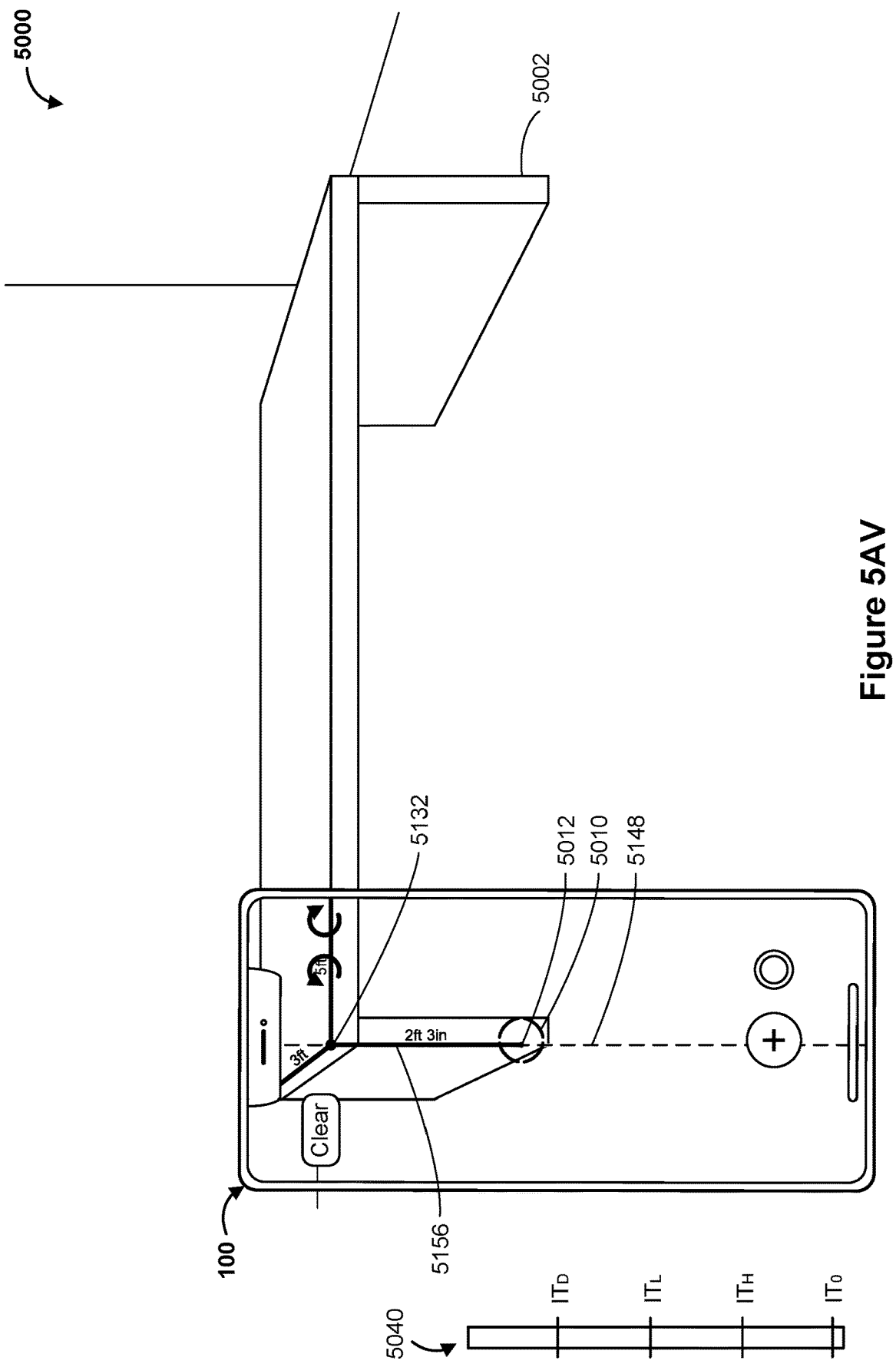
Figure 5A:
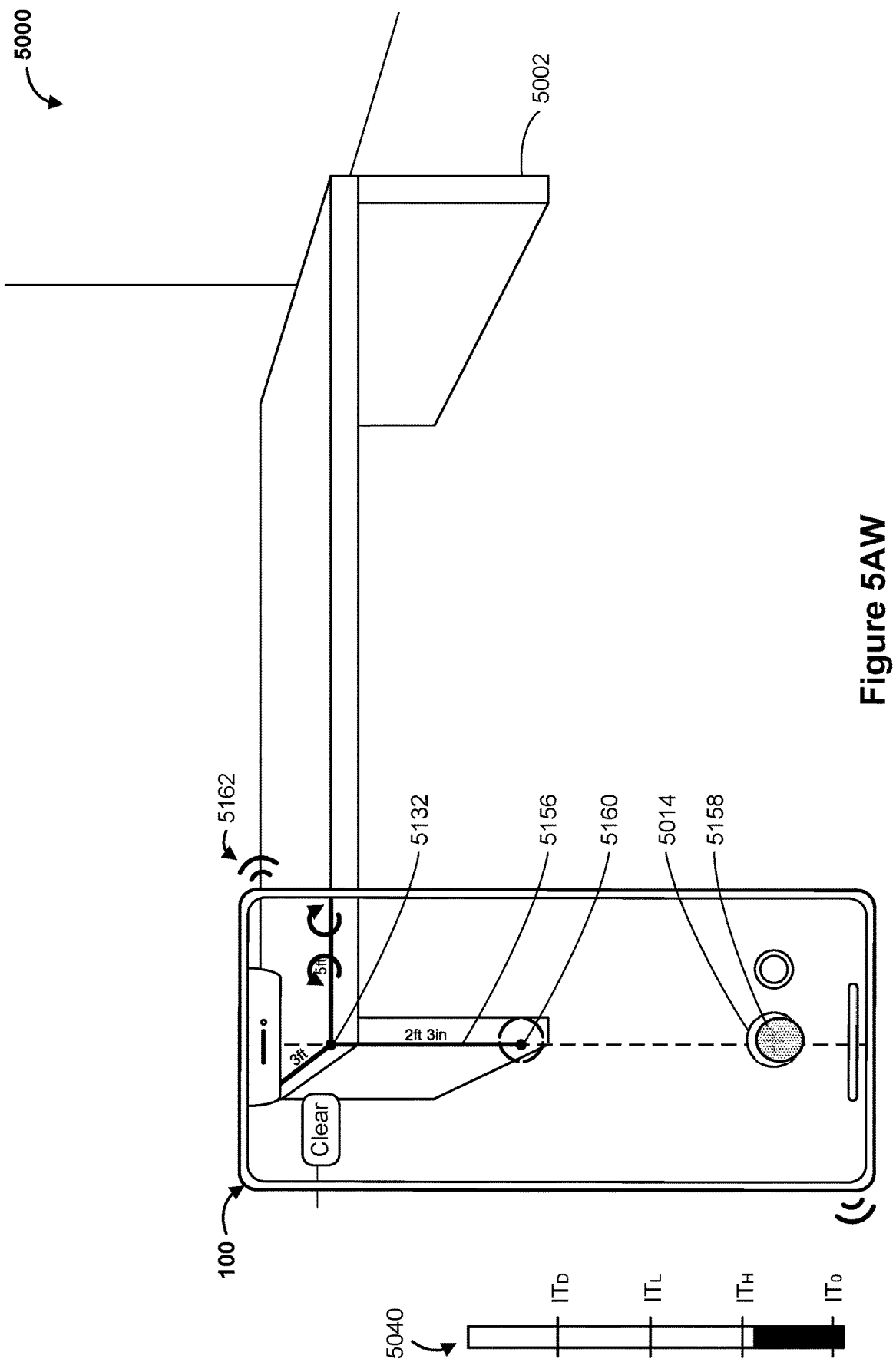
Figure 5A:
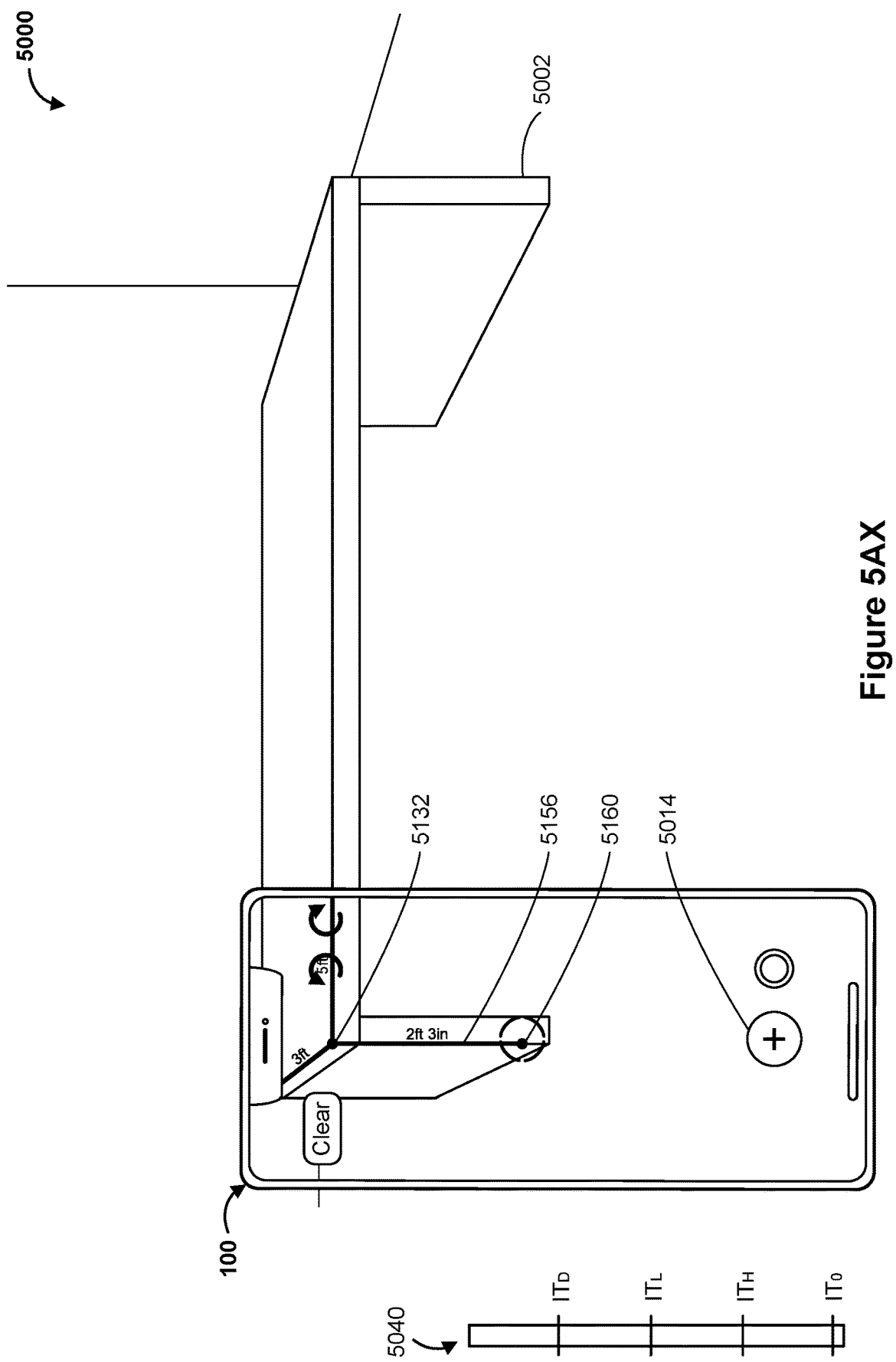
Figure 5A:
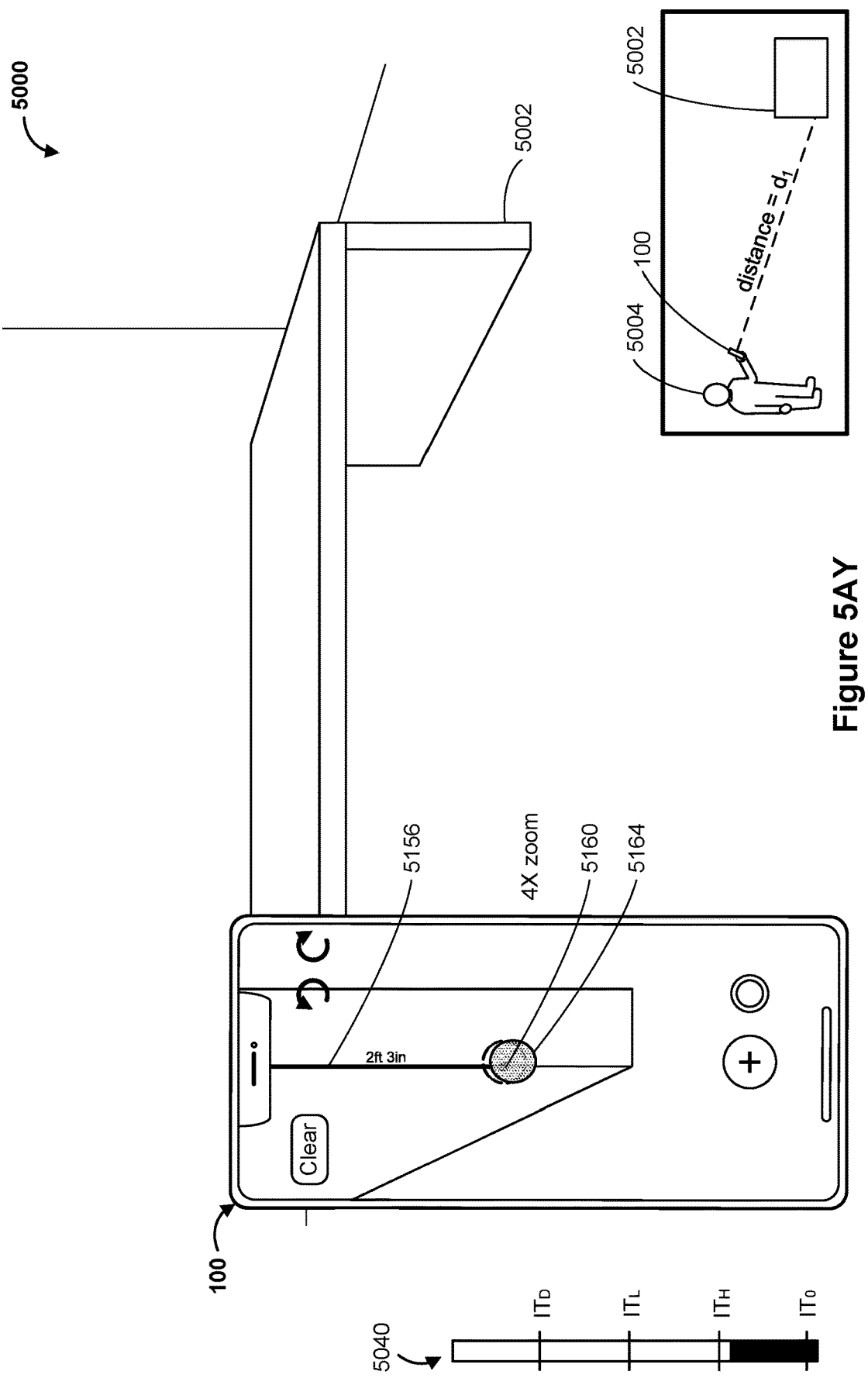
Figure 5A:
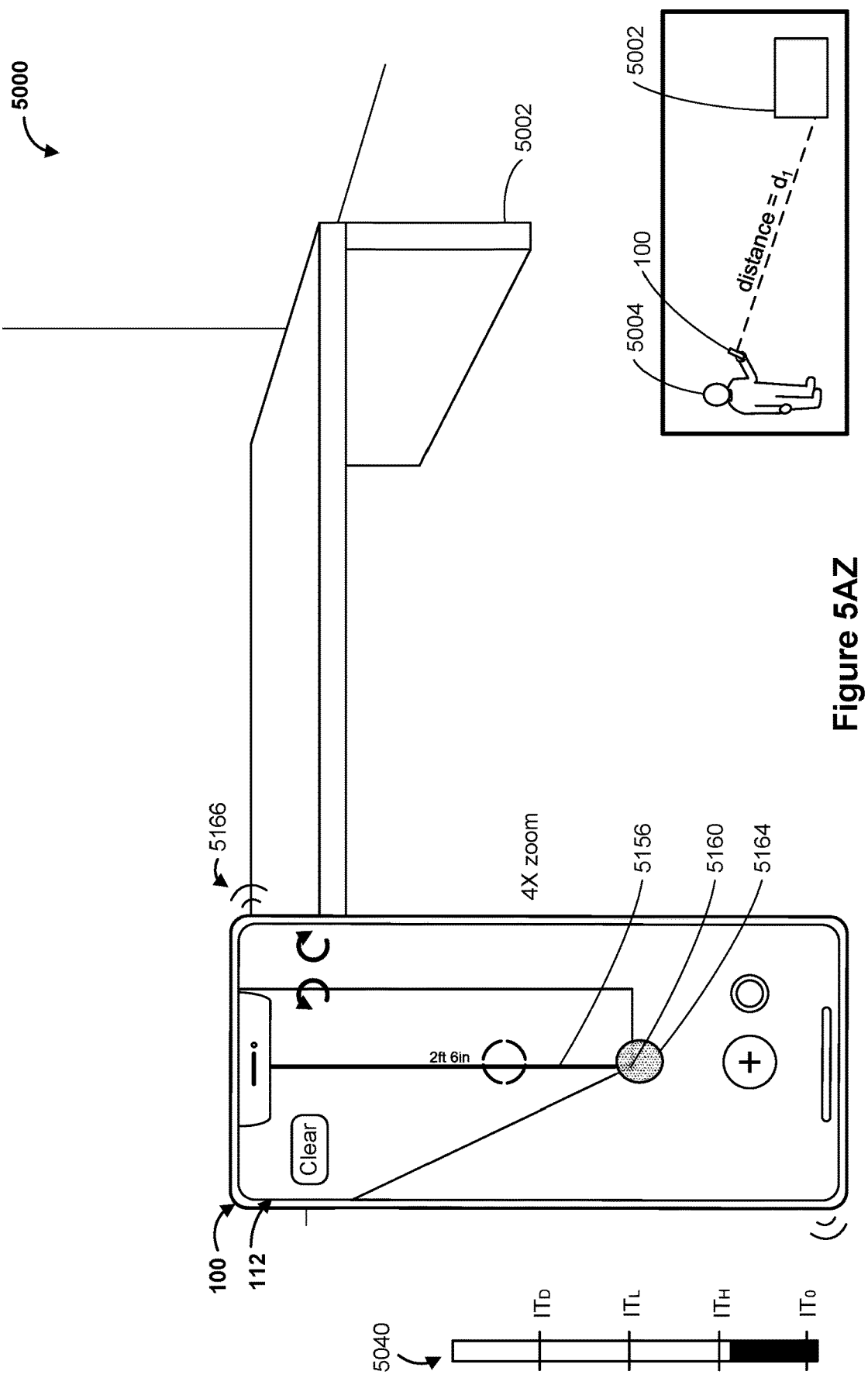
Figure 5B:
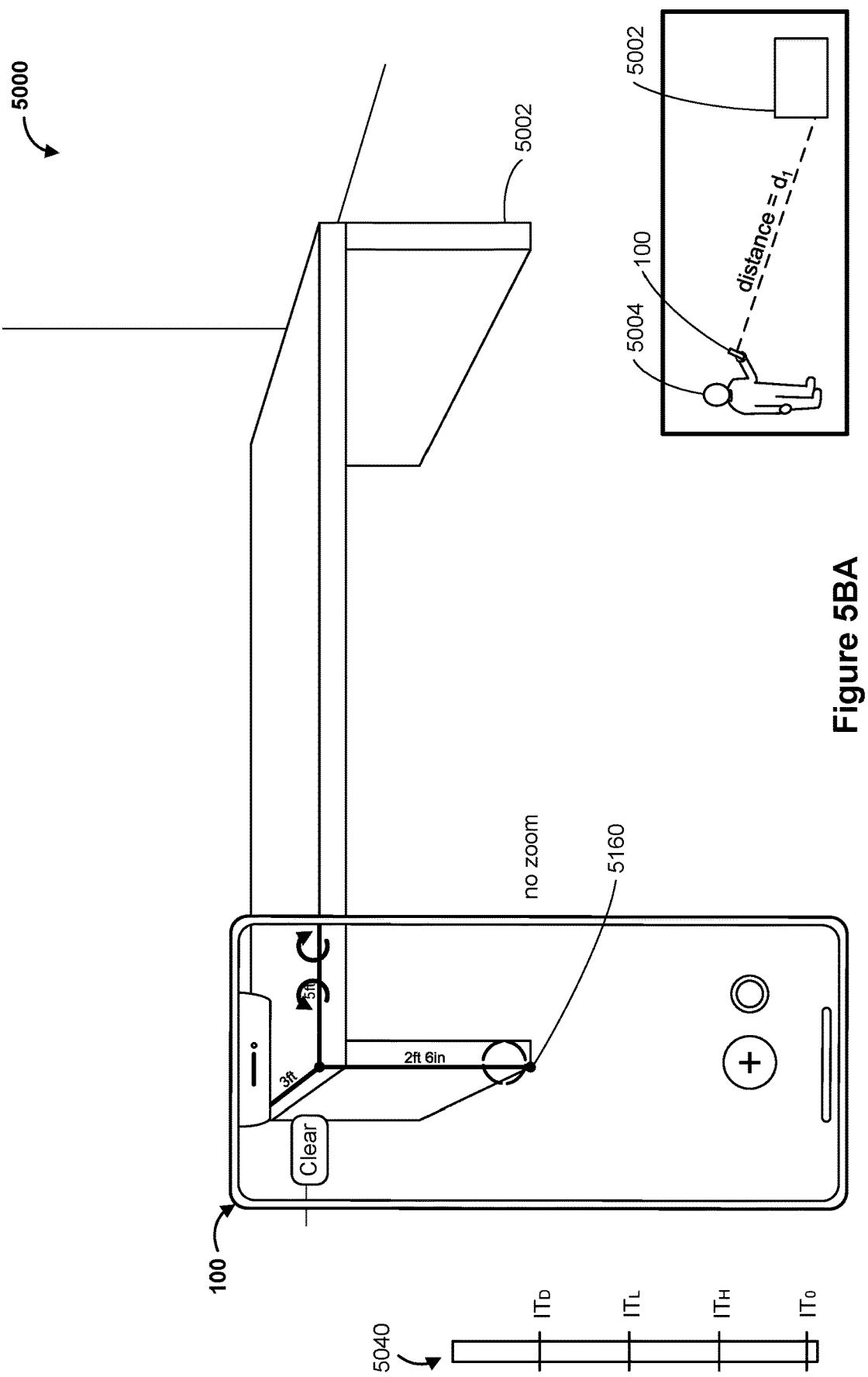
Figure 5B:
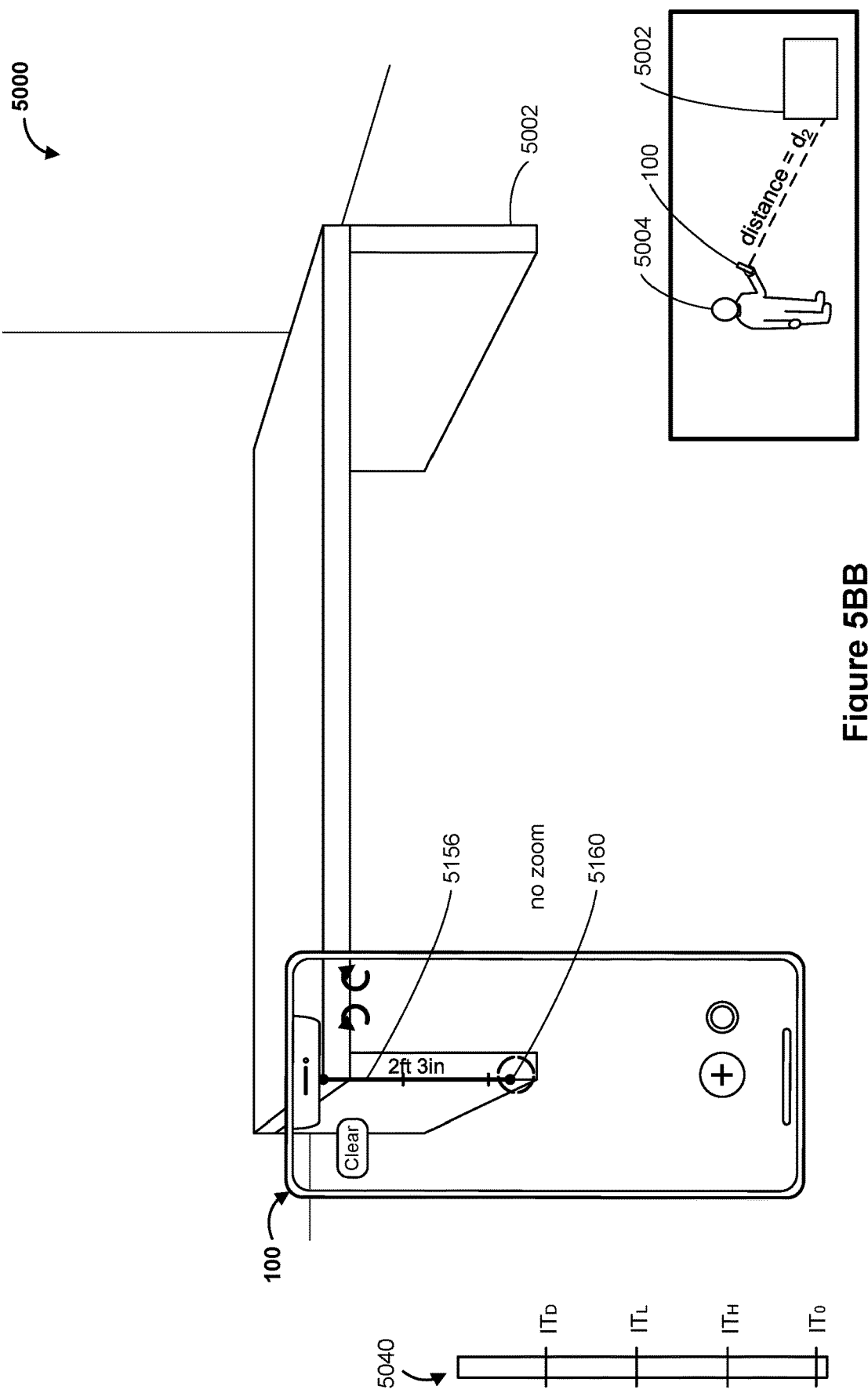
Figure 5B:
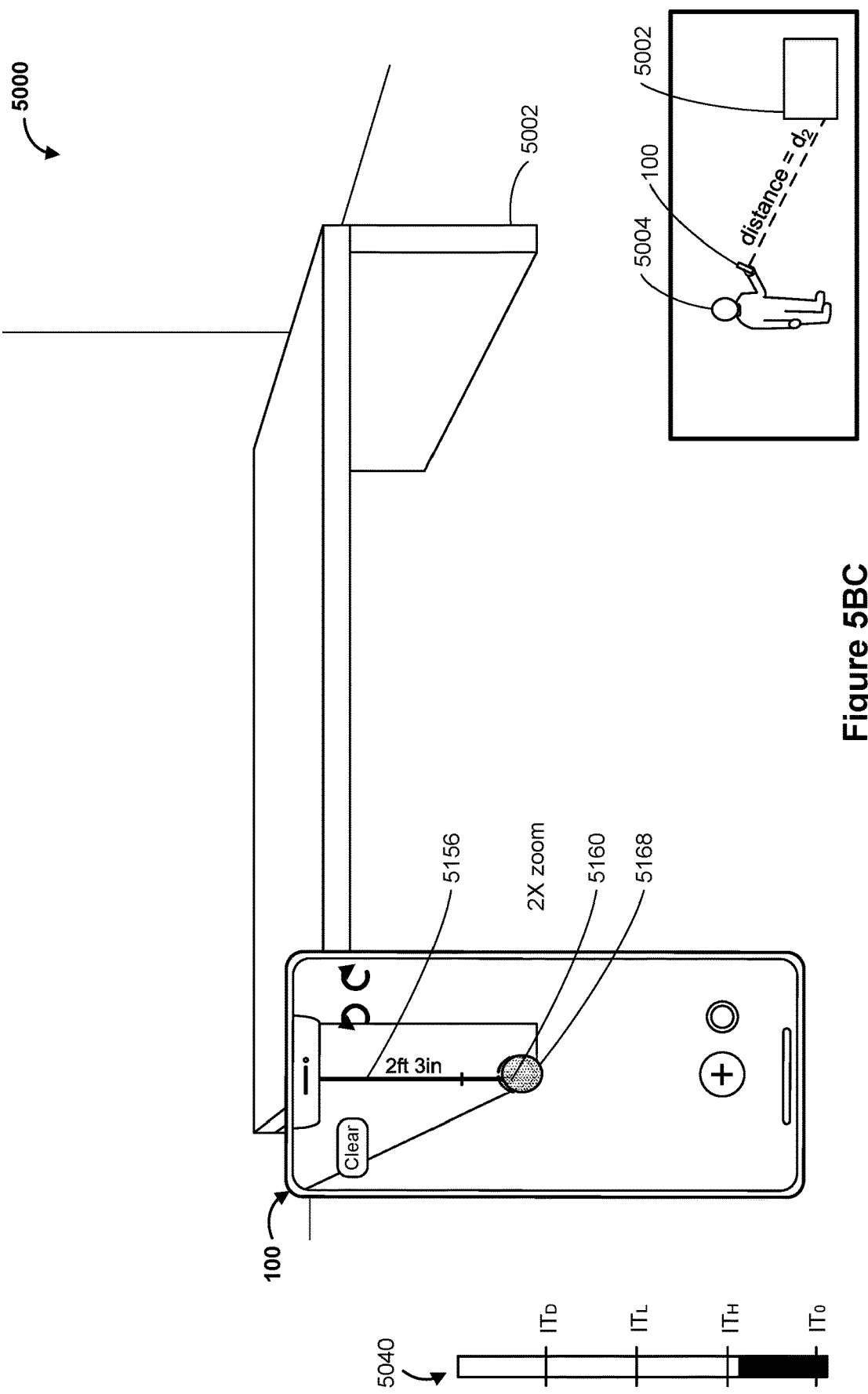
Figure 5B:
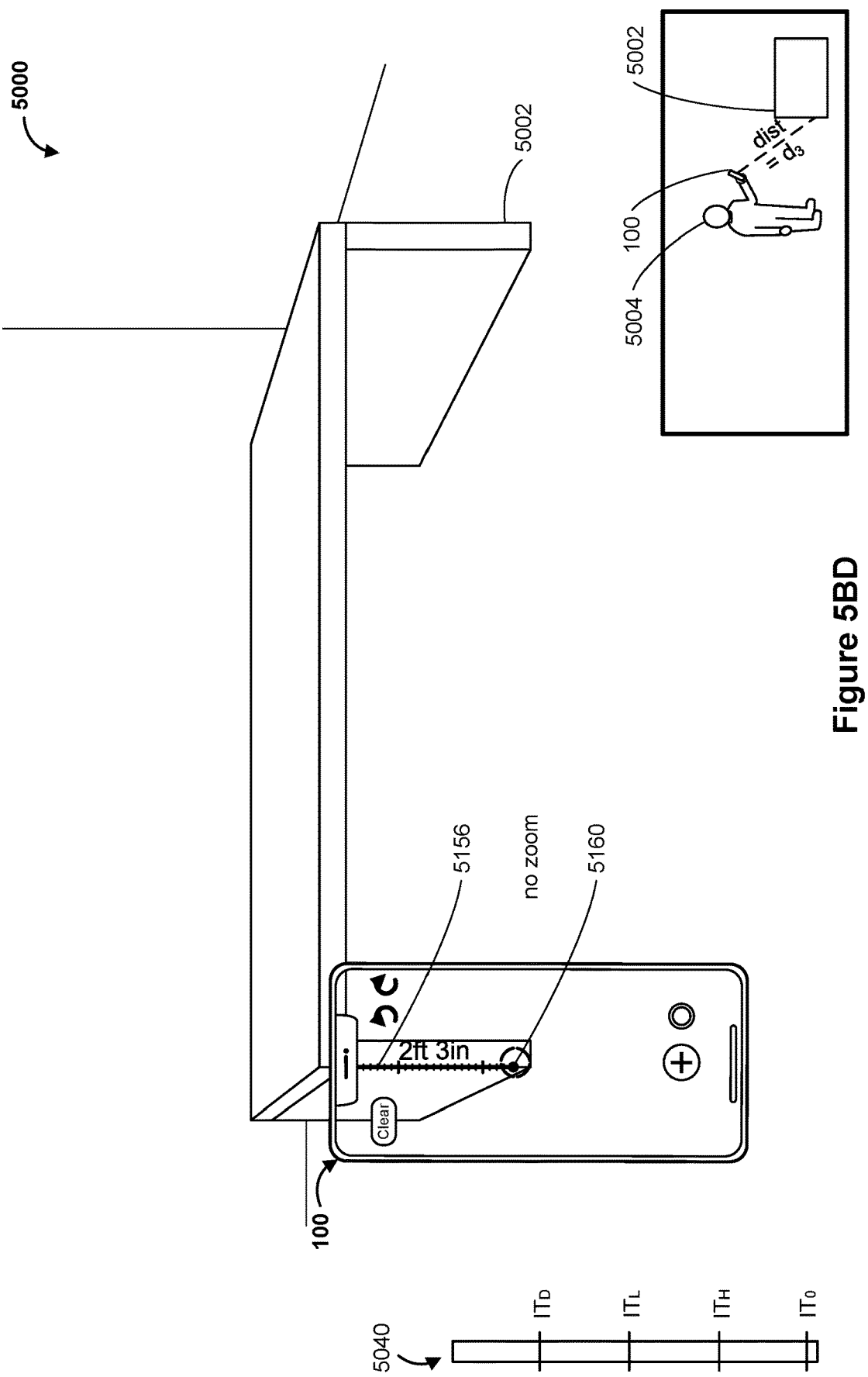
Figure 5B:
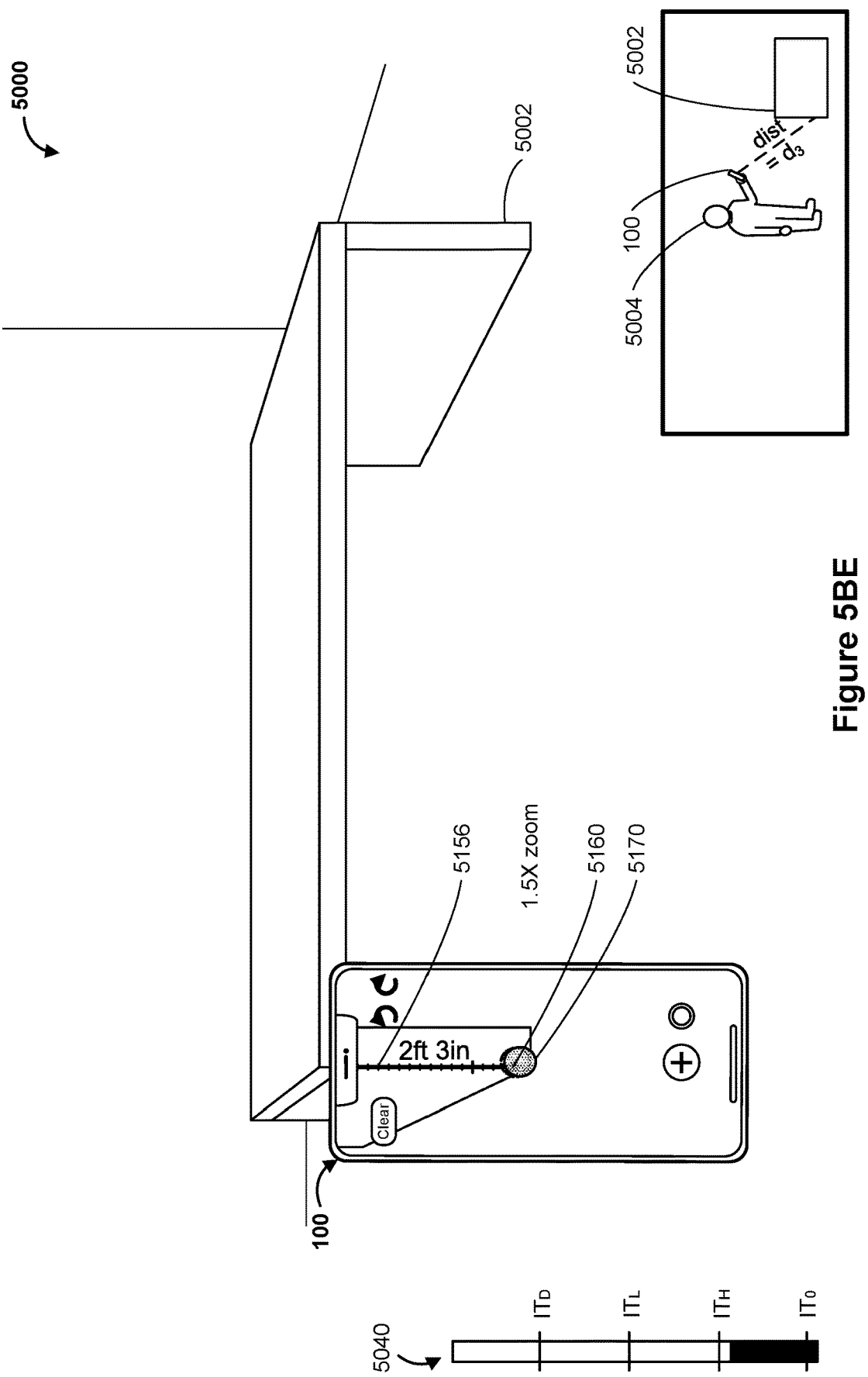
Figure 5B:
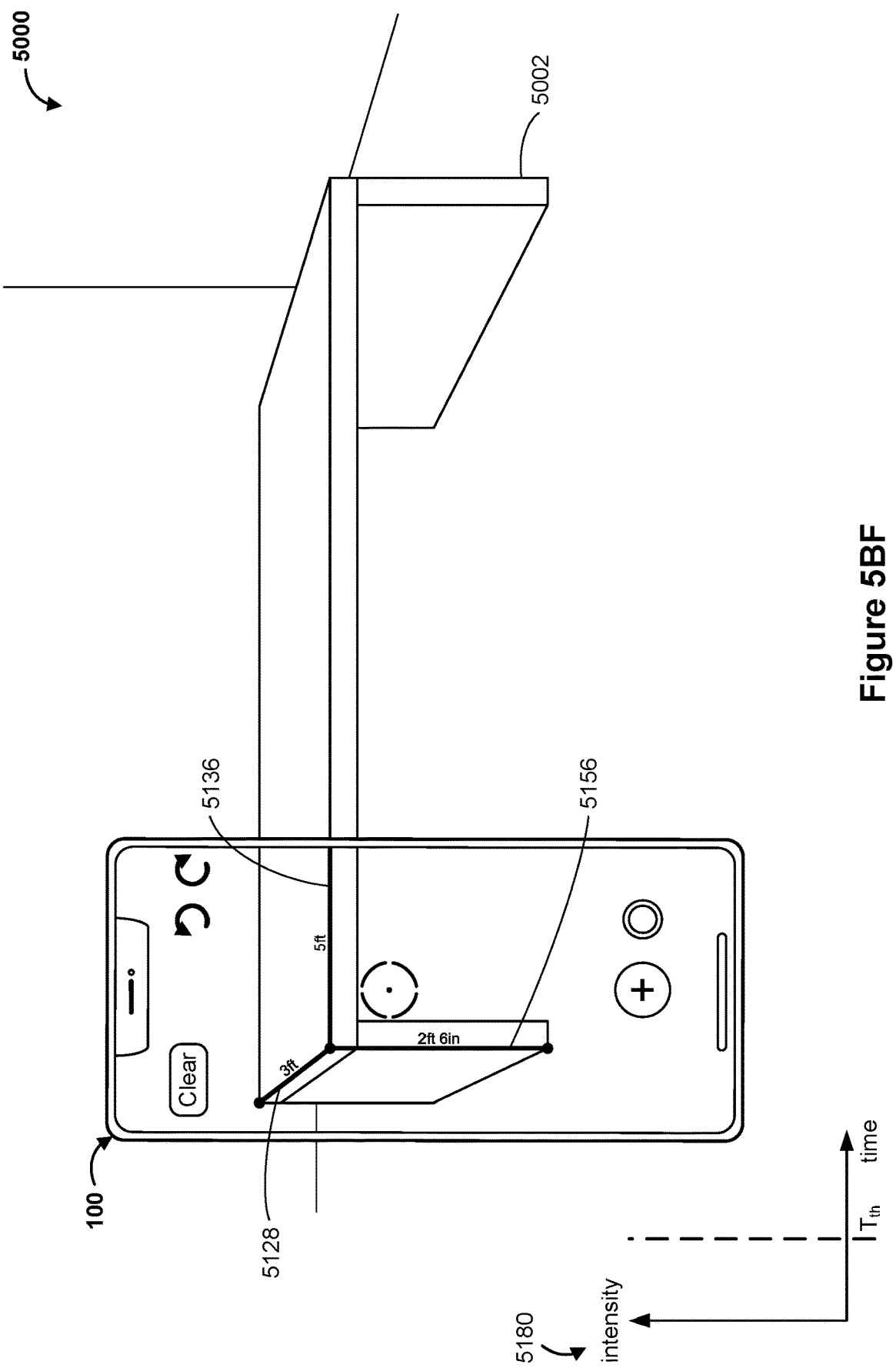
Figure 5B:
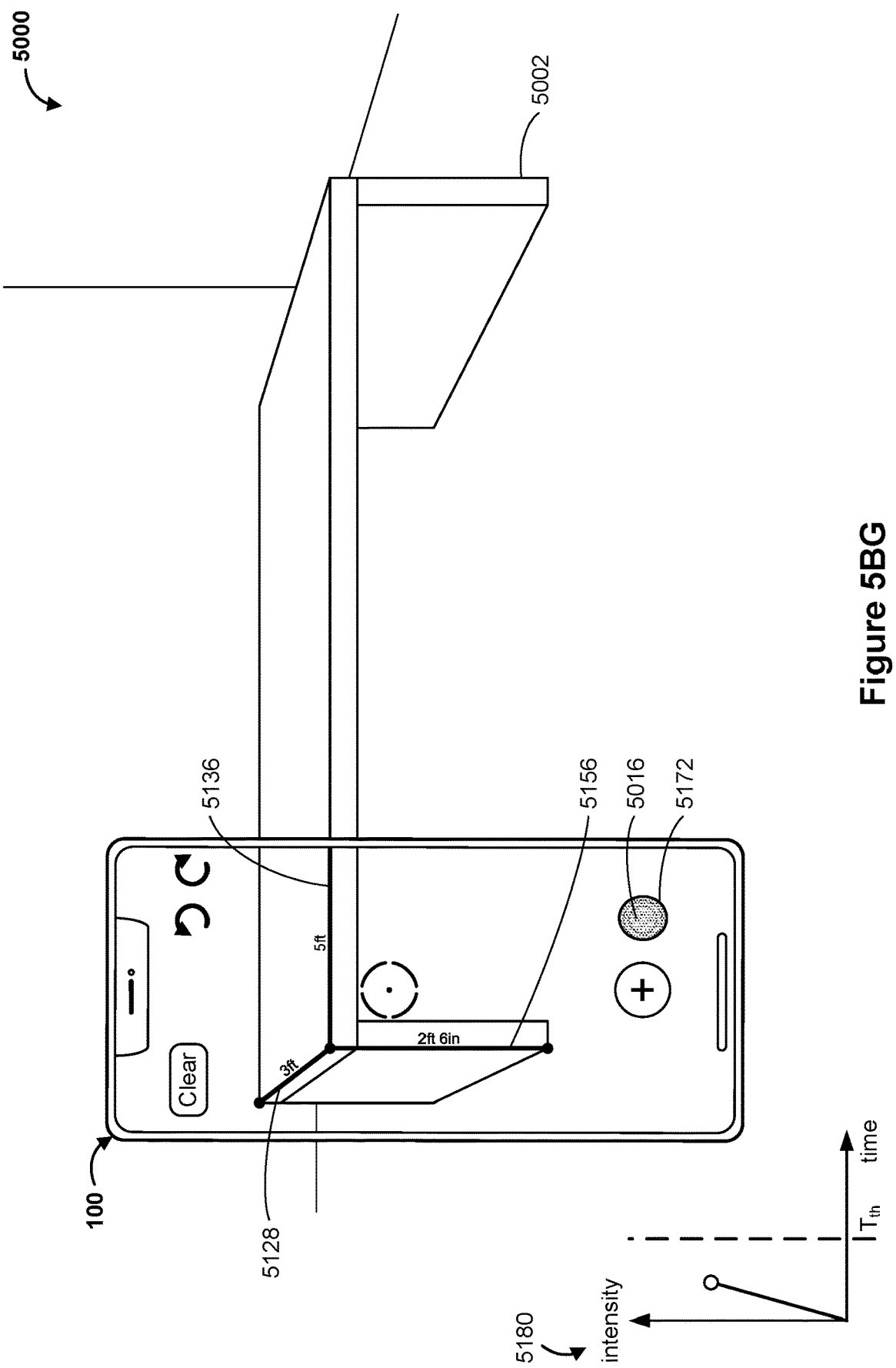
Figure 5B:
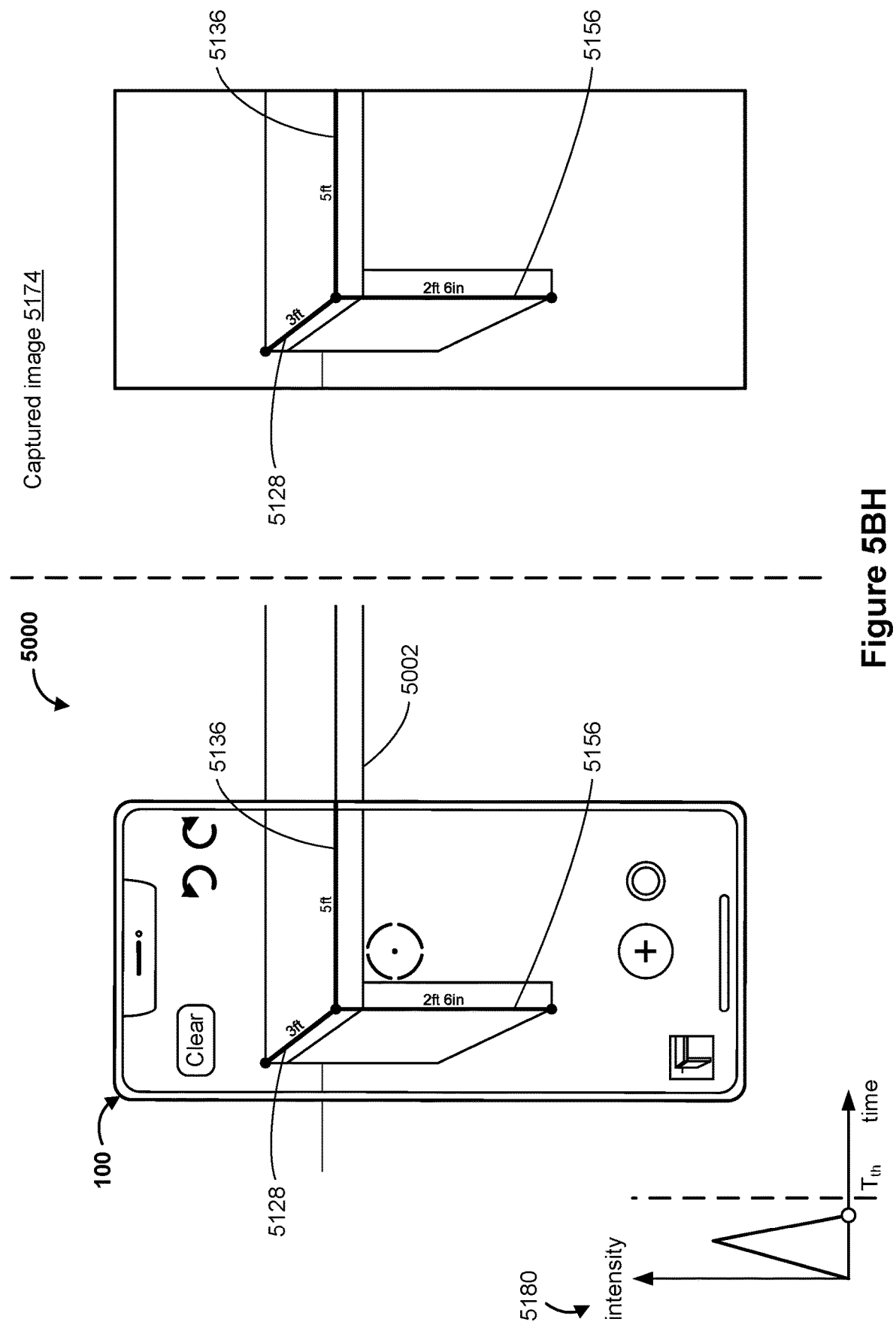
Figure 5B:
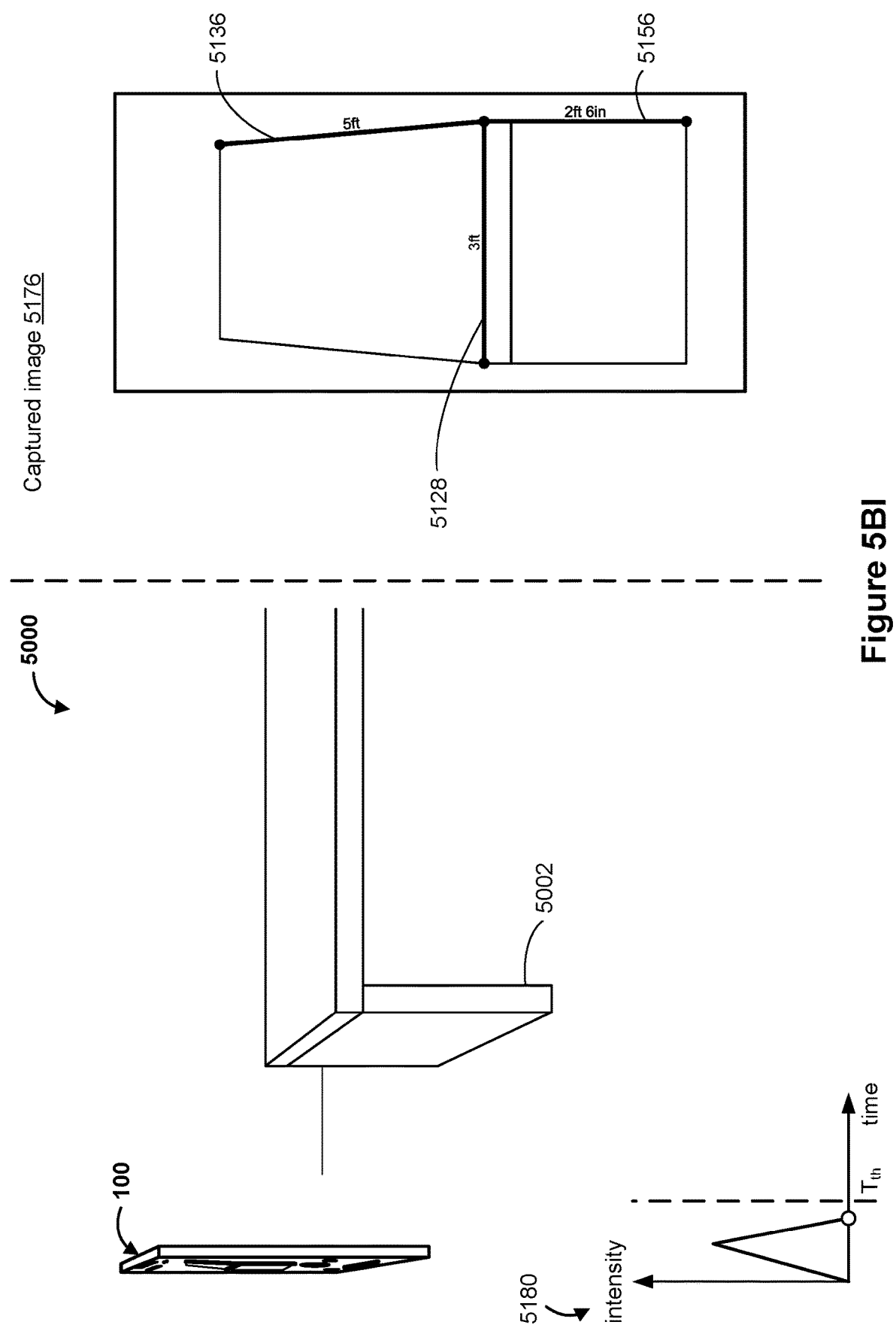
Figure 5B:
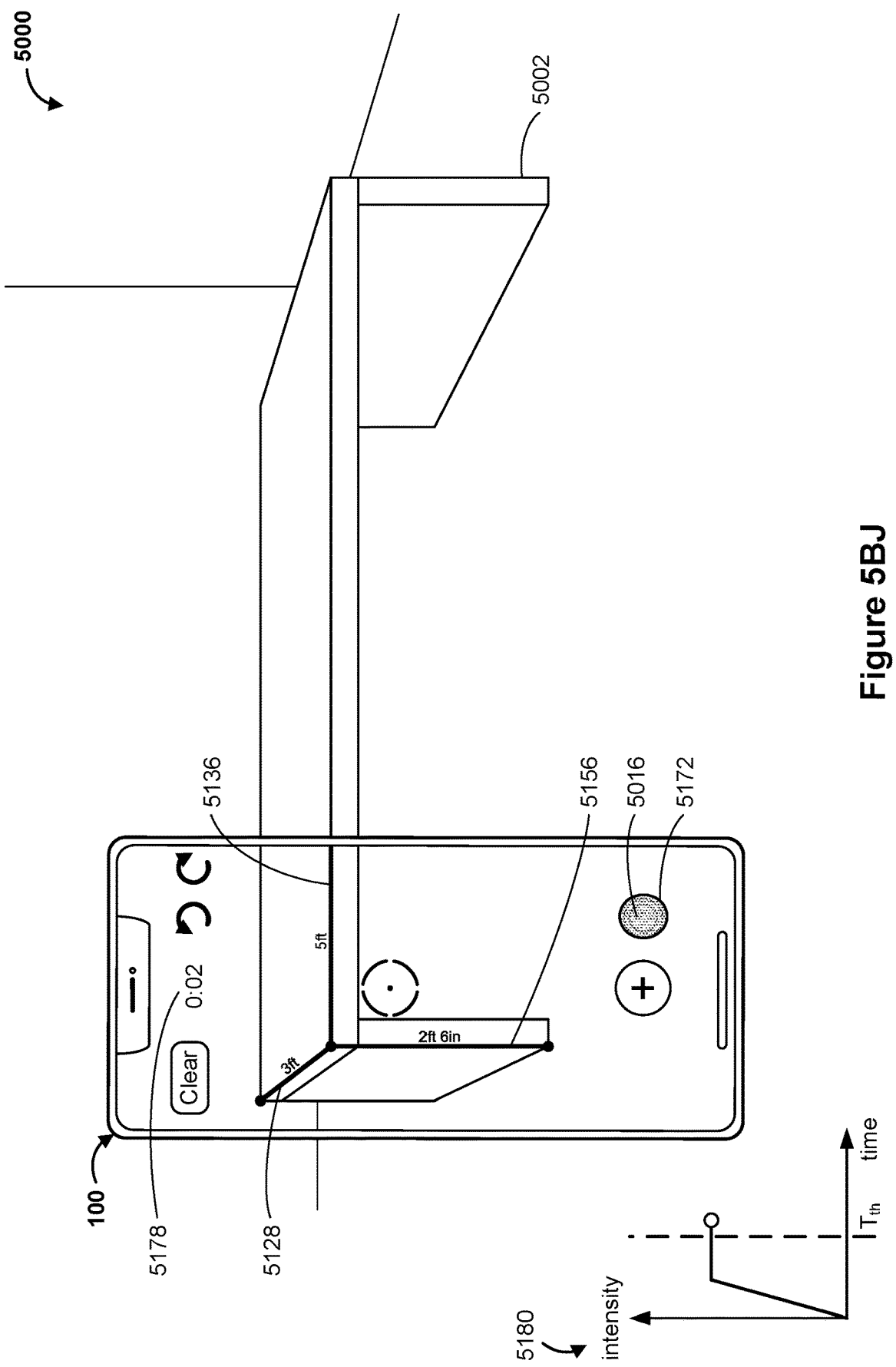
Figure 5B:
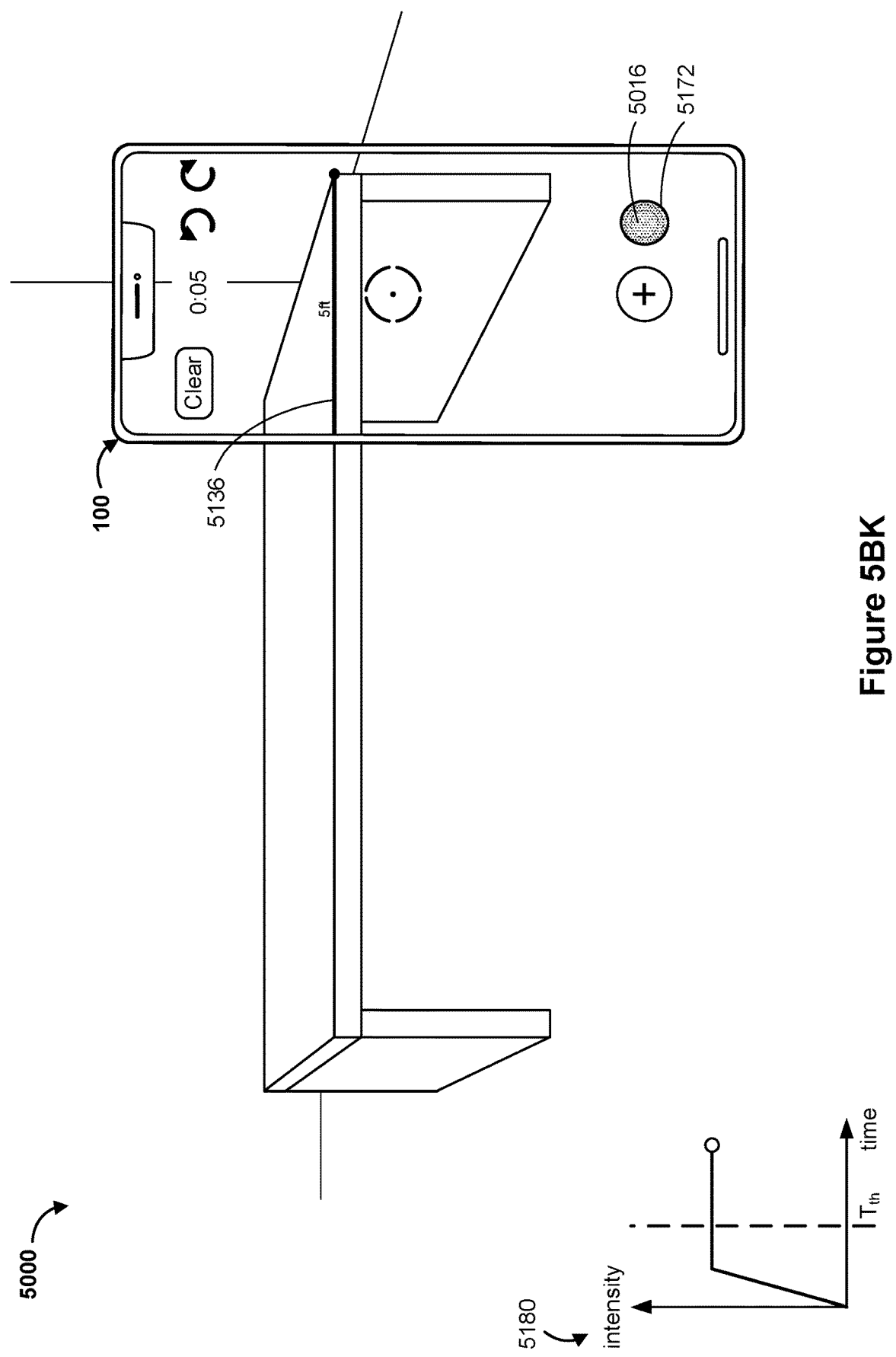
Figure 5B:
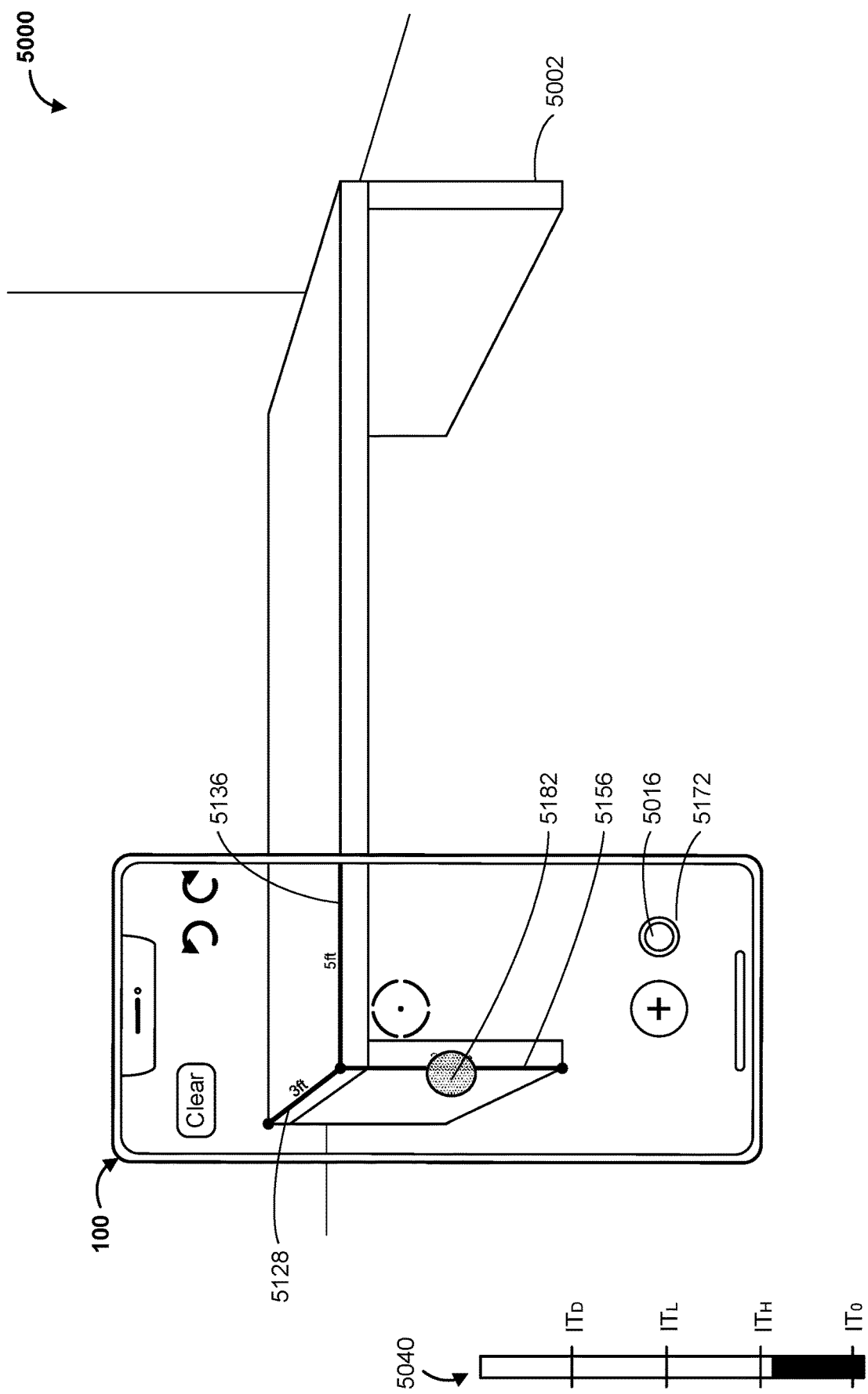
Figure 5B:
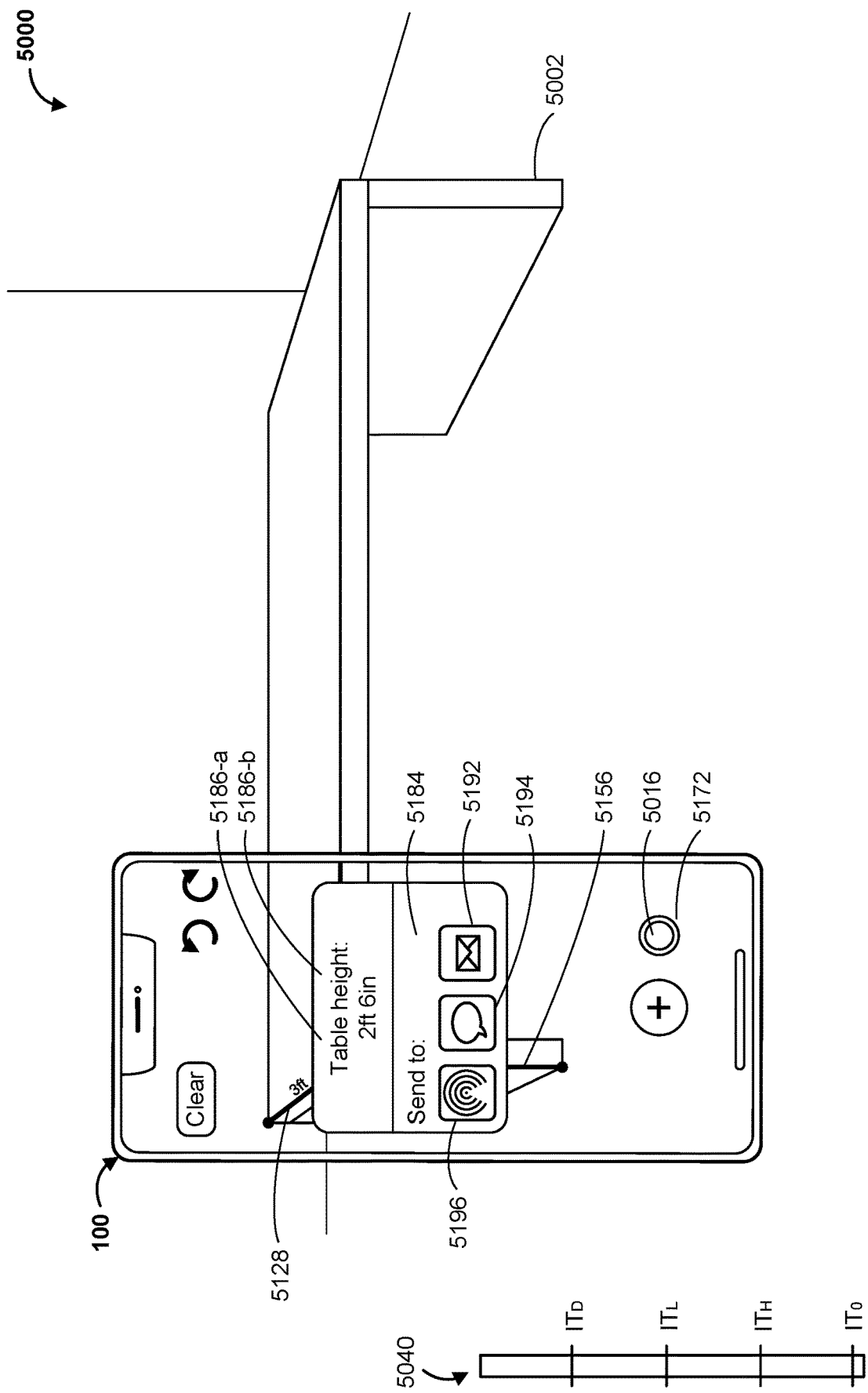
Figure 5B:
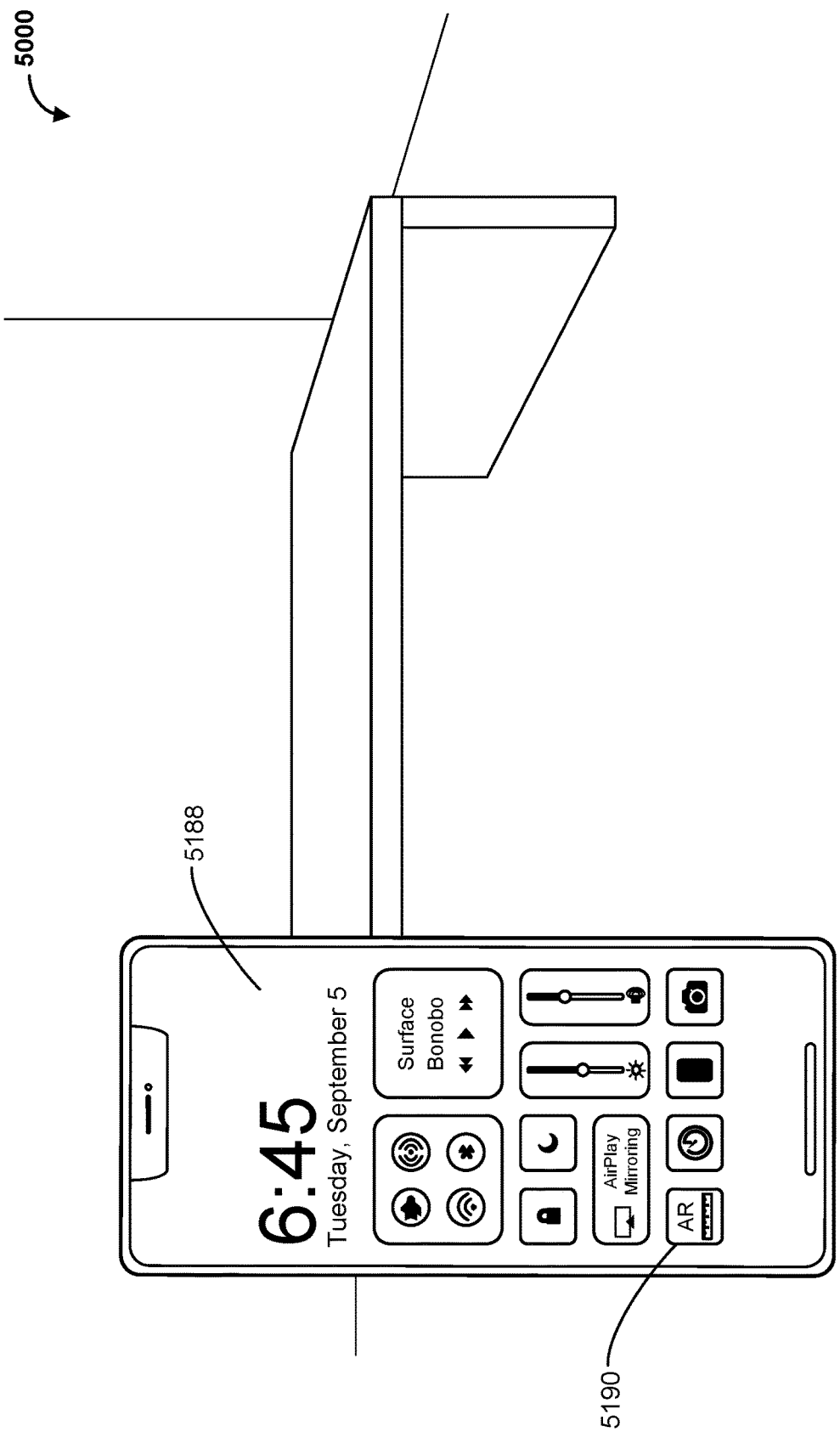
Figure 5B:
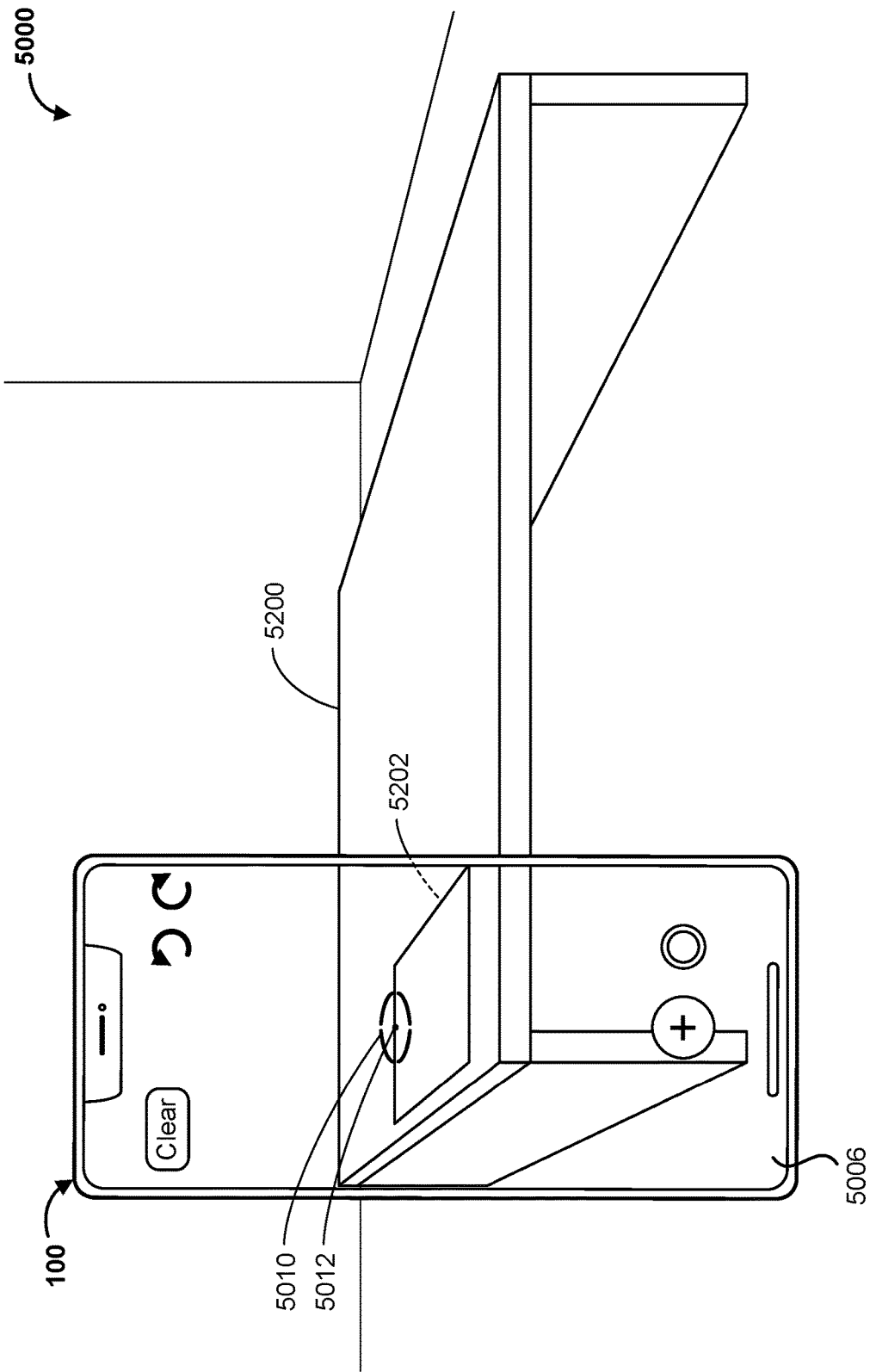
Figure 5B:
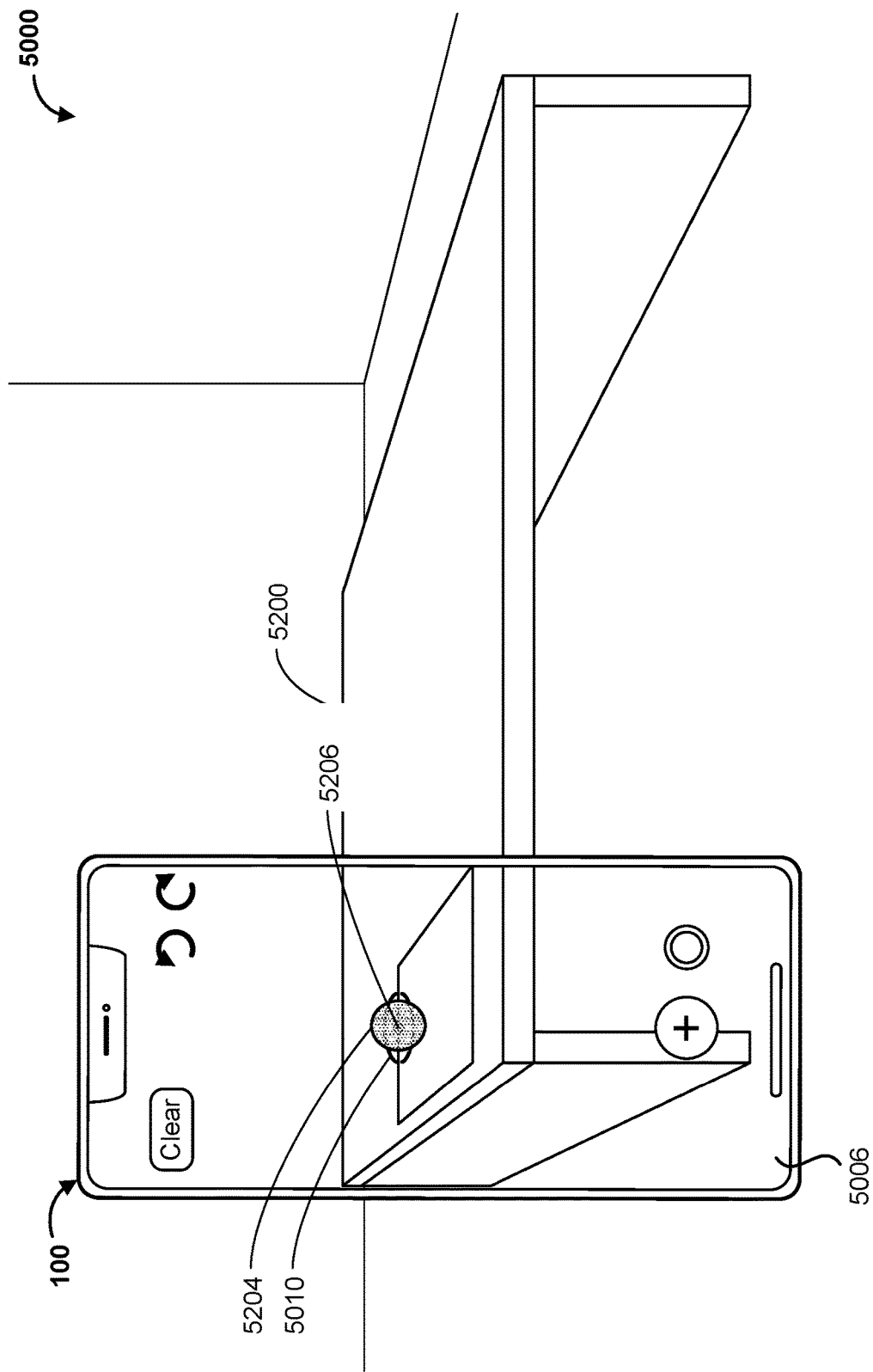
Figure 5B:
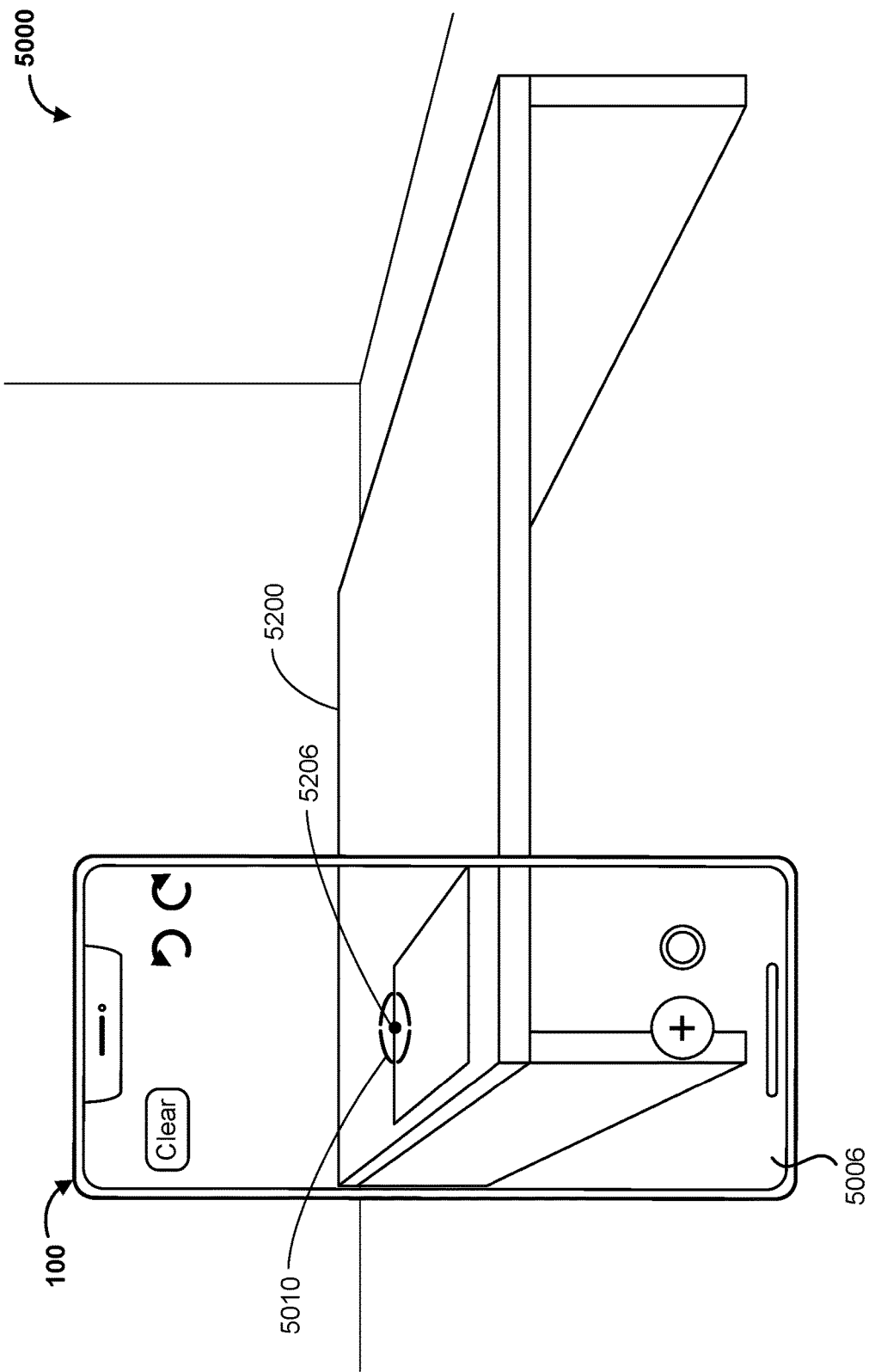
Figure 5B:
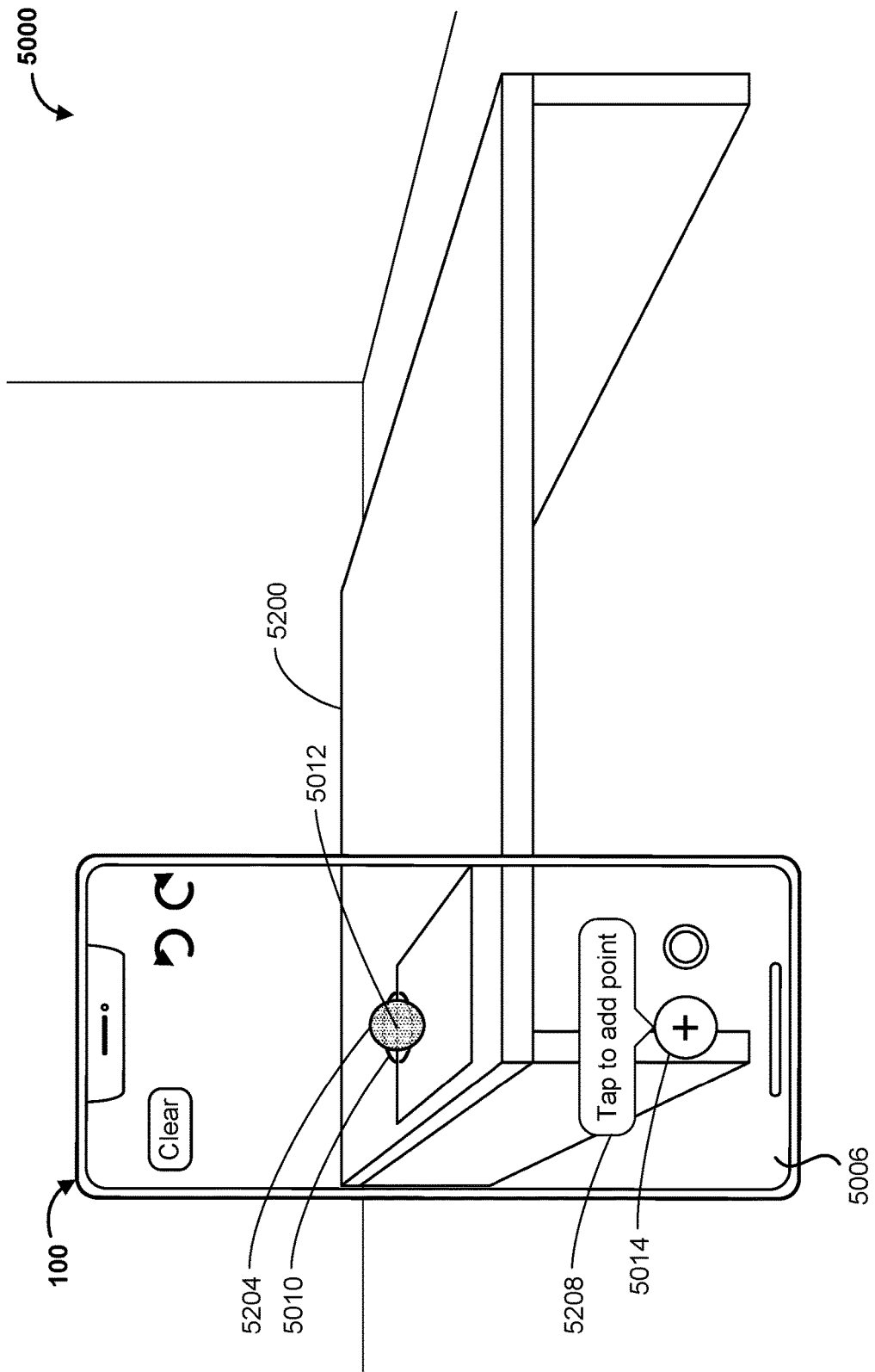
Figure 5B:
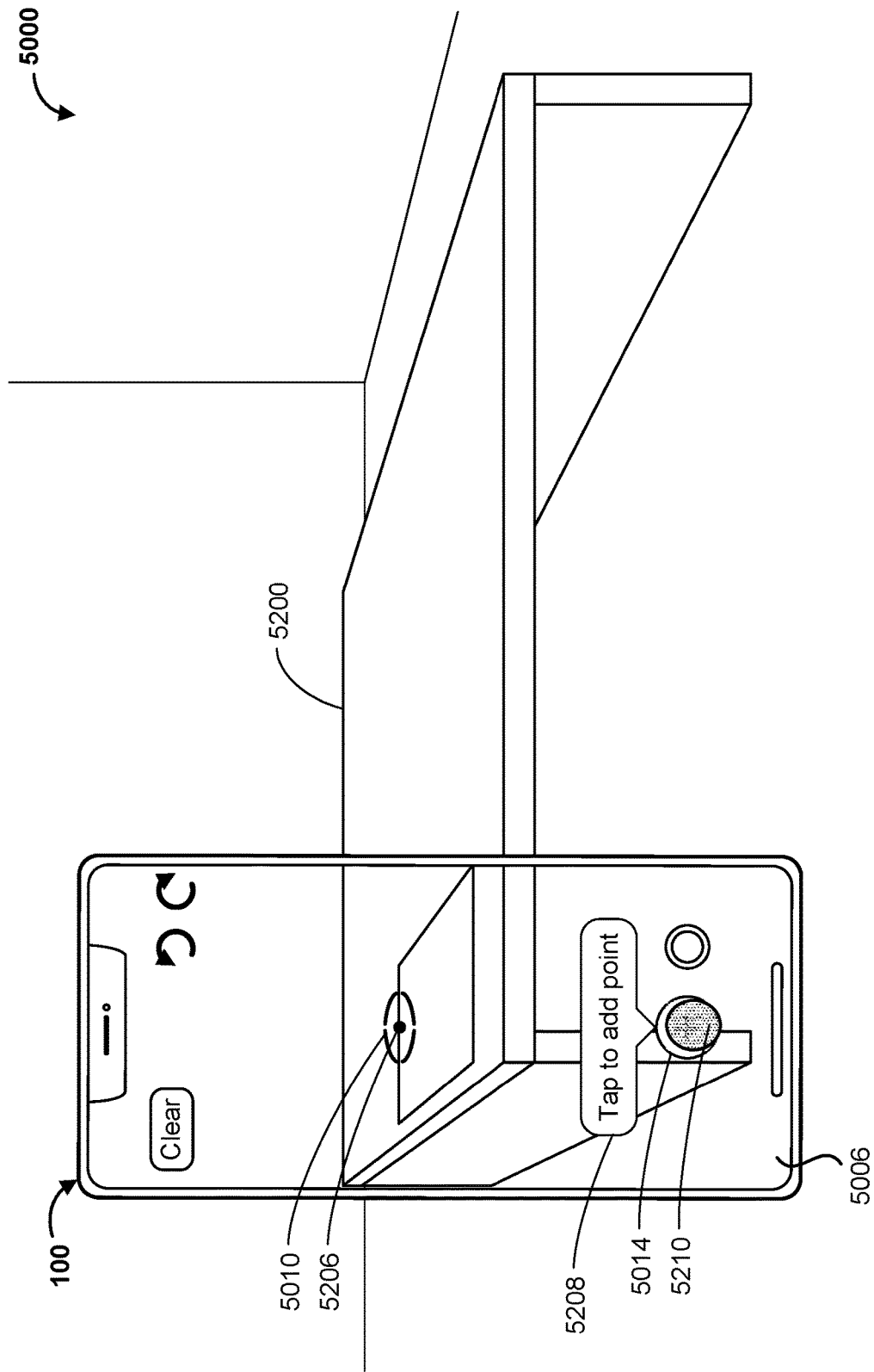
Figure 5B:
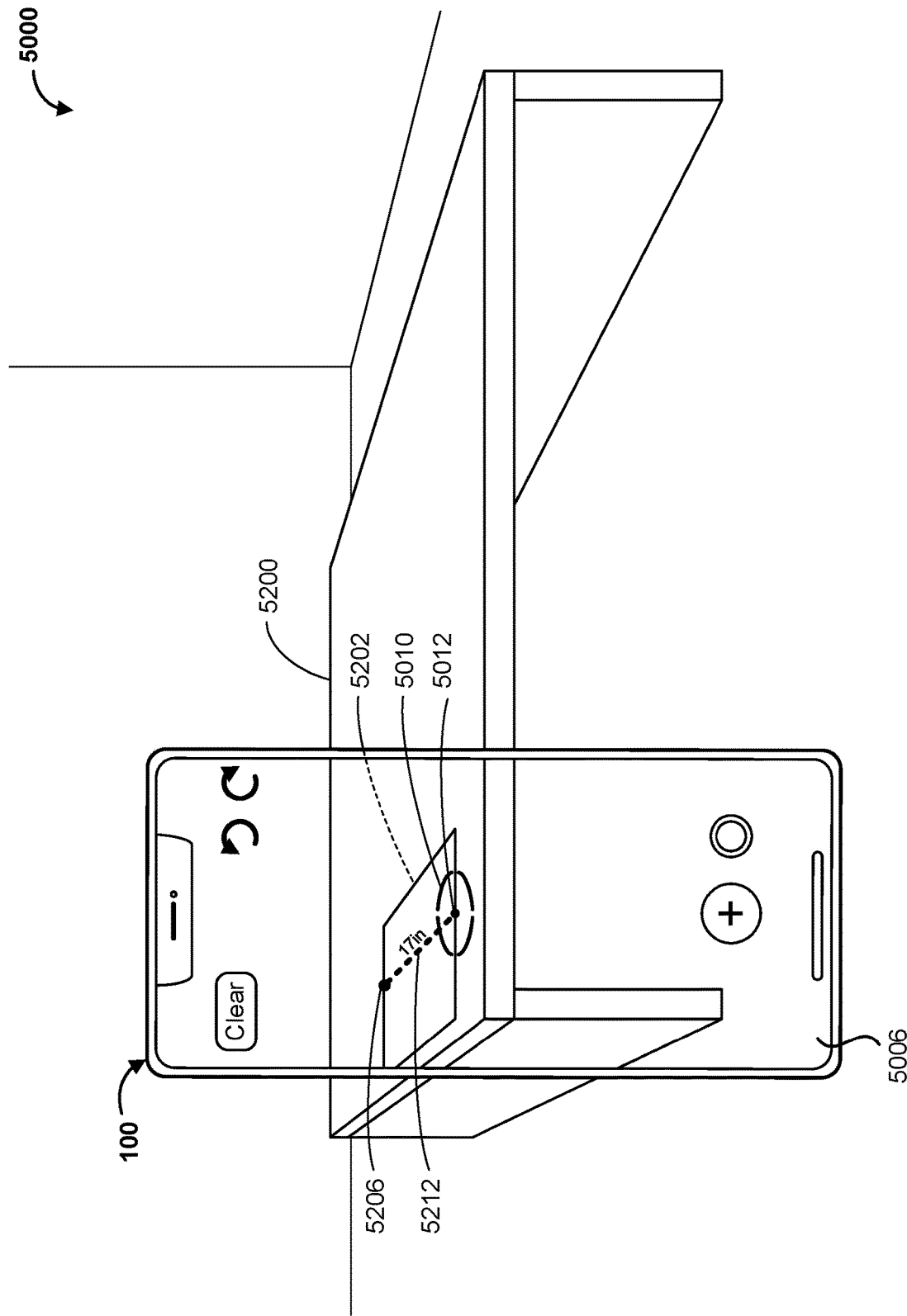
Figure 5B:
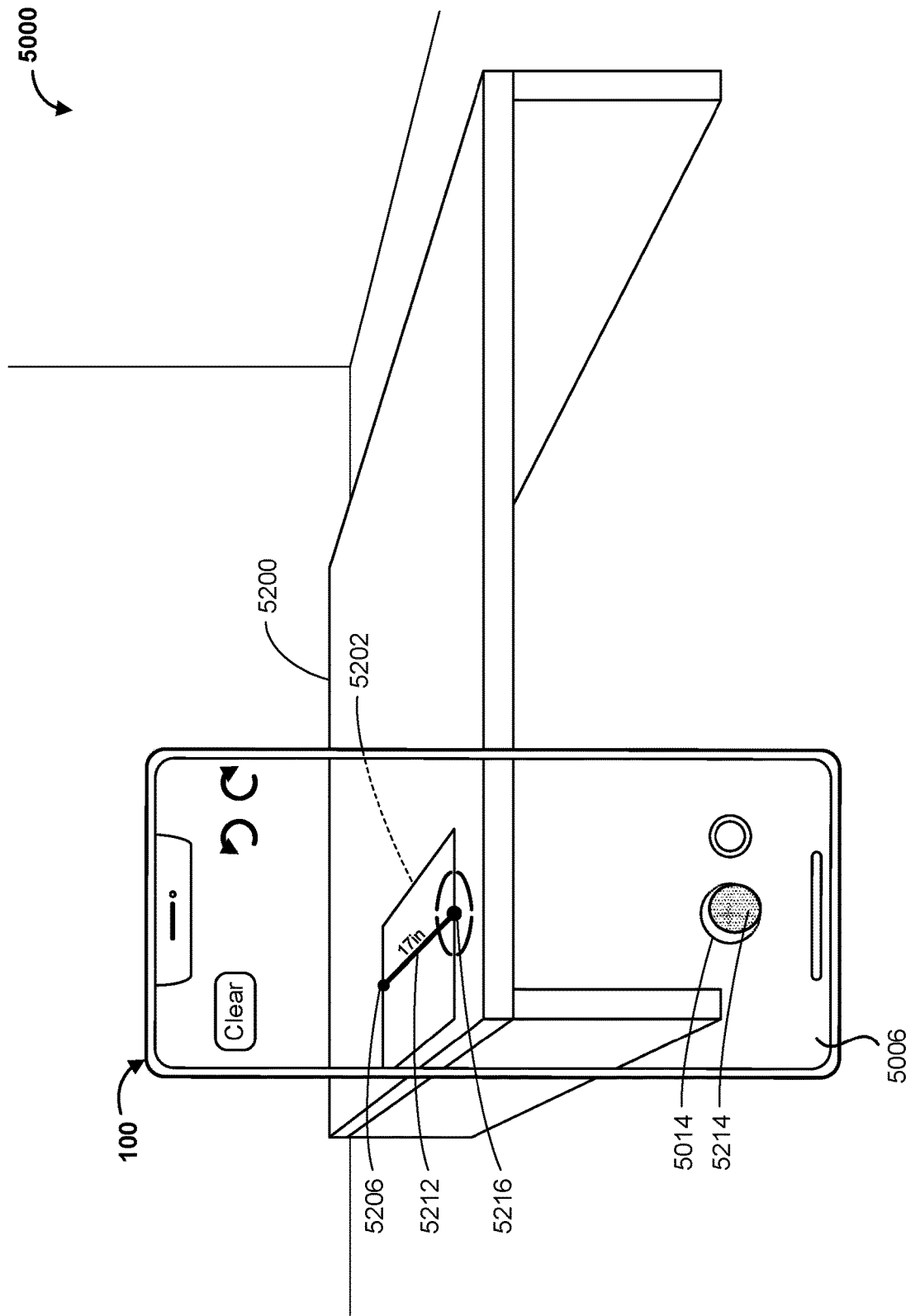
Figure 5B:
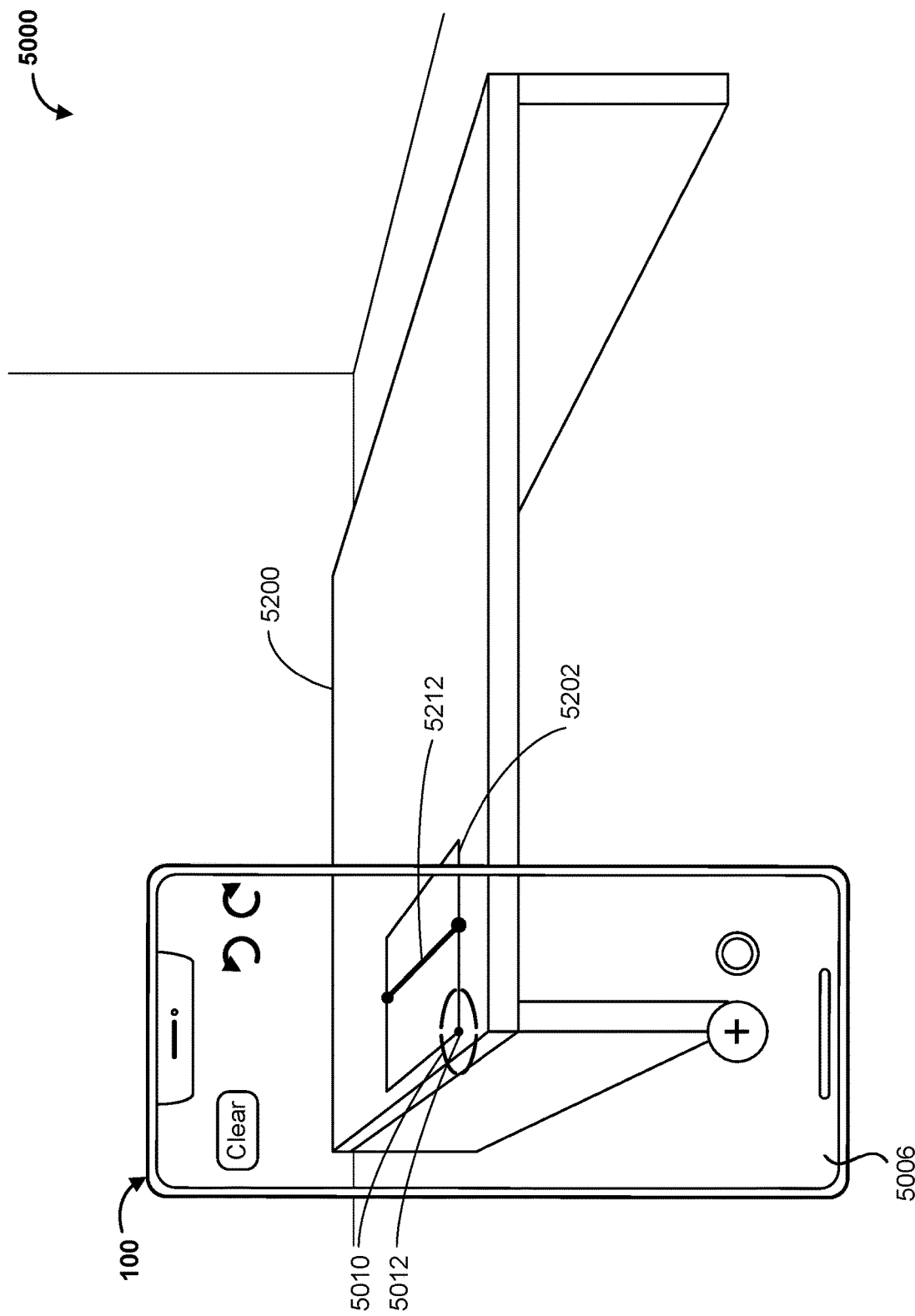
Figure 5B:
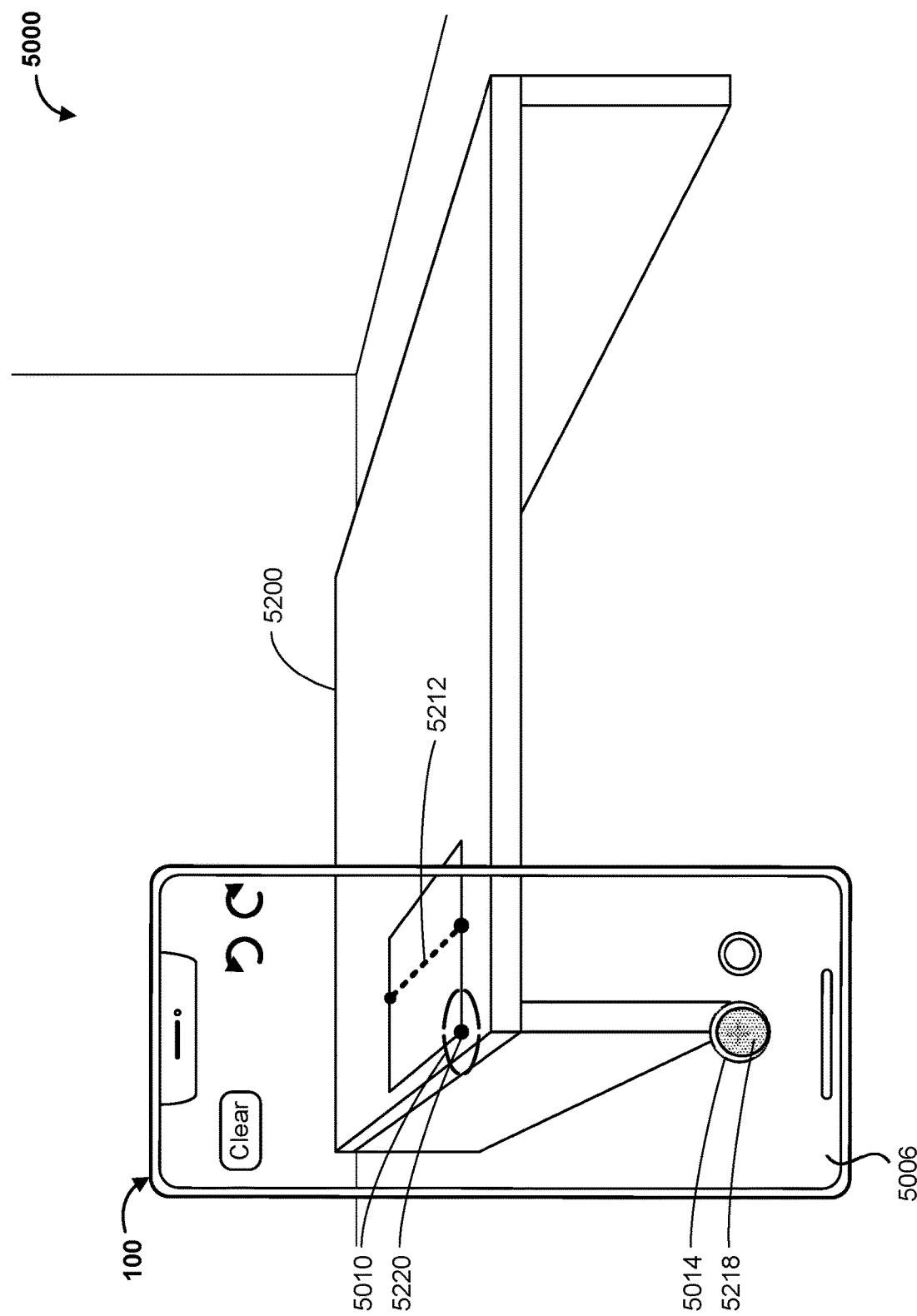
Figure 5B:
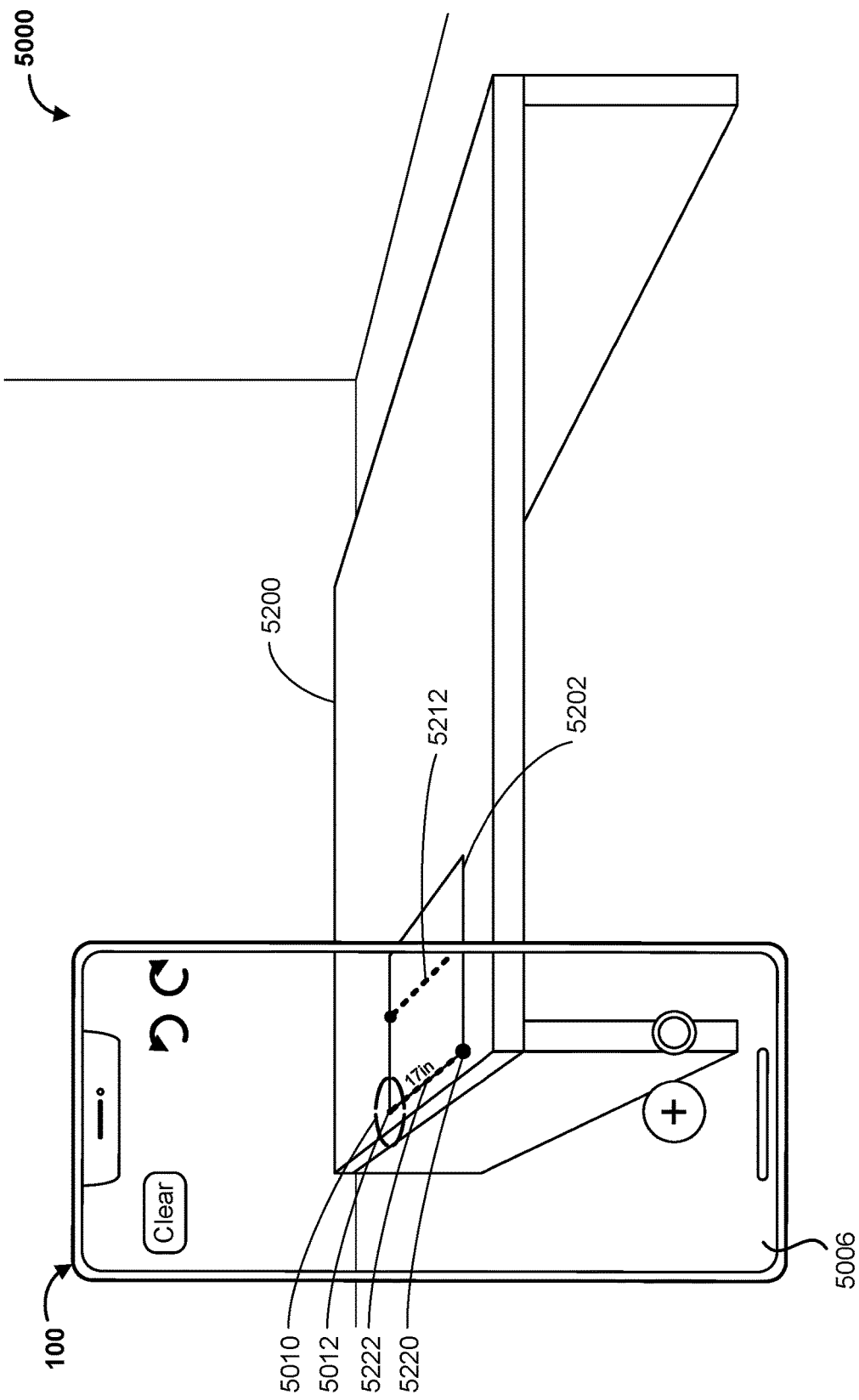
Figure 5B:
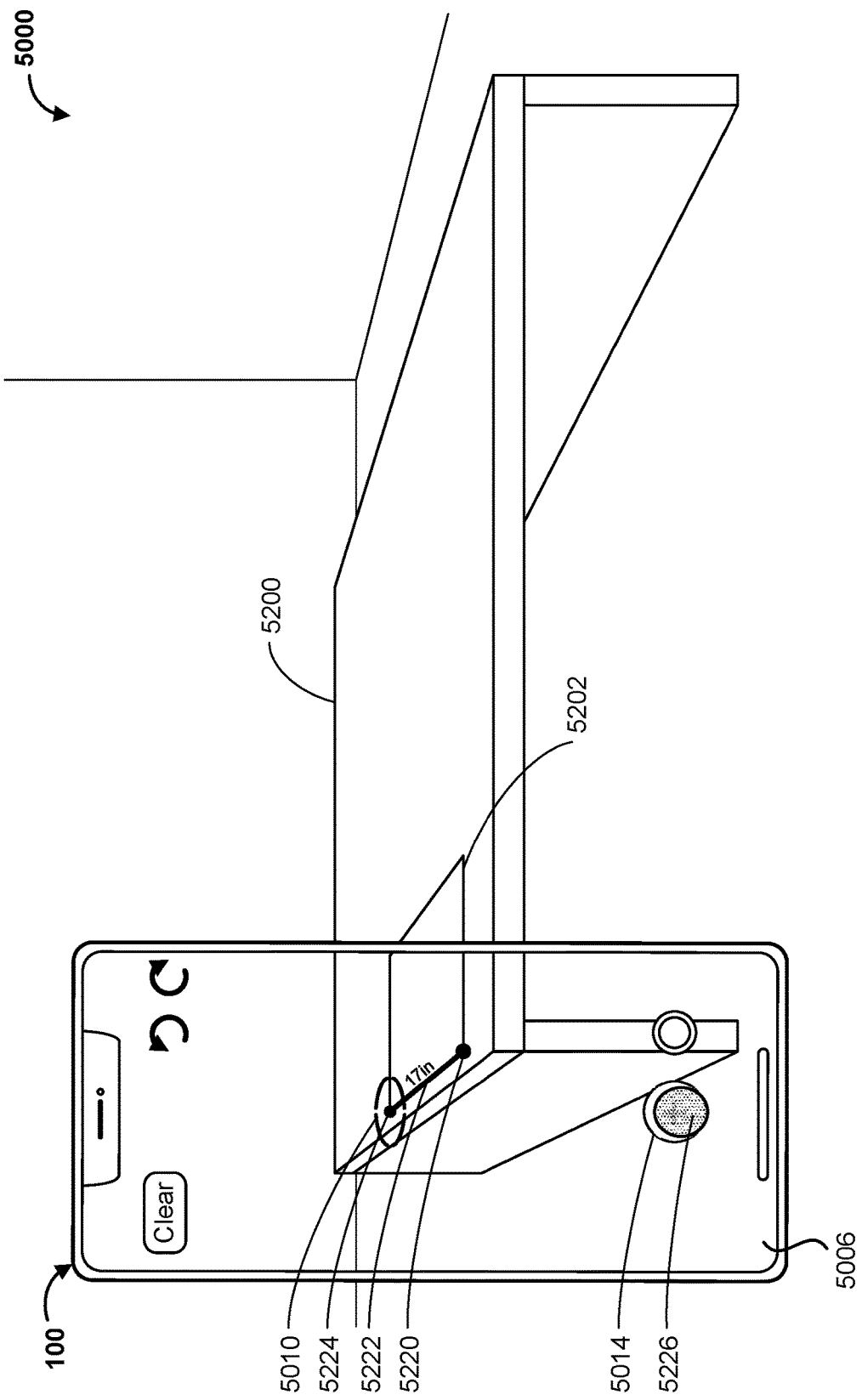
Figure 5B:
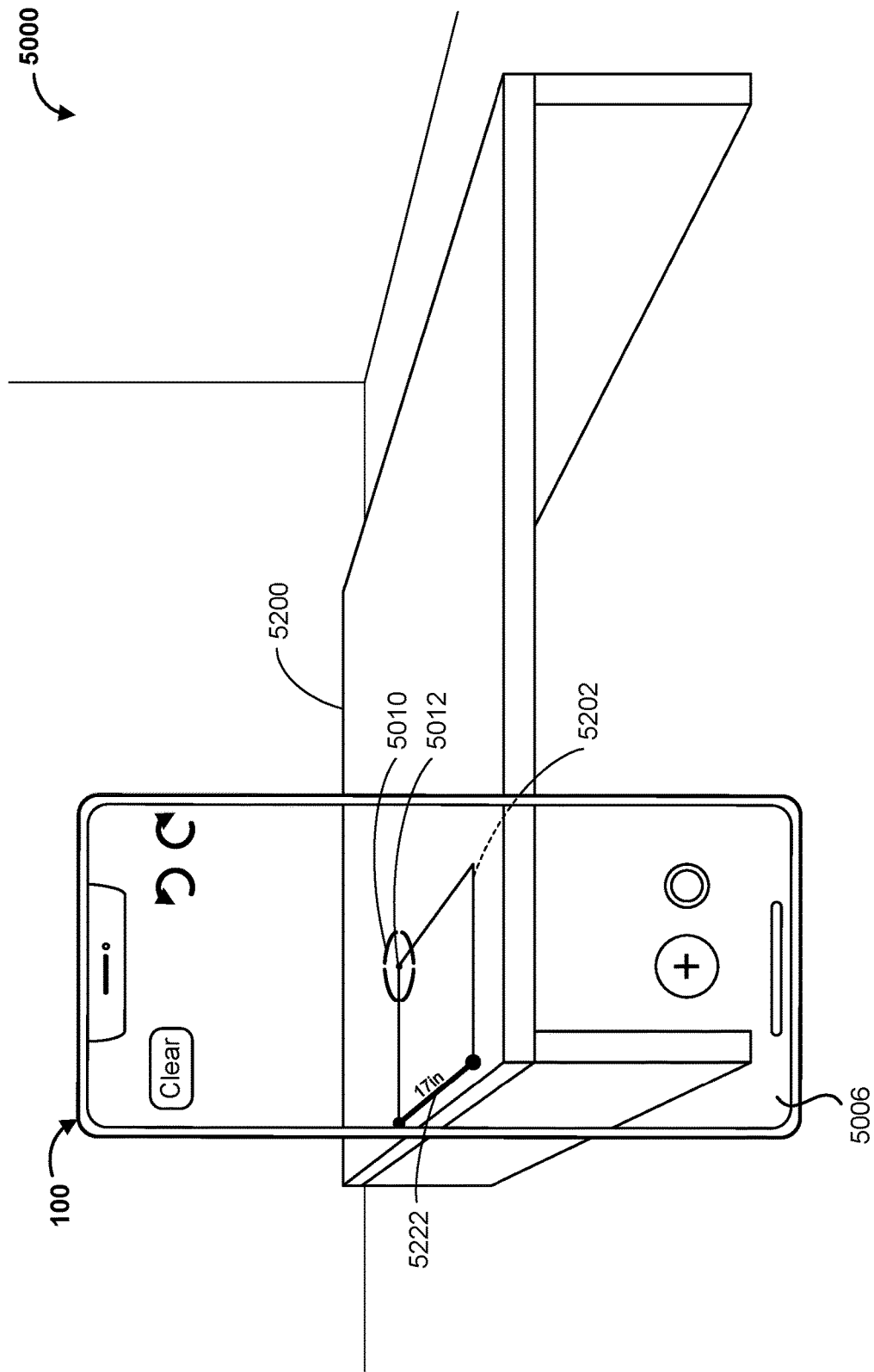
Figure 5C:
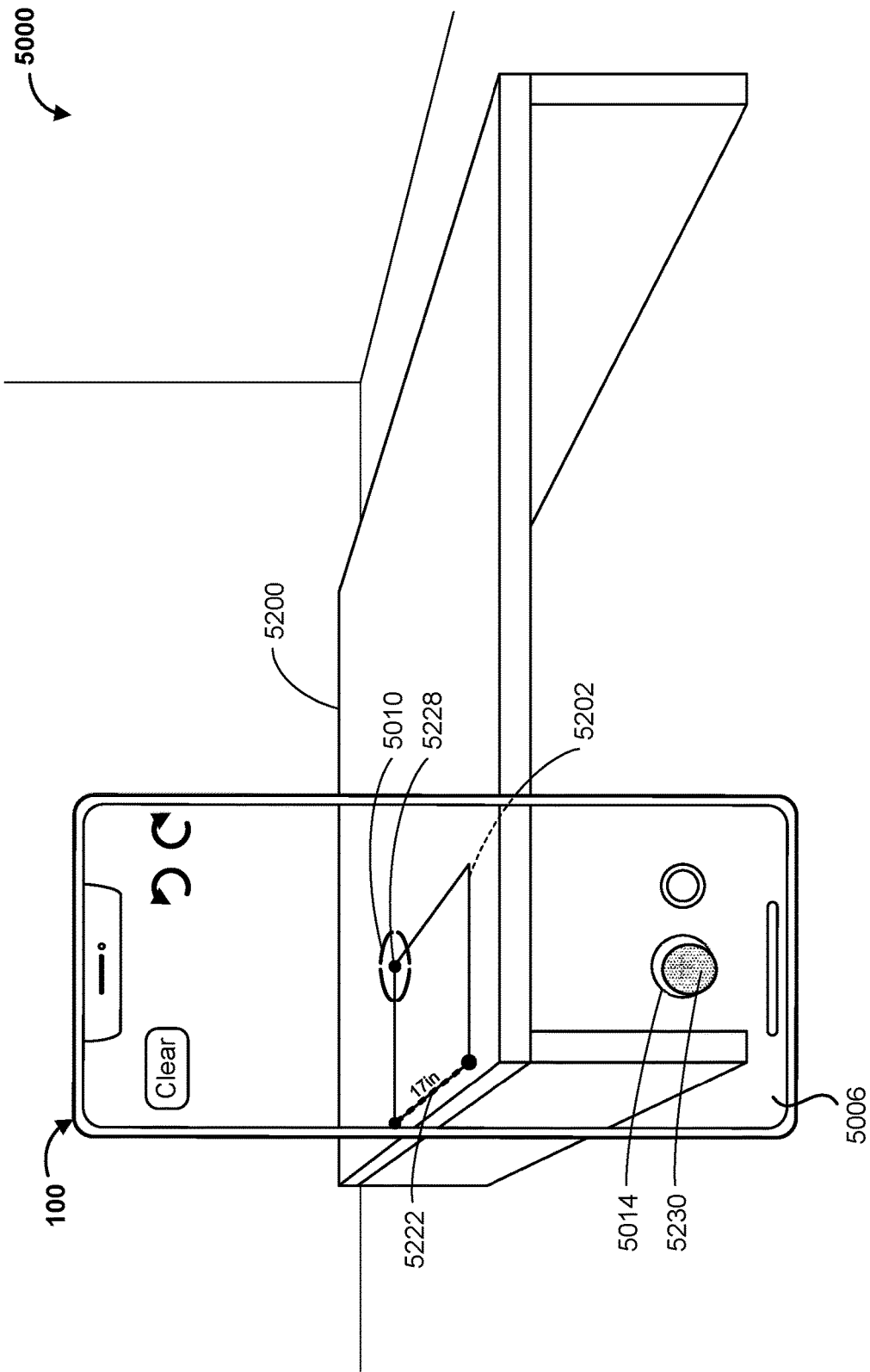
Figure 5C:
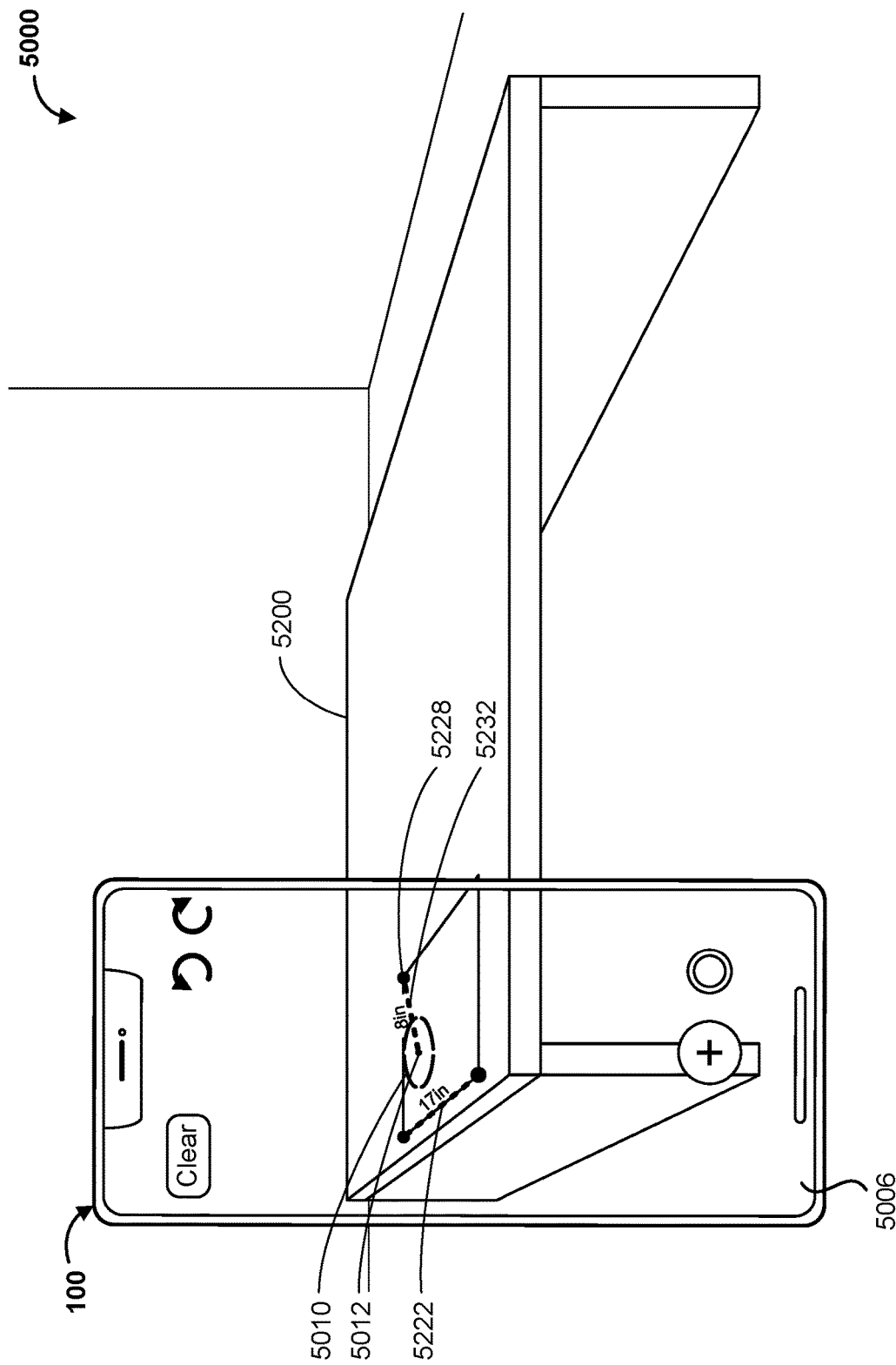
Figure 5C:
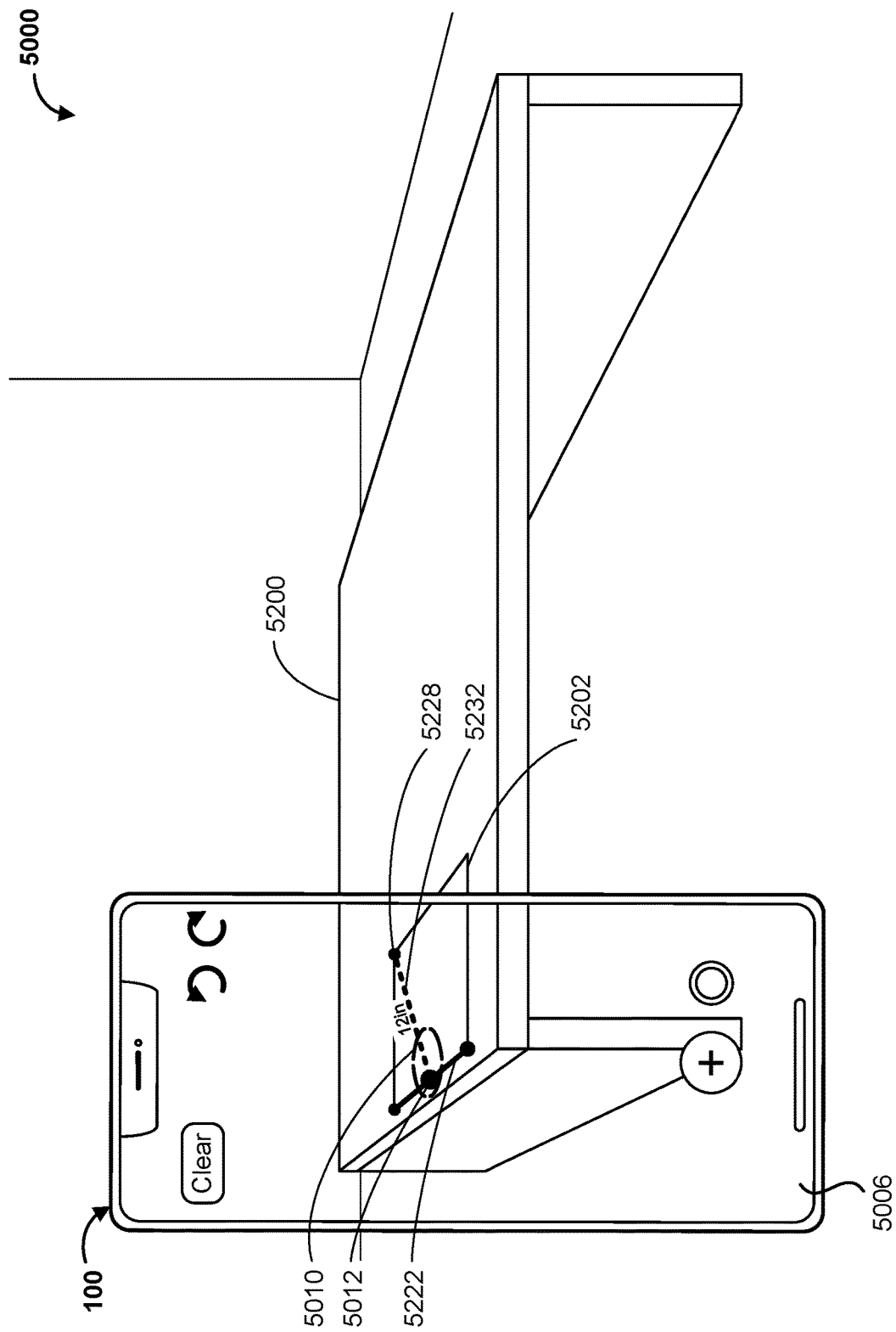
Figure 5C:
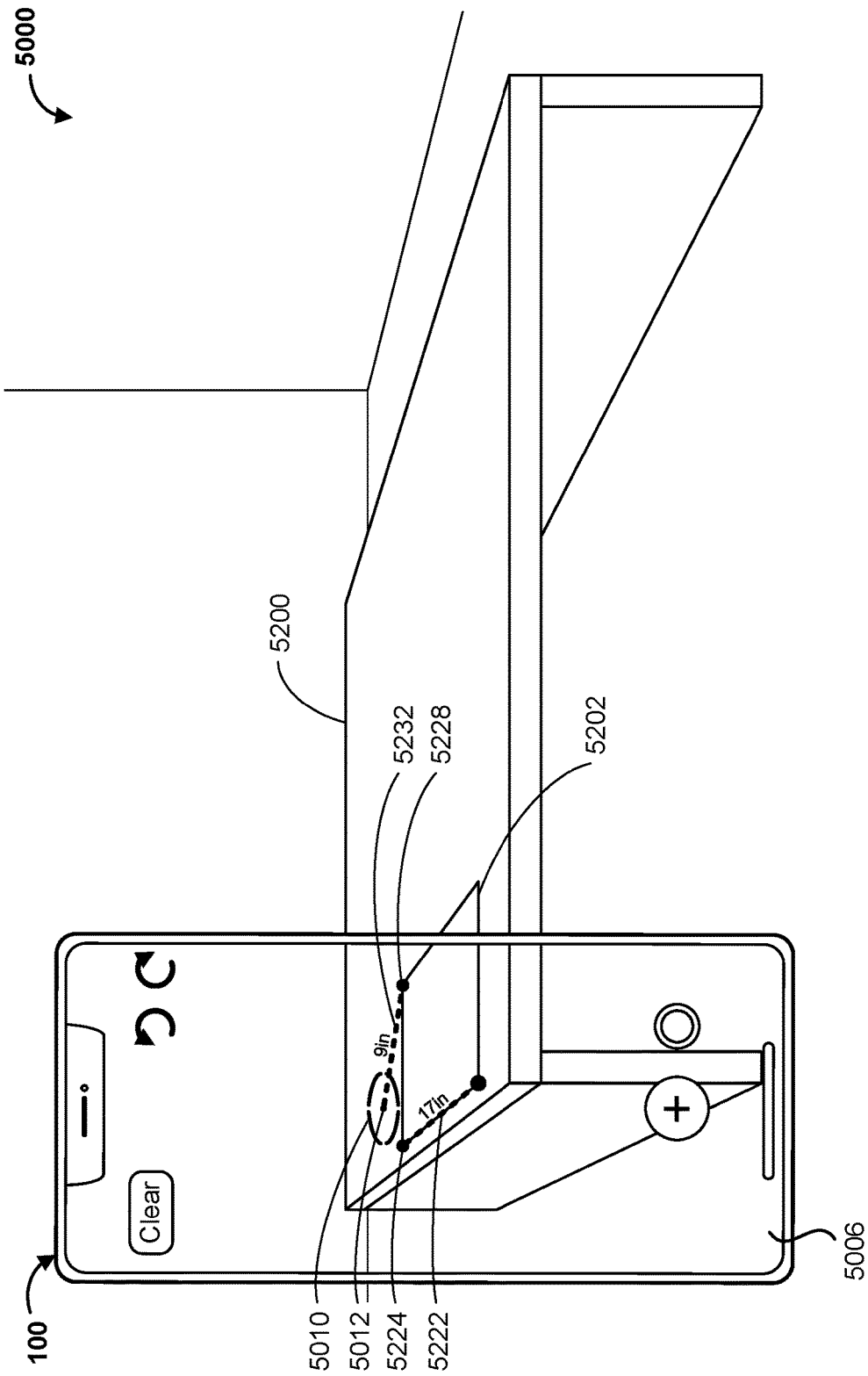
Figure 5C:
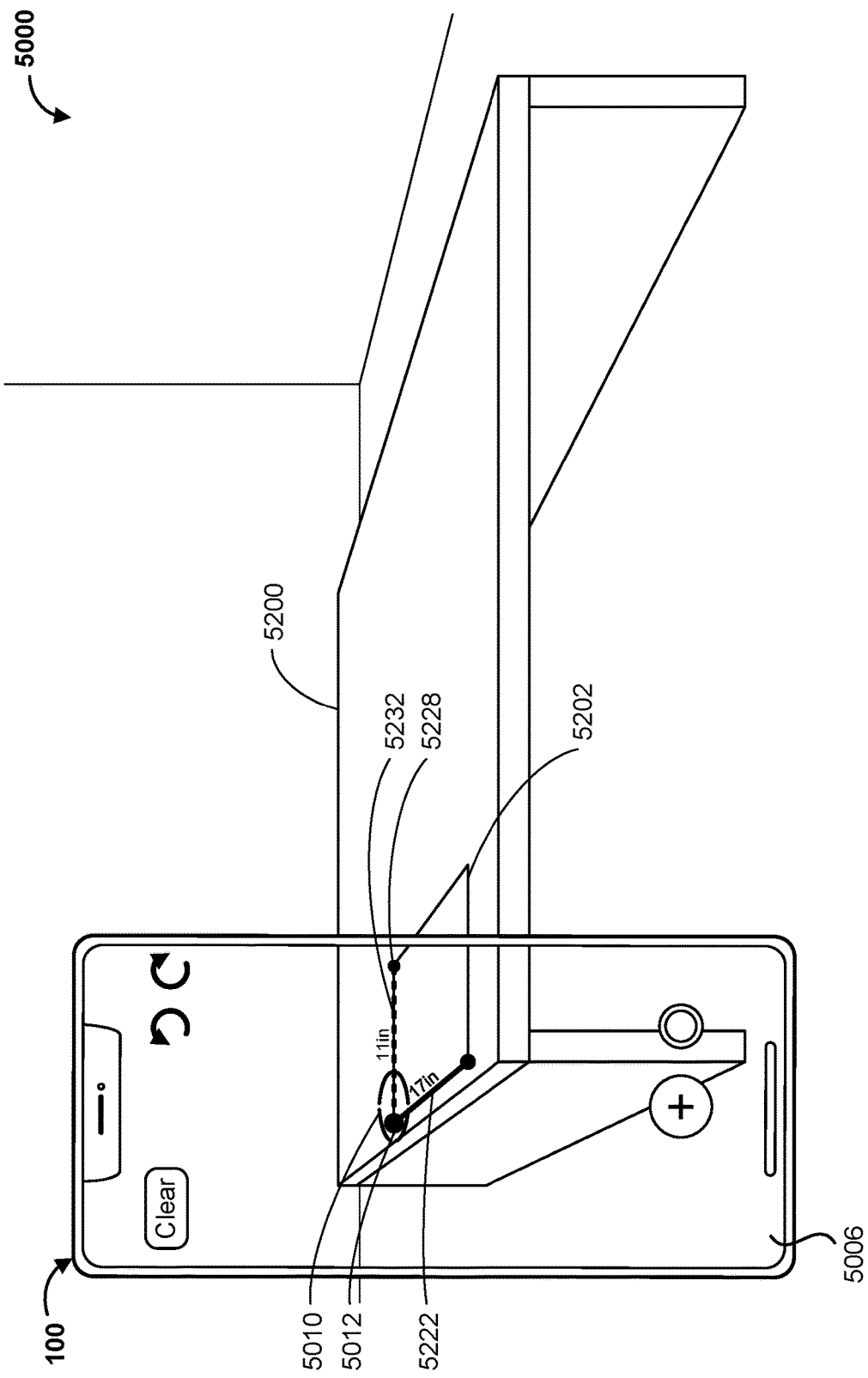
Figure 5C:
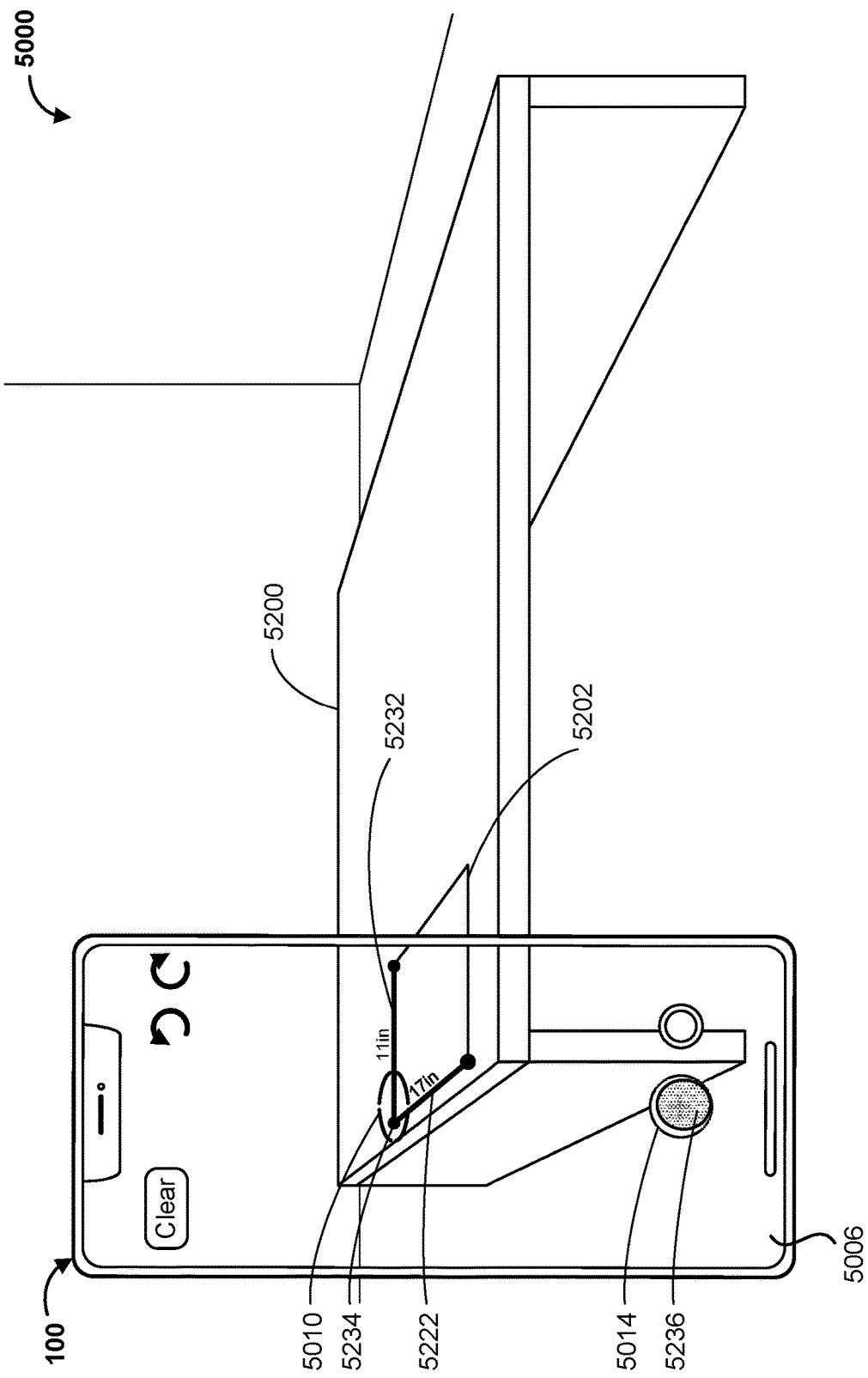
Figure 5C:
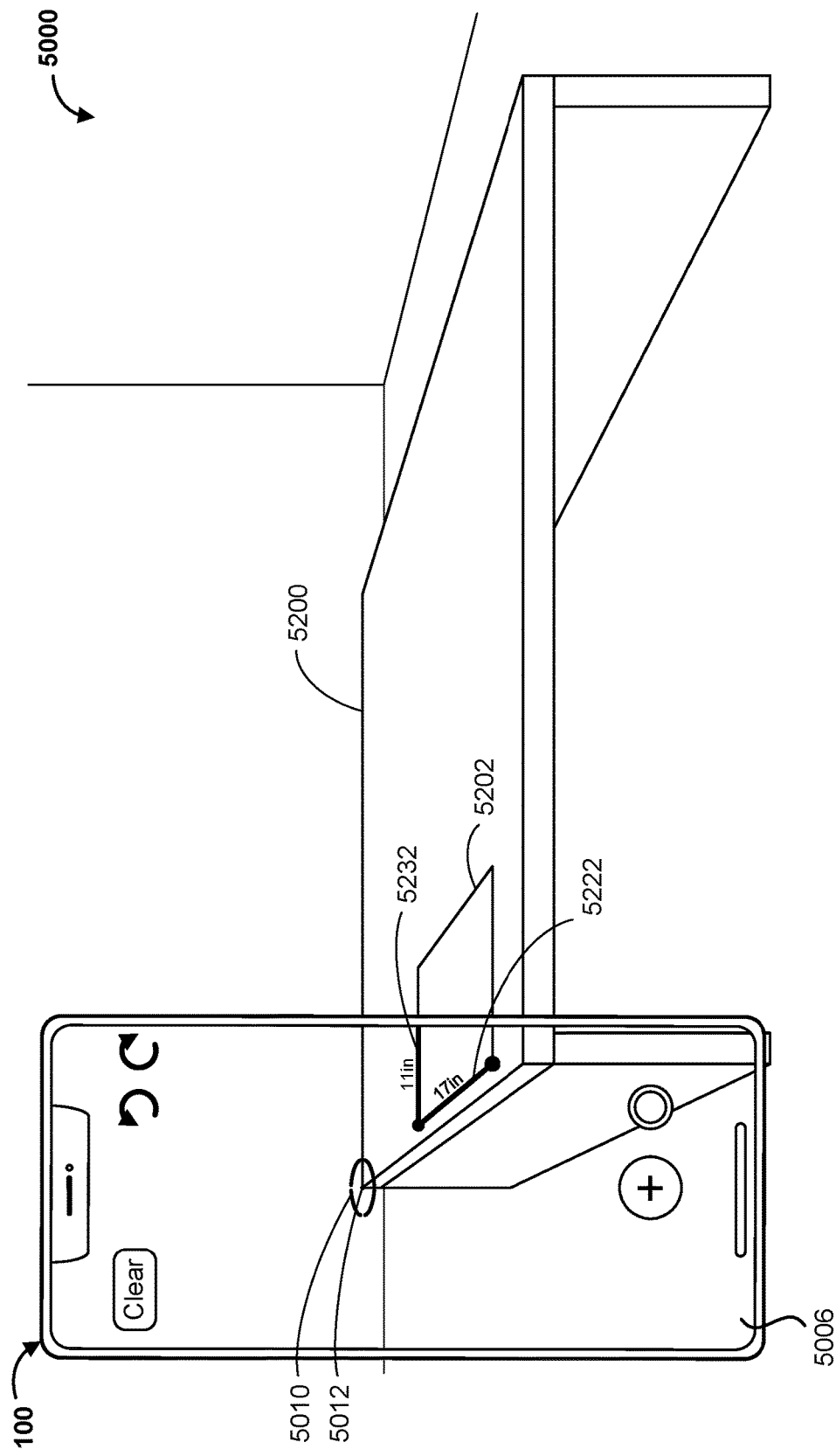
Figure 5C:
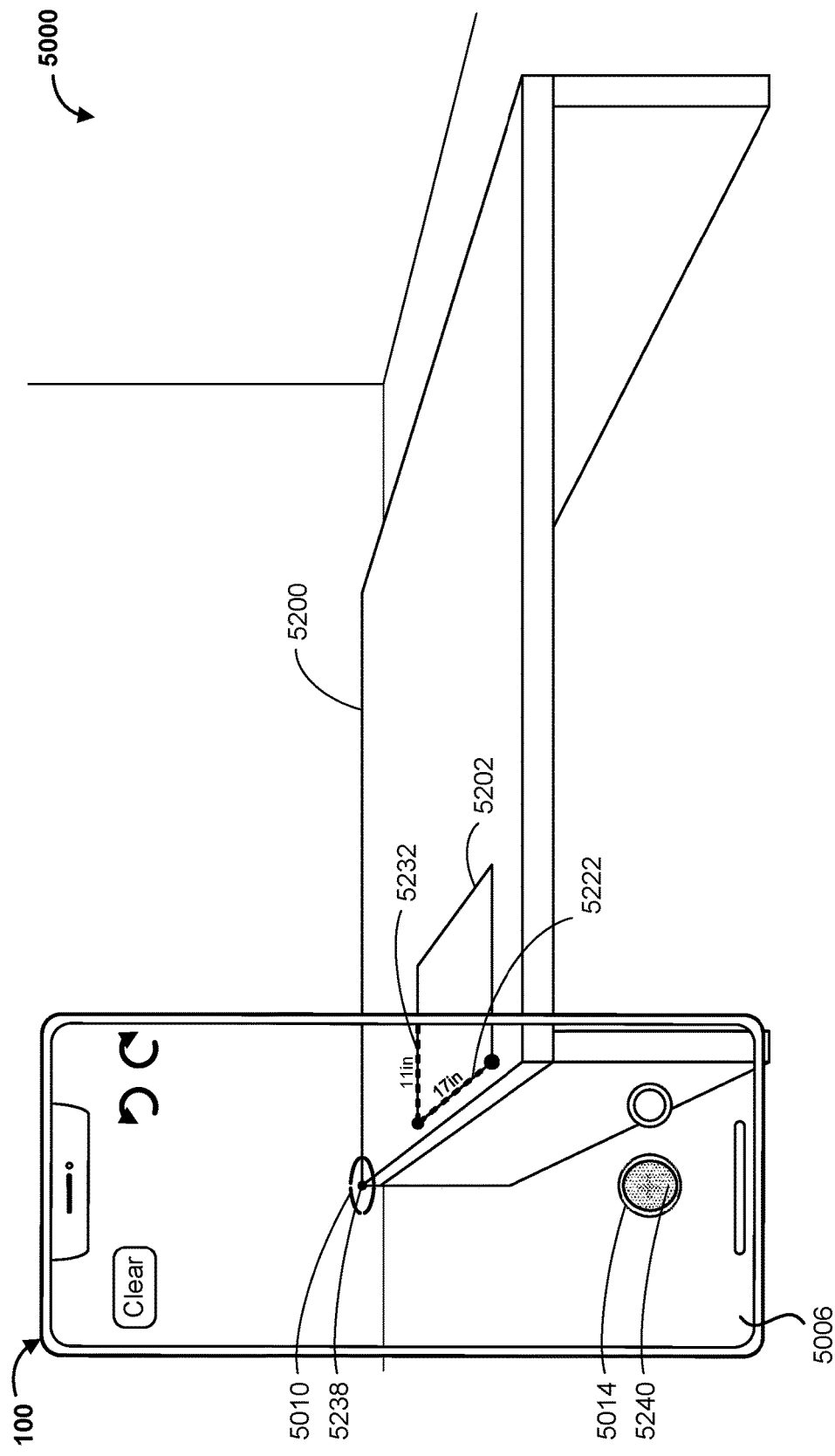
Figure 5C:
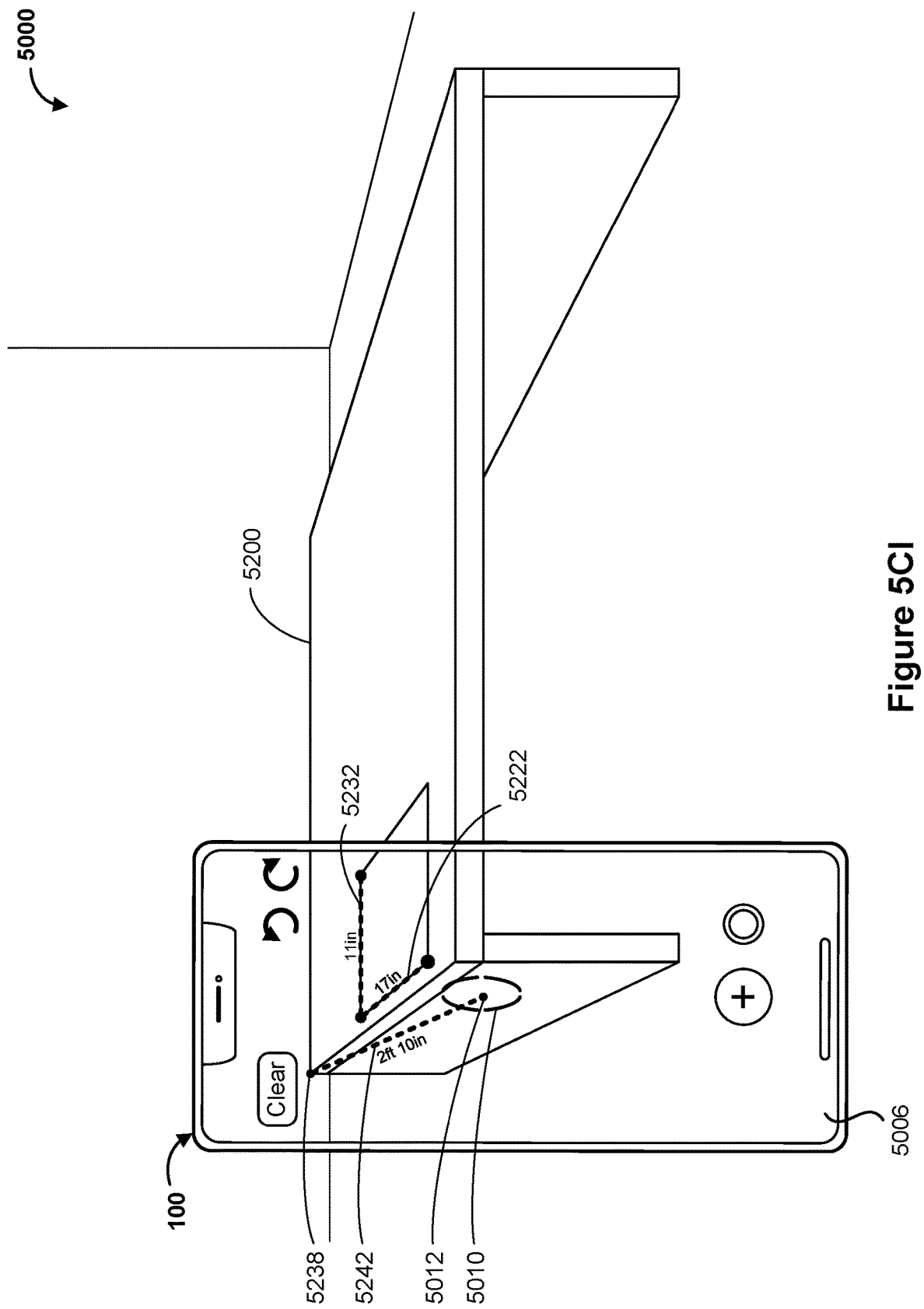
Figure 5C:
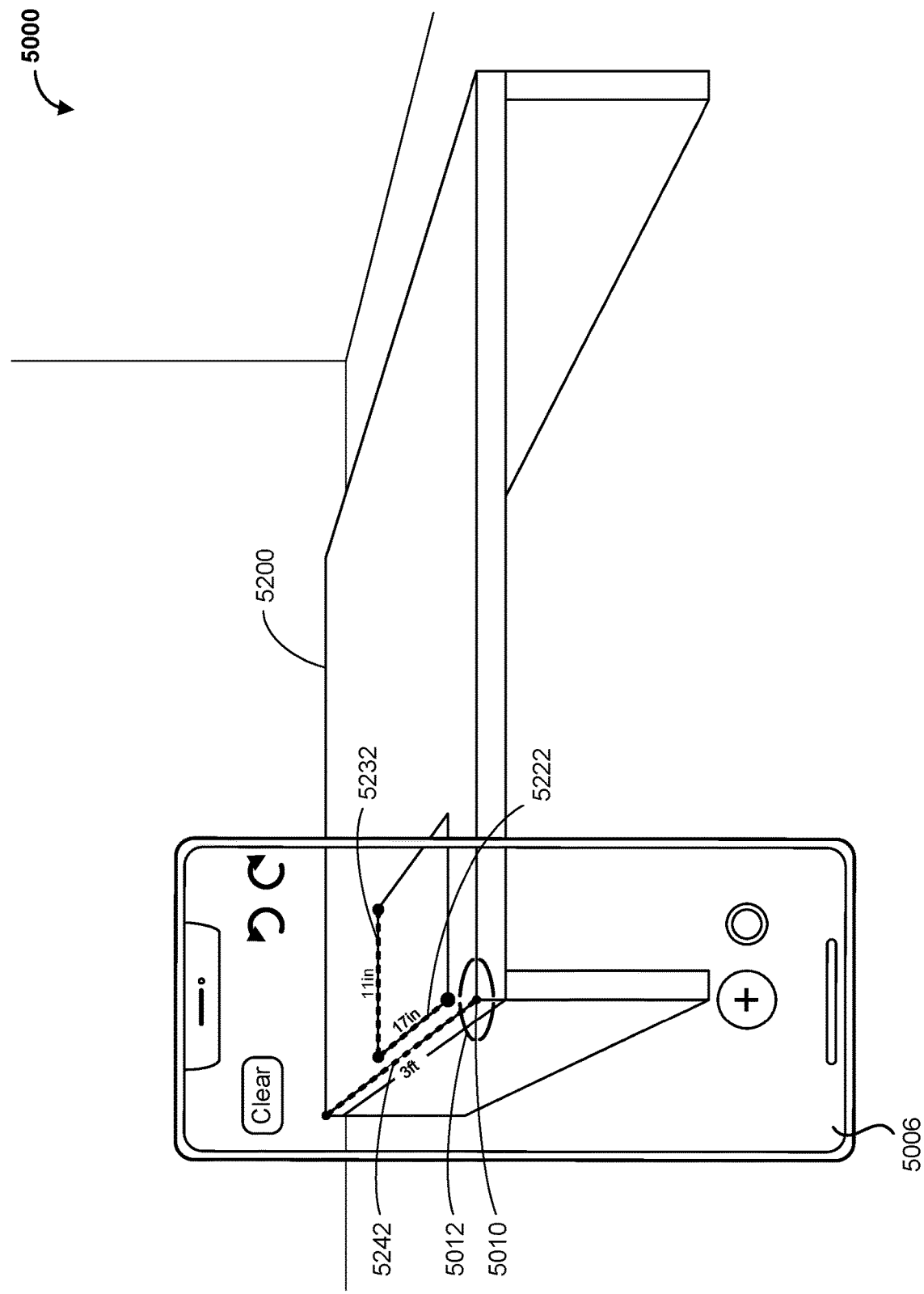
Figure 5C:
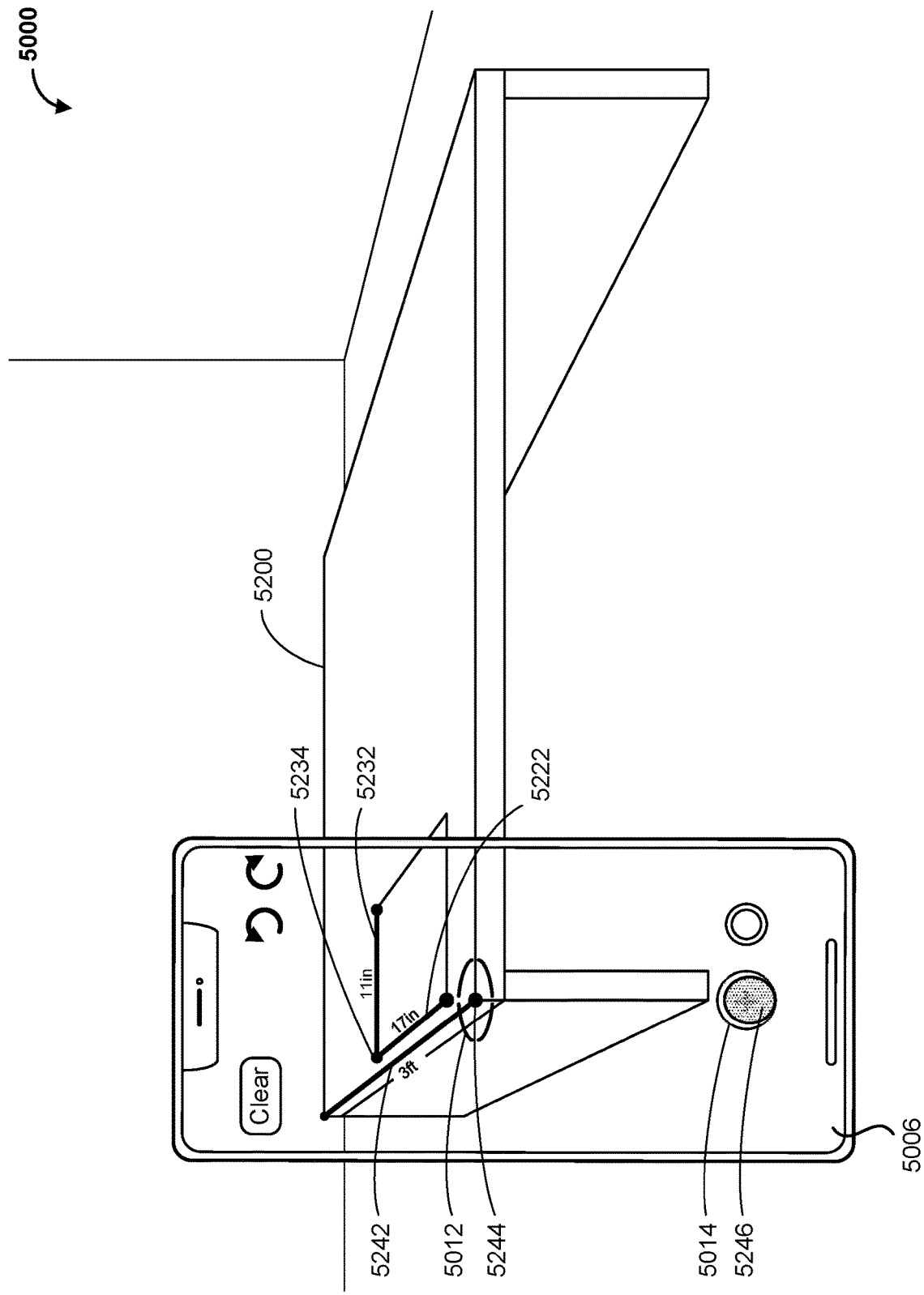
Figure 5C:
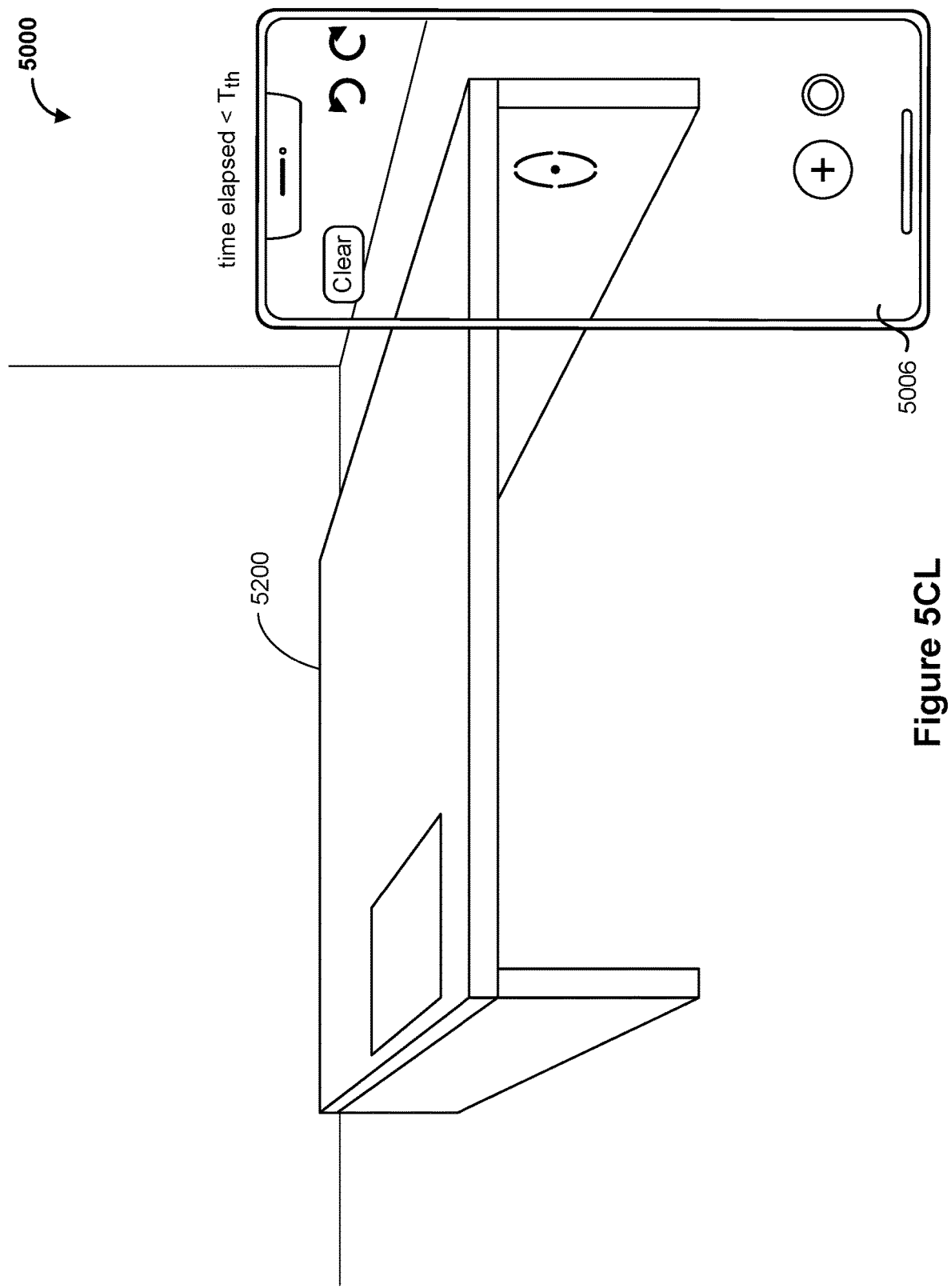
Figure 5C:
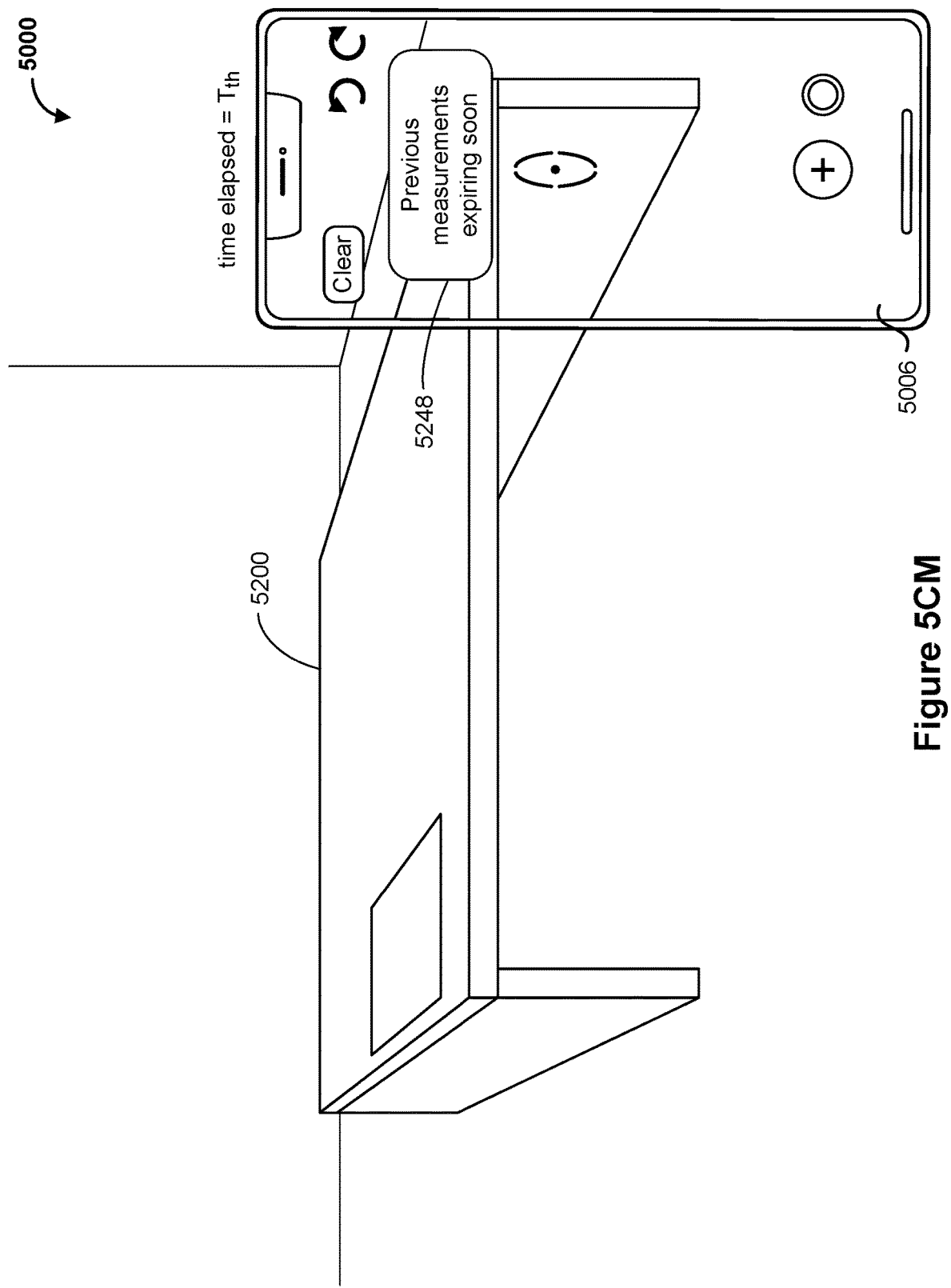
Figure 5C:
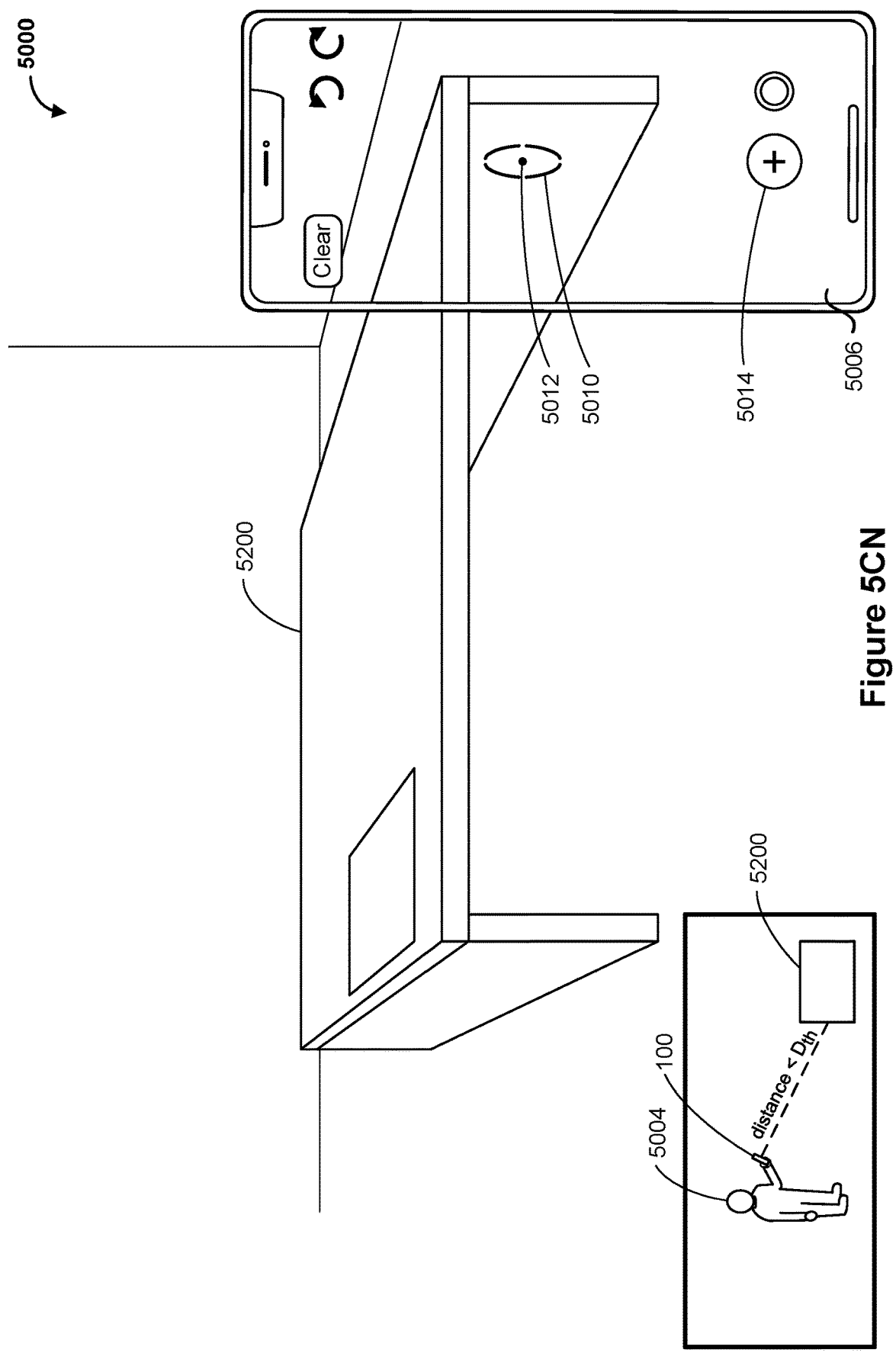
Figure 5C:
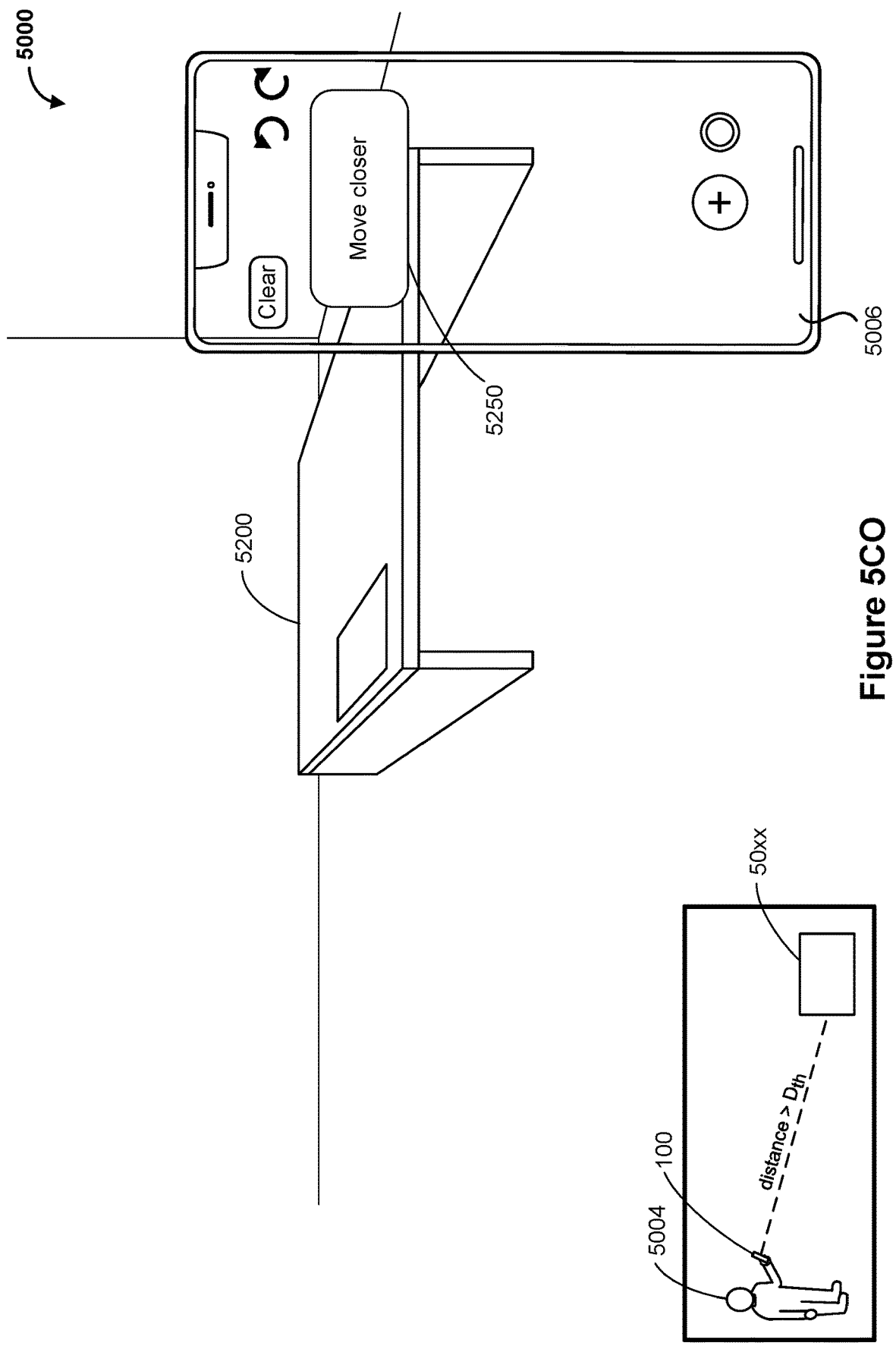

FIGS. 5Y-5AF illustrate the creation of measurement regions corresponding to physical rectangular areas in physical space 5000 (e.g., surfaces of table 5002). In particular, FIGS. 5Y-5Z illustrate the creation of a measurement region corresponding to a physical rectangular area that is displayed in its entirety in the live preview at one time. FIG. 5Y illustrates a transition from FIG. 5X. In FIG. 5Y, user 5004 has moved device 100 from its position in FIG. 5X such that reticle 5010 is positioned over the side surface of table 5002 in the live preview that is adjacent to both measurement segment 5048 and to measurement segment 5066. Device 100 has determined that the region in the live preview over which reticle 5010 (or more specifically, focus point 5012) is positioned corresponds to a physical rectangular area in physical space 5000 (e.g., the determination is based in part on measurement segment 5048 and measurement segment 5066 being adjacent sides of the detected region). Accordingly, device 100 displays indicator 5094 to indicate that the detected region in the live preview over which focus point 5012 is positioned corresponds to a physical rectangular area. In addition, device 100 continues to display measurement segment 5048, corresponding label 5049, measurement segment 5066, corresponding label 5068, and endpoints 5042, 5054, and 5090. FIG. 5Y is similar to FIG. 5P, except that FIG. 5Y includes (a second) measurement segment 5066, with endpoints 5054 and 5090 and label 5068, in addition to (a first) measurement segment 5048, with endpoints 5042 and 5054 and label 5049.

FIG. 5Z illustrates a transition from FIG. 5Y showing the addition of a measurement region to user interface 5006. In particular, FIG. 5Z illustrates activation of measurement addition button 5014, while focus point 5012 is over the detected region indicated by indicator 5094, by touch input 5096 (e.g., a tap gesture) with a contact intensity that is above a minimum contact detection threshold $IT_0$, as indicated by intensity meter 5040. In response to the activation of measurement addition button 5014, device 100 adds a measurement corresponding to the detected region and changes the appearance of indicator 5094 to indicate that the detected region has been confirmed as a measurement region. In addition, device 100 displays label 5098 that indicates an area of the physical rectangular area corresponding to the confirmed region (e.g., "7.5 ft$^2$"). Optionally, in some embodiments, label 5098 is displayed with indicator 5094 prior to the detected region being confirmed as a measurement region (e.g., in some embodiments, label 5098 is displayed with indicator 5094 in FIG. 5Y).

FIG. 5AA illustrates a transition from FIG. 5Z. In FIG. 5AA, user 5004 has moved device 100 vertically upwards such that reticle 5010 is positioned over the horizontal upper-left edge of table 5002 in the live preview and measurement segment 5048. In particular, the midpoint of measurement segment 5048 is within reticle 5010. In some embodiments, as shown in FIG. 5AA, the midpoint of a respective measurement segment displayed in user interface 5006 can be an anchor point to which focus point 5012 snaps. Accordingly, in FIG. 5AA, focus point 5012 is snapped to the anchor point corresponding to the midpoint of measurement segment 5048 (and also corresponding to the midpoint of the horizontal upper-left edge of table 5002). The size of reticle 5010 is decreased to indicate the snapping behavior, as previously described. Tactile output 5100 is generated to indicate the snapping behavior. In addition, device 100 continues to display confirmed-region indicator 5094 over the detected region that corresponds to the physical rectangular area in physical space 5000 (e.g., confirmed-region indicator 5094 is associated with the detected region that corresponds to the physical rectangular area and is displayed over the detected region in the live preview even while the detected region moves in the live preview as device 100 moves).

FIG. 5AB-5AE illustrate creation of a measurement region corresponding to a physical rectangular area in physical space 5000 that is partially visible in the live preview but not visible in its entirety at one time (e.g., a physical rectangular area of which only three sides, in whole or in part, are visible in the live preview). FIG. 5AB illustrates a transition from FIG. 5AA. In FIG. 5AB, user 5004 has moved device 100 horizontally toward the right such that reticle 5010 is positioned over a region in the live preview that is adjacent to measurement segment 5048 and that corresponds to a partial view of the top surface of table 5002. In particular, the left edge of the top surface of table 5002 is visible, a portion of the front edge of the top surface of table 5002 is visible, and a portion of the back edge of the top surface of table 5002 is visible, whereas the right edge of the top surface of table 5002 is not visible. Focus point 5012 has snapped away from the anchor point corresponding to the midpoint of measurement 5048 and is redisplayed at the center of reticle 5010. Reticle 5010 is redisplayed at its increased size, and tactile output 5102 is optionally generated in conjunction with focus point 5012 moving away from the anchor point. In addition, device 100 has determined (e.g., based in part on measurement segment 5048) that the region over which reticle 5010 (or more specifically, focus point 5012) is positioned corresponds to a portion of a physical rectangular area in physical space 5000 (e.g., although the detected region does not appear rectangular in the live preview, from the perspective of device 100). Accordingly, device 100 displays indicator 5104 to indicate that the detected region corresponds to a physical rectangular area. Optionally, in accordance with the movement of device 100, virtual guides 5106 are displayed. Virtual guides 5106 extend horizontally and correspond to features in the live preview identified as extending horizontally, in the direction of movement of device 100. In some embodiments, where multiple features extend in the direction of movement of device 100, multiple virtual guides that extend in the direction of movement are displayed. In some embodiments, virtual guides that extend in the direction of movement are displayed only for features over which corresponding measurement points have already been added in user interface 5006.

FIGS. 5AC-5AD illustrate further horizontal movement of device 100 while reticle 510 is positioned over the top surface of table 5002 in the live preview. In FIG. 5AC, a portion of the front edge and a portion of the back edge of the top surface of table 5002 are visible, whereas neither the left edge nor the right edge of the top surface of table 5002 are visible. In FIG. 5AD, the right edge of the top surface of table 5002 is now visible, in addition to a portion of the front edge and a portion of the back edge. Device 100 continues to display indicator 5104 over the visible portion of the top surface of table 5002 in the live preview as well as horizontal virtual guides in accordance with the horizontal movement of device 100.

FIG. 5AE illustrates a transition from FIG. 5AD showing the addition of a measurement region to user interface 5006. In particular, FIG. 5AE illustrates activation of measurement addition button 5014, while focus point 5012 is over the detected region indicated by indicator 5104, by touch input 5108 (e.g., a tap gesture) with a contact intensity that is above a minimum contact detection threshold $IT_0$, as indicated by intensity meter 5040. In response to the activation of measurement addition button 5014, device 100 adds a measurement corresponding to the entire detected region, although only a portion of the detected region is visible, and changes the appearance of indicator 5104 to indicate that the detected region has been confirmed as a measurement region. In addition, device 100 displays label 5110, label 5112, and label 5114. Label 5110 indicates an area of the (entire) physical rectangular area corresponding to the (entire) confirmed region. Label 5112 indicates a length of a first side of the physical rectangular area corresponding to the confirmed region (e.g., the right edge of the top surface of table 5002). Label 5114 indicates a length of a second side, adjacent to the first side, of the physical rectangular area corresponding to the confirmed region (e.g., the front edge of the top surface of table 5002). Optionally, in some embodiments, label 5114 is displayed with indicator 5104 prior to the detected region being confirmed as a measurement region (e.g., in some embodiments, label 5114 is displayed with indicator 5104 in FIG. 5AD).

FIG. 5AF illustrates a transition from FIG. 5AE. In FIG. 5AF, user 5004 has moved device 100 horizontally toward the left so that the left portion of table 5002 is visible in the live preview. Indicator 5094, measurement segment 5048, and measurement segment 5066 (along with their associated labels) are displayed in user interface 5006 at their respective locations corresponding to respective features of table 5002 (e.g., the side surface, the horizontal upper-left edge, and the vertical front-left edge, respectively, of table 5002), even though device 100 previously moved away from a position at which these elements and the corresponding features of table 5002 were visible in user interface 5006 and has now been moved back to a position (such as that shown in FIG. 5AF) at which these elements and the corresponding features of table 5002 are (again) visible in user interface 5006. In addition, indicator 5104 (along with its associated labels) is displayed over the visible portion of the top surface of table 5002, even though the detected region corresponding to the top surface of table 5002 was confirmed while device 100 displayed a different portion of the top surface of table 5002 that is not currently visible in user interface 5006.

FIG. 5AG illustrates clearing from user interface 5006 all measurements displayed over the live preview of and corresponding to physical space 5000 (e.g., including measurements corresponding to physical objects not currently in the field of view of the camera). In FIG. 5AG, in response to activation of clear button 5022 by touch input 5116, measurement segments 5048 and 5066, measurement points 5042, 5054, and 5090, indicators 5094 and 5104, and all corresponding labels are removed from user interface 506.

FIGS. 5AH-5AS illustrate continuous creation of measurements based on changes in intensity of a continuous touch input. In particular, FIGS. 5AH-5AM illustrate creation of a measurement of the horizontal upper-left edge of table 5002. FIG. 5AH optionally illustrates a transition from FIG. 5AG. In FIG. 5AH, user 5004 has moved device 100 such that the upper-back-left corner of table 5002, as displayed in the live preview, is within reticle 5010. Accordingly, focus point 5012 is snapped to the anchor point corresponding to the upper-back-left corner of table 5002 in the live preview. Reticle 5010 is displayed at its decreased size to indicate the snapping behavior. In addition, tactile output 5118 is optionally generated to indicate the snapping behavior.

FIG. 5AI illustrates a transition from FIG. 5AH showing the addition of a measurement point to user interface 5006. In particular, FIG. 5AI illustrates activation of measurement addition button 5014 by touch input 5120 (e.g., a light press gesture) with a contact intensity that is above light press intensity threshold $IT_L$, as indicated by intensity meter 5040. In response to the activation of measurement addition button 5014, device 100 adds and displays (virtual) measurement point 5122 to user interface 5006 at the current location of focus point 5012. In conjunction with adding measurement point 5122 to user interface 5006, and in response to the increase in contact intensity of touch input 5120 above light press intensity threshold $IT_L$, device 100 optionally generates tactile output 5124 to indicate the addition of a measurement point. In some embodiments, as shown in FIG. 5AI, the size of measurement addition button 5014 is decreased as the contact intensity of touch input 5120 increases (e.g., measurement addition button 5014 is smaller in FIG. 5AI, when the contact intensity of touch input 5120 is above light press intensity threshold $IT_L$, than in FIG. 5K, when the contact intensity of touch input 5038 is between minimum contact detection threshold $IT_0$ and light press intensity threshold $IT_L$).

FIG. 5AJ illustrates a transition from FIG. 5AI showing that touch input 5120 is maintained on measurement addition button 5014 with a contact intensity that is above minimum contact detection threshold $IT_0$ but that has decreased below light press intensity threshold $IT_L$. In some embodiments, device 100 generates a tactile output upon detecting the decrease in the contact intensity of touch input 5120 below light press intensity threshold $IT_L$ (e.g., tactile output 5124 is not generated in response to the increase in contact intensity of touch input 5120 above light press intensity threshold $IT_L$, as shown in FIG. 5AI, but instead is generated in response to the decrease in contact intensity of touch input 5120 below light press intensity threshold $IT_L$, as shown in FIG. 5AJ).

FIG. 5AK illustrates a transition from FIG. 5AJ. In FIG. 5AK, user 5004 has moved device 100 diagonally downward and toward the right while maintaining touch input 5120 on measurement addition button 5014 with a contact intensity that is above minimum contact detection threshold $IT_0$ and below light press intensity threshold $IT_L$. Device 100 has been moved such that reticle 5010 is positioned over the upper-front-left corner of table 5002 as displayed in the live preview. Accordingly, focus point 5012 is snapped to the anchor point corresponding to the upper-front-left corner of table 5002 in the live preview. Reticle 5010 is displayed at its decreased size to indicate the snapping behavior, and, optionally, tactile output 5126 is generated to indicate the snapping behavior. Measurement point 5122 continues to be displayed over the upper-back-left corner of table 5002 in the live preview, and dynamic measurement segment 5128 is displayed between the current position of focus point 5012 and measurement point 5122. In addition, in accordance with the movement of device 100, virtual guide 5130 is displayed, where virtual guide 5130 extends diagonally from measurement point 5122 and along the horizontal upper-left edge of table 5002 in user interface 5006.

FIG. 5AL illustrates a transition from FIG. 5AK showing the addition of a measurement point to user interface 5006. In particular, FIG. 5AL illustrates activation of measurement addition button 5014, while touch input 5120 is maintained on measurement addition button 5014, by an increase in the contact intensity of touch input 5120 to above light press intensity threshold $IT_L$, as indicated by intensity meter 5040. In response to the activation of measurement addition button 5014, device 100 adds and displays (virtual) measurement point 5132 to user interface 5006 at the current location of focus point 5012 and as the second endpoint of measurement segment 5128. In conjunction with adding measurement point 5132 to user interface 5006, and in response to the increase in contact intensity of touch input 5120 above light press intensity threshold $IT_L$, device 100 optionally generates tactile output 5134 to indicate the addition of a measurement point. In some embodiments, as shown in FIG. 5AL (and as previously described with reference to FIG. 5AI), the size of measurement addition button 5014 is decreased as the contact intensity of touch input 5120 increases. Optionally, as shown in FIG. 5AL, upon the completion of measurement segment 5128, device 100 ceases to display virtual guide 5130.

FIG. 5AM illustrates a transition from FIG. 5AL showing that touch input 5120 is maintained on measurement addition button 5014 with a contact intensity that is above minimum contact detection threshold $IT_0$ but that has decreased below light press intensity threshold $IT_L$. In some embodiments, device 100 generates a tactile output upon detecting the decrease in the contact intensity of touch input 5120 below light press intensity threshold $IT_L$, as described herein with respect to FIG. 5AJ.

FIGS. 5AN-5AR illustrates a transition from FIG. 5AM showing the addition of another measurement segment that is continuous with (e.g., has an endpoint in common with)

measurement segment 5128, using the same continuous touch input 5120. In FIG. 5AN, user 5004 has moved device 100 diagonally upward and toward the right while maintaining touch input 5120 on measurement addition button 5014 with a contact intensity that is above minimum contact detection threshold $IT_0$ and below light press intensity threshold $IT_L$. Device 100 has been moved such that reticle 5010 is positioned over an area of the top surface of table 5002 that does not include any features to which focus point 5012 has snapped. Accordingly, focus point 5012 is displayed at the center of reticle 5010, and reticle 5010 is displayed at its increased size. Measurement point 5122, measurement segment 5128, and measurement point 5132 continue to be displayed over the live preview, and dynamic measurement segment 5136 is displayed between the current position of focus point 5012 and measurement point 5122. Because the live preview does not include any features that extend in the direction of movement of device 100, no virtual guides are displayed. For example, the movement of device 100 is more than a predefined angle from horizontal, so virtual guides are not displayed for features in the live preview that extend horizontally; in addition, the movement of device 100 is more than a predefined angle from vertical, so virtual guides are not displayed for features in the live preview that extend vertically.

FIG. 5AO illustrates a transition from FIG. 5AN. In FIG. 5AO, user 5004 has moved device 100 horizontally toward the right while maintaining touch input 5120 on measurement addition button 5014 with a contact intensity that is above minimum contact detection threshold $IT_0$ and below light press intensity threshold $IT_L$. Device 100 has been moved such that measurement point 5122, measurement segment 5128, and measurement point 5132 are no longer displayed in user interface 5006 because the physical features to which they correspond are no longer within the live preview displayed in user interface 5006. Dynamic measurement segment 5136 continues to be displayed extending from the current position of focus point 5012. However, because measurement point 5132 (the other endpoint of dynamic measurement segment 5136) is no longer displayed in user interface 5006, dynamic measurement segment 5136 extends only to the edge of user interface 5006 (e.g., toward a projected position of measurement point 5132). In addition, in accordance with the horizontal movement of device 100, virtual guide 5138 is displayed, where virtual guide 5138 extends horizontally from (the projected position of) measurement point 5132 and along the horizontal front edge of table 5002 in user interface 5006.

FIG. 5AP illustrates a transition from FIG. 5AO. In FIG. 5AP, user 5004 has moved device 100 toward the right and slightly downward while maintaining touch input 5120 on measurement addition button 5014 with a contact intensity that is above minimum contact detection threshold $IT_0$ and below light press intensity threshold $IT_L$. Device 100 has been moved such that virtual guide 5138, corresponding to the horizontal front edge of table 5002 in the live preview, is at least partially within reticle 5010 (e.g., focus point 5012 is within a predefined distance (e.g., the predefined distance being the radius of reticle 5010) of virtual guide 5138 and the horizontal front edge of table 5002 in the live preview). Accordingly, focus point 5012 is snapped to virtual guide 5138 (e.g., to a point along virtual guide 5138 that is the shortest distance from the center of reticle 5010). Reticle 5010 is displayed at its decreased size, and, optionally, tactile output 5140 is generated, to indicate the snapping behavior. Dynamic measurement segment 5136 continues to be displayed extending from the current position of focus point 5012 to the edge of user interface 5006 (e.g., toward a projected position of measurement point 5132). In addition, in accordance with the continued movement of device 100 that is within a predefined angle of horizontal, horizontal virtual guide 5138 continues to be displayed along the front edge of table 5002 in user interface 5006.

FIG. 5AQ illustrates a transition from FIG. 5AP. In FIG. 5AQ, user 5004 has moved device 100 horizontally toward the right while maintaining touch input 5120 on measurement addition button 5014 with a contact intensity that is above minimum contact detection threshold $IT_0$ and below light press intensity threshold $IT_L$. Device 100 has been moved such that reticle 5010 is positioned over the upper-front-right corner of table 5002 as displayed in the live preview. Accordingly, focus point 5012 is snapped to the anchor point corresponding to the upper-front-right corner of table 5002 in the live preview. Reticle 5010 is displayed at its decreased size to indicate the snapping behavior. Dynamic measurement segment 5136 continues to be displayed extending from the current position of focus point 5012 to the edge of user interface 5006 (e.g., toward a projected position of measurement point 5132). In addition, in the sequence of FIGS. 5AN-5AQ, the label corresponding to measurement segment 5136 is updated to reflect the changes in the length of the measurement represented by dynamic measurement segment 5136 as device 100 is moved. In addition, in accordance with the continued horizontal movement of device 100, horizontal virtual guide 5138 continues to be displayed along the front edge of table 5002 in user interface 5006.

FIGS. 5AR-5AS illustrate a transition from FIG. 5AQ showing the addition of a measurement point to user interface 5006. In particular, FIG. 5AR illustrates activation of measurement addition button 5014, while touch input 5120 is maintained on measurement addition button 5014, by an increase in the contact intensity of touch input 5120 to above light press intensity threshold $IT_L$, as indicated by intensity meter 5040. In response to the activation of measurement addition button 5014, device 100 adds and displays (virtual) measurement point 5142 to user interface 5006 at the current location of focus point 5012 and as the second endpoint of measurement segment 5136. In conjunction with adding measurement point 5142 to user interface 5006, and in response to the increase in contact intensity of touch input 5120 above light press intensity threshold $IT_L$, device 100 optionally generates tactile output 5144 to indicate the addition of a measurement point. In addition, the size of measurement addition button 5014 is (optionally) decreased as the contact intensity of touch input 5120 increases. Optionally, as shown in FIG. 5AR, device 100 continues to display virtual guide 5138 even after the completion of measurement segment 5136.

FIG. 5AS illustrates liftoff of touch input 5120 from measurement addition button 5014. In some embodiments, after the liftoff of touch input 5120 from measurement addition button 5014 (and before any subsequent touch inputs are detected), further movement of device 100 will not result in display of a new dynamic measurement segment that extends from measurement point 5142 (e.g., and that is continuous with measurement segment 5136). That is, the liftoff of continuous touch input 5120 ends the continuous creation of new measurement segments based on touch input 5120.

In some embodiments, the device responds differently to a series of tap gestures (where contact is not maintained with the touch-sensitive surface) than to a series of pressing gestures (where contact is maintained with the touch-sensitive surface). For inputs that are discrete tap gestures (rather than pressing gestures made with a single continuously detected contact), measurement segments are not continuously created with each subsequently added measurement point. That is, for a series of tap gestures, if a user drops four points in succession, a measurement segment will be created between the first point and second point, and another measurement segment will be created between the third point and the fourth point, but a measurement segment will not be created between the second point and the third point.

FIG. 5AT illustrates a transition from FIG. 5AS. In FIG. 5AT, device 100 has been moved such that reticle 5010 is positioned over the upper-front-left corner of table 5002 as displayed in the live preview and over measurement point 5132. Accordingly, focus point 5012 is snapped to measurement point 5132, at the anchor point corresponding to the upper-front-left corner of table 5002 in the live preview. Reticle 5010 is displayed at its decreased size to indicate the snapping behavior. Measurement segment 5128 and measurement segment 5136 are displayed in user interface 5006 at their respective locations corresponding to respective features of table 5002 (e.g., the horizontal upper-left edge and the horizontal front edge, respectively, of table 5002), in accordance with the corresponding features of table 5002 being displayed (again) in the live preview in user interface 5006. Measurement segment 5128 is displayed between its endpoints, measurement point 5122 and measurement point 5132. Measurement segment 5136 is displayed extending from measurement point 5132 (one endpoint of measurement segment 5136) to the edge of user interface 5006 (e.g., toward a projected position of measurement point 5142, which is the other endpoint of measurement segment 5136, and which is not currently visible in user interface 5006). In addition, in accordance with reticle 5010 being positioned over measurement point 5132, virtual guides 5146, 5148, and 5150 extending from measurement point 5132 are displayed. Virtual guide 5146 extends in an x-direction (e.g., horizontally along the horizontal front edge of table 5002) from measurement point 5132. Virtual guide 5148 extends in a y-direction (e.g., vertically along the vertical front-left edge of table 5002) from measurement point 5132. Virtual guide 5150 extends in a z-direction (e.g., horizontally along the horizontal upper-left edge of table 5002) from measurement point 5132.

FIGS. 5AU-5AX illustrate a transition from FIG. 5AT showing the addition of a measurement segment to user interface 5006. FIG. 5AU illustrates activation of measurement addition button 5014 by touch input 5152 (e.g., a tap gesture) with a contact intensity that is above a minimum contact detection threshold $IT_0$, as indicated by intensity meter 5040. In response to the activation of measurement addition button 5014, device 100 uses measurement point 5132 as the starting point for a new measurement segment to be added and, optionally, generates tactile output 5154 to indicate the beginning of a new measurement segment.

FIG. 5AV illustrates that (after liftoff of touch input 5152) user 5004 has moved device 100 downward along the vertical front-left edge of table 5002. Focus point 5012 is snapped to an anchor point along the vertical front-left edge of table 5002 that is not the lower-front-left corner of table 5002. Reticle 5010 is displayed at its decreased size to indicate the snapping behavior. Also, in accordance with the vertical movement, device 100 continues to display virtual guide 5148, which extends vertically from measurement point 5132, and has ceased to display virtual guides 5146 and 5150, which do not extend vertically (or in a direction that is within a predefined angle of vertical) from measurement point 5132. In addition, dynamic measurement segment 5156 is displayed between measurement point 5132 and the current position of focus point 5012.

FIG. 5AW illustrates activation of measurement addition button 5014 by touch input 5158 (e.g., a tap gesture) with a contact intensity that is above a minimum contact detection threshold $IT_0$, as indicated by intensity meter 5040. In response to the activation of measurement addition button 5014, device 100 adds and displays measurement point 5160 to user interface 5006 at the current location of focus point 5012 and as the second endpoint of measurement segment 5156, which becomes a completed measurement segment. In conjunction with adding measurement point 5160 to user interface 5006, device 100 optionally generates tactile output 5162 (e.g., to indicate the completion of a measurement segment). FIG. 5AX illustrates liftoff of touch input 5158 from measurement addition button 5014.

FIGS. 5AY-5BE illustrate example zoom interactions with the augmented reality environment in user interface 5006. In particular, FIG. 5AY-5BA illustrate zoom-assisted repositioning of a displayed measurement point. FIG. 5AY illustrates touch input 5164 detected on measurement point 5160 with a contact intensity that is above a minimum contact detection threshold $IT_0$, as indicated by intensity meter 5040. In response to detecting touch input 5164 on measurement point 5160, device 100 enlarges, or zooms into, a portion of the live preview that includes measurement point 5160 (e.g., the portion of the live preview that is centered on measurement point 5160). An amount of zoom of the live preview is based on the distance between device 100 and the point on table 5002 to which measurement point 5160 corresponds (e.g., a point on table 5002 just above the lower-front-left corner of table 5002). For example, in FIG. 5AY, when device 100 is a distance $d_1$ from the point on table 5002 to which measurement point 5160 corresponds, the live preview is enlarged by a zoom factor of 4×.

FIG. 5AZ illustrates a transition from FIG. 5AY showing movement of touch input 5164 across touch screen 112 (e.g., a pan gesture or a drag gesture by the contact in touch input 5164) such that touch input 5164 is over an anchor point corresponding to the lower-front-left corner of table 5002. Measurement point 5160 moves in user interface 5006 with the movement of touch input 5164 across touch screen 112. In some embodiments, as shown in FIG. 5AZ, measurement point 5160 is snapped to the anchor point over which touch input 5164 has moved. Accordingly, measurement point 5160 is displayed at the anchor point corresponding to the lower-front-left corner of table 5002. In conjunction with the movement of measurement point 5160, measurement segment 5156 is extended and its label is updated accordingly (to indicate a length of the vertical front-left edge of table 5002). In addition, device 100 optionally generates tactile output 5166 to indicate the snapping behavior.

In some embodiments, device 100 determines a vector from the position of the camera to the location on a detected surface in physical space 5000 over which a measurement point is displayed. In some embodiments, device 100 determines an angle between the determined vector and the detected surface. In some embodiments, in accordance with a determination that the determined vector is within a predefined threshold angle of the detected surface (e.g., the determined angle is less than a predefined threshold angle, such as 15, 18, 20, 25, or 30 degrees), when receiving a set of one or more user inputs to move the measurement point, the measurement point is moved through locations in user interface 5006 that correspond to locations along the determined vector.

FIG. 5BA illustrates a transition from FIG. 5AZ. In some embodiments, as shown in FIG. 5BA, upon liftoff of touch input 5164, device 100 ceases to display the enlarged (portion of the) live preview and redisplays the live preview without zoom. In some embodiments, after liftoff of touch input 5164, device 100 continues to display the enlarged live preview until a subsequent input (to exit the zoomed live preview and return to the live preview displayed without zoom) is detected.

Because device 100 was maintained in the same position in FIGS. 5AX-5AZ, reticle 5010 is displayed in FIG. 5BA at the same size and at the same position as it was in FIG. 5AX (prior to the zoom-assisted repositioning of measurement point 5160). Because measurement point 5160 was repositioned to the anchor point corresponding to the lower-front-left corner of table 5002 as described with respect to FIGS. 5AY-5AZ, measurement point 5160 is displayed at that anchor point in the live preview that is displayed without zoom in FIG. 5BA, outside of reticle 5010. Extended measurement segment 5156 and its corresponding updated label are also displayed.

FIG. 5BB-5BC illustrate another example zoom interaction. FIG. 5BB is similar to FIG. 5AX, except that device 100 is positioned closer to table 5002 (or, more specifically, to the point on table 5002 to which measurement point 5160 corresponds) in FIG. 5BB than in FIG. 5AX (as indicated by the side view of user 5004, device 100, and table 5002 in FIG. 5AY), at a distance $d_2$ that is less than the distance $d_1$ in FIG. 5AY. Accordingly, in response to detecting touch input 5168 on measurement point 5160, as shown in FIG. 5BC, device 100 zooms into a portion of the live preview that includes measurement point 5160. The amount of zoom of the live preview in FIG. 5BC is based on the lesser distance $d_2$ between device 100 and table 5002, and thus the amount of zoom of the live preview in FIG. 5BC, corresponding to a zoom factor of 2×, is less than the amount of zoom in FIG. 5AY, which corresponds to a zoom factor of 4×. In addition, because device 100 is closer to table 5002 in FIG. 5BB than in FIG. 5AX, scale markers are displayed at one-foot intervals along measurement segment 5156 (e.g., as opposed to no scale markers being displayed in FIG. 5AX). Also, because device 100 is closer to table 5002 in FIG. 5BB than in FIG. 5AX, the size of the labels corresponding to the displayed measurements is larger in FIG. 5BB than in FIG. 5AX.

FIG. 5BD-5BE illustrate another example zoom interaction. FIG. 5BD is similar to FIG. 5BB, except that device 100 is positioned closer to table 5002 (or, more specifically, to the point on table 5002 to which measurement point 5160 corresponds) in FIG. 5BD than in FIG. 5BB, at a distance $d_3$ that is less than the distance $d_2$ in FIG. 5BB. Accordingly, in response to detecting touch input 5170 on measurement point 5160, as shown in FIG. 5BE, device 100 zooms into a portion of the live preview that includes measurement point 5160. The amount of zoom of the live preview in FIG. 5BE is based on the lesser distance $d_3$ between device 100 and table 5002, and thus the amount of zoom of the live preview in FIG. 5BE, corresponding to a zoom factor of 1.5×, is less than the amount of zoom in FIG. 5BC, which corresponds to a zoom factor of 2×. In addition, because device 100 is closer to table 5002 in FIG. 5BD than in FIG. 5BD, scale markers are displayed at one-inch intervals along measurement segment 5156 (e.g., as opposed to the scale markers displayed at one-foot intervals in FIG. 5BB). Also, because device 100 is closer to table 5002 in FIG. 5BD than in FIG. 5BB, the size of the labels corresponding to the displayed measurements is larger in FIG. 5BD than in FIG. 5BB. In some embodiments, the scale at which markers are displayed along a measurement segment becomes finer as the distance between device 100 and the physical feature corresponding to the measurement segment decreases (e.g., at distances above a first distance, no scale markers are displayed; at distances between the first distance and a second distance (shorter than the first distance), scale markers are displayed at one-foot intervals; at distances between the second distance and a third distance (shorter than the second distance), scale markers are displayed at one-inch intervals; at distances shorter than the third distance, scale markers are displayed at quarter-inch intervals, and so on).

In some embodiments, the amount of zoom displayed in FIG. 5AY is a maximum amount of zoom, such that when the distance between device 100 and table 5002 (or the point on table 5002 to which the displayed measurement point corresponds) is greater than the distance $d_1$ shown in FIG. 5AY, the amount of zoom of the live preview still corresponds to a zoom factor of 4×. In some embodiments, the amount of zoom displayed in FIG. 5BE is a minimum amount of zoom, such that when the distance between device 100 and table 5002 (or the point on table 5002 to which the displayed measurement point corresponds) is less than the distance $d_3$ shown in FIG. 5BE, the amount of zoom of the live preview still corresponds to a zoom factor of 1.5×.

Similarly, in some embodiments, the size of the labels displayed in FIG. 5AY is a minimum label size, such that when the distance between device 100 and table 5002 (or the point on table 5002 to which the displayed measurement point corresponds) is greater than the distance $d_1$ shown in FIG. 5AY, the size of the labels is the same as in FIG. 5AY. In some embodiments, the size of the labels displayed in FIG. 5BE is a maximum label size, such that when the distance between device 100 and table 5002 (or the point on table 5002 to which the displayed measurement point corresponds) is less than the distance $d_3$ shown in FIG. 5BE, the size of the labels is the same as in FIG. 5BE.

FIG. 5BF-5BK illustrate capturing images of the augmented reality environment in user interface 5006. FIG. 5BF optionally illustrates a transition from FIG. 5BA. In FIG. 5BF, user 5004 has positioned device 100 such that measurement segments 5128, 5136, and 5156, and their corresponding endpoints and labels, are displayed in user interface 5006, the corresponding features of table 5002 being visible in the live preview. FIG. 5BG illustrates activation of media capture button 5016 by touch input 5172, as indicated by the increase in intensity shown in intensity graph 5180, which shows the contact intensity of touch input 5172 over time.

FIG. 5BH illustrates a transition from FIG. 5BG based on liftoff of touch input 5172 before a predefined threshold time Tin (e.g., touch input 5172 is a tap gesture). Accordingly, intensity graph 5180 shows a corresponding decrease in the contact intensity of touch input 5172 to zero before time Tin. In response to detecting liftoff of touch input 5172 before the predefined threshold time Tin, device 100 captures image 5174 of the augmented reality environment. Captured image 5174 is a still image that includes an image of the field of view of the camera, corresponding to an instantaneous snapshot of the live preview, and measurement segments 5128, 5136, and 5156, along with their corresponding endpoints and labels, superimposed on the image of the field of view of the camera. In some embodiments, as shown in FIG. 5BH, captured image 5174 does not include images of the buttons/controls in user interface 5006.

FIG. 5BI illustrates capture of an image in response to activation of media capture button 5016 while device 100 is at a different position relative to table 5002 (facing the left side surface of table 5002) such that a different perspective view of table 5002 is displayed in the live preview. In response to activation of media capture button 5016 by a touch input and liftoff of the touch input before the predefined threshold time $T_{th}$, as indicated by intensity graph 5180, device 100 captures image 5176 of the augmented reality environment. Captured image 5176 is a still image that includes an image of table 5002 from the perspective of device 100 at its position in FIG. 5BI (e.g., facing the left side surface of table 5002). Measurement segments 5128, 5136, and 5156 and their corresponding endpoints and labels are superimposed on the corresponding features of table 5002 in captured image 5176 based on the perspective of device 100 in FIG. 5BI.

FIG. 5BJ illustrates an alternate transition from FIG. 5BG. Together with FIG. 5BG, FIGS. 5BJ-5BK illustrate capture of a video of the augmented reality environment in response to a touch input maintained on media capture button 5016 (e.g., a long-press gesture). In FIG. 5BJ, touch input 5172 is maintained on media capture button 5016 past the predefined threshold time $T_{th}$, as indicated by intensity graph 5180. Accordingly, device 100 captures video of the field of view of the camera. Timer 5178 is displayed in user interface 5006 and indicates a current length of the captured video. In addition, the captured video includes any measurements in the field of view of the camera (e.g., measurement segments 5128, 5136, and 5156, and their corresponding endpoints and labels, are superimposed on the corresponding features of table 5002 in the captured video). In some embodiments, the captured video does not include images of the buttons/controls in user interface 5006.

FIG. 5BK illustrates that device 100 has moved while touch input 5172 is maintained on media capture button 5016. Accordingly, device 100 has continued to capture video of the field of view of the camera as device 100 moved, as indicated by the current video length shown by timer 5178 in FIG. 5BK being longer than that shown by timer 5178 in FIG. 5BJ. The captured video includes additional portions of measurement segment 5136 superimposed over corresponding features in the field of view of the camera as device 100 moves to its position as shown in FIG. 5BK.

FIGS. 5BL-5BM illustrate displaying additional information about a selected measurement and options for sharing the information to another application, process, or device. FIG. 5BL illustrates touch input 5182 (e.g., a tap gesture by a contact in the touch input) detected on measurement segment 5156 with a contact intensity that is above a minimum contact detection threshold $IT_0$, as indicated by intensity meter 5040. FIG. 5BM illustrates that, in response to detecting touch input 5182 on measurement segment 5156, device 100 displays measurement management interface 5184. Measurement management interface 5184 includes a label that describes the physical object, table 5002, to which measurement 5156 corresponds. For example, measurement management interface 5184 includes label 5186-a classifying table 5002 (e.g., identifying table 5002 as a "Table"). Measurement management interface 5184 also includes label 5186-b classifying the relationship between measurement 5156 and table 5002 (e.g., identifying measurement 5156 as a "height" of table 5002). In some embodiments, the relationship between measurement 5156 and table 5002 is classified as a "height" based on the vertical movement of device 100 while adding measurement 5156 to user interface 5006.

In some embodiments, in response to touch input 5182, information about measurement 5156 (e.g., the classification of the physical object to which measurement 5156 corresponds and the relationship between measurement 5156 and the physical object, a magnitude of measurement 5156 such as length or area, an image of measurement 5156, etc.) is copied to a clipboard process executing on device 100. In some embodiments, measurement management interface includes a plurality of destinations to which information about selected measurement 5156 can be transmitted (e.g., icon 5192 corresponding to e-mail client module 140 (FIG. 1A), icon 5194 corresponding to IM module 141 (FIG. 1A), and icon 5196 corresponding to a file transfer protocol between electronic devices). In some embodiments, measurement management interface 5184 is displayed in response to touch input 5182 satisfying an intensity threshold (e.g., light press intensity threshold $IT_L$) that is above minimum contact detection threshold $IT_0$ (e.g., in response to touch input 5182 being a light press or deep press gesture).

FIG. 5BN illustrates an example control center user interface 5188 that includes augmented reality measurement application icon 5190. Activation of augmented reality measurement application icon 5190 launches the augmented reality measurement application and displays user interface 5006 (e.g., as described with reference to FIG. 5A).

FIG. 5BO illustrates a context in which user interfaces described with respect to FIGS. 5BO-5CO are used. FIG. 5BO is similar to FIG. 5A in that FIG. 5BO illustrates a view of physical space 5000 that includes device 100, except that physical space 5000 includes table 5200 on which object 5202 is placed (instead of table 5002). Object 5202 is in the field of view of the camera(s) of device 100 and is visible in the live preview of physical space 5000 displayed in user interface 5006 on device 100. In some embodiments, as shown in FIG. 5BO, reticle 5010 in user interface 5006 is tilted to appear to be co-planar with the top surface of table 5200 to indicate the surface that has been detected and that corresponds to the current location of focus point 5012.

FIGS. 5BP-5BQ illustrate a first way of adding a virtual measurement point to user interface 5006, in accordance with some embodiments. FIG. 5BP shows touch input 5204 on reticle 5010. In accordance with some embodiments, FIG. 5BP shows that, in response to touch input 5204, device 100 adds and displays virtual measurement point 5206 to user interface 5006 at a current location of focus point 5012 (as shown in FIG. 5BO). FIG. 5BQ shows measurement point 5206 displayed at the same location as in FIG. 5BP after liftoff of touch input 5204.

FIGS. 5BR-5BS illustrate an alternate way of adding a virtual measurement point to user interface 5006, in accordance with some embodiments. FIG. 5BR shows touch input 5204 on reticle 5010. In contrast to FIG. 5BP, FIG. 5BR shows that, in response to touch input 5204, device 100 forgoes adding and displaying a virtual measurement point at the location of focus point 5012. Instead, in FIG. 5BR, device 100 displays instruction message 5208 to prompt user 5004 to tap on measurement addition button 5014 (instead of tapping on reticle 5010) to add a measurement point. FIG. 5BS illustrates activation of measurement addition button 5014 by touch input 5210. In response to touch input 5210, device 100 adds virtual measurement point 5206 to user interface 5006 at a current location of focus point 5012 (as shown in FIG. 5BQ).

FIG. 5BT-5BU illustrate the creation of a measurement corresponding to object 5202 following the addition of measurement point 5206 (e.g., in either FIG. 5BQ or FIG.

5BS). In FIG. 5BT, user 5004 has moved device 100 such that reticle 5010 and focus point 5012 are positioned over a different location in physical space 5000. Specifically, in FIG. 5BT, reticle 5010 and focus point 5012 are positioned over an edge of object 5202 (as displayed in the live preview) that is closer to device 100 than the edge over which reticle 5010 and focus point 5012 were positioned in FIG. 5BO. Accordingly, reticle 5010 is displayed at an increased size in FIG. 5BT relative to its size in FIG. 5BO, and focus point 5012 is displayed at an increased size in FIG. 5BT relative to its size in FIG. 5BO. In some embodiments, the size at which reticle 5010 is displayed is based on a distance between device 100 and the location in physical space 5000 over which reticle 5010 is displayed, optionally subject to a predefined minimum size (used for distances greater than a predefined maximum distance) and a predefined maximum size (used for distances less than a predefined minimum distance). Similarly, in some embodiments, the size at which focus point 5012 is displayed is based on a distance between device 100 and the location in physical space 5000 over which focus point 5012 is displayed, optionally subject to a predefined minimum size and a predefined maximum size. In addition, in accordance with the movement of device 100 such that reticle 5010 and focus point 5012 are positioned over a different location in physical space 5000, (dynamic) measurement segment 5212, indicated by a dashed line, is displayed between measurement point 5206 (the most-recently-added measurement point) and focus point 5012. Measurement segment 5212 is displayed with an associated (dynamic) label that indicates a distance in physical space 5000 across which measurement segment 5212 appears to extend in user interface 5006.

FIG. 5BU illustrates activation of measurement addition button 5014 by touch input 5214 (e.g., a tap gesture). In response to the activation of measurement addition button 5214, device 100 adds and displays measurement point 5216 in user interface 5006 at a current location of focus point 5012 (as shown in FIG. 5BT) and as the second endpoint of measurement segment 5212. In accordance with the completion of measurement segment 5212, the appearance of measurement segment 5212 is changed. In the example shown in FIG. 5BU, measurement segment 5212 is changed from a dashed line to a solid line. Because measurement point 5216 is positioned over an edge of object 5202 that is closer to device 100 than the edge of object 5202 over which measurement point 5206 is displayed, measurement point 5216 is displayed at an increased size relative to measurement point 5206.

FIG. 5BV-5BY illustrate creation of a measurement corresponding to object 5202 that causes a prior measurement to be removed, in accordance with some embodiments. FIG. 5BV illustrates a transition from FIG. 5BU. In FIG. 5BV, user 5004 has moved device 100 such that reticle 5010 and focus point 5012 are positioned over a different location in physical space 5000 than in FIG. 5BU. Specifically, in FIG. 5BV, reticle 5010 and focus point 5012 are positioned over a first corner of object 5202. In some embodiments, as shown in FIG. 5BV, in accordance with reticle 5010 and focus point 5012 being moved away from measurement segment 5212, device 100 ceases to display the label ("17 in") associated with measurement segment 5212.

FIG. 5BW illustrates a transition from FIG. 5BV showing the addition of a measurement point to user interface 5006. In particular, FIG. 5BW illustrates activation of measurement addition button 5014 by touch input 5218. In response, device 100 adds measurement point 5220 to user interface 5006 at the current location of focus point 5012 (as shown in FIG. 5BV). In addition, in accordance with the addition of a new measurement point away from previously-created measurement segment 5212, device 100 changes the appearance of measurement segment 5212 (e.g., to indicate that creating a measurement segment that is disconnected from measurement segment 5212 will cause measurement segment 5212 to be removed from user interface 5006). In the example shown in FIG. 5BW, measurement segment 5212 is changed from a solid line to a dashed line, and the color (and/or transparency) of measurement segment 5212 and its endpoints is changed.

FIG. 5BX illustrates a transition from FIG. 5BW showing that user 5004 has moved device 100 such that reticle 5010 and focus point 5012 are positioned over a second corner of object 5202. Accordingly, (dynamic) measurement segment 5222, indicated by a dashed line, is displayed between measurement point 5206 (the most-recently-added measurement point) and focus point 5012. Measurement segment 5222 is displayed with an associated (dynamic) label (e.g., "17 in") that indicates a distance in physical space 5000 (e.g., along object 5202) across which measurement segment 5222 appears to extend in user interface 5006.

FIG. 5BY illustrates a transition from FIG. 5BX showing the addition of measurement point 5224 to user interface 5006 in response to activation of measurement addition button 5014 by touch input 5226. FIG. 5BY illustrates that measurement point 5224 has been added at a current location of focus point 5012 (as shown in Figure BX) as the second endpoint of measurement segment 5222. Because measurement point 5224 is positioned over a location on object 5202 that is further from device 100 than the location on object 5202 over which measurement point 5220 is displayed, measurement point 5224 is displayed at a decreased size relative to measurement point 5220. In accordance with the completion of measurement segment 5222, the appearance of measurement segment 5222 is changed from a dashed line to a solid line. In addition, in accordance with the completion of measurement segment 5222, and in accordance with measurement segment 5222 being disconnected from previously-placed measurement segment 5212, device 100 ceases to display measurement segment 5212. In some embodiments, measurement segment 5212 ceases to be displayed in accordance with a determination that measurement segment 5222 is at least a predefined threshold distance away from measurement segment 5212 (e.g., no point on measurement segment 5212 is within the predefined threshold distance of any point on measurement segment 5222).

FIGS. 5BZ-5CF illustrate creation of a measurement corresponding to object 5202 that connects to a prior measurement such that the prior measurement continues to be displayed, in accordance with some embodiments. FIG. 5BZ illustrates a transition from FIG. 5BY showing that user 5004 has moved device 100 such that reticle 5010 and focus point 5012 are positioned over a third corner of object 5202. In some embodiments, as shown in FIG. 5BZ, even though reticle 5010 and focus point 5012 have been moved away from measurement segment 5222, device 100 continues to display the label associated with measurement segment 5222 (in contrast to FIG. 5BV, which illustrates embodiments in which device 100 ceases to display the label associated with measurement segment 5212 when reticle 5010 and focus point 5012 are moved away from the measurement segment).

FIG. 5CA illustrates a transition from FIG. 5BZ showing the addition of measurement point 5228 to user interface 5006 at a current location of focus point 5012 (as shown in FIG. 5BZ) in response to activation of measurement addition button 5014 by touch input 5230. In accordance with measurement point 5228 being added at a location in user interface 5006 that is away from previously-created measurement segment 5222, device 100 changes the appearance of measurement segment 5222 (e.g., to indicate that creating a measurement segment that is disconnected from measurement segment 5222 will cause measurement segment 5222 to be removed from user interface 5006). In the example shown in FIG. 5CA, measurement segment 5222 is changed from a solid line to a dashed line, and the color (and/or transparency) of measurement segment 5222 is changed.

FIG. 5CB illustrates a transition from FIG. 5BZ showing that user 5004 has moved device 100 such that reticle 5010 and focus point 5012 are positioned away from the third corner of object 5202. Accordingly, (dynamic) measurement segment 5232, indicated by a dashed line, is displayed between measurement point 5228 and focus point 5012. Measurement segment 5232 is displayed with an associated (dynamic) label that indicates the distance along object 5202 across which measurement segment 5222 appears to extend in user interface 5006 (e.g., "8 in").

FIG. 5CC illustrates a transition from FIG. 5CB showing that user 5004 has moved device 100 such that the midpoint of measurement segment 5222 is within reticle 5010. In some embodiments, as shown in FIG. 5CC, the midpoint of a respective measurement segment displayed in user interface 5006 can be an anchor point to which focus point 5012 snaps. Accordingly, in FIG. 5CC, focus point 5012 is snapped to the anchor point corresponding to the midpoint of measurement segment 5222. To indicate the snapping behavior, focus point 5012 is displayed at an increased size relative to the size of focus point 5012 when focus point 5012 is not snapped to an anchor point (e.g., as shown in FIG. 5CB). In some embodiments, as shown in FIG. 5CC, the size of reticle 5010 is not changed when the focus point is snapped to an anchor point. In some embodiments, the size of focus point 5012 when snapped to an anchor point is greater than the predefined maximum size of focus point 5012 that is used for changing the size of focus point 5012 based on the distance between device 100 and the location in physical space 5000 over which focus point 5012 is displayed (e.g., as described herein with respect to FIG. 5BT). In addition, because focus point 5012 is snapped to a point along measurement segment 5222, the appearance of measurement segment 5222 is changed to indicate that adding a measurement point at the current location of focus point 5012 will result in measurement segment 5222 continuing to be displayed instead of being removed. Specifically, measurement segment 5222 is changed from a dashed line (back) to a solid line, and the color (and/or transparency) of measurement segment 5222 is changed, such that measurement segment 5222 is redisplayed with its appearance as shown in FIG. 5BZ (before measurement point 5228 was added). In addition, the length of dynamic measurement segment 5232 is updated in accordance with the movement of device 100 such that measurement segment 5232 continues to be displayed between measurement point 5228 and the current location of focus point 5012. The label associated with measurement segment 5232 is updated to reflect the change in length of measurement segment 5232 (e.g., "12 in").

FIG. 5CD illustrates a transition from FIG. 5CC showing that user 5004 has moved device 100 such that reticle 5010 and focus point 5012 are positioned away from the midpoint of measurement segment 5222. Accordingly, in FIG. 5CD, dynamic measurement segment 5232 and its associated label are updated to reflect the change in length of measurement segment 5232 due to the movement of focus point 5012 relative to measurement point 5228. In addition, the appearance of measurement segment 5222 is updated to indicate that adding a measurement point at the current location of focus point 5012 will result in measurement segment 5222 being removed.

FIG. 5CE illustrates a transition from FIG. 5CD showing that user 5004 has moved device 100 such that measurement point 5224 (as shown in FIG. 5CD) is within reticle 5010. In some embodiments, as shown in FIG. 5CE, the endpoint of a previously-added measurement segment can be an anchor point to which focus point 5012 snaps. Accordingly, in FIG. 5CE, focus point 5012 is snapped to the anchor point corresponding to measurement point 5224 (as shown in FIG. 5CD). To indicate the snapping behavior, focus point 5012 is displayed at an increased size relative to its size when not snapped to an anchor point (e.g., as shown in FIG. 5CD), although the size of reticle 5010 is not changed, as described herein with reference to FIG. 5CC. In addition, because focus point 5012 is snapped to a point along measurement segment 5222, the appearance of measurement segment 5222 is changed to indicate that adding a measurement point at the current location of focus point 5012 will result in measurement segment 5222 continuing to be displayed, instead of being removed. Specifically, measurement segment 5222 is changed from a dashed line to a solid line, and the color (and/or transparency) of measurement segment 5222 is changed, such that measurement segment 5222 is redisplayed with its appearance as shown in FIG. 5BZ. In addition, dynamic measurement segment 5232 and its associated label are updated to reflect the change in length of measurement segment 5232 due to the movement of focus point 5012 relative to measurement point 5228.

FIG. 5CF illustrates a transition from FIG. 5CE showing the addition of measurement point 5234 to user interface 5006 at the current location of focus point 5012 (as shown in FIG. 5CE) in response to activation of measurement addition button 5014 by touch input 5236. In accordance with measurement point 5234 being added at a point along measurement segment 5222, measurement segment 5222 continues to be displayed. In accordance with the completion of measurement segment 5232, the appearance of measurement segment 5232 is changed from a dashed line to a solid line.

FIG. 5CG-5CK illustrate creation of a measurement that is close enough to (e.g., within a predefined threshold distance of, but not connected to) a prior measurement such that the prior measurement continues to be displayed, in accordance with some embodiments. FIG. 5CG illustrates a transition from FIG. 5CF showing that user 5004 has moved device 100 such that reticle 5010 and focus point 5012 are positioned away from object 5202 and over a first corner of table 5200. In some embodiments, as shown in FIG. 5CG, even though reticle 5010 and focus point 5012 have been moved away from measurement segment 5222 and measurement segment 5232, device 100 continues to display the labels associated with measurement segments 5222 and 5232 (in contrast to FIG. 5BV, which illustrates embodiments in which device 100 ceases to display the label associated with measurement segment 5212 when reticle 5010 and focus point 5012 are moved away from the measurement segment).

FIG. 5CH illustrates a transition from FIG. 5CG showing the addition of measurement point 5238 to user interface 5006 at the current location of focus point 5012 (as shown in FIG. 5CH) in response to activation of measurement addition button 5014 by touch input 5240. In accordance with measurement point 5238 being added at a location in user interface 5006 that is away from previously-created measurement segments 5222 and 5232, device 100 changes the appearance of measurement segments 5222 and 5232 to indicate that creating a measurement segment that is disconnected and more than a threshold distance from any point along measurement segment 5222 and any point along measurement segment 5232 will cause measurement segments 5222 and 5232 to be removed from user interface 5006. In the example shown in FIG. 5CH, measurement segments 5222 and 5232 are changed from solid lines to dashed lines, and the color (and/or transparency) of measurement segments 5222 and 5232 and their endpoints is changed.

FIG. 5CI illustrates a transition from FIG. 5CH showing that user 5004 has moved device 100 such that reticle 5010 and focus point 5012 are positioned over a side surface of table 5200. In some embodiments, as shown in FIG. 5CI, reticle 5010 is tilted to appear to be co-planar with the side surface of table 5200 to indicate the surface that has been detected and that corresponds to the current location of focus point 5012. Dynamic measurement segment 5242, indicated by a dashed line, is displayed between measurement point 5238 and focus point 5012, along with an associated dynamic label that indicates the distance along the side surface of table 5200 across which measurement segment 5242 appears to extend in user interface 5006 (e.g., "2 ft 10 in").

FIG. 5CJ illustrates a transition from FIG. 5CI showing that user 5004 has moved device 100 such that reticle 5010 and focus point 5012 are positioned over a second corner of table 5200. In some embodiments, as shown in FIG. 5CJ, the appearance of measurement segments 5222 and 5232 are not changed even though adding a measurement point at the current location of focus point 5012 will result in measurement segments 5222 and 5232 continuing to be displayed instead of being removed (e.g., because the resulting measurement segment that would be created by the addition of a measurement point at the current location of focus point 5012 will be within a predefined threshold distance of both measurement segments 5222 and 5232).

FIG. 5CK illustrates a transition from FIG. 5CJ showing the addition of measurement point 5244 at the current location of focus point 5012 (as shown in FIG. 5CJ) in response to activation of measurement addition button 5014 by touch input 5246. Measurement point 5244 is added at a location in user interface 5006 such that measurement segment 5242 is within a predefined threshold distance of measurement segment 5222 (e.g., measurement segment 5242 includes at least one point that is within a predefined threshold distance of at least one point along measurement segment 5222). Accordingly, measurement segment 5222 continues to be displayed after the addition of measurement point 5244. In addition, measurement segment 5222 is changed from a dashed line (back) to a solid line, and the color (and/or transparency) of measurement segment 5222 is changed, such that measurement segment 5222 is redisplayed with its appearance as shown in FIG. 5CG. Similarly, measurement segment 5242 is within the predefined threshold distance of measurement segment 5232 (e.g., measurement segment 5242 includes at least one point that is within a predefined threshold distance of at least one point along measurement segment 5222, such as endpoint measurement point 5234). Accordingly, like measurement segment 5222, measurement segment 5232 continues to be displayed and is redisplayed with its appearance as shown in FIG. 5CG. In some embodiments, as long as at least one point in any of the currently displayed segments (e.g., previously connected segments 5222 and 5232) is within the predefined distance of a newly created segment (e.g., segment 5242), then all of the currently displayed segments remain displayed.

FIG. 5CL-5CM illustrate an example alert condition in the augmented reality environment. FIG. 5CL illustrates a transition from FIG. 5CK showing that user 5004 has moved device 100 such that field of view of the camera no longer includes the portion of physical space 5000 over which measurement segments 5222, 5232, and 5242 were displayed (e.g., the left portion of table 5200, as shown in FIG. 5CK). FIG. 5CL indicates that the amount of time that has elapsed since the field of view of the camera was moved away from the left portion of table 5200 is less than a first predefined threshold amount of time $T_{th}$.

FIG. 5CM illustrates a transition from FIG. 5CL showing that the amount of time that has elapsed since the field of view of the camera was moved away from the left portion of table 5200 has reached the first predefined threshold amount of time. Accordingly, device 100 displays alert message 5248 to indicate that measurement segments 5222, 5232, and 5242 will soon be removed from user interface 5006. In some embodiments, if device 100 is moved back to its position as shown in FIG. 5CK within a second predefined threshold amount of time since alert message 5248 was displayed, measurement segments 5222, 5232, and 5242 will be redisplayed in user interface 5006 over the corresponding features in physical space 5000 as shown in FIG. 5CG. In some embodiments, if device 100 is moved back to its position as shown in FIG. 5CK after the second predefined threshold amount of time has elapsed since alert message 5248 was displayed, measurement segments 5222, 5232, 5242 will not be redisplayed in user interface 5006. In some embodiments, alert message 5248 is displayed when device 100 has been moved such that the portion of physical space 5000 over which measurements 5222, 5232, and 5242 were displayed is more than a threshold distance from the portion of physical space 5000 that is currently in the field of view of the camera.

FIG. 5CN-5CO illustrate another example alert condition in the augmented reality environment. FIG. 5CN shows device 100 positioned at a first distance from table 5200, where the first distance is less than a predefined (maximum) threshold distance an. Reticle 5010 and focus point 5012 are displayed, which indicates that device 100 has detected a surface at the location over which focus point 5012 is displayed. FIG. 5CO shows device 100 positioned at a second distance from table 5200, where the second distance is greater than the predefined (maximum) threshold distance an. Accordingly, device 100 does not display reticle 5010 and focus point 5012, which indicates that device 100 has not detected a surface at the location in physical space 5000 over which focus point 5012 would have been displayed. In addition, device 100 displays alert message 5250 to indicate that device 100 is too far away from the location in physical space 5000 over which focus point 5012 would have been displayed and to prompt user 5004 to move device 100 closer to that location. Similarly, in some embodiments, when device 100 is positioned at a distance from table 5200 that is less than a predefined minimum threshold distance, device 100 does not display reticle 5010 and focus point 5012 (to indicate that a surface has not been detected) and displays an alert message (e.g., with text such as "Move further") to prompt user 5004 to move device 100 further away from the location in physical space 5000 over which focus point 5012 would have been displayed.

FIGS. 6A-6C are flow diagrams illustrating method 600 of interacting with an application for making measurements of a physical space using an augmented reality environment in accordance with some embodiments. Method 600 is performed at an electronic device (e.g., portable multifunction device 100 (FIG. 1A), device 300 (FIG. 3A), or computer system 301 (FIG. 3B)) that includes a touch-sensitive display (e.g., touch screen 112 (FIG. 1A), or display generation component(s) 304 in combination with input device(s) 302 (FIG. 3B)), and one or more cameras (e.g., optical sensor(s) 164 (FIG. 1A) or camera(s) 305 (FIG. 3B)), optionally one or more sensors to detect intensities of contacts with the touch-sensitive display (e.g., contact intensity sensor(s) 165, FIG. 1A), and optionally one or more tactile output generators (e.g., tactile output generator(s) 163 (FIG. 1A) or tactile output generator(s) 357 (FIG. 3A)). Some operations in method 600 are, optionally, combined and/or the order of some operations is, optionally, changed.

As described below, method 600 provides an intuitive way to reposition a virtual measurement point in an augmented reality-based measurement. Zooming in on an area that includes the measurement point in response to an input directed to the measurement point makes it easy to reposition the measurement point more precisely. Method 600 reduces the number, extent, and/or nature of the inputs from a user when repositioning a virtual measurement point, thereby creating a more efficient human-machine interface. For battery-operated electronic devices, enabling a user to reposition measurement points faster and more efficiently conserves power and increases the time between battery charges.

The electronic device displays (602), on the touch-sensitive display, a user interface (e.g., user interface 5006, FIG. 5AX) of an application (e.g., an augmented reality measurement application or an application that includes augmented reality measurement functionality).

The user interface includes (604) a representation of a field of view of at least one of the one or more cameras (e.g., user interface 5006 includes a live preview of the field of view of the camera of device 100, FIG. 5AX). The representation of the field of view is displayed at a first magnification and updated over time based on changes to current visual data detected by at least one of the one or more cameras (e.g., the representation of the field of view is a live view from at least one of the one or more cameras). In addition, the field of view includes at least a portion of a three-dimensional space (e.g., a space in the physical world that includes physical objects). For example, the live preview is displayed without zoom (or with a zoom factor of 1×) and is updated as device 100 moves (e.g., as in FIGS. 5AU-5AV).

While displaying the representation of the field of view, the electronic device detects (606) a first touch input on the touch-sensitive display (e.g., a tap gesture or press input on an affordance which, when activated, adds a measurement point to the displayed representation of the field of view) (e.g., touch input 5158, FIG. 5AW).

In response to detecting the first touch input, the electronic device adds (608) and displays a (virtual) measurement point at a first location in the representation of the field of view that corresponds to a first location in the three-dimensional space (e.g., measurement point 5160, FIG. 5AW).

After adding the measurement point and while continuing to display the representation of the field of view (610), as at least one of the one or more cameras moves, the electronic device displays (612) the measurement point at a location in the representation of the field of view that corresponds to the first location in the three-dimensional space. For example, as the position and/or orientation of at least one of the one or more cameras change due to movement of the electronic device, the (virtual) measurement point continues to be displayed in the live view at a location that corresponds to the first location in the three-dimensional space, where the (virtual) measurement point was initially placed. In some embodiments, as at least one of the one or more cameras moves, the displayed measurement point appears to be attached or anchored to the location in the three-dimensional space where the (virtual) measurement point was initially placed.

After adding the measurement point and while continuing to display the representation of the field of view (610), the electronic device detects (614) a second touch input (e.g., touch input 5164, FIG. 5AY) at a location on the touch-sensitive display that corresponds to a current location of the measurement point in the representation of the field of view (which, in turn, corresponds to the first location in the three-dimensional space, where the measurement point was initially placed).

In response to detecting the second touch input, the electronic device enlarges (616) display of at least a portion of the representation of the field of view from the first magnification to a second magnification, greater than the first magnification (e.g., the live preview is enlarged by a zoom factor of 4× in FIG. 5AY). The enlarged display of the portion of the representation of the field of view includes the measurement point. In some embodiments, in response to a gesture on the measurement point (such as a tap, double tap, press, press and hold, or depinch gesture), the electronic device zooms in on an area that includes the measurement point, thereby enlarging an area that includes the measurement point from a first magnification to a second magnification. In some embodiments, zooming in on an area that includes the measurement point enables a user to reposition the measurement point more precisely, e.g., in response to gestures directed to the zoomed-in measurement point.

In some embodiments, the one or more cameras are (618) located on the electronic device adjacent to a portion of the touch-sensitive display that is near a side of the device on which the one or more cameras are positioned (e.g., the one or more cameras are located in region 5008, FIG. 5A). In some embodiments, the one or more cameras are located on the electronic device adjacent to a first portion of the touch-sensitive display. In some embodiments, a surface of the touch-sensitive display extends along an xy-plane, and the one or more cameras are adjacent to the first portion of the touch-sensitive display along the xy-plane. In some embodiments, the one or more cameras are adjacent to the first portion of the touch-sensitive display in a z-direction that is perpendicular to the xy-plane. In some embodiments, the user interface includes a first affordance that is displayed in a portion of the touch-sensitive display that is away from a side of the device on which the one or more cameras are positioned and which, when activated, adds a measurement point to the displayed representation of the field of view (e.g., measurement addition button 5014, FIG. 5A). In some embodiments, the first affordance is displayed in a second portion of the touch-sensitive display, where the second portion of the touch-sensitive display is distinct from the first portion of the touch-sensitive display, and where the second portion of the touch-sensitive display is located away from the side of the device on which the one or more cameras are positioned. In some embodiments, the user interface further includes one or more second affordances (e.g., buttons 5018, 5020, 5022, FIG. 5A) displayed in accordance with a first orientation of the electronic device (e.g., portrait orientation, as shown in FIG. 5A). In some embodiments, the electronic device detects movement (e.g., rotation) of the electronic device to a second orientation (e.g., rotation to a landscape orientation as shown in FIG. 5B or FIG. 5C). In some embodiments, in response to detecting the movement of the electronic device to the second orientation, the electronic device updates display of the one or more second affordances in accordance with the second orientation of the electronic device (e.g., buttons 5018, 5020, and 5022 move to different regions of the user interface in FIG. 5B or FIG. 5C without regard to the positions of the one or more cameras) and continues to display the first affordance in the portion of the touch-sensitive display that is away from the side of the device on which the one or more cameras are positioned (e.g., measurement addition button 5014 is displayed away from region 5008 in FIGS. 5B and 5C).

In some embodiments, in the second orientation, the electronic device updates display of the first affordance such that the first affordance is displayed at a different position within the portion of the touch-sensitive display that is away from the side of the device on which the one or more cameras are positioned (e.g., at a position within a predefined distance of an edge or a corner of the touch-sensitive display, to facilitate activation of the first affordance during single-handed operation of the electronic device) (e.g., measurement addition button 5014). In some embodiments, the first affordance is restricted to positions within the portion of the touch-sensitive display that is away from the side of the device on which the one or more cameras are positioned, so as to deter a user from holding the electronic device in a manner in which the user's hand obscures the field of view. In some embodiments, while the electronic device is in a first orientation (e.g., a first landscape orientation) in which the one or more cameras are located on a left half of the electronic device, the first affordance is displayed in the user interface on a right half of the electronic device; and, while the electronic device is in a second orientation (e.g., a second landscape orientation in which the device is rotated 180 degrees from the first landscape orientation) in which the one or more cameras are located on the right half of the electronic device, the first affordance is displayed in the user interface on the left half of the electronic device (e.g., as shown in and described herein with reference to FIGS. 5B-5C).

When the device orientation changes, automatically keeping an affordance that is used to place measurement points at a location on that touch sensitive display that is away from the one or more cameras reduces the chance that a user will hold the electronic device in a way that obscures the field of view of a camera that is providing the live view. Automatically repositioning an affordance in this manner when the device orientation changes enhances the operability of the device and makes the user-device interface more efficient (e.g., by helping the user to provide proper inputs and reducing user mistakes when operating/interacting with the device, such as obscuring the field of view).

In some embodiments, the user interface of the application includes (620) one or more affordances that correspond to operations of the application, including a capture affordance (e.g., an affordance such as a virtual shutter button which, when activated, initiates capture of media that corresponds to the representation of the field of view) (e.g., media capture button 5016, FIG. 5A). In some embodiments, the electronic device detects a third touch input on the capture affordance, and, in accordance with a determination that the third touch input meets first media capture criteria, initiates capture of media of a first type (e.g., a video or a live photo) that includes a sequence of images of the field of view of at least one of the one or more cameras (and, in some embodiments, corresponding audio) (e.g., as described herein with reference to FIGS. 5BJ-5BK). In some embodiments, the first media capture criteria include a first requirement that the third touch input be maintained on the touch-sensitive display for at least a predefined threshold amount of time, and a second requirement that an amount of movement of the third touch input across the touch-sensitive display be less than a predefined threshold amount of movement. In some embodiments, the first media capture criteria are satisfied by a stationary long-press or a press-and-hold gesture on the capture affordance.

In some embodiments, the captured sequence of images includes (virtual) measurement information displayed over the images (e.g., one or more (virtual) measurement points, lines between the measurement points, labels for the measurement points, and/or distances between measurement points) (e.g., as described herein with reference to FIGS. 5BJ-5BK). In some embodiments, the captured sequence of images does not include display of other affordances (besides the measurement information displayed over the images) that are shown in the user interface of the application, such as the capture affordance. In other words, in some embodiments, instead of capturing a screen recording of everything being shown in the user interface of the application, the device just captures a video of the field of view with the (virtual) measurement information superimposed upon the field of view (e.g., as described herein with reference to FIGS. 5BJ-5BK).

Providing a virtual shutter button or other capture affordance makes it easy to record a video of the objects being measured, along with the virtual measurement information that is displayed over the objects. Recording such a video, without also recording other elements in the user interface of the application, enhances the operability of the device and makes the user-device interface more efficient (e.g., by helping the user to create recordings that show the objects and the measurements, without showing extraneous information that was displayed in the user interface during the recording).

In some embodiments, in accordance with a determination that the third touch input meets second media capture criteria, the electronic device initiates (622) capture of media of a second type (e.g., a still image) that includes a single image of the field of view of at least one of the one or more cameras (e.g., without corresponding audio) (e.g., as shown in and described herein with reference to FIGS. 5BH-5BI). In some embodiments, the second media capture criteria include a first requirement that the third touch input cease to be detected on the touch-sensitive display before a predefined threshold amount of time elapses, and a second requirement that an amount of movement of the second touch input across the touch-sensitive display be less than a predefined threshold amount of movement. In some embodiments, the second media capture criteria are satisfied by a stationary tap gesture on the capture affordance.

In some embodiments, the captured still image does not include display of other affordances (besides the measurement information displayed over the images) that are shown in the user interface of the application, such as the capture affordance (e.g., as shown in and described herein with reference to FIGS. 5BH-5BI). In other words, in some embodiments, instead of capturing a still image of everything being shown in the user interface of the application, the device just captures a still image of the field of view with the (virtual) measurement information superimposed upon the field of view.

Providing a capture affordance that can initiate capture of either a still image or a video makes it easy to obtain either a still image or a video of the objects being measured, along with the virtual measurement information that is displayed over the objects. Obtaining such a still image or video, without also including other elements in the user interface of the application, enhances the operability of the device and makes the user-device interface more efficient (e.g., by helping the user to create a still image or video that shows the objects and the measurements, without showing extraneous information that was displayed in the user interface during the recording). In addition, providing additional control options for the capture affordance (e.g., to capture either a still image or a video, depending on the characteristics of the touch input on the capture affordance), without cluttering the user interface with additional displayed controls, enhances the operability of the device and makes the user-device interface more efficient.

In some embodiments, prior to displaying the user interface of the application, the electronic device displays (624) a control panel user interface that includes a plurality of controls (e.g., control center user interface 5188, FIG. 5BN), where a first control in the plurality of controls corresponds to the application (e.g., augmented reality measurement application icon 5190, FIG. 5BN). In some embodiments, the electronic device detects a touch input (e.g., a tap gesture or press input) activating the first control, and, in response to detecting the touch input activating the first control, displays the user interface of the application (e.g., as described herein with reference to FIG. 5BN). Providing access to a measurement application via a control panel makes it easier to find and launch the application. Reducing the number of inputs needed to find and launch an application enhances the operability of the device and makes the user-device interface more efficient.

In some embodiments, the user interface is (626) a first user interface of a plurality of user interfaces in the application. In some embodiments, the first user interface corresponds to a measurement mode of the application. In some embodiments, a second user interface of the plurality of user interfaces corresponds to a levelling mode of the application. In some embodiments, an augmented reality measurement application or an application that includes augmented reality measurement functionality also includes level functionality. Providing both measurement and level functionality in the same application makes it easier to find and use these related functions. Providing multiple related functionalities in the same application enhances the operability of the device and makes the user-device interface more efficient.

In some embodiments, the electronic device determines (628) a distance between the electronic device and the first location in the three-dimensional space that corresponds to the measurement point (e.g., a distance from one of the cameras of the electronic device to the first location in the three-dimensional space that corresponds to the measurement point). In some embodiments, the distance from one of the cameras to the first location in the three-dimensional space is determined based on depth information captured by at least one of the one or more cameras (e.g., by depth sensors that are optionally part of the one or more cameras) and/or based on disparity information between multiple different cameras (e.g., determined by comparing information captured by multiple different cameras). In some embodiments, in accordance with a determination that the determined distance is less than a first threshold distance, a magnification factor between the first magnification and the second magnification (e.g., an amount of increase in magnification from the first magnification to the second magnification) is a first magnification factor (e.g., corresponding to a minimum amount of zoom, that does not change as the distance between the electronic device and the first location in the three-dimensional space decreases below the first threshold distance). In some embodiments, in accordance with a determination that the determined distance is greater than a second threshold distance, the magnification factor is a second magnification factor (e.g., corresponding to a maximum amount of zoom, that does not change as the distance between the electronic device and the first location in the three-dimensional space increases above the second threshold distance). In some embodiments, in accordance with a determination that the determined distance is between the first threshold distance and the second threshold distance, the magnification factor is a respective magnification factor, between the first magnification factor and the second magnification factor, that depends on the determined distance. For example, as shown in and described herein with reference to FIGS. 5AY-5BE, an amount of zoom of the live preview is based on the distance between device 100 and table 5002, optionally with a maximum and/or a minimum limit on the amount of zoom.

More generally, in some embodiments, the amount of zoom is increased when the electronic device is further from the point of interest in the three-dimensional space (optionally subject to a maximum amount of zoom), and the amount of zoom is decreased when the electronic device is closer to the point of interest in the three-dimensional space (optionally subject to a minimum amount of zoom). In principle, a greater amount of zoom is needed when the electronic device is further from the point(s) of interest in the three-dimensional space, because features of interest are more difficult to discern (e.g., in the representation of the field of view) at greater distances, whereas a lesser amount of zoom is needed when the electronic device is closer to the point(s) of interest in the three-dimensional space, because features of interest are more readily perceived (e.g., in the representation of the field of view) at lesser distances. In some embodiments, a maximum amount of zoom is imposed in accordance with hardware specifications (e.g., zoom limitations) of the one or more cameras.

Automatically varying the amount of zooming based on the distance from the electronic device to a location in the three-dimensional space that corresponds to the measurement point makes it easier to reposition the measurement point, because the measurement point is displayed at an appropriate level of magnification for each distance. Performing a zoom operation with different magnification factors, which depend on an automatically measured distance, without requiring further user input, enhances the operability of the device and makes the user-device interface more efficient (e.g., by automatically displaying the measurement point at a magnification level where proper inputs can be provided to reposition the measurement point).

In some embodiments, while displaying the enlarged display of at least the portion of the representation of the field of view, the electronic device detects (630) a fourth touch input that includes detecting a contact at the current location of the measurement point and detecting movement of the contact across the touch-sensitive display (e.g., touch input 5164, FIG. 5AZ). In some embodiments, the second touch input and the fourth touch input are different portions of an input by a single continuous contact (e.g., the second touch input is a first portion of the input that touches down the contact on the touch-sensitive display, and the fourth input is a second portion of the input that includes movement of the contact). In some embodiments, in response to detecting the movement of the contact across the touch-sensitive display, the electronic device moves the measurement point across the representation of the field of view in accordance with the movement of the contact in the fourth touch input (e.g., as described herein with reference to measurement point 5160, FIG. 5AZ). Dragging the measurement point while viewing an enlarged area around the measurement point makes it easy to reposition the measurement point precisely with movement of a single contact. Reducing the number of inputs needed to perform a repositioning operation enhances the operability of the device and makes the user-device interface more efficient (e.g., by helping the user to provide proper inputs and reducing user mistakes when operating/interacting with the device).

In some embodiments, the first touch input is (632) detected on an affordance which, when activated, adds a measurement point to the displayed representation of the field of view. In some embodiments, the affordance is displayed in the user interface at a (fixed) predefined location. In some embodiments, a location in the representation of the field of view where the measurement point is initially added, in response to activation of the affordance, is distinct from the predefined location of the affordance. For example, in FIGS. 5AV-5AW, measurement point 5160 is added to user interface 5006 at a location that is away from the location of measurement addition button 5014. Providing an affordance for adding measurement points that is located away from where the added measurement points are initially displayed makes it easy to see where a measurement point will be placed. Displaying an affordance for adding points away from the location where the points are initially added enhances the operability of the device and makes the user-device interface more efficient (e.g., by helping the user to provide proper inputs for adding measurement points and reducing user mistakes when operating/interacting with the device).

It should be understood that the particular order in which the operations in FIGS. 6A-6C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, 1100, 1200, 1300, and 1400) are also applicable in an analogous manner to method 600 described above with respect to FIGS. 6A-6C. For example, the inputs, user interface elements (e.g., measurement points, measurement segments, virtual annotations, representations of the physical space or field of view, affordances, alerts, indicators, labels, anchor points, and/or placement user interface elements such as a reticle and dot), tactile outputs, and intensity thresholds described above with reference to method 600 optionally have one or more of the characteristics of the inputs, user interface elements, tactile outputs, and intensity thresholds described herein with reference to other methods described herein (e.g., methods 700, 800, 900, 1000, 1100, 1200, 1300, and 1400). For brevity, these details are not repeated here.

FIGS. 7A-7E are flow diagrams illustrating method 700 of adding measurements to a displayed representation of a physical space in an augmented reality environment in accordance with some embodiments. Method 700 is performed at an electronic device (e.g., portable multifunction device 100 (FIG. 1A), device 300 (FIG. 3A), or computer system 301 (FIG. 3B)) that includes a touch-sensitive display (e.g., touch screen 112 (FIG. 1A), or display generation component(s) 304 in combination with input device(s) 302 (FIG. 3B)), one or more sensors to detect intensities of contacts with the touch-sensitive display (e.g., contact intensity sensor(s) 165, FIG. 1A), and one or more cameras (e.g., optical sensor(s) 164 (FIG. 1A) or camera(s) 305 (FIG. 3B)), and optionally one or more tactile output generators (e.g., tactile output generator(s) 163 (FIG. 1A) or tactile output generator(s) 357 (FIG. 3A)). Some operations in method 700 are, optionally, combined and/or the order of some operations is, optionally, changed.

As described below, method 700 provides an intuitive way to more precisely add virtual measurement points and segments in augmented reality-based measurements. For an electronic device with a touch-sensitive display, one or more sensors to detect intensities of contacts with the touch-sensitive display, and one or more cameras, repeated presses by a continuously detected contact on the touch-sensitive display make it easier to hold the electronic device steady (e.g., as compared to repeated taps on the touch-sensitive display) while positioning the locations of the measurement points with a live view from at least one of the cameras. Method 700 changes the nature of the inputs from a user when adding virtual measurement points and segments, thereby creating a more efficient human-machine interface. For battery-operated electronic devices, enabling a user to add measurement points and segments more accurately and more efficiently conserves power and increases the time between battery charges.

The electronic device displays (702), on the touch-sensitive display, a user interface of an application (e.g., an augmented reality measurement application or an application that includes augmented reality measurement functionality).

The user interface includes (704) a representation of a field of view of at least one of the one or more cameras. The representation of the field of view is updated over time based on changes to current visual data detected by at least one of the one or more cameras (e.g., the representation of the field of view is a live view, which changes as the one or more cameras move and/or as the physical world in the field of view of the one or more cameras change). The user interface includes a measurement-point-creation indicator that is displayed over the representation of the field of view (e.g., reticle 5010 in conjunction with focus point 5012, FIG. 5AH which are displayed within user interface 5006 on top of the live preview of the camera). In addition, the field of view includes at least a portion of a three-dimensional space (e.g., a space in the physical world that includes physical objects) (e.g., physical space 5000).

The electronic device detects (706) a contact on the touch-sensitive display (e.g., touch input 5120, FIG. 5AI).

While continuously detecting the contact on the touch-sensitive display (708), and while the measurement-point-creation indicator is displayed over a first location in the representation of the field of view that corresponds to a first location in the three-dimensional space (710), in accordance with a determination that first criteria (e.g., measurement-point-creation criteria) are met, where the first criteria include a requirement that an intensity of the contact meet (e.g., reach or exceed) a respective intensity threshold in order for the first criteria to be met, the electronic device adds (712) and displays a first (virtual) measurement point (e.g., measurement point 5122, FIG. 5AI) in the representation of the field of view that corresponds to the first location in the three-dimensional space. In some embodiments, the electronic device determines whether the first criteria are met. In some embodiments, the first criteria are met when the intensity of the contact exceeds an intensity threshold (e.g., a light press intensity threshold $IT_L$, which is above a contact detection intensity threshold $IT_0$) (e.g., as indicated by intensity meter 5040, FIG. 5AI). In some embodiments, the first criteria are met when the intensity of the contact falls below the intensity threshold (after exceeding the intensity threshold). In some embodiments, the first criteria include a requirement that, when other criteria of the first criteria are met, the contact be positioned on an affordance, which, when activated, adds a measurement point to the displayed representation of the field of view at the location over which the measurement-point-creation indicator is displayed (e.g., measurement addition button 5014, FIG. 5AI).

While continuously detecting the contact on the touch-sensitive display (708), and after adding the first (virtual) measurement point, the electronic device updates (714) the representation of the field of view as the electronic device is moved (e.g., as the field of view of the one or more cameras changes). In some embodiments, in response to the electronic device being moved, the electronic device displays a dynamic measurement segment between the first (virtual) measurement point in the representation of the field of view (e.g., while the field of view of the one or more cameras includes the first location in the three-dimensional space) and the measurement-point-creation indicator in the user interface (e.g., dynamic measurement segment 5128, FIG. 5AK). In some embodiments, the display of the dynamic measurement segment changes in accordance with the movement of the device (e.g., which changes the field of view of the one or more cameras). For example, when the measurement-point-creation indicator is centered at a fixed position within the representation of the field of view, a distance between the first measurement point in the representation of the field of view and a location in the representation of the field of view that corresponds to the measurement-point-creation indicator changes as the device (and the field of view of the one or more cameras) moves relative to the first location in the three-dimensional space and, accordingly, a length of the dynamic measurement segment changes as the device moves.

While continuously detecting the contact on the touch-sensitive display (708), after the electronic device is moved, and while the measurement-point-creation indicator is displayed over a second location in the representation of the field of view that corresponds to a second location in the three-dimensional space (716), in accordance with a determination that the first criteria are met while the measurement-point-creation indicator is displayed over the second location in the representation of the field of view that corresponds to the second location in the three-dimensional space (718): the electronic device adds (720) and displays a second (virtual) measurement point (e.g., as explained herein with respect to the addition of measurement point 5132, FIG. 5AL) in the representation of the field of view that corresponds to the second location in the three-dimensional space. In some embodiments, the second location in the representation of the field of view is the same as the first location in the representation of the field of view, for example when the measurement-point-creation indicator is centered at a fixed position within the representation of the field of view. In some embodiments, the electronic device determines whether the first criteria are met. In addition, the electronic device displays (722) a first measurement segment connecting the first measurement point and the second measurement point.

In some embodiments, the first measurement segment (connecting the first measurement point and the second measurement point) is displayed in accordance with a determination that second criteria (e.g., measurement-segment-creation criteria) are met. In some embodiments, the second criteria include a requirement that, following a respective instance when the first criteria are met for adding and displaying a respective measurement point, the contact be maintained on the touch-sensitive display (e.g., on an affordance which, when activated, adds a measurement point to the displayed representation of the field of view at the location over which the measurement-point-creation indicator is displayed) until a next instance that the first criteria are met for adding and displaying a next measurement point (e.g., as shown in and described herein with reference to FIGS. 5AH-5AS). That is, the second criteria include a requirement that the contact be maintained between the creation of successive measurement points that satisfy the (intensity-based) first criteria. In some embodiments, the intensity threshold for the first criteria is a second intensity threshold (e.g., a light press intensity threshold $IT_L$) that is above a first intensity threshold (e.g., a contact detection intensity threshold ($IT_0$), and the second criteria include a requirement that an intensity of the contact remain at or above the first intensity threshold while the contact is maintained. In some embodiments, the second criteria include a requirement that an intensity of the contact decrease to or below the second intensity threshold while the contact is maintained (e.g., if the first criteria require that the intensity of the contact exceed the second intensity threshold). In some embodiments, the second criteria include a requirement that an intensity of the contact remain at or below the second intensity threshold while the contact is maintained (e.g., if the first criteria require that the intensity of the contact fall below the intensity threshold (after exceeding the intensity threshold)).

More generally, in some embodiments, after a respective point is added and displayed in accordance with the first criteria being met, as long as the contact is maintained on the touch-sensitive display, one or more additional measurement points, as well as their corresponding measurement segments, are added and displayed in accordance with the first criteria being met for each additional measurement point. That is, as long as the contact is maintained on the touch-sensitive-display, each subsequent instance when the first criteria is met adds both an additional point and an additional measurement segment between the (newly-added) additional point and the most-recently-added prior point. Stated another way, after a respective point is added in accordance with the first criteria being met, the electronic device operates in a continuous measurement-(point-and-segment-)creation mode until the contact ceases to be maintained on the touch-sensitive display.

In some embodiments, while continuously detecting the contact on the touch-sensitive display, and after adding the second (virtual) measurement point, the electronic device updates (724) the representation of the field of view as the electronic device is moved again (e.g., as shown in and described herein with reference to FIGS. 5AN-5AQ). In some embodiments, while continuously detecting the contact on the touch-sensitive display, after the electronic device is moved again, and while the measurement-point-creation indicator is displayed over a third location in the representation of the field of view that corresponds to a third location in the three-dimensional space, in accordance with a determination that the first criteria are met while the measurement-point-creation indicator is displayed over the third location in the representation of the field of view that corresponds to the third location in the three-dimensional space, the electronic device adds and displays a third (virtual) measurement point in the representation of the field of view that corresponds to the third location in the three-dimensional space (e.g., measurement point 5142, FIG. 5AR), and displays a second measurement segment connecting the second measurement point and the third measurement point (e.g., completed measurement segment 5136, FIG. 5AR). In some embodiments, the third location in the representation of the field of view is the same as the first location in the representation of the field of view, for example when the measurement-point-creation indicator is centered at a fixed position within the representation of the field of view.

In some embodiments, in accordance with a determination that the first criteria are not met while the measurement-point-creation indicator is displayed over the second location in the representation of the field of view that corresponds to the second location in the three-dimensional space, the electronic device forgoes (726) adding and displaying the second (virtual) measurement point in the representation of the field of view that corresponds to the second location in the three-dimensional space, and forgoes displaying the first measurement segment connecting the first measurement point and the second measurement point.

In some embodiments, after adding the second (virtual) measurement point, the electronic device updates (728) the representation of the field of view as the electronic device is moved again. In some embodiments, after the electronic device is moved again, while the measurement-point-creation indicator is displayed over a third location in the representation of the field of view that corresponds to the third location in the three-dimensional space, and in accordance with a determination that the first criteria are met while the measurement-point-creation indicator is displayed over the third location in the representation of the field of view that corresponds to the third location in the three-dimensional space, the electronic device adds and displays a third (virtual) measurement point in the representation of the field of view that corresponds to the third location in the three-dimensional space. In some embodiments, in accordance with a determination that second criteria (e.g., measurement-segment-creation criteria) are met, where the second criteria include a requirement that the contact is maintained between the first criteria being met for adding the second measurement point and the first criteria being met for adding the third measurement point, the electronic device displays a second measurement segment connecting the second measurement point and the third measurement point. In some embodiments, in accordance with a determination that the second criteria are not met, the electronic device forgoes displaying the second measurement segment connecting the second measurement point and the third measurement point (e.g., as shown in and described herein with reference to FIGS. 5AH-5AS). In some embodiments, if a respective measurement point is a most-recently-added measurement point (e.g., the second measurement point) and is an endpoint of a measurement segment that is the most-recently-added measurement segment (e.g., the first measurement segment), then, in accordance with a determination that the first criteria (e.g., the measurement-point-creation criteria) are met and the second criteria are not met, the electronic device adds and displays an additional measurement point (e.g., the third measurement point) and forgoes displaying an additional measurement segment between the respective measurement point (the most-recently-added measurement point prior to displaying the additional measurement point) and the additional measurement point.

In some embodiments, while continuously detecting the contact on the touch-sensitive display, and while the electronic device is being moved, a dynamic measurement segment is displayed between a most-recently-added measurement point (e.g., the second measurement point) and a location in the representation of the field of view that corresponds to the measurement-point-creation indicator (e.g., a dynamic measurement segment as described herein with reference to operation 714), and the dynamic measurement segment continues to be displayed in accordance with a determination that the second criteria are met. In some embodiments, if the most-recently-added measurement point is an endpoint of another measurement segment that is the most-recently-added measurement segment prior to displaying the dynamic measurement segment (e.g., the first measurement segment), then the electronic device ceases to display the dynamic measurement segment in response to liftoff of the contact after the first criteria are met for adding the second measurement point (e.g., at any point before the first criteria are met for adding the third measurement point) (e.g., as shown in and described herein with reference to FIGS. 5AH-5AS).

Adding a measurement point with or without a corresponding measurement segment to the immediately prior measurement point, depending on whether a contact has been maintained on the touch sensitive display, provides an additional option for adding a measurement point without adding a measurement segment (e.g., a user lifts off the contact to indicate that the next measurement point to be added is not connected to the prior measurement points and segments). Providing additional control options without cluttering the UI with additional displayed controls enhances the operability of the device and makes the user-device interface more efficient (e.g., by helping the user to provide proper inputs and reducing user mistakes when operating/interacting with the device).

In some embodiments, the electronic device includes one or more tactile output generators. In some embodiments, in accordance with a determination that the intensity of the contact meets (e.g., reaches (increases to) or exceeds) the respective intensity threshold, the electronic device generates (730) a tactile output (e.g., to indicate that the intensity of the contact is sufficient to add a measurement point) (e.g., as described herein with reference to tactile output 5124, FIG. 5AI). In some embodiments, a tactile output is generated in accordance with the determination that the first criteria are met (e.g., that other requirements of the first criteria are also met, in addition to the requirement that the intensity of the contact meet the respective intensity threshold). In some embodiments, the electronic device provides a tactile output when the respective intensity threshold is met to indicate that the intensity of the contact is sufficient to add a measurement point and/or to indicate that the measurement point has been added. Providing improved feedback enhances the operability of the device and makes the user-device interface more efficient (e.g., by helping the user to provide proper inputs and reducing user mistakes when operating/interacting with the device).

In some embodiments in which the electronic device includes one or more tactile output generators, the respective intensity threshold is (732) a second intensity threshold (e.g., a light press intensity threshold $IT_L$) that is above a first intensity threshold (e.g., a contact detection intensity threshold $IT_0$). In some embodiments, in accordance with a determination that the intensity of the contact ceases to meet the second intensity threshold (after meeting the second intensity threshold) (e.g., the intensity of the contact decreases to or below the second intensity threshold), and that the intensity of the contact meets the first intensity threshold (e.g., the intensity of the contact remains at or above the first intensity threshold), the electronic device generates a tactile output (e.g., to indicate addition of a measurement point) (e.g., as described herein with reference to FIG. 5AJ). In some embodiments, the electronic device provides a tactile output when the intensity falls below the second intensity threshold to indicate that a measurement point has been added. Providing improved feedback enhances the operability of the device and makes the user-device interface more efficient (e.g., by helping the user to provide proper inputs and reducing user mistakes when operating/interacting with the device).

In some embodiments, the adding and the displaying of the first measurement point is (734) performed when the intensity of the contact meets the respective intensity threshold, while the measurement-point-creation indicator is displayed over the first location in the representation of the field of view that corresponds to the first location in the three-dimensional space (e.g., as shown in and described herein with reference to FIG. 5AI). In some embodiments, the adding and the displaying of the second measurement point is performed when the intensity of the contact meets the respective intensity threshold after the electronic device is moved, while the measurement-point-creation indicator is displayed over the second location in the representation of the field of view that corresponds to the second location in the three-dimensional space.

In some embodiments, the respective intensity threshold is (736) a second intensity threshold (e.g., a light press intensity threshold $IT_L$) that is above a first intensity threshold (e.g., a contact detection intensity threshold $IT_0$). In some embodiments, the first criteria include a requirement that the intensity of the contact falls below the respective intensity threshold, after meeting the respective intensity threshold, in order for the first criteria to be met. In some embodiments, the adding and the displaying of the first measurement point is performed when the intensity of the contact falls below the respective intensity threshold, while the measurement-point-creation indicator is displayed over the first location in the representation of the field of view that corresponds to the first location in the three-dimensional space. In some embodiments, the adding and the displaying of the second measurement point is performed when, after the electronic device is moved and while the measurement-point-creation indicator is displayed over the second location in the representation of the field of view that corresponds to the second location in the three-dimensional space, the intensity of the contact falls below the respective intensity threshold.

In some embodiments, while displaying the representation of the field of view of the one or more cameras, the electronic device determines (738) an anchor point in the representation of the field of view of the one or more cameras that corresponds to a respective location in the three-dimensional space. In some embodiments, as the one or more cameras move, while the measurement-point-creation indicator (or at least a portion thereof) is over (or proximate to) the anchor point, the electronic device changes a visual appearance of the measurement-point-creation indicator to indicate that a respective measurement point will be added at the anchor point if the contact meets the first criteria (e.g., as described herein with reference to reticle 5010 and focus point 5012 in FIG. 5AH). Providing visual feedback that a measurement point will be added at the anchor point if the contact meets the first criteria makes it easy to add a measurement point at the anchor point. Providing improved feedback enhances the operability of the device and makes the user-device interface more efficient (e.g., by helping the user to provide proper inputs and reducing user mistakes when operating/interacting with the device).

In some embodiments, the user interface includes (740) an affordance, which, when activated, adds a (virtual) measurement point in the representation of the field of view at a location in the representation of the field of view over which the measurement-point-creation indicator is displayed (e.g., measurement addition button 5014). In some embodiments, the electronic device detects a touch input (e.g., a tap gesture) activating the affordance, and, in response to detecting the touch input activating the affordance, adds and displays a measurement point in the representation of the field of view at the location in the representation of the field of view over which the measurement-point-creation indicator is displayed (e.g., as shown in and described herein with reference to FIG. 5K).

It should be understood that the particular order in which the operations in FIGS. 7A-7E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, 1000, 1100, 1200, 1300, and 1400) are also applicable in an analogous manner to method 700 described above with respect to FIGS. 7A-7E. For example, the inputs, user interface elements (e.g., measurement points, measurement segments, virtual annotations, representations of the physical space or field of view, affordances, alerts, indicators, labels, anchor points, and/or placement user interface elements such as a reticle and dot), tactile outputs, and intensity thresholds described above with reference to method 700 optionally have one or more of the characteristics of the inputs, user interface elements, tactile outputs, and intensity thresholds described herein with reference to other methods described herein (e.g., methods 600, 800, 900, 1000, 1100, 1200, 1300, and 1400). For brevity, these details are not repeated here.

FIGS. 8A-8C are flow diagrams illustrating method 800 of adding virtual measurement points at automatically determined anchor points in an augmented reality environment in accordance with some embodiments. Method 800 is performed at an electronic device (e.g., portable multifunction device 100 (FIG. 1A), device 300 (FIG. 3A), or computer system 301 (FIG. 3B)) that includes a touch-sensitive display (e.g., touch screen 112 (FIG. 1A), or display generation component(s) 304 in combination with input device(s) 302 (FIG. 3B)), and one or more cameras (e.g., optical sensor(s) 164 (FIG. 1A) or camera(s) 305 (FIG. 3B)), optionally one or more sensors to detect intensities of contacts with the touch-sensitive display (e.g., contact intensity sensor(s) 165, FIG. 1A), and optionally one or more tactile output generators (e.g., tactile output generator(s) 163 (FIG. 1A) or tactile output generator(s) 357 (FIG. 3A)). Some operations in method 800 are, optionally, combined and/or the order of some operations is, optionally, changed.

As described below, method 800 provides an intuitive way to add virtual measurement points in augmented reality-based measurements, either at automatically determined anchor points or away from such anchor points. An electronic device provides visual feedback that a measurement point will be added at an anchor point if measurement-point-creation criteria, which makes it easy to add a measurement point at the anchor point. Providing improved feedback enhances the operability of the device and makes the user-device interface more efficient (e.g., by helping the user to provide proper inputs and reducing user mistakes when operating/interacting with the device). For battery-operated electronic devices, enabling a user to add measurement points at automatically determined anchor points (or add measurement points away from such anchor points) faster and more efficiently conserves power and increases the time between battery charges.

The electronic device displays (802), on the touch-sensitive display, a user interface of an application (e.g., an augmented reality measurement application or an application that includes augmented reality measurement functionality).

The user interface includes (804) a representation of a field of view of at least one of the one or more cameras. The representation of the field of view is updated over time based on changes to current visual data detected by at least one of the one or more cameras (e.g., the representation of the field of view is a live view). In addition, the user interface includes a measurement-point-creation indicator that is displayed over the representation of the field of view (e.g., reticle 5010 in combination with focus point 5012, FIG. 5K). The field of view includes at least a portion of a three-dimensional space (e.g., a space in the physical world that includes physical objects).

While displaying the representation of the field of view (806), the electronic device determines (808) an anchor point at a location in the representation of the field of view that corresponds to a first location in the three-dimensional space. In some embodiments, the electronic device determines a plurality of anchor points that correspond to a plurality of locations in the three-dimensional space, such as a corner of a physical object in the three-dimensional space, points along an edge of a physical object in the three-dimensional space, or the like.

While displaying the representation of the field of view (806), as at least one of the one or more cameras move, and while the measurement-point-creation indicator (or at least a portion thereof) is over (or proximate to) the anchor point, the electronic device changes (810) a visual appearance of the measurement-point-creation indicator to indicate that a (virtual) measurement point will be added at the anchor point if a touch input meets first criteria (e.g., measurement point creation criteria) (e.g., as described herein with reference to reticle 5010 and focus point 5012 in FIG. 5AK).

While displaying the representation of the field of view (806), the electronic device detects (812) a first touch input on the touch-sensitive display that meets the first criteria (e.g., a tap gesture on an affordance or a hard press input on an affordance, the hard press input meeting or exceeding an intensity threshold) (e.g., touch input 5038, FIG. 5K.

While displaying the representation of the field of view (806), in response to detecting the first touch input that meets the first criteria (814), and in accordance with a determination that the measurement-point-creation indicator (or at least a portion thereof) is over (or proximate to) the anchor point when the first criteria are met (816), the electronic device adds and displays a first (virtual) measurement point at the anchor point in the representation of the field of view that corresponds to the first location in the three-dimensional space (e.g., measurement point 5042, FIG. 5K).

While displaying the representation of the field of view (806), in accordance with a determination that the measurement-point-creation indicator (or at least a portion thereof) is not over (or proximate to) the anchor point when the first criteria are met (818), the electronic device adds and displays a first (virtual) measurement point at a first location in the representation of the field of view that is away from the anchor point (e.g., at a location in the representation of the field of view that does not correspond to the first location in the three-dimensional space).

In some embodiments, the determined anchor point is (820) also an endpoint of a (currently) displayed representation of a measurement (e.g., as described herein with respect to the anchor point corresponding to measurement point 5054, FIG. 5Q), and adding a measurement point at the anchor point, if a touch input meets first criteria, will not form a region, in the representation of the field of view, that is enclosed by a plurality of displayed measurement segments (e.g., and their associated endpoints). For example, a measurement segment that will be added in conjunction with or in response to adding the measurement point at the determined anchor point will not form a closed polygon that includes the added measurement segment as a final side of the closed polygon). Providing visual feedback that a measurement point will be added at the anchor point if measurement-point-creation criteria are met makes it easy to add a measurement point at the anchor point, including at an anchor point that is not just closing a loop of measurement points. Providing improved feedback enhances the operability of the device and makes the user-device interface more efficient (e.g., by helping the user to provide proper inputs and reducing user mistakes when operating/interacting with the device).

In some embodiments, the electronic device displays (822), over the representation of the field of view, a representation of a first measurement. The representation of the first measurement includes a first endpoint that corresponds to a second location in the three-dimensional space, a second endpoint that corresponds to a third location in the three-dimensional space, and a first line segment connecting the first endpoint and the second endpoint. In addition, the determined anchor point is a midpoint of the first line segment (e.g., the first location, to which the anchor point corresponds, is halfway between the second location and the third location in the three-dimensional space) (e.g., as shown in and described herein with reference to FIG. 5AA). Providing visual feedback that a measurement point will be added at an anchor point that is at the midpoint of a measurement segment if measurement-point-creation criteria are met makes it easy to add a measurement point at the midpoint of a measurement segment. Providing improved feedback enhances the operability of the device and makes the user-device interface more efficient (e.g., by helping the user to provide proper inputs and reducing user mistakes when operating/interacting with the device).

In some embodiments, the electronic device includes one or more tactile output generators. In some embodiments, as at least one of the one or more cameras moves, and while the measurement-point-creation indicator (or at least a portion thereof) is over (or proximate to) the anchor point, the electronic device generates (824) a tactile output in conjunction with changing the visual appearance of the measurement-point-creation indicator (e.g., as described herein with respect to FIG. 5H). In some embodiments, adding a measurement point at the anchor point, if a touch input meets first criteria, will not form a region enclosed by a plurality of displayed measurement segments (e.g., and their associated endpoints) in the representation of the field of view of the one or more cameras. For example, a measurement segment that will be added in conjunction with or in response to adding the measurement point will not form a closed polygon that includes the added measurement segment as a final side of the closed polygon. In some embodiments, a tactile output is generated when snapping to an identified physical feature in the three-dimensional space. In some embodiments, a tactile output is generated when snapping to a currently displayed representation of a measurement, to a respective measurement point (e.g., an endpoint) thereof, and/or to a midpoint of a measurement segment thereof. Providing both haptic and visual feedback that a measurement point will be added at the anchor point if measurement-point-creation criteria are met makes it easy to add a measurement point at the anchor point, including at an anchor point that is not just closing a loop of measurement points. Providing improved feedback enhances the operability of the device and makes the user-device interface more efficient (e.g., by helping the user to provide proper inputs and reducing user mistakes when operating/interacting with the device).

In some embodiments in which the electronic device includes one or more tactile output generators, the electronic device detects (826) movement of the measurement-point-creation indicator away from the anchor point (e.g., so that the measurement-point-creation indicator is not over (or not proximate to) the anchor point) (e.g., due to movement of the one or more cameras that changes the field of view while the measurement-point-creation indicator remains at a fixed location within the user interface). In some embodiments, in response to detecting the movement of the measurement-point-creation indicator away from the anchor point, the electronic device generates a tactile output (e.g., as described herein with respect to FIG. 5I). Providing haptic feedback that a measurement point will not be added at the anchor point if measurement-point-creation criteria are met helps guide a user while placing measurement points. Providing improved feedback enhances the operability of the device and makes the user-device interface more efficient (e.g., by helping the user to provide proper inputs and reducing user mistakes when operating/interacting with the device).

In some embodiments in which the electronic device includes one or more tactile output generators, in response to detecting the first touch input that meets the first criteria, the electronic device adds (828) the first measurement point without adding a measurement segment connected to the first measurement point (e.g., the first measurement point is a first endpoint of a new measurement) and generates a first tactile output (e.g., a start-of-measurement tactile output) (e.g., as described herein with respect to measurement point 5042, FIG. 5K). In some embodiments, the electronic device detects movement of the measurement-point-creation indicator to a second location in the representation of the field of view that corresponds to a second location in the three-dimensional space (e.g., as described herein with respect to FIG. 5M). In some embodiments, while the measurement-point-creation indicator is over the second location in the representation of the field of view, the electronic device detecting a second touch input on the touch-sensitive display that meets the first criteria. In some embodiments, in response to detecting the second touch input that meets the first criteria, the electronic device adds a second measurement point at the second location in the representation of the field of view (e.g., as described herein with respect to measurement point 5054, FIG. 5N). In some embodiments, in response to detecting the second touch input that meets the first criteria, the electronic device adds a measurement segment between the first measurement point and the second measurement point (e.g., the electronic device adds a representation of a measurement by adding a second measurement point and a measurement segment, where the representation of the measurement includes the first measurement point, the second measurement point, and the measurement segment) (e.g., as described herein with respect to measurement segment 5048, FIG. 5N). In some embodiments, in response to detecting the second touch input that meets the first criteria, the electronic device generates a second tactile output (e.g., an end-of-measurement tactile output) that is different from the first tactile output (e.g., the second tactile output differs from the first tactile output in at least one tactile output property, such as frequency, amplitude, pattern, duration, etc.) (e.g., as described herein with respect to tactile output 5056, FIG. 5N). Providing different haptic feedback at the start of a measurement (with just the first measurement point) versus when a measurement segment has been created helps guide a user while placing measurement points, by indicating where they are in the measurement process. Providing improved feedback enhances the operability of the device and makes the user-device interface more efficient (e.g., by helping the user to provide proper inputs and reducing user mistakes when operating/interacting with the device).

In some embodiments, as at least one of the one or more cameras moves, the electronic device displays (830) the measurement-point-creation indicator while the representation of the field of view includes a region corresponding to an identified physical feature in the three-dimensional space in the field of view of at least one of the one or more cameras, In addition, the electronic device ceases to display the measurement-point-creation indicator while the representation of the field of view does not include a region corresponding to an identified physical feature in the three-dimensional space (e.g., as described herein with reference to FIGS. 5E-5G). Displaying or not displaying the measurement-point-creation indicator, depending on whether a live view includes a region that corresponds to an identified physical feature in the three-dimensional space, provides visual feedback about the presence or absence of automatically identified features. Providing improved feedback enhances the operability of the device and makes the user-device interface more efficient (e.g., by helping the user to provide proper inputs and reducing user mistakes when operating/interacting with the device).

It should be understood that the particular order in which the operations in FIGS. 8A-8C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, 1000, 1100, 1200, 1300, and 1400) are also applicable in an analogous manner to method 800 described above with respect to FIGS. 8A-8C. For example, the inputs, user interface elements (e.g., measurement points, measurement segments, virtual annotations, representations of the physical space or field of view, affordances, alerts, indicators, labels, anchor points, and/or placement user interface elements such as a reticle and dot), tactile outputs, and intensity thresholds described above with reference to method 800 optionally have one or more of the characteristics of the inputs, user interface elements, tactile outputs, and intensity thresholds described herein with reference to other methods described herein (e.g., methods 600, 700, 900, 1000, 1100, 1200, 1300, and 1400). For brevity, these details are not repeated here.

FIGS. 9A-9B are flow diagrams illustrating method 900 of displaying labels for measurements of a physical space in an augmented reality environment in accordance with some embodiments. Method 900 is performed at an electronic device (e.g., portable multifunction device 100 (FIG. 1A), device 300 (FIG. 3A), or computer system 301 (FIG. 3B)) that includes a display (e.g., touch screen 112 (FIG. 1A), display 340 (FIG. 3A), or display generation component(s) 304 (FIG. 3B)), an input device (e.g., touch screen 112 (FIG. 1A), touchpad 355 (FIG. 3A), input device(s) 302 (FIG. 3B), or a physical button that is separate from the display), and one or more cameras (e.g., optical sensor(s) 164 (FIG. 1A) or camera(s) 305 (FIG. 3B)), optionally one or more sensors to detect intensities of contacts with a touch-sensitive surface of the input device (e.g., contact intensity sensor(s) 165, FIG. 1A), and optionally one or more tactile output generators (e.g., tactile output generator(s) 163 (FIG. 1A) or tactile output generator(s) 357 (FIG. 3A)). Some operations in method 900 are, optionally, combined and/or the order of some operations is, optionally, changed.

As described below, method 900 provides an intuitive way to provide labels for different measurements, based on the distance between the electronic device and a given measurement. Providing maximum-size labels at short distances keeps these labels from getting too big and obscuring large portions of the representation of the field of view. Providing minimum-size labels at long distances keeps these labels legible. And providing variable-size labels at intermediate distances indicates the relative distances of the corresponding measurements in the representation of the field of view. Providing labels for different measurements at different distances in this manner enhances the operability of the device and makes the user-device interface more efficient (e.g., by helping the user to see and use measurement labels when operating/interacting with the device).

The electronic device displays (902), on the display, a user interface of an application (e.g., an augmented reality measurement application or an application that includes augmented reality measurement functionality).

The user interface includes (904) a representation of a field of view of at least one of the one or more cameras. The representation of the field of view is updated over time based on changes to current visual data detected by at least one of the one or more cameras (e.g., the representation of the field of view is a live view). The field of view includes a physical object in a three-dimensional space (e.g., a space in the physical world).

While displaying the representation of the field of view, the electronic device detects (906) one or more user inputs (e.g., tap gestures or press inputs on an affordance which, when activated, adds a measurement point to the displayed representation of the field of view), via the input device, that add, over the representation of the field of view, a representation of a first measurement that corresponds to the physical object (e.g., a displayed line that corresponds to a measurement of the length, width, or other dimension of the physical object, where the displayed line is superimposed or overlaid on the representation of the field of view). In some embodiments, the electronic device concurrently displays (908), over the representation of the field of view, the representation of the first measurement and a first label that describes the first measurement. In some embodiments, in accordance with a determination that a first distance between the electronic device and the physical object (e.g., a distance from one of the cameras of the electronic device to the physical object) is less than a first threshold distance (e.g., a lower distance threshold), the first label is (910) displayed at a first threshold size (e.g., an upper size threshold, or a maximum size, that does not change as the distance between the electronic device and the physical object decreases below the first threshold distance). In some embodiments, in accordance with a determination that the first distance between the electronic device and the physical object is greater than a second threshold distance (e.g., an upper distance threshold) that is greater than the first threshold distance, the first label is displayed at a second threshold size that is smaller than the first threshold size (e.g., a lower size threshold, or a minimum size, that does not change as the distance between the electronic device and the physical object increases above the second threshold distance). In some embodiments, in accordance with a determination that the first distance between the electronic device and the physical object is between the first threshold distance and the second threshold distance, the first label is displayed at a size, between the first threshold size and the second threshold size, that depends on the first distance between the electronic device and the physical object. Variations in label size based on distance between the electronic device and the physical object are shown in and described herein with reference to FIGS. 5AX-5BE.

In some embodiments, while concurrently displaying, over the representation of the field of view, the representation of the measurement and the label that describes the measurement: while the electronic device (or one of the cameras of the electronic device) is the first distance from the physical object, the electronic device displays (912) one or more first scale markers along the representation of the measurement at a first scale (e.g., displaying the one or more first scale markers at intervals of a first predefined distance along the representation of the measurement, corresponding to intervals of a first predefined physical distance in the three-dimensional space). In some embodiments, the electronic device detects movement of the electronic device (or movement of the one or more cameras thereof) that moves the electronic device to a second distance from the physical object. In some embodiments, while the electronic device is the second distance from the physical object, the electronic device displays one or more second scale markers along at least a portion of the representation of the measurement at a second scale that is distinct from the first scale (e.g., the electronic device displays the one or more second scale markers at intervals of a second predefined distance along the representation of the measurement, corresponding to intervals of a second predefined physical distance in the three-dimensional space). Variations in the scale of displayed markers based on distance between the electronic device and the physical object are shown in and described herein with reference to FIGS. 5AX-5BE.

In some embodiments, the one or more first scale markers at the first scale are displayed along the representation of the measurement while the electronic device is within a first predefined range of distances from the physical object (e.g., distances greater than the second threshold distance, or distances between the first threshold distance and the second threshold distance), where the first predefined range of distances includes the first distance. In some embodiments, the one or more second scale markers at the second scale are displayed along at least a portion of the representation of the measurement (e.g., if only a portion of the representation of the measurement continues to be displayed in the user interface as a result of the movement of the electronic device closer to the physical object) while the electronic device is within a second predefined range of distances from the physical object (e.g., distances between the first threshold distance and the second threshold distance, or distances less than the first threshold distance), where the second predefined range of distances includes the second distance.

In an example, the detected movement of the electronic device moves the electronic device closer to the physical object, such that the first distance is greater than the second distance. While the electronic device is the first distance from the physical object, the one or more scale markers are displayed at intervals along the representation of the measurement corresponding to intervals of one foot in the three-dimensional space. In the same example, while the electronic device is the second distance from the physical object, the one or more scale markers are displayed at intervals along the representation of the measurement corresponding to intervals of one inch in the three-dimensional space. One of ordinary skill in the art will recognize that different predefined physical distances may be denoted by the scale markers displayed while the device is at a respective distance from the physical object, such as meters, decimeters, centimeters, millimeters, yards, feet, inches, quarter inches, or any other suitable distance.

Providing scale markers that automatically change scale as the distance from a measurement to the device changes is more efficient than requiring a user to change the scale manually. Performing an operation when a set of conditions has been met (e.g., distance conditions) without requiring further user input enhances the operability of the device and makes the user-device interface more efficient (e.g., by helping the user to provide proper inputs and reducing user mistakes when operating/interacting with the device).

In some embodiments, the electronic device detects (914) a second set of one or more user inputs that add, over the representation of the field of view, a representation of a second measurement that corresponds to a respective physical object (e.g., the same physical object to which the first measurement corresponds, or a different physical object in the three-dimensional space) in the three-dimensional space. In some embodiments, the electronic device concurrently displays, over the representation of the field of view, the representation of the second measurement and a second label that describes the second measurement. In some embodiments, in accordance with a determination that a second distance between the electronic device and the respective physical object is less than the first threshold distance, the second label is displayed at the first threshold size. In some embodiments, in accordance with a determination that the second distance between the electronic device and the respective physical object is greater than the second threshold distance, the second label is displayed at the second threshold size. In some embodiments, in accordance with a determination that the second distance between the electronic device and the respective physical object is between the first threshold distance and the second threshold distance, the second label is displayed at a size, between the first threshold size and the second threshold size, that depends on the second distance between the electronic device and the respective physical object. In some embodiments, the representation of the field of view concurrently displays multiple labels that change in size as the field of view changes.

In some embodiments, the first distance between the electronic device and the physical object to which the first measurement corresponds is (916) different from the second distance between the electronic device and the respective physical object to which the second measurement corresponds. In some embodiments, the first label is displayed at a first size (e.g., based on the first distance), the second label is displayed at a second size (e.g., based on the second distance), and the first size is different from the second size. In an example, the first distance is in a first predefined range of distances, and the second distance is in a second predefined range of distances (e.g., the first predefined range is one of: distances less than the first threshold distance, distances greater than the second threshold distance, or distances between the first threshold distance and the second threshold distance, and the second predefined range is a different one of the aforementioned ranges). In another example, the first distance and the second distances are different distances in the range of distances between the first threshold distance and the second threshold distance, and, accordingly, the respective sizes of their associated labels (e.g., the labels corresponding to the measurements at the first distance and the second distance) are different.

It should be understood that the particular order in which the operations in FIGS. 9A-9B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 1000, 1100, 1200, 1300, and 1400) are also applicable in an analogous manner to method 900 described above with respect to FIGS. 9A-9B. For example, the inputs, user interface elements (e.g., measurement points, measurement segments, virtual annotations, representations of the physical space or field of view, affordances, alerts, indicators, labels, anchor points, and/or placement user interface elements such as a reticle and dot), tactile outputs, and intensity thresholds described above with reference to method 900 optionally have one or more of the characteristics of the inputs, user interface elements, tactile outputs, and intensity thresholds described herein with reference to other methods described herein (e.g., methods 600, 700, 800, 1000, 1100, 1200, 1300, and 1400). For brevity, these details are not repeated here.

FIGS. 10A-10B are flow diagrams illustrating method 1000 of measuring and interacting with rectangular areas in a physical space in an augmented reality environment in accordance with some embodiments. Method 1000 is performed at an electronic device (e.g., portable multifunction device 100 (FIG. 1A), device 300 (FIG. 3A), or computer system 301 (FIG. 3B)) that includes a display (e.g., touch screen 112 (FIG. 1A), display 340 (FIG. 3A), or display generation component(s) 304 (FIG. 3B)), an input device (e.g., touch screen 112 (FIG. 1A), touchpad 355 (FIG. 3A), input device(s) 302 (FIG. 3B), or a physical button that is separate from the display), and one or more cameras (e.g., optical sensor(s) 164 (FIG. 1A) or camera(s) 305 (FIG. 3B)), optionally one or more sensors to detect intensities of contacts with a touch-sensitive surface of the input device (e.g., contact intensity sensor(s) 165, FIG. 1A), and optionally one or more tactile output generators (e.g., tactile output generator(s) 163 (FIG. 1A) or tactile output generator(s) 357

(FIG. 3A)). Some operations in method 1000 are, optionally, combined and/or the order of some operations is, optionally, changed.

As described below, method 1000 provides an intuitive way to detect and indicate a rectangle that adjoins a measurement. By having the detected rectangle adjoin a measurement made in response to user inputs, method 1000 reduces the risk that the device will detect and indicate rectangles that are not relevant to the user (e.g., are not being measured), thereby creating a more efficient human-machine interface. For battery-operated electronic devices, enabling faster and more efficient detection and display of relevant rectangles conserves power and increases the time between battery charges.

The electronic device displays (1002), on the display, a user interface of an application (e.g., an augmented reality measurement application or an application that includes augmented reality measurement functionality).

The user interface includes (1004) a representation of a field of view of at least one of the one or more cameras. The representation of the field of view is updated over time based on changes to current visual data detected by at least one of the one or more cameras (e.g., the representation of the field of view is a live view). The field of view includes a physical object (or portion thereof) in a three-dimensional space (e.g., a space in the physical world).

While displaying the representation of the field of view, the electronic device detects (1006) one or more user inputs (e.g., tap gestures or press inputs on an affordance which, when activated, adds a measurement point to the displayed representation of the field of view), via the input device, that add, over the representation of the field of view, a representation of a first measurement that corresponds to the physical object (e.g., the detected user inputs cause the electronic device to add a displayed line that corresponds to a measurement of an edge of the physical object, where the displayed line is superimposed or overlaid on the representation of the field of view).

The representation of the first measurement includes (1008) a first endpoint that corresponds to a first location on the physical object. The representation of the first measurement includes a second endpoint that corresponds to a second location on the physical object. The representation of the first measurement includes a first line segment connecting the first endpoint and the second endpoint. The addition of a representation of a measurement including two endpoints and a first line segment connecting the two endpoints is shown in and described herein with reference to FIGS. 5J-5O.

The electronic device determines (1010), based in part on the first measurement (or the representation thereof), a first area in the representation of the field of view that adjoins the first line segment of the first measurement. The first area corresponds to a physical rectangular area (e.g., the entire physical rectangular area or a portion thereof) in the three-dimensional space. For example, the first area corresponds to a physical rectangular area, or a portion thereof, of the physical object and the first measurement corresponds to one edge of the physical rectangular area of the physical object). In some embodiments, the first area in the representation of the field of view is not displayed as rectangular in the representation of the field of view, due to a viewing angle of at least one of the one or more cameras with respect to the physical rectangular area. In some embodiments, the electronic device determines that the physical area corresponding to the first area in the representation of the field of view is a rectangular area based on image processing (e.g., using depth estimation) of the representation of the field of view. In some embodiments, the field of view of at least one of the one or more cameras includes a first portion of the physical rectangular area without including one or more additional portions of the physical rectangular area. In some embodiments, viewing the one or more additional portions of the physical rectangular area requires movement of the device that moves the field of view of at least one of the one or more cameras to include the one or more additional portions of the physical rectangular area.

The electronic device displays (1012) an indication of the first area in the user interface (e.g., indicator 5058, FIG. 5P). The indication is overlaid (e.g., superimposed) on the first area in the representation of the field of view.

In some embodiments, the user interface includes (1014) a measurement-point-creation indicator that is displayed over the representation of the field of view (e.g., reticle 5010 in combination with focus point 5012, FIG. 5Y). In some embodiments, the indication of the first area is displayed in accordance with a determination that the measurement-point-creation indicator is displayed over the first area in the representation of the field of view of the one or more cameras (e.g., as shown in and described herein with reference to FIG. 5Y). In some embodiments, while the measurement-point-creation indicator (or at least a portion thereof) is over the first area, the electronic device detects a user input via the input device (e.g., a tap gesture or press input on a touch-sensitive surface at a location corresponding to an affordance which, when activated, adds a measurement or measurement point to the displayed representation of the field of view). In some embodiments, in response to detecting the user input while the measurement-point-creation indicator is over the first area, the electronic device changes a visual appearance of the indication of the first area to indicate that the first area has been confirmed (e.g., as shown in and described herein with reference to FIG. 5Z).

In some embodiments, the user input is detected while the measurement-point-creation indicator is over the first area and while the indication of the first area is displayed, and the visual appearance of the indication of the first area is changed in response to (e.g., in accordance with) detecting the user input both while the measurement-point-creation indicator is over the first area and while the indication of the first area is displayed. In some embodiments, the method includes displaying, over the representation of the field of view, one or more labels that describe the first area (e.g., concurrently displayed with the indication displayed with changed visual appearance). In some embodiments, the one or more labels that describe the first area include a label that indicates a length of a first side of the first area (e.g., a length of the physical rectangular area), a label that indicates a length of a second side of the first area (e.g., a width of the physical rectangular area), and/or a label that indicates an area of the first area (e.g., an area of the physical rectangular area) (e.g., as shown in and described herein with reference to FIG. 5Z).

Changing the appearance of the indication of the first area provides visual feedback that the electronic device has detected the user's confirmation that the rectangle adjoining the first measurement is correct. Providing improved feedback enhances the operability of the device and makes the user-device interface more efficient (e.g., by helping the user to provide proper inputs and reducing user mistakes when operating/interacting with the device).

In some embodiments, the one or more user inputs add (1016), over the representation of the field of view, a representation of a second measurement that corresponds to the physical object (e.g., the detected user inputs cause the electronic device to add a second displayed line that corresponds to a measurement of a second edge of the physical object, where the second displayed line is superimposed or overlaid on the representation of the field of view) (e.g., a measurement represented by measurement segment 5066 and its corresponding endpoints, FIG. 5Y). In some embodiments, the representation of the second measurement includes the second endpoint that corresponds to the second location on the physical object (e.g., measurement point 5054, FIG. 5Y). In some embodiments, the representation of the second measurement includes a third endpoint that corresponds to a third location on the physical object (e.g., the third location is different from the first location and the second location) (e.g., measurement point 5090, FIG. 5Y). In some embodiments, the representation of the second measurement includes a second line segment connecting the second endpoint and the third endpoint (e.g., measurement segment 5066, FIG. 5Y). In some embodiments, the first area in the representation of the field of view of the one or more cameras is determined based on the first measurement and the second measurement. In some embodiments, the first area adjoins the first line segment of the first measurement and the second line segment of the second measurement. Determining the first area based on two measurements reduces the risk that the device will detect and indicate rectangles that are not relevant to the user (e.g., are not being measured), thereby enhancing the operability of the device and making the user-device interface more efficient (e.g., by helping the user to provide proper inputs and reducing user mistakes when operating/interacting with the device).

In some embodiments, the field of view of at least one of the one or more cameras includes (1018) a first portion of the physical rectangular area, and the first area corresponds to the first portion of the physical rectangular area (e.g., as described with reference to the region indicated by indicator 5104, FIG. 5AB). In some embodiments, the electronic device detects movement of the electronic device that moves the field of view of at least one of the one or more cameras (e.g., as shown in and described herein with reference to FIGS. 5AC-5AD). In some embodiments, in response to detecting the movement of the electronic device that moves the field of view, the electronic device updates the representation of the field of view over time to display one or more indications of one or more additional areas that correspond to one or more additional portions of the physical rectangular area. In some embodiments, in accordance with a determination that an aggregate area, including the first area and the one or more additional areas displayed over time, corresponds to the entire physical rectangular area, the electronic device displays, over the representation of the field of view, a label that describes a measurement that corresponds to the physical rectangular area (e.g., as described herein with reference to label 5110, FIG. 5AE). In some embodiments, the label indicates an area of the measurement (e.g., an area of the entire physical rectangular area). Automatically showing, as the field of view changes, indications of additional areas that correspond to the physical rectangular area provides visual feedback that the electronic device has correctly detected the physical rectangular area. Providing improved feedback enhances the operability of the device and makes the user-device interface more efficient (e.g., by helping the user to provide proper inputs and reducing user mistakes when operating/interacting with the device).

In some embodiments, after displaying, over the representation of the field of view, the label that describes the measurement that corresponds to the physical rectangular area in accordance with the determination that the aggregate area corresponds to the entire physical rectangular area, the electronic device detects (1020) further movement of the electronic device that moves the field of view of at least one of the one or more cameras such that the representation of the field of view includes the first area corresponding to the first portion of the physical rectangular area. In some embodiments, in accordance with the determination that the aggregate area corresponds to the entire physical rectangular area, the electronic device displays, over the first area corresponding to the first portion of the physical rectangular area, the label that describes the measurement that corresponds to the physical rectangular area (e.g., as described herein with reference to FIG. 5AF). Displaying the label describing the measurement of the physical rectangular area at different portions of the physical rectangular area when those portions are (re)displayed provides visual feedback that the electronic device has correctly detected the physical rectangular area and that the measurement has been correctly associated with all portions of the physical rectangular area. Providing improved feedback enhances the operability of the device and makes the user-device interface more efficient (e.g., by helping the user to provide proper inputs and reducing user mistakes when operating/interacting with the device).

It should be understood that the particular order in which the operations in FIGS. 10A-10B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1100, 1200, 1300, and 1400) are also applicable in an analogous manner to method 1000 described above with respect to FIGS. 10A-10B. For example, the inputs, user interface elements (e.g., measurement points, measurement segments, virtual annotations, representations of the physical space or field of view, affordances, alerts, indicators, labels, anchor points, and/or placement user interface elements such as a reticle and dot), tactile outputs, and intensity thresholds described above with reference to method 1000 optionally have one or more of the characteristics of the inputs, user interface elements, tactile outputs, and intensity thresholds described herein with reference to other methods described herein (e.g., methods 600, 700, 800, 900, 1100, 1200, 1300, and 1400). For brevity, these details are not repeated here.

FIGS. 11A-11B are flow diagrams illustrating method 1100 of interacting with and managing measurement information in an augmented reality environment in accordance with some embodiments. Method 1100 is performed at an electronic device (e.g., portable multifunction device 100 (FIG. 1A), device 300 (FIG. 3A), or computer system 301 (FIG. 3B)) that includes a touch-sensitive display (e.g., touch screen 112 (FIG. 1A), or display generation component(s) 304 in combination with input device(s) 302 (FIG. 3B)), and one or more cameras (e.g., optical sensor(s) 164 (FIG. 1A) or camera(s) 305 (FIG. 3B)), optionally one or more sensors to detect intensities of contacts with the touch-sensitive display (e.g., contact intensity sensor(s) 165, FIG. 1A), and optionally one or more tactile output generators (e.g., tactile output generator(s) 163 (FIG. 1A) or tactile output generator(s) 357 (FIG. 3A)). Some operations in method 1100 are, optionally, combined and/or the order of some operations is, optionally, changed.

As described below, method 1100 provides an intuitive way to share information about a measurement, by initiating a process for sharing the information in response to detecting a touch input on a representation of the measurement. Method 1100 reduces the number, extent, and/or nature of the inputs from a user when sharing information about a measurement, thereby creating a more efficient human-machine interface. For battery-operated electronic devices, enabling a user to share information about a measurement faster and more efficiently conserves power and increases the time between battery charges.

The electronic device displays (1102), on the touch-sensitive display, a first user interface of an application (e.g., an augmented reality measurement application or an application that includes augmented reality measurement functionality).

The first user interface includes (1104) a representation of a field of view of at least one of the one or more cameras. The representation of the field of view is updated over time based on changes to current visual data detected by at least one of the one or more cameras (e.g., the representation of the field of view is a live view). The field of view includes a physical object in a three-dimensional space (e.g., a space in the physical world). A representation of a measurement of the physical object is superimposed on an image of the physical object in the representation of the field of view.

While displaying the first user interface, the electronic device detects (1106) a first touch input on the touch-sensitive display on the representation of the measurement (e.g., a tap, double tap, or press input on the displayed measurement) (e.g., touch-input 5182, FIG. 5BL).

In response to detecting the first touch input on the touch-sensitive display on the representation of the measurement, the electronic device initiates (1108) a process for sharing information about the measurement (e.g., sending information about the measurement to a clipboard process or a communication application (e.g., a text messaging application, an e-mail application, a file transfer application), etc.) (e.g., as described herein with reference to FIGS. 5BL-5BM). In some embodiments, the process includes adding the measurement information to a clipboard. In some embodiments, the process includes sending the information to a second application. In some embodiments, initiating the process includes displaying a second user interface that includes user-selectable options for sharing the information about the measurement, such as a share sheet user interface. In some embodiments, the second user interface includes the information describing the measurement. In some embodiments, the information includes an automatically generated semantic label classifying the physical object (e.g., as a window, wall, floor, or table) on which the measurement is superimposed. In some embodiments, the information includes an automatically generated semantic label classifying a relationship between the first measurement and the physical object (e.g., a length, width, height, or depth of the physical object).

In some embodiments, initiating the process for sharing information about the measurement includes (1110) copying the information about the measurement (e.g., to a clipboard process provided by an operating system of the electronic device). In some embodiments, after copying the information about the measurement, the electronic device detects one or more user inputs to paste the information about the measurement to a destination on the electronic device. In some embodiments, in response to detecting the one or more user inputs to paste the information about the measurement to the destination on the electronic device, the electronic device displays the information about the measurement at the destination on the electronic device. Enabling copying and pasting of the information about the measurement makes it easy to share the measurement within the same application and with other applications on the electronic device. Making information available to multiple applications enhances the operability of the device and makes the user-device interface more efficient (e.g., by making it easy to select an application for sharing or sending the measurement).

In some embodiments, initiating the process for sharing the information about the measurement includes (1112) displaying a second user interface (e.g., measurement management interface 5184, FIG. 5BM) that includes one or more activatable user interface elements, where a respective activatable user interface element in the one or more activatable user interface elements corresponds to a respective destination for the information about the measurement (e.g., icons 5192, 5194, and 5196, FIG. 5BM). In some embodiments, each of the one or more activatable user interface elements corresponds to a respective application (other than the first application) or process on the electronic device (e.g., a messaging application (e.g., icon 5194, FIG. 5BM), an email application (e.g., icon 5192, FIG. 5BM), a notetaking application, a file transfer protocol (e.g., icon 5196, FIG. 5BM), etc.). In some embodiments, the electronic device detects a second touch input on the touch-sensitive display on a respective activatable user interface element in the second user interface. In some embodiments, in response to detecting the second touch input, the electronic device transmits the information about the measurement to the respective destination corresponding to the respective activatable user interface element.

In some embodiments, transmitting the information about the measurement to the respective destination includes transmitting the information to a second application (e.g., a notetaking application) on the electronic device. In some embodiments, transmitting the information about the measurement to the respective destination includes displaying a third user interface for reviewing, editing, and/or annotating the information about the measurement prior to transmitting the information to a subsequent destination (e.g., the third user interface includes an affordance upon selection of which the information, including any edits and annotations, is transmitted from the respective destination (e.g., a messaging application or an email application) to a subsequent destination (e.g., another electronic device)). In some embodiments, transmitting the information about the measurement to the respective destination includes transmitting the information to a second electronic device via a file transfer protocol between the electronic device and the second electronic device.

Providing a user interface with activatable user interface elements for multiple destinations for the shared measurement (e.g., a share sheet with destination icons) makes it easy to share the measurement with these destinations. Providing multiple sharing destination options enhances the operability of the device and makes the user-device interface more efficient (e.g., by making it easy to select an application for sharing or sending the measurement).

In some embodiments, in response to detecting the first touch input on the touch-sensitive display on the representation of the measurement, the electronic device displays (1114) the information about the measurement. In some embodiments, the information about the measurement includes a magnitude of the measurement (e.g., as shown in measurement management interface 5184, FIG. 5BM). In some embodiments, the information about the measurement includes a semantic label classifying a relationship between the measurement and the physical object (e.g., a length, width, height, or depth of the physical object) (e.g., as described herein with reference to label 5186-*b* in measurement management interface 5184, FIG. 5BM). In some embodiments, the information about the measurement includes a label (e.g., a text label) classifying a relationship between the measurement and an identified anchor feature of the three-dimensional space (e.g., whether an area in the representation of the field of view corresponds to a physical rectangular area that is parallel to the ground). In some embodiments, where the measurement corresponds to a physical rectangular area and includes a length measurement, a width measurement, and an area measurement, the length, width, and area are displayed, and the length and width are displayed more prominently than the area. Providing information about the measurement, in addition to initiating a process for sharing the information, in response to detecting a touch input on a representation of the measurement, provides visual feedback that the user has selected the correct measurement for sharing, and allows a user to see and use the information. Providing improved feedback enhances the operability of the device and makes the user-device interface more efficient (e.g., by helping the user to provide proper inputs and reducing user mistakes when operating/interacting with the device).

In some embodiments, the displaying of the information about the measurement is (1116) performed in accordance with a determination that the first touch input meets first criteria, where the first criteria include a requirement that an intensity of a contact in the first touch input meet (e.g., reach or exceed) a respective intensity threshold in order for the first criteria to be met (e.g., as described herein with reference to FIGS. 5BL-5BM). In some embodiments, the respective intensity threshold is a light-press intensity threshold $IT_L$ that is above a contact detection intensity threshold $IT_0$. Providing information about the measurement in response to detecting a touch input on a representation of the measurement that meets intensity criteria reduces accidental, unwanted display of the information. Performing an operation when intensity criteria have been met enhances the operability of the device and makes the user-device interface more efficient (e.g., by helping the user to provide proper inputs and reducing user mistakes when operating/interacting with the device).

In some embodiments, the electronic device determines (1118) a classification of the physical object (e.g., a classification of the physical object as a respective structural feature (such as a window, a wall, a floor, etc.) or as a respective piece of furniture or fixture (such as a table)). In some embodiments, the information about the measurement includes a label indicating the classification of the physical object (e.g., as described herein with reference to label 5186-*a* in measurement management interface 5184, FIG. 5BM). In some embodiments, the electronic device classifies the physical object based on image processing (e.g., using feature recognition) of the representation of the field of view of the one or more cameras. Automatically classifying and labeling the physical object, without requiring further user input, enhances the operability of the device and makes the user-device interface more efficient by reducing (or eliminating) the need for the user to manually classify and label physical objects.

In some embodiments, the representation of the measurement was (1120) added to the user interface of the application based at least in part on movement of the electronic device in a first direction during the measurement. In some embodiments, the electronic device determines a classification of a relationship between the measurement and the physical object (e.g., a classification of the measurement as corresponding to a length, width, height, or depth of the physical object) based at least in part on the movement of the electronic device in the first direction during the measurement (e.g., as described herein with reference to FIG. 5BM).

In some embodiments, the information about the measurement includes a label indicating the classification of the relationship between the measurement and the physical object. For example, the electronic device classifies the measurement as a height of the physical object based on the movement of the electronic device being in a vertical direction during the measurement, or as a width of the physical object based on the movement of the electronic device being in a horizontal direction during the measurement. In some embodiments, the electronic device classifies the relationship between the measurement and the physical object based further on image processing (e.g., feature recognition) of the representation of the field of view to determine respective distances between the electronic device and respective points on the physical object corresponding to respective points along the measurement. For example, the electronic device classifies the measurement as a depth of the physical object based further on a determination that a first point on the physical object, corresponding to a first endpoint of the measurement, is further from (or closer to) (e.g., in a z-direction) the electronic device than a second point on the physical object, corresponding to a second endpoint of the measurement.

Automatically classifying and labeling a measurement, based in part on the movement of the device during the measurement, without requiring further user input, enhances the operability of the device and makes the user-device interface more efficient, by reducing (or eliminating) the need for the user to manually classify and label measurements.

It should be understood that the particular order in which the operations in FIGS. 11A-11B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1200, 1300, and 1400) are also applicable in an analogous manner to method 1100 described above with respect to FIGS. 11A-11B. For example, the inputs, user interface elements (e.g., measurement points, measurement segments, virtual annotations, representations of the physical space or field of view, affordances, alerts, indicators, labels, anchor points, and/or placement user interface elements such as a reticle and dot), tactile outputs, and intensity thresholds described above with reference to method 1100 optionally have one or more of the characteristics of the inputs, user interface elements, tactile outputs, and intensity thresholds described herein with reference to other methods described herein (e.g., methods 600, 700, 800, 900, 1000, 1200, 1300, and 1400). For brevity, these details are not repeated here.

FIGS. 12A-12C are flow diagrams illustrating method 1200 of providing automatically determined alignment guides in an augmented reality environment in accordance with some embodiments. Method 1200 is performed at an electronic device (e.g., portable multifunction device 100 (FIG. 1A), device 300 (FIG. 3A), or computer system 301 (FIG. 3B)) that includes a display (e.g., touch screen 112 (FIG. 1A), display 340 (FIG. 3A), or display generation component(s) 304 (FIG. 3B)), an input device (e.g., touch screen 112 (FIG. 1A), touchpad 355 (FIG. 3A), or input device(s) 302 (FIG. 3B), or a physical button that is separate from the display), and one or more cameras (e.g., optical sensor(s) 164 (FIG. 1A) or camera(s) 305 (FIG. 3B)), optionally one or more sensors to detect intensities of contacts with a touch-sensitive surface of the input device (e.g., contact intensity sensor(s) 165, FIG. 1A), and optionally one or more tactile output generators (e.g., tactile output generator(s) 163 (FIG. 1A) or tactile output generator(s) 357 (FIG. 3A)). Some operations in method 1200 are, optionally, combined and/or the order of some operations is, optionally, changed.

As described below, method 1200 provides an intuitive way to provide (virtual) guides in an augmented reality-based measurement, with the guides extending along a direction of movement of a field of view of a camera. Providing measurement guides helps a user position and place (virtual) measurement points quickly and accurately. By automatically providing guides along a direction of movement of a field of view of a camera, method 1200 reduces the number, extent, and/or nature of the inputs from a user when making measurements, thereby creating a more efficient human-machine interface. For battery-operated electronic devices, enabling a user to make measurements faster and more efficiently conserves power and increases the time between battery charges.

The electronic device displays (1202), on the display, a user interface of an application (e.g., an augmented reality measurement application or an application that includes augmented reality measurement functionality). The user interface includes (1204) a representation of a field of view of at least one of the one or more cameras; the representation of the field of view is updated over time based on changes to current visual data detected by at least one of the one or more cameras (e.g., the representation of the field of view is a live view); and the field of view includes at least a portion of a three-dimensional space (e.g., a space in the physical world that includes physical objects).

The electronic device detects (1206) movement of the electronic device that moves the field of view of at least one of the one or more cameras in a first direction (e.g., horizontally, or vertically) (or, in some embodiments, in substantially the first direction (e.g., a direction that is within a predefined threshold angle of a first direction, such as within 10, 15, 20 or 25 degrees of the first direction)).

While detecting the movement of the electronic device that moves the field of view in the first direction (1208), the electronic device updates (1210) the representation of the field of view in accordance with the movement of the electronic device; identifies (1212) one or more first elements (or features) in the representation of the field of view that extend along the first direction (e.g., a detected edge, a detected plane, etc.); and, based at least in part on the determination of the one or more first elements, displays (1214), in the representation of the field of view, a first guide that extends in the first direction and that corresponds to one of the one or more first identified elements (e.g., as described herein with reference to virtual guide 5050, FIG. 5M). In some embodiments, the electronic device displays a plurality of guides in the first direction (e.g., as described herein with reference to virtual guides 5106, FIG. 5AB). In some embodiments, each of the plurality of guides corresponds to a respective identified element that extends along the first direction (e.g., a respective edge, of a respective physical object in the three-dimensional space, that extends along the first direction). In some embodiments, the electronic device displays one or more guides in the first direction while detecting the movement of the electronic device.

In some embodiments, the field of view includes (1216) a plurality of elements, and the plurality of elements includes one or more elements that extend in directions other than the first direction (e.g., directions perpendicular to or substantially perpendicular to (e.g., within a predefined threshold angle of being perpendicular to) the first direction, or directions that are greater than a predefined threshold angle from the first direction, such as greater than 10, 15, 20 or 25 degrees from the first direction). In some embodiments, while detecting the movement of the electronic device that moves the field of view in the first direction, the electronic device forgoes displaying guides that extend in directions other than the first direction (e.g., as described herein with reference to FIGS. 5AN-5AO and 5AV). For example, the electronic device determines an axis of a physical object (e.g., a table or a wall) along which to extend guides based on the direction of movement of the camera. In some embodiments, the electronic device displays one or more guides, corresponding to one or more elements in the field of view, that extend in the direction of movement of at least one camera, without displaying guides that extend in directions other than the direction of motion of the at least one camera. Providing one or more guides along the direction of movement of the field of view, without providing guides that extend in other directions, avoids displaying guides that are not likely to be relevant to the measurement being made. Reducing clutter in the user interface enhances the operability of the device and makes the user-device interface more efficient (e.g., by helping the user to provide proper inputs and reducing user mistakes when operating/interacting with the device).

In some embodiments, prior to detecting the movement of the electronic device that moves the field of view in the first direction (1218), the electronic device detects a first touch input on the touch-sensitive display, and, in response to detecting the first touch input, adds and displays a first (virtual) measurement point at a first location in the representation of the field of view that corresponds to a first location in the three-dimensional space (e.g., measurement point 5054, FIG. 5R). Displaying the first guide is further based on a determination that the one or more first elements correspond to the first location in the three-dimensional space (e.g., the first location is a point along a detected edge). In addition, the first guide includes the first location in the representation of the field of view (e.g., the guide overlaps with the measurement point, or extends from the measurement point in the first direction) (e.g., as described herein with reference to virtual guide 5070, FIG. 5S). Providing a guide that extends from and/or includes a first measurement point along the direction of movement of the field of view helps a user to place a second measurement point, and thereby make a measurement. Providing this visual feedback enhances the operability of the device and makes the user-device interface more efficient (e.g., by helping the user to provide proper measurement inputs and reducing user mistakes when operating/interacting with the device).

In some embodiments, the first measurement point at the first location in the representation of the field of view is (1220) a most-recently-added measurement point in the representation of the field of view. Providing a guide that extends from and/or includes the most-recently-added measurement point along the direction of movement of the field of view helps a user to place the next measurement point, and thereby make a measurement between the two most-recently-added measurement points. Providing this visual feedback enhances the operability of the device and makes the user-device interface more efficient (e.g., by helping the user to provide proper measurement inputs and reducing user mistakes when operating/interacting with the device).

In some embodiments, after detecting the movement of the electronic device that moves the field of view in the first direction (e.g., horizontally, as described herein with reference to FIG. 5S), the electronic device (1222) detects movement of the electronic device that moves the field of view in a second direction (e.g., vertically, as described herein with reference to FIG. 5T). In response to detecting the movement of the electronic device that moves the field of view in the second direction, the electronic device ceases to display the first guide that extends in the first direction. In some embodiments, the electronic device ceases to display any guides in any directions other than the second direction or within a predefined threshold angle of the second direction (e.g., as described herein with reference to FIG. 5T). While detecting the movement of the electronic device that moves the field of view in the second direction, the electronic device updates the representation of the field of view in accordance with the movement of the electronic device, identifies one or more second elements in the representation of the field of view that extend along the second direction, and, based at least in part on the determination of the one or more second elements, displays, in the representation of the field of view, a second guide that extends in the second direction and that corresponds to one of the one or more identified second elements (e.g., virtual guide 5072, FIG. 5T). Automatically changing guides, as the direction of movement of the field of view changes, displays guides that are more likely to be relevant to the measurement being made (and ceases to display guides that are less likely to be relevant to the measurement being made). Reducing clutter in the user interface enhances the operability of the device and makes the user-device interface more efficient (e.g., by helping the user to provide proper inputs and reducing user mistakes when operating/interacting with the device).

In some embodiments, at least one of the one or more first identified elements to which the first guide corresponds is (1224) an element identified as an edge of a physical object in the three-dimensional space (e.g., as described herein with reference to FIG. 5S). Automatically displaying a guide along an edge of a physical object that runs in the first direction helps a user to place measurement points and make measurements along the edge. Automatically providing a guide along an edge of an object, without requiring further user input, enhances the operability of the device and makes the user-device interface more efficient (e.g., by helping the user to provide proper measurement inputs and reducing user mistakes when operating/interacting with the device).

In some embodiments, at least one of the one or more first identified elements to which the first guide corresponds is (1226) an element identified as a plane in the three-dimensional space (e.g., corresponding to a surface of a physical object in the three-dimensional space). Automatically displaying a guide along a plane that runs in the first direction helps a user to place measurement points and make measurements along the plane. Automatically providing a guide along a plane, without requiring further user input, enhances the operability of the device and makes the user-device interface more efficient (e.g., by helping the user to provide proper measurement inputs and reducing user mistakes when operating/interacting with the device).

In some embodiments, the user interface includes (1228) a measurement-point-creation indicator that is displayed over the representation of the field of view. In some embodiments, the electronic device displays a respective measurement point at a respective location in the representation of the field of view that corresponds to a respective location in the three-dimensional space. In some embodiments, the electronic device detects movement of the electronic device that moves the measurement-point-creation indicator over the respective measurement point in the representation of the field of view, and, in response to detecting the movement of the electronic device, while the measurement-point-creation indicator is displayed over the respective measurement point, the electronic device displays a plurality of guides. A first guide of the plurality of guides is perpendicular to a second guide of the plurality of guides, and the plurality of guides intersect at the respective measurement point. Display of perpendicular guides is described herein with reference to FIG. 5AT.

In some embodiments, a respective guide of the plurality of guides is displayed based at least in part on a determination that the respective guide extends along an element in the representation of the field of view that extends from the measurement point. For example, if the measurement point corresponds to a corner of a physical object in the three-dimensional space, the one or more guides include a guide that extends in a first direction (e.g., along an x-axis) from the corner of the physical object along an edge of the physical object that extends in the first direction (e.g., an edge corresponding to a (horizontal) length of the physical object), as displayed in the representation of the field of view. In some embodiments, the one or more guides include a guide that extends in a second direction (e.g., along a y-axis) from the corner of the physical object along an edge of the physical object that extends in the second direction (e.g., corresponding to a (vertical) height of the physical object), as displayed in the representation of the field of view. In some embodiments, the one or more guides include a guide that extends in a third direction (e.g., along a z-axis) from the corner of the physical object along an edge of the physical object that extends in the third direction (e.g., an edge corresponding to a depth of the physical object), as displayed in the representation of the field of view.

Automatically displaying a plurality of perpendicular guides at a measurement point, while a measurement-point-creation indicator is displayed over the measurement point, helps a user to place additional measurement points. Automatically providing perpendicular guides at a measurement point, without requiring further user input, enhances the operability of the device and makes the user-device interface more efficient (e.g., by helping the user to provide proper measurement inputs and reducing user mistakes when operating/interacting with the device).

In some embodiments, the user interface includes (1230) a measurement-point-creation indicator that is displayed over a second location in the representation of the field of view. In some embodiments, while displaying the first guide that extends in the first direction, the electronic device detects a second touch input on the touch-sensitive display. In response to detecting the second touch input, and in accordance with a determination that a distance (e.g., a shortest distance) between the second location and the first guide is within a threshold distance, the electronic device adds and displays a second (virtual) measurement point at the location on the first guide that is the distance from the second location. For example, FIG. 5X illustrates the addition of measurement point 5090 at a point on virtual guide 5072. In response to detecting the second touch input, and in accordance with a determination that a distance between the second location and the first guide is not within the threshold distance, the electronic device adds and displays the second measurement point at the second location (e.g., measurement point 5080 is not within the threshold distance of virtual guide 5072, and thus measurement point 5080 is not added to a point on virtual guide 5072). Automatically adding a measurement point on a guide (e.g., snapping the measurement point to a location on the guide) or adding the measurement point off the guide, depending on the distance between the location of a measurement-point-creation indicator and the guide, helps a user to place measurement points quickly and accurately. Performing an operation when a set of conditions has been met (e.g., a distance condition), without requiring further user input, enhances the operability of the device and makes the user-device interface more efficient (e.g., by helping the user to provide proper measurement inputs and reducing user mistakes when operating/interacting with the device).

It should be understood that the particular order in which the operations in FIGS. 12A-12C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100, 1300, and 1400) are also applicable in an analogous manner to method 1200 described above with respect to FIGS. 12A-12C. For example, the inputs, user interface elements (e.g., measurement points, measurement segments, virtual annotations, representations of the physical space or field of view, affordances, alerts, indicators, labels, anchor points, and/or placement user interface elements such as a reticle and dot), tactile outputs, and intensity thresholds described above with reference to method 1200 optionally have one or more of the characteristics of the inputs, user interface elements, tactile outputs, and intensity thresholds described herein with reference to other methods described herein (e.g., methods 600, 700, 800, 900, 1000, 1100, 1300, and 1400). For brevity, these details are not repeated here.

FIGS. 13A-13C are flow diagrams illustrating method 1300 of automatically removing previously-added virtual annotations in accordance with some embodiments. Method 1300 is performed at an electronic device (e.g., portable multifunction device 100 (FIG. 1A), device 300 (FIG. 3A), or computer system 301 (FIG. 3B)) that includes one or more input devices (e.g., touch screen 112 (FIG. 1A), touchpad 355 (FIG. 3A), or input device(s) 302 (FIG. 3B), or a physical button that is separate from the display), one or more display devices (e.g., touch screen 112 (FIG. 1A), display 340 (FIG. 3A), or display generation component(s) 304 (FIG. 3B)), and one or more cameras (e.g., optical sensor(s) 164 (FIG. 1A) or camera(s) 305 (FIG. 3B)), optionally one or more sensors to detect intensities of contacts with a touch-sensitive surface of the input device (e.g., contact intensity sensor(s) 165, FIG. 1A), and optionally one or more tactile output generators (e.g., tactile output generator(s) 163 (FIG. 1A) or tactile output generator(s) 357 (FIG. 3A)). Some operations in method 1300 are, optionally, combined and/or the order of some operations is, optionally, changed.

As described below, method 1300 provides an intuitive way to automatically delete prior virtual annotations (such as prior augmented-reality-based measurements) that are not connected or related to current virtual annotations (such as current augmented-reality-based measurements). Automatically deleting prior, unrelated virtual annotations prevents the augmented reality user interface from becoming cluttered with earlier virtual annotations while making new virtual annotations. As described herein, method 1300 makes it easy to make individual virtual annotations without having to manually delete prior virtual annotations, and also makes it easy to take a series of related virtual annotations (e.g., connected virtual annotations) without deleting early virtual annotations in the series as new virtual annotations are added to the series. The method reduces the number, extent, and/or nature of the inputs from a user when making augmented-reality-based virtual annotations, thereby creating a more efficient human-machine interface. For battery-operated electronic devices, enabling a user to make augmented-reality-based virtual annotations faster and more efficiently conserves power and increases the time between battery charges.

In particular, when the virtual annotations are augmented-reality-based measurements, automatically deleting prior, unrelated augmented-reality-based measurements prevents the measurement user interface from becoming cluttered with earlier measurements while making new measurements. These automatic deletions also remove measurements for which the electronic device may no longer have accurate mappings to the physical space. As described herein, method 1300 makes it easy to take individual measurements without having to manually delete prior measurements, and also makes it easy to take a series of related measurements (e.g., connected measurements) without deleting early measurements in the series as new measurements are added to the series. The method reduces the number, extent, and/or nature of the inputs from a user when making augmented-reality-based measurements, thereby creating a more efficient human-machine interface. For battery-operated electronic devices, enabling a user to make augmented-reality-based measurements faster and more efficiently conserves power and increases the time between battery charges.

The electronic device displays (1302), via the one or more display devices, a user interface that includes a representation of a physical space (e.g., a live preview of a portion of the physical space that is in the field of view of at least one of the one or more cameras). For example, user interface 5006 in FIG. 5BS includes a representation of physical space 5000.

While displaying the representation of the physical space, the electronic device receives (1304) a first set of one or more inputs to create a virtual annotation (e.g., a shape, line, rectangle, measurement, or the like) in the representation of the physical space (e.g., an input to drop a point followed by movement of the electronic device relative to the physical space followed by another input to drop a point).

In response to receiving the first set of one or more inputs, the electronic device adds (1306) a first virtual annotation to the representation of the physical space. The first virtual annotation is linked to a portion of the representation of the physical space. For example, as shown in FIGS. 5BS-5BU, a virtual annotation that includes measurement segment 5212 and its associated endpoints 5206 and 5216 is created in user interface 5006 and linked to a representation of (physical) object 5202. As another example, as shown in FIGS. 5BV-5BY, a virtual annotation that includes measurement segment 5222 and its associated endpoints 5220 and 5224 is created in user interface 5006 and linked to a representation of object 5202.

In some embodiments, adding a virtual annotation to the representation of the physical space includes creating a virtual annotation and linking it to a position in the representation of the physical space, so that the virtual annotation appears fixed or substantially fixed in the representation of the physical space. In some embodiments, a virtual annotation "in" the representation of the physical space or "added to" the representation of the physical space is actually added to a model of the physical space and is drawn on top of camera images of the physical space when the portion of the representation of the physical space to which the virtual annotation is linked appears in the camera images of the physical space, to give the impression that the virtual annotation is in the physical space. In some embodiments, a virtual annotation "removed from" the representation of the physical space is actually removed from a model of the physical space and, once it has been "removed from" the representation of the physical space, it is no longer drawn on top of camera images of the physical space when the portion of the representation of the physical space to which the virtual annotation was linked appears in the camera images of the physical space, to give the impression that the virtual annotation is no longer in the physical space.

After adding the first virtual annotation to the representation of the physical space, the electronic device receives (1310) a second set of one or more inputs associated with the representation of the physical space.

In response to receiving the second set of one or more inputs associated with the representation of the physical space (1312), in accordance with a determination that the second set of one or more inputs corresponds to a request to create a virtual annotation in the representation of the physical space that is within a threshold distance from the first virtual annotation (1314), the electronic device creates a second virtual annotation in the representation of the physical space (e.g., linked to a second portion of the representation of the physical space) while maintaining the first virtual annotation in the representation of the physical space. In some embodiments, the first virtual annotation and the second virtual annotation are concurrently displayed. In some embodiments, the threshold distance is zero (e.g., the second virtual annotation must be connected with the first virtual annotation in order for the first virtual annotation to be maintained when the second virtual annotation is created). In some embodiments, the threshold distance is greater than zero (e.g., if the second virtual annotation is within a predetermined distance to the first virtual annotation, the first virtual annotation is maintained when the second virtual annotation is created, even if the second virtual annotation is not connected to or touching the first virtual annotation). For example, as shown in FIGS. 5BZ-5CF, because measurement segment 5232 is within a threshold distance from previously-added measurement segment 5222, previously-added measurement segment 5222 is maintained in the representation of physical space 5000 in user interface 5006 when/after measurement segment 5232 is created. In another example, as shown in FIGS. 5CG-5CK, because measurement segment 5242 is within a threshold distance from previously-added measurement segments 5232 and 5222, previously-added measurement segments 5232 and 5222 are maintained in the representation of physical space 5000 in user interface 5006 when/after measurement segment 5242 is created.

In addition, in response to receiving the second set of one or more inputs associated with the representation of the physical space (1312), in accordance with a determination that the second set of one or more inputs corresponds to a request to create a virtual annotation in the representation of the physical space that is outside of the threshold distance from the first virtual annotation (1316), the electronic device creates a second virtual annotation in the representation of the physical space (e.g., linked to a second portion of the representation of the physical space) and removes the first virtual annotation from the representation of the physical space. In some embodiments, the first virtual annotation is removed without an explicit request to remove the first virtual annotation (e.g., the device does not detect a user input, separate from the second set of inputs used to create the second virtual annotation, requesting deletion of the first virtual annotation). For example, as shown in FIGS. 5BV-5BY, because measurement segment 5222 is outside of the threshold distance from previously-added measurement segment 5212, previously-added measurement segment 5212 is removed when/after measurement segment 5222 is added.

In some embodiments, creating the second virtual annotation in the representation of the physical space while maintaining the first virtual annotation in the representation of the physical space includes (1318) starting to create the second virtual annotation at a location that corresponds to at least a portion of the first virtual annotation (e.g., if the creation of measurement segment 5232 in FIGS. 5CA-5CF had instead started with the placement of measurement point 5234 in FIG. 5CF and ended with the placement of measurement point 5228 in FIG. 5CA). Automatically keeping a prior virtual annotation when a subsequent virtual annotation starts on the prior virtual annotation enables the electronic device to make a series of related virtual annotations (e.g., a series of connected measurements), without deleting early annotations (e.g., measurements) in the series as new annotations are added to the series. Performing an operation when a set of conditions has been met (e.g., when a subsequent virtual annotation starts on the prior virtual annotation) without requiring further user input enhances the operability of the device and makes the user-device interface more efficient (e.g., by helping the user to provide proper inputs and reducing user mistakes when operating/interacting with the device).

In some embodiments, creating the second virtual annotation in the representation of the physical space while maintaining the first virtual annotation in the representation of the physical space includes (1320) completing creation of the second virtual annotation at a location that corresponds to at least a portion of the first virtual annotation. For example, as shown in FIGS. 5BZ-5CF, creation of measurement segment 5232 is completed at a location that corresponds to an endpoint of measurement segment 5222, and measurement segment 5222 is thus maintained in the representation of physical space 5000. Automatically keeping a prior virtual annotation when a subsequent virtual annotation ends on the prior virtual annotation enables the electronic device to make a series of related virtual annotations (e.g., a series of connected measurements), without deleting early annotations (e.g., measurements) in the series as new annotations are added to the series. Performing an operation when a set of conditions has been met (e.g., when a subsequent virtual annotation ends on the prior virtual annotation) without requiring further user input enhances the operability of the device and makes the user-device interface more efficient (e.g., by helping the user to provide proper inputs and reducing user mistakes when operating/interacting with the device).

In some embodiments, in response to receiving the second set of one or more inputs associated with the representation of the physical space (1322), in accordance with a determination that the second set of one or more inputs correspond to a request to shift a field of view of at least one of the one or more cameras by more than a threshold amount (e.g., shifting a field of view of at least one of the one or more cameras by an amount that causes a fidelity of tracking of the link between the first virtual annotation and the representation of the physical space to degrade by more than a threshold amount), the electronic device removes the first virtual annotation from the representation of the physical space. In some embodiments, the first virtual annotation is removed without an explicit request to remove the first virtual annotation (e.g., the electronic device does not detect a user input requesting deletion of the first virtual annotation). An example of removal of virtual annotations in accordance with movement of the camera(s) by more than a threshold amount is described herein with reference to FIGS. 5CL-5CM. Automatically removing a prior virtual annotation (e.g., measurement) when the field of view for a subsequent virtual annotation shifts by more than a threshold amount reduces clutter in the augmented reality user interface and avoids potential problems with the fidelity of tracking and displaying prior virtual annotations that are not near new virtual annotations. Performing an operation when a set of conditions has been met without requiring further user input enhances the operability of the device and makes the user-device interface more efficient (e.g., by helping the user to provide proper inputs and reducing user mistakes when operating/interacting with the device).

In some embodiments, in response to receiving the second set of one or more inputs associated with the representation of the physical space (1324), in accordance with a determination that the second set of one or more inputs correspond to a request to shift a field of view of at least one of the one or more cameras so that the first virtual annotation is no longer visible for more than a threshold amount of time (e.g., shifting a field of view of at least one of the one or more cameras away from the portion of the physical space to which the first virtual annotation appears to be linked for more than a threshold amount of time), the electronic device removes the first virtual annotation from the representation of the physical space. In some embodiments, the first virtual annotation is removed without an explicit request to remove the first virtual annotation (e.g., the device does not detect a user input requesting deletion of the first virtual annotation). An example of removal of virtual annotations in accordance with movement of the camera(s) so that the virtual annotations are no longer visible for more than a threshold amount of time is described herein with reference to FIGS. 5CL-5CM. Automatically removing a prior virtual annotation (e.g., measurement) when the field of view for a subsequent virtual annotation shifts by more than a threshold amount of time reduces clutter in the augmented reality user interface and avoids potential problems with the fidelity of tracking and displaying prior virtual annotations that are not near new virtual annotations. Performing an operation when a set of conditions has been met without requiring further user input enhances the operability of the device and makes the user-device interface more efficient (e.g., by helping the user to provide proper inputs and reducing user mistakes when operating/interacting with the device).

In some embodiments, while receiving the second set of one or more inputs and while the first virtual annotation is in the representation of the physical space, the electronic device outputs (1326) an indication that further input will cause the first virtual annotation to be removed from the representation of the physical space. In some embodiments, the indication includes a graphical indication, an audio indication, and/or a tactile indication. For example, as shown in FIGS. 5BW-5BX, device 100 changes the appearance of measurement segment 5212 to indicate that further input will cause measurement segment 5212 to be removed from the representation of physical space 5000 in user interface 5006. In another example, as shown in FIGS. 5CA-5CB, device 100 changes the appearance of measurement segment 5222 to indicate that further input will cause measurement segment 5222 to be removed from the representation of physical space 5000 in user interface 5006. Providing visual, audio, and/or haptic feedback that further input will delete the prior virtual annotation (e.g., measurement) provides an opportunity to alter the input so that the prior virtual annotation is not accidentally removed. Providing improved feedback enhances the operability of the device and makes the user-device interface more efficient (e.g., by helping the user to provide proper inputs and reducing user mistakes when operating/interacting with the device).

In some embodiments, the indication is (1328) a visual indication that is displayed in a predetermined portion of the user interface that is used for displaying alerts (e.g., a designated alert area in the user interface, such as the area in user interface 5006 above reticle 5010 (e.g., the area in which error message 5248 is displayed in FIG. 5CM)). Providing visual feedback in a designated area of the user interface for displaying alerts increases the likelihood that a user will see and understand the feedback/alert. Providing improved feedback enhances the operability of the device and makes the user-device interface more efficient (e.g., by helping the user to provide proper inputs and reducing user mistakes when operating/interacting with the device).

In some embodiments, the indication is (1330) a change in appearance of the first virtual annotation in the representation of the physical space (e.g., changing a line color, line style, line thickness, fill, opacity, etc.). For example, as shown in FIGS. 5BW-5BX, the appearance (e.g., line color and line style) of measurement segment 5212 is changed. In some embodiments, the change in appearance of the first virtual annotation increases in magnitude as a reticle for point placement moves away from the first virtual annotation). Providing visual feedback by changing the appearance of the first virtual annotation increases the likelihood that a user will see and understand that the first virtual annotation will be removed if the same input continues. Providing improved feedback enhances the operability of the device and makes the user-device interface more efficient (e.g., by helping the user to provide proper inputs and reducing user mistakes when operating/interacting with the device).

In some embodiments, the first virtual annotation is (1332) a representation of a measurement that includes a description of the measurement (e.g., a text description of the distance or area measured by the measurement), and the change in appearance of the first virtual annotation includes removing the description from the representation of the measurement while maintaining at least a portion of the representation of the measurement. For example, as shown in FIG. 5BV, the label associated with measurement segment 5212 is removed when reticle 5010 is moved away from measurement segment 5212. Providing visual feedback by removing a label or other description from a measurement while maintaining a line or other shape that represents the measurement increases the likelihood that a user will see and understand that the measurement will be removed if the same input continues. Providing improved feedback enhances the operability of the device and makes the user-device interface more efficient (e.g., by helping the user to provide proper inputs and reducing user mistakes when operating/interacting with the device).

In some embodiments, after displaying the change in appearance of the first virtual annotation in the representation of the physical space (1334), the electronic device detects an input at a location within a threshold distance (e.g., the same threshold distance that will be used to determine whether or not to remove the first virtual annotation from the display when the second virtual annotation is created) from the first virtual annotation (e.g., hovering the reticle for point placement on or near the first virtual annotation), and, in response to detecting the input at the location within the threshold distance form the first virtual annotation, reverses the change in appearance of the first virtual indication (e.g., to indicate that if the second virtual annotation includes a portion at the location within the threshold distance from the first virtual annotation, the first virtual annotation will not be removed when the second virtual annotation is created). For example, the change in appearance of measurement segment 5222 from FIGS. 5CA-5CB is reversed in FIG. 5CC when focus point 5012 snaps to a point on measurement segment 5222. After providing visual feedback to indicate that the prior virtual annotation will be removed, and after a user alters their input by making the input closer to or on the prior virtual annotation, providing feedback to indicate that the prior virtual annotation will be maintained helps guide the user's input. Providing improved feedback enhances the operability of the device and makes the user-device interface more efficient (e.g., by helping the user to provide proper inputs and reducing user mistakes when operating/interacting with the device).

It should be understood that the particular order in which the operations in FIGS. 13A-13C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100, 1200, and 1400) are also applicable in an analogous manner to method 1300 described above with respect to FIGS. 13A-13C. For example, the inputs, user interface elements (e.g., measurement points, measurement segments, virtual annotations, representations of the physical space or field of view, affordances, alerts, indicators, labels, anchor points, and/or placement user interface elements such as a reticle and dot), tactile outputs, and intensity thresholds described above with reference to method 1300 optionally have one or more of the characteristics of the inputs, user interface elements, tactile outputs, and intensity thresholds described herein with reference to other methods described herein (e.g., methods 600, 700, 800, 900, 1000, 1100, 1200, and 1400). For brevity, these details are not repeated here.

FIGS. 14A-14D are flow diagrams illustrating method 1400 of indicating whether objects in a physical space have been identified as objects whose corresponding representations in an augmented reality environment can be tracked in accordance with some embodiments. Method 1400 is performed at an electronic device (e.g., portable multifunction device 100 (FIG. 1A), device 300 (FIG. 3A), or computer system 301 (FIG. 3B)) that includes one or more input devices (e.g., touch screen 112 (FIG. 1A), touchpad 355 (FIG. 3A), or input device(s) 302 (FIG. 3B), or a physical button that is separate from the display), one or more display devices (e.g., touch screen 112 (FIG. 1A), display 340 (FIG. 3A), or display generation component(s) 304 (FIG. 3B)), and one or more cameras (e.g., optical sensor(s) 164 (FIG. 1A) or camera(s) 305 (FIG. 3B)), optionally one or more sensors to detect intensities of contacts with a touch-sensitive surface of the input device (e.g., contact intensity sensor(s) 165, FIG. 1A), and optionally one or more tactile output generators (e.g., tactile output generator(s) 163 (FIG. 1A) or tactile output generator(s) 357 (FIG. 3A)). Some operations in method 1400 are, optionally, combined and/or the order of some operations is, optionally, changed.

As described below, method 1400 provides visual feedback while placing virtual annotations (e.g., virtual measurements) in an augmented reality environment. Providing improved feedback enhances the operability of the device and makes the user-device interface more efficient (e.g., by helping the user to provide proper inputs and reducing user mistakes when operating/interacting with the device).

The electronic device displays (1402), via the one or more display devices, an annotation placement user interface. The annotation placement user interface includes (1404): a representation of a physical space (e.g., a live preview of a portion of the physical space that is in the field of view of at least one of the one or more cameras); and a placement user interface element (e.g., a placement indicator) that indicates a location at which a virtual annotation will be placed in the representation of the physical space in response to detecting an annotation placement input (e.g., a tap on a drop point button or a tap on the placement user interface element). For example, as shown in FIG. 5CN, device 100 displays user interface 5006 that includes a representation of physical space 5000 and a placement user interface element in the form of reticle 5010 in conjunction with focus point 5012 that indicates a location at which a virtual annotation will be placed in the representation of physical space 5000 in response to detecting an annotation placement input (e.g., a tap on measurement addition button 5014 or, in some embodiments, a tap on reticle 5010 and/or focus point 5012).

While displaying the annotation placement user interface, the electronic device detects (1406) movement of at least one of the one or more cameras relative to the physical space. The movement of at least one of the one or more cameras starts (1408) while the placement user interface element is displayed at a location in the representation of the physical space that corresponds to a first portion of the physical space. In some embodiments, the movement includes one or more of moving laterally (e.g., moving up, down, left, right), rotating (e.g., rotating right, left, up, down), or moving forward or backward.

In response to detecting the movement of at least one of the one or more cameras relative to the physical space, the electronic device moves (1410) the placement user interface element to a location in the representation of the physical space that corresponds to a second portion of the physical space that is different from the first portion of the physical space, and updates an appearance of the annotation placement user interface in accordance with the movement of at least one of the one or more cameras relative to the physical space, including: in accordance with a determination that the electronic device is unable to identify an object in the second portion of the physical space whose corresponding object in the representation of the physical space can be linked to a virtual annotation, ceasing (1412) to display at least a portion of the placement user interface element; and in accordance with a determination that the device has identified an object in the second portion of the physical space whose corresponding object in the representation of the physical space can be linked to a virtual annotation, maintaining (1414) display of the placement user interface element. For example, as shown in FIG. 5CN, reticle 5010 and focus point 5012 are displayed in accordance with a determination that device 100 has identified an object (table 5200) in physical space 5000 such that measurements can be added to the representation of table 5200 in user interface 5006. In FIG. 5CO, reticle 5010 and focus point 5012 are not displayed in accordance with a determination that device 100 is unable to identify such an object in physical space 5000. Providing visual feedback that the electronic device is unable to identify an object in the physical space whose corresponding object in the representation of the physical space can be linked to a virtual annotation (e.g., by ceasing to display at least a portion of the placement user interface element) informs a user that the field of view needs to be changed (by moving the electronic device) until such an object is identified. Providing improved feedback enhances the operability of the device and makes the user-device interface more efficient (e.g., by helping the user to provide proper inputs and reducing user mistakes when operating/ interacting with the device).

In some embodiments, in response to detecting the movement of at least one of the one or more cameras relative to the physical space (1416): in accordance with a determination that the placement user interface element is at a location in the representation of the physical space that corresponds to a first object in the physical space that is a first distance away from one of the one or more cameras, the electronic device displays the placement user interface element at a first size; and in accordance with a determination that the placement user interface element is at a location in the representation of the physical space that corresponds to a second object in the physical world that is a second distance away from one of the one or more cameras, the electronic device displays the placement user interface element at a second size. In some embodiments, the first distance is greater than the second distance and the first size is less than the second size. For example, as shown in FIGS. 5BO and 5BT, reticle 5010 and focus point 5012 are displayed at smaller respective sizes when positioned over a location in the live preview that corresponds to a further point in physical space 5000 (as shown in FIG. 5BO) than when positioned over a location in the live preview that corresponds to a closer point in physical space 5000 (as shown in FIG. 5BT). In another example, as shown in FIGS. 5CG and 5CJ, reticle 5010 and focus point 5012 are displayed at smaller respective sizes when positioned over a location in the live preview that corresponds to a further point in physical space 5000 (as shown in FIG. 5CG) than when positioned over a location in the live preview that corresponds to a closer point in physical space 5000 (as shown in FIG. 5CJ). When the placement user interface element is at the location of a given object in the live view from a camera, the electronic device adjusts the size of the placement user interface element based on the distance from the camera to the given object in the physical space. This visual feedback provides information to a user about the relative positions of objects in the physical space. Providing improved feedback enhances the operability of the device and makes the user-device interface more efficient (e.g., by helping the user to provide proper inputs and reducing user mistakes when operating/interacting with the device).

In some embodiments, the first size of the placement user interface element in the representation of the physical space is (1418) larger relative to the first object in the physical space than the second size of the placement user interface element in the representation of the physical space relative to the second object in the physical space (e.g., as described herein with reference to FIG. 5BT). Although in some embodiments the size of the placement user interface element is based on the distance from the camera to the given object in the physical space, to avoid having the size be too small when an object is far away from the camera (or be too large when the object is very close to the camera), the size in some embodiments does not scale precisely with distance. Providing improved feedback enhances the operability of the device and makes the user-device interface more efficient (e.g., by helping the user to provide proper inputs and reducing user mistakes when operating/interacting with the device).

In some embodiments, the placement user interface element includes (1420) a first portion (e.g., a reticle, such as reticle 5010 in FIG. 5CC) and a second portion (e.g., a dot, such as focus point 5012 in FIG. 5CC, or other marker). In some embodiments, in response to detecting the movement of at least one of the one or more cameras relative to the physical space: in accordance with a determination that the placement user interface element is at a location in the representation of the physical space that corresponds to a predefined type of feature in the physical space (e.g., a corner, line or other feature that the second portion of the placement user interface element can snap to), the electronic device updates the appearance of the placement user interface element so that the second portion of the placement user interface element is enlarged relative to the first portion of the placement user interface element; and in accordance with a determination that the placement user interface element is at a location in the representation of the physical space that does not correspond to a predefined type of feature in the physical space (e.g., a corner, line or other feature that the second portion of the placement user interface element can snap to), the electronic device maintains display of the placement user interface element without enlarging the second portion of the placement user interface element relative to the first portion of the placement user interface element. For example, as shown in FIGS. 5CC and 5CE, when focus point is snapped to an anchor point (such as a point of interest on a previously-added measurement or a point of interest on a representation of a physical object), focus point 5012 is enlarged relative to reticle 5010 (and relative to the size of focus point 5012 when not snapped to an anchor point). Changing the appearance of the placement user interface element (e.g., by increasing the size of a placement dot relative to the rest of the placement user interface element) when it is over a feature that a virtual annotation point can be snapped to makes it easy to add a virtual annotation point at that feature. Providing improved feedback enhances the operability of the device and makes the user-device interface more efficient (e.g., by helping the user to provide proper inputs and reducing user mistakes when operating/interacting with the device).

In some embodiments in which the placement user interface element includes (1422) a first portion (e.g., a reticle) and a second portion (e.g., a dot or other marker), in response to detecting the movement of at least one of the one or more cameras relative to the physical space: in accordance with a determination that the placement user interface element is at a location in the representation of the physical space that corresponds to a predefined type of feature in the physical space (e.g., a corner, line or other feature that the second portion of the placement user interface element can snap to), the electronic device updates the appearance of the placement user interface element so that the second portion of the placement user interface element is shifted relative to the first portion of the placement user interface element; and in accordance with a determination that the placement user interface element is at a location in the representation of the physical space that does not correspond to a predefined type of feature in the physical space (e.g., a corner, line or other feature that the second portion of the placement user interface element can snap to), the electronic device maintains display of the placement user interface element without shifting the second portion of the placement user interface element relative to the first portion of the placement user interface element. For example, as shown in FIGS. 5CC and 5CE, when focus point is snapped to an anchor point (such as a point of interest on a previously-added measurement or a point of interest on a representation of a physical object), focus point 5012 is shifted relative to reticle 5010 (and relative to the position of focus point 5012 within reticle 5010 when not snapped to an anchor point). Changing the appearance of the placement user interface element when it is over a feature that a virtual annotation point can be snapped to (e.g., by shifting the location of a placement dot relative to the rest of the placement user interface element, so that the placement dot snaps to the feature) makes it easy to add a virtual annotation point at that feature. Providing improved feedback enhances the operability of the device and makes the user-device interface more efficient (e.g., by helping the user to provide proper inputs and reducing user mistakes when operating/interacting with the device).

In some embodiments, in response to detecting the movement of at least one of the one or more cameras relative to the physical space (1424), in accordance with a determination that the device is unable to identify an object in the second portion of the physical space whose corresponding object in the representation of the physical space can be linked to a virtual annotation, the electronic device displays an alert (e.g., separate from or overlaid on the annotation placement user interface) with information indicating that the electronic device is unable to identify an object in the second portion of the physical space whose corresponding object in the representation of the physical space can be linked to a virtual annotation. For example, as shown in FIG. 5CO, in response to movement of device 100 further away from table 5200 device 100 displays error message 5250 to indicate that device 100 is unable to identify an object in physical space 5000 whose corresponding object in the representation of physical space 5000 in user interface 5006 can be linked to a virtual annotation (e.g., a virtual measurement). Displaying an alert that the electronic device is unable to identify an object in the physical space whose corresponding object in the representation of the physical space can be linked to a virtual annotation informs a user that the field of view needs to be changed (by moving the electronic device) until such an object is identified. Providing improved feedback enhances the operability of the device and makes the user-device interface more efficient (e.g., by helping the user to provide proper inputs and reducing user mistakes when operating/interacting with the device).

In some embodiments, in response to detecting the movement of at least one of the one or more cameras relative to the physical space (1426), in accordance with a determination that the device is unable to identify an object in the second portion of the physical space whose corresponding object in the representation of the physical space can be linked to a virtual annotation, the electronic device displays an alert (e.g., separate from or overlaid on the placement user interface) with information indicating a reason that the electronic device is unable to identify an object in the second portion of the physical space whose corresponding object in the representation of the physical space can be linked to a virtual annotation. In some embodiments, the alert includes information describing steps that can be taken to improve the ability of the electronic device to identify objects in the physical space. For example, as shown in FIG. 5CO, in response to movement of device 100 further away from table 5200 device 100 displays error message 5250 to indicate that device 100 is unable to identify an object because device 100 needs to be moved closer to objects in the field of view of the camera. Displaying an alert that: (1) explains why the electronic device is unable to identify an object in the physical space whose corresponding object in the representation of the physical space can be linked to a virtual annotation, and/or (2) informs a user how the field of view needs to be changed (e.g., by moving the electronic device) helps to correct this situation. Providing improved feedback enhances the operability of the device and makes the user-device interface more efficient (e.g., by helping the user to provide proper inputs and reducing user mistakes when operating/interacting with the device).

In some embodiments, the information indicating the reason that the device is unable to identify an object in the second portion of the physical space whose corresponding object in the representation of the physical space can be linked to a virtual annotation includes (1428) one or more of: an indication that more light is required (e.g., as shown in FIG. 5D), an indication that at least one of the one or more cameras (or the electronic device) is moving too fast, an indication that at least one of the one or more cameras (or the electronic device) needs to be moved to locate a surface in the physical space (e.g., as shown in FIG. 5E), an indication that at least one of the one or more cameras (or the electronic device) needs to be moved further away from objects in the physical space, and an indication that at least one of the one or more cameras (or the electronic device) needs to be moved closer to objects in the physical space (e.g., as shown in FIG. 5CO).

In some embodiments, while displaying the placement user interface element at a location over the representation of the physical space that corresponds to the second portion of the physical space, the electronic device detects (1430) a placement input (e.g., a tap gesture on the placement user interface element or a button that triggers placement of virtual annotations in the annotation placement user interface). In some embodiments, in response to detecting the placement input, the electronic device places at least a portion of a virtual annotation in the representation of the physical space at a location that corresponds to the placement user interface element. In some embodiments, the placement of the portion of the annotation includes dropping a first point in a measurement. In some embodiments, the placement of the portion of the annotation includes dropping a second or third point in a measurement. In some embodiments, the placement of the portion of the annotation includes completing placement of a measurement in the representation of the physical space. For example, as shown in FIGS. 5BP-5BQ, touch input 5204 (e.g., a tap gesture) on reticle 5010 and focus point 5012 triggers placement of measurement point 5206 in the representation of physical space 5000 in user interface 5006 at the location that corresponds to focus point 5012. Placing a virtual annotation point at the displayed location of the placement user interface element, in response to a placement input, makes it easy to position the virtual annotation point at the correct location in the representation of the physical space. Providing improved visual feedback enhances the operability of the device and makes the user-device interface more efficient (e.g., by helping the user to provide proper inputs and reducing user mistakes when operating/interacting with the device).

In some embodiments, while displaying the placement user interface element at a location over the representation of the physical space that corresponds to the second portion of the physical space, the electronic device detects (1432) an input at a location that corresponds to the placement user interface element (e.g., for an electronic device with a touch-sensitive display, a tap gesture on the placement user interface element). In some embodiments, in response to detecting the input at the location that corresponds to the placement user interface element, the electronic device displays a graphical indication adjacent to (or near) a different user interface element in the annotation placement user interface that indicates that activation of the different user interface element (e.g., for a touch-sensitive display, by a tap gesture on the different user interface element) will cause placement of at least a portion of a virtual annotation in the representation of the physical space at a location that corresponds to the placement user interface element (e.g., the electronic device displays instructions to tap a button to drop a point, where the button is different from the placement user interface element and is located away from the placement user interface element). For example, as shown in FIG. 5BR, touch input 5204 (e.g., a tap gesture) on reticle 5010 and focus point 5012 results in display of instruction message 5208 near measurement addition button 5014 to indicate that activation of measurement addition button 5014 will cause placement of a measurement point in the representation of physical space 5000 in user interface 5006 at the location that corresponds to focus point 5012. In some embodiments, when a user tries to create a virtual annotation point by tapping on the placement user interface element (rather than tapping on a different element, such as a "+," "add," or similar element), the electronic device displays a message next to the "+," "add," or similar element indicating that this is the correct element to tap on to create a virtual annotation point (instead of tapping on the placement user interface element). Providing improved feedback enhances the operability of the device and makes the user-device interface more efficient (e.g., by helping the user to provide proper inputs and reducing user mistakes when operating/interacting with the device).

It should be understood that the particular order in which the operations in FIGS. 14A-14D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100, 1200, and 1300) are also applicable in an analogous manner to method 1400 described above with respect to FIGS. 14A-14D. For example, the inputs, user interface elements (e.g., measurement points, measurement segments, virtual annotations, representations of the physical space or field of view, affordances, alerts, indicators, labels, anchor points, and/or placement user interface elements such as a reticle and dot), tactile outputs, and intensity thresholds described above with reference to method 1400 optionally have one or more of the characteristics of the inputs, user interface elements, tactile outputs, and intensity thresholds described herein with reference to other methods described herein (e.g., methods 600, 700, 800, 900, 1000, 1100, 1200, and 1300). For brevity, these details are not repeated here.

The operations described above with reference to FIGS. 6A-6C, 7A-7E, 8A-8C, 9A-9B, 10A-10B, 11A-11B, 12A-12C, 13A-13C, and 14A-14D are, optionally, implemented by components depicted in FIGS. 1A-1B. For example, detecting operations 606, 614, 706, 708, 812, 906, 1006, 1106, 1206, 1334, 1430, and 1432, and receiving operations 1304 and 1310 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive display (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with one or more input devices, one or more display devices, and one or more cameras:
   displaying, via the one or more display devices, a user interface that includes a representation of a physical space;
   while displaying the representation of the physical space, receiving a first set of one or more inputs to create a virtual annotation in the representation of the physical space;
   in response to receiving the first set of one or more inputs, displaying a first virtual annotation in the representation of the physical space, wherein the first virtual annotation comprises a representation of a first measure segment and is linked to a portion of the representation of the physical space;
   after displaying the first virtual annotation to the representation of the physical space, receiving a second set of one or more inputs associated with the representation of the physical space; and, in response to receiving the second set of one or more inputs associated with the representation of the physical space:

in accordance with a determination that the second set of one or more inputs corresponds to a request to create a virtual annotation in the representation of the physical space that is within a threshold distance from the first virtual annotation, displaying a second virtual annotation in the representation of the physical space while maintaining the display of the first virtual annotation in the representation of the physical space, wherein the second virtual annotation comprises a representation of a second measure segment; and, in accordance with a determination that the second set of one or more inputs corresponds to a request to create a virtual annotation in the representation of the physical space that is outside of the threshold distance from the first virtual annotation:

displaying and maintaining the second virtual annotation in the representation of the physical space; and automatically, in response to the second set of one or more inputs, removing the display of the first virtual annotation from the representation of the physical space.

2. The method of claim 1, wherein displaying the second virtual annotation in the representation of the physical space while maintaining the display of the first virtual annotation in the representation of the physical space includes starting to create the second virtual annotation at a location that corresponds to at least a portion of the first virtual annotation.

3. The method of claim 1, wherein displaying the second virtual annotation in the representation of the physical space while maintaining the display of the first virtual annotation in the representation of the physical space includes completing creation of the second virtual annotation at a location that corresponds to at least a portion of the first virtual annotation.

4. The method of claim 1, including, in response to receiving the second set of one or more inputs associated with the representation of the physical space, in accordance with a determination that the second set of one or more inputs correspond to a request to shift a field of view of at least one of the one or more cameras by more than a threshold amount, removing the first virtual annotation from the representation of the physical space.

5. The method of claim 1, including, in response to receiving the second set of one or more inputs associated with the representation of the physical space, in accordance with a determination that the second set of one or more inputs correspond to a request to shift a field of view of at least one of the one or more cameras so that the first virtual annotation is no longer visible for more than a threshold amount of time, removing the first virtual annotation from the representation of the physical space.

6. The method of claim 1, including, while receiving the second set of one or more inputs and while the first virtual annotation is in the representation of the physical space, outputting an indication that further input will cause the first virtual annotation to be removed from the representation of the physical space.

7. The method of claim 6, wherein the indication is a visual indication that is displayed in a predetermined portion of the user interface that is used for displaying alerts.

8. The method of claim 6, wherein the indication is a change in appearance of the first virtual annotation in the representation of the physical space.

9. The method of claim 8, wherein the first virtual annotation is a representation of a measurement that includes a description of the measurement, and the change in appearance of the first virtual annotation includes removing the description from the representation of the measurement while maintaining at least a portion of the representation of the measurement.

10. The method of claim 8, including, after displaying the change in appearance of the first virtual annotation in the representation of the physical space:

detecting an input corresponding to a request to create a virtual annotation in the representation of the physical space that is within the threshold distance from the first virtual annotation; and, in response to detecting the input corresponding to a request to create a virtual annotation in the representation of the physical space that is within the threshold distance from the first virtual annotation, reversing the change in appearance of the first virtual annotation.

11. An electronic device, comprising:

one or more input devices;

one or more display devices;

one or more cameras;

one or more processors; and memory storing one or more programs, wherein the one or more programs are configured to be executed by the one or more processors, the one or more programs including instructions for:

displaying, via the one or more display devices, a user interface that includes a representation of a physical space;

while displaying the representation of the physical space, receiving a first set of one or more inputs to create a virtual annotation in the representation of the physical space;

in response to receiving the first set of one or more inputs, displaying a first virtual annotation in the representation of the physical space, wherein the first virtual annotation comprises a representation of a first measure segment and is linked to a portion of the representation of the physical space;

after displaying the first virtual annotation to the representation of the physical space, receiving a second set of one or more inputs associated with the representation of the physical space; and, in response to receiving the second set of one or more inputs associated with the representation of the physical space:

in accordance with a determination that the second set of one or more inputs corresponds to a request to create a virtual annotation in the representation of the physical space that is within a threshold distance from the first virtual annotation, displaying a second virtual annotation in the representation of the physical space while maintaining the display of the first virtual annotation in the representation of the physical space, wherein the second virtual annotation comprises a representation of a second measure segment; and, in accordance with a determination that the second set of one or more inputs corresponds to a request to create a virtual annotation in the representation of the physical space that is outside of the threshold distance from the first virtual annotation:
- displaying and maintaining the second virtual annotation in the representation of the physical space; and
- automatically, in response to the second set of one or more inputs, removing the display of the first virtual annotation from the representation of the physical space.

12. The electronic device of claim 11, wherein displaying the second virtual annotation in the representation of the physical space while maintaining the display of the first virtual annotation in the representation of the physical space includes starting to create the second virtual annotation at a location that corresponds to at least a portion of the first virtual annotation.

13. The electronic device of claim 11, wherein displaying the second virtual annotation in the representation of the physical space while maintaining the display of the first virtual annotation in the representation of the physical space includes completing creation of the second virtual annotation at a location that corresponds to at least a portion of the first virtual annotation.

14. The electronic device of claim 11, wherein the one or more programs include instructions for, in response to receiving the second set of one or more inputs associated with the representation of the physical space, in accordance with a determination that the second set of one or more inputs correspond to a request to shift a field of view of at least one of the one or more cameras by more than a threshold amount, removing the first virtual annotation from the representation of the physical space.

15. The electronic device of claim 11, wherein the one or more programs include instructions for, in response to receiving the second set of one or more inputs associated with the representation of the physical space, in accordance with a determination that the second set of one or more inputs correspond to a request to shift a field of view of at least one of the one or more cameras so that the first virtual annotation is no longer visible for more than a threshold amount of time, removing the first virtual annotation from the representation of the physical space.

16. The electronic device of claim 11, wherein the one or more programs include instructions for, while receiving the second set of one or more inputs and while the first virtual annotation is in the representation of the physical space, outputting an indication that further input will cause the first virtual annotation to be removed from the representation of the physical space.

17. The electronic device of claim 16, wherein the indication is a visual indication that is displayed in a predetermined portion of the user interface that is used for displaying alerts.

18. The electronic device of claim 16, wherein the indication is a change in appearance of the first virtual annotation in the representation of the physical space.

19. The electronic device of claim 18, wherein the first virtual annotation is a representation of a measurement that includes a description of the measurement, and the change in appearance of the first virtual annotation includes removing the description from the representation of the measurement while maintaining at least a portion of the representation of the measurement.

20. The electronic device of claim 18, wherein the one or more programs include instructions for, after displaying the change in appearance of the first virtual annotation in the representation of the physical space:
- detecting an input corresponding to a request to create a virtual annotation in the representation of the physical space that is within the threshold distance from the first virtual annotation; and,
- in response to detecting the input corresponding to a request to create a virtual annotation in the representation of the physical space that is within the threshold distance from the first virtual annotation, reversing the change in appearance of the first virtual annotation.

21. A non-transitory computer readable storage medium storing one or more programs, the one or more programs comprising instructions that, when executed by an electronic device that includes one or more input devices, one or more display devices, and one or more cameras, cause the electronic device to:
- display, via the one or more display devices, a user interface that includes a representation of a physical space;
- while displaying the representation of the physical space, receive a first set of one or more inputs to create a virtual annotation in the representation of the physical space;
- in response to receiving the first set of one or more inputs, display a first virtual annotation in the representation of the physical space, wherein the first virtual annotation comprises a representation of a first measure segment and is linked to a portion of the representation of the physical space;
- after displaying the first virtual annotation to the representation of the physical space, receive a second set of one or more inputs associated with the representation of the physical space; and,
- in response to receiving the second set of one or more inputs associated with the representation of the physical space:
  - in accordance with a determination that the second set of one or more inputs corresponds to a request to create a virtual annotation in the representation of the physical space that is within a threshold distance from the first virtual annotation, display a second virtual annotation in the representation of the physical space while maintaining the display of the first virtual annotation in the representation of the physical space, wherein the second virtual annotation comprises a representation of a second measure segment; and,
  - in accordance with a determination that the second set of one or more inputs corresponds to a request to create a virtual annotation in the representation of the physical space that is outside of the threshold distance from the first virtual annotation:
    - display and maintain the second virtual annotation in the representation of the physical space; and
    - automatically, in response to the second set of one or more inputs, remove the display of the first virtual annotation from the representation of the physical space.

22. The non-transitory computer readable storage medium of claim 21, wherein displaying the second virtual annotation in the representation of the physical space while maintaining the display of the first virtual annotation in the representation of the physical space includes starting to create the second virtual annotation at a location that corresponds to at least a portion of the first virtual annotation.

23. The non-transitory computer readable storage medium of claim 21, wherein displaying the second virtual annotation in the representation of the physical space while maintaining the display of the first virtual annotation in the representation of the physical space includes completing creation of the second virtual annotation at a location that corresponds to at least a portion of the first virtual annotation.

24. The non-transitory computer readable storage medium of claim 21, wherein the one or more programs include instructions that, when executed by the electronic device, cause the electronic device, in response to receiving the second set of one or more inputs associated with the representation of the physical space, in accordance with a determination that the second set of one or more inputs correspond to a request to shift a field of view of at least one of the one or more cameras by more than a threshold amount, to remove the first virtual annotation from the representation of the physical space.

25. The non-transitory computer readable storage medium of claim 21, wherein the one or more programs include instructions that, when executed by the electronic device, cause the electronic device, in response to receiving the second set of one or more inputs associated with the representation of the physical space, in accordance with a determination that the second set of one or more inputs correspond to a request to shift a field of view of at least one of the one or more cameras so that the first virtual annotation is no longer visible for more than a threshold amount of time, to remove the first virtual annotation from the representation of the physical space.

26. The non-transitory computer readable storage medium of claim 21, wherein the one or more programs include instructions that, when executed by the electronic device, cause the electronic device, while receiving the second set of one or more inputs and while the first virtual annotation is in the representation of the physical space, to output an indication that further input will cause the first virtual annotation to be removed from the representation of the physical space.

27. The non-transitory computer readable storage medium of claim 26, wherein the indication is a visual indication that is displayed in a predetermined portion of the user interface that is used for displaying alerts.

28. The non-transitory computer readable storage medium of claim 26, wherein the indication is a change in appearance of the first virtual annotation in the representation of the physical space.

29. The non-transitory computer readable storage medium of claim 28, wherein the first virtual annotation is a representation of a measurement that includes a description of the measurement, and the change in appearance of the first virtual annotation includes removing the description from the representation of the measurement while maintaining at least a portion of the representation of the measurement.

30. The non-transitory computer readable storage medium of claim 28, wherein the one or more programs include instructions that, when executed by the electronic device, cause the electronic device, after displaying the change in appearance of the first virtual annotation in the representation of the physical space, to:
  detect an input corresponding to a request to create a virtual annotation in the representation of the physical space that is within the threshold distance from the first virtual annotation; and,
  in response to detecting the input corresponding to a request to create a virtual annotation in the representation of the physical space that is within the threshold distance from the first virtual annotation, reverse the change in appearance of the first virtual annotation.

* * * * *